United States Patent
Gottschalk et al.

(10) Patent No.: US 12,448,426 B2
(45) Date of Patent: Oct. 21, 2025

(54) CHIMERIC ANTIGEN RECEPTORS WITH MYD88 AND CD40 COSTIMULATORY DOMAINS

(71) Applicants: ST. JUDE CHILDREN'S RESEARCH HOSPITAL, INC., Memphis, TN (US); BAYLOR COLLEGE OF MEDICINE, Houston, TX (US)

(72) Inventors: Stephen Gottschalk, Memphis, TN (US); Brooke Prinzing, Memphis, TN (US); Giedre Krenciute, Memphis, TN (US)

(73) Assignees: ST. JUDE CHILDREN'S RESEARCH HOSPITAL, INC., Memphis, TN (US); BAYLOR COLLEGE OF MEDICINE, Houston, TX (US)

( * ) Notice: Subject to any disclaimer, the term of this patent is extended or adjusted under 35 U.S.C. 154(b) by 1205 days.

(21) Appl. No.: 17/056,181

(22) PCT Filed: May 17, 2019

(86) PCT No.: PCT/US2019/032786
§ 371 (c)(1),
(2) Date: Nov. 17, 2020

(87) PCT Pub. No.: WO2019/222579
PCT Pub. Date: Nov. 21, 2019

(65) Prior Publication Data
US 2021/0252058 A1    Aug. 19, 2021

Related U.S. Application Data

(60) Provisional application No. 62/672,819, filed on May 17, 2018.

(51) Int. Cl.
| | | |
|---|---|---|
| *C07H 21/04* | (2006.01) | |
| *A61K 40/11* | (2025.01) | |
| *A61K 40/31* | (2025.01) | |
| *A61K 40/42* | (2025.01) | |
| *A61K 48/00* | (2006.01) | |
| *A61P 35/00* | (2006.01) | |
| *C07K 14/705* | (2006.01) | |
| *C07K 14/725* | (2006.01) | |
| *C07K 16/28* | (2006.01) | |
| *C12N 15/63* | (2006.01) | |

(52) U.S. Cl.
CPC .......... *C07K 14/7051* (2013.01); *A61K 40/11* (2025.01); *A61K 40/31* (2025.01); *A61K 40/421* (2025.01); *A61K 40/422* (2025.01); *A61K 40/4232* (2025.01); *A61P 35/00* (2018.01); *C07K 14/70517* (2013.01); *C07K 14/70521* (2013.01); *C07K 14/70575* (2013.01); *C07K 14/70578* (2013.01); *C07K 14/70596* (2013.01); *C07K 16/2866* (2013.01); *A61K 2239/31* (2023.05); *A61K 2239/38* (2023.05); *C07K 2317/622* (2013.01)

(58) Field of Classification Search
CPC ...... A61K 40/31; A61K 40/422; A61K 40/11; A61P 35/00
See application file for complete search history.

(56) References Cited

U.S. PATENT DOCUMENTS

| | | | | |
|---|---|---|---|---|
| 10,568,947 | B2 * | 2/2020 | Brogdon | ............ A61K 31/7068 |
| 10,844,128 | B2 * | 11/2020 | Orentas | .................... A61P 35/00 |
| 11,197,919 | B2 * | 12/2021 | Priceman | ................ A61P 35/00 |
| 11,458,167 | B2 * | 10/2022 | Jensen | ................... C07K 16/30 |
| 11,541,076 | B2 * | 1/2023 | Stadheim | ............... C07K 16/30 |
| 11,655,282 | B2 * | 5/2023 | Corey | |
| 2008/0044413 | A1 | 2/2008 | Hammond et al. | |
| 2010/0183618 | A1 | 7/2010 | Hasegawa et al. | |
| 2010/0203067 | A1 | 8/2010 | Spencer et al. | |
| 2015/0111294 | A1 | 4/2015 | Spencer et al. | |
| 2015/0252080 | A1 | 9/2015 | Stone et al. | |
| 2015/0307564 | A1 | 10/2015 | Young et al. | |
| 2015/0343081 | A1 | 12/2015 | Zhou et al. | |
| 2016/0046700 | A1 | 2/2016 | Foster et al. | |

(Continued)

FOREIGN PATENT DOCUMENTS

| | | | | |
|---|---|---|---|---|
| WO | 00/71150 A1 | 11/2000 | | |
| WO | WO-2007075706 A2 * | 7/2007 | | ............. A61P 35/00 |

(Continued)

OTHER PUBLICATIONS

Chow, KKH et al., "T Cells Redirected to EphA2 for the Immunotherapy of Glioblastoma" The American Society of Gene & Cell Therapy (2013) vol. 21, No. 3, pp. 629-637.

Deguine, J. et al., "MyD88: a Central Player in Innate Immune Signaling" F1000Prime Reports (2014) vol. 6, No. 97, 7 pages total.

Foster, A.E. et al., "Regulated Expansion and Survival of Chimeric Antigen Receptor-Modified T Cells Using Small Molecule-Dependent Inducible MyD88/CD40" Molecular Therapy (2017) vol. 25, No. 9, pp. 2176-2188.

Kaczanowska, S. et al., "A Synthetic CD8α: MyD88 Coreceptor Enhances CD8+ T-Cell Responses to Weakly Immunogenic and Lowly Expressed Tumor Antigens" Microenvironment and Immunology (2017) vol. 77, pp. 7049-7058.

(Continued)

*Primary Examiner* — Quang Nguyen
(74) *Attorney, Agent, or Firm* — Troutman Pepper Locke LLP

(57) ABSTRACT

The application relates to a chimeric antigen receptor that targets Eph receptors and allows activation of co-stimulatory pathways. The application also relates to polynucleotides that encode the chimeric antigen receptor, vectors, and host cells comprising the chimeric antigen receptor. The application also relates to methods for preparing host cells comprising a chimeric antigen receptor in order to improve the in vivo effector function of the chimeric antigen receptor host cells.

10 Claims, 47 Drawing Sheets
(17 of 47 Drawing Sheet(s) Filed in Color)
Specification includes a Sequence Listing.

(56) References Cited

U.S. PATENT DOCUMENTS

| | | |
|---|---|---|
| 2016/0058857 A1 | 3/2016 | Spencer et al. |
| 2016/0175359 A1 | 6/2016 | Spencer et al. |
| 2017/0002321 A1 | 1/2017 | Spencer et al. |
| 2017/0166877 A1 | 6/2017 | Bayle et al. |
| 2017/0267768 A1 | 9/2017 | Marks et al. |
| 2017/0306032 A1 | 10/2017 | Gehlsen |
| 2017/0349663 A1 | 12/2017 | Nikolov et al. |

FOREIGN PATENT DOCUMENTS

| | | | |
|---|---|---|---|
| WO | 2016/036746 A1 | 3/2016 | |
| WO | WO-2019112509 A1 * | 6/2019 | ........... C07K 14/415 |

OTHER PUBLICATIONS

Krenciute, G. et al., "Characterization and Function Analysis of scFv-based Chimeric Antigen Receptors to Redirect T Cells to IL13Rα2-positive Glioma" The American Society of Gene & Cell Therapy (2016) vol. 24, No. 2, pp. 354-363.

Mata, M. et al., "Inducible Activation of MyD88 and CD40 in CAR T Cells Results in Controllable and Potent Antitumor Activity in Preclinical Solid Tumor Models" American Association for Cancer Research (2017) 15 pages total.

Mata, M. et al., "Supplemental Figures: Inducible Activation of MyD88 and CD40 in CAR T Cells Results in Controllable and Potent Antitumor Activity in Preclinical Solid Tumor Models" American Association for Cancer Research (2017) 18 pages total.

Narayanan, P. et al., "A Composite MyD88/CD40 Switch Synergistically Activates Mouse and Human Dendritic Cells for Enhanced Antitumor Efficacy" The Journal of Clinical Investigation (2011) vol. 121, No. 4, pp. 1524-1534.

Pasquale, E.B., "Eph Receptors and Ephrins in Cancer: Bidirectional Signaling and Beyond" Nat Rec Cancer (2010) vol. 10, No. 3, pp. 165-180.

Wypych, J. et al., "Human IgG2 Antibodies Display Disulfide-Mediated Structural Isoforms" The Journal of Biological Chemistry (2008) vol. 283, No. 23, pp. 1619-16205.

Xi, H-Q, et al., "Eph Receptors and Ephrins as Targets for Cancer Therapy" J. Cell Mol. Med. (2012) vol. 16, No. 12, pp. 2894-2909.

Xie, P., "TRAF Molecules in Cell Signaling and in Human Diseases" Journal of Molecular Signaling (2013) vol. 8, No. 7, 31 pages total.

Yi, "Optimizing EphA2-CAR T Cells for the Adoptive Immunotherapy of Glioma" Molecular Therapy, Methods & Clinical Development (2018) vol. 9, pp. 70-80.

Communication (International Search Report) mailed in International Application No. PCT/US2019/32786 dated Sep. 5, 2019, 5 pages total.

Communication (Wirtten Opinion) mailed in International Application No. PCT/US2019/32786 dated Sep. 5, 2019, 6 pages total.

Zhongzhen, Y. et al., "From the CART Workshop: Selecting an EphA2-CAR for the Immunotherapy of GBM" Molecular Therapy (2017) vol. 25, No. 5S1, p. 254.

* cited by examiner

FIG. 6A
CD28.ζ.CAR
<u>Underline: Leader Sequence</u>
Bold: scFv 4H5
*Italic: IgG1 Core Hinge*
<u>Dashed underline: CD28 Transmembrane and Cytoplasmic Domain</u>
*Bold italic: CD3 Zeta*
*<u>Italic and underline: T2A</u>*
<u>Wave underline: Truncated CD19</u>

Amino Acid Sequence (SEQ ID NO:3):
<u>MDWIWRILFLVGAATGAHS</u>**QVQLLESGGGLVQPGGSLRLSCAASGFTFSSYTMSWV
RQAPGQALEWMGTISSGGTYTYYPDSVKGRFTISRDNAKNSLYLQMNSLRAEDTA
VYYCAREAIFTYWGRGTLVTSSGGGGSGGGGSGGGGSDIQLTQSPSSLSASVGDRV
TITCKASQDINNYLSWYQQKPGQAPRLLIYRANRLVDGVPDRFSGSGYGTDFTLTIN
NIESEDAAYYFCLKYDVFPYTFGQGTKVEIKD***LEPKSCDKTHTCPPCP*<u>DPKFWVLVVV
GGVLACYSLLVTVAFIIFWVRSKRSRLLHSDYMNMTPRRPGPTRKHYQPYAPPRDFAAY
RS</u>***RVKFSRSADAPAYQQGQNQLYNELNLGRREEYDVLDKRRGRDPEMGGKPRRKNPQE
GLYNELQKDKMAEAYSEIGMKGERRRGKGHDGLYQGLSTATKDTYDALHMQALPPR***A
SRA*<u>EGRGSLLTCGDVEENPGP</u>*MPPPRLLFFLLFLTPMEVRPEEPLVVKVEEGDNAVLQCL
KGTSDGPTQQLTWSRESPLKPFLKLSLGLPGLGIHMRPLAIWLFIFNVSQQMGGFYLCQP
GPPSEKAWQPGWTVNVEGSGELFRWNVSDLGGLGCGLKNRSSEGPSSPSGKLMSPKLY
VWAKDRPEIWEGEPPCLPPRDSLNQSLSQDLTMAPGSTLWLSCGVPPDSVSRGPLSWTH
VHPKGPKSLLSLELKDDRPARDMWVMETGLLLPRATAQDAGKYYCHRGNLTMSFHLEI
TARPVLWHWLLRTGGWKVSAVTLAYLIFCLCSLVGILHLQRALVLRRKRKRMTDPTRR
F*

Nucleotide Sequence (SEQ ID NO:4):
<u>ATGGACTGGATCTGGCGGATTCTGTTCCTCGTGGGAGCCGCCACAGGCGCTCACTCA</u>**CAGGTGCAGCTGCTGGAATCTGGCGGCGGACTGGTGCAGCCTGGCGGCAGCC
TGAGACTGAGCTGCGCCGCCAGCGGCTTCACCTTCAGCAGCTACACCATGAGC
TGGGTCCGGCAGGCTCCTGGACAGGCCCTGGAATGGATGGGCACCATCAGCAG
CGGCGGCACCTACACCTACTACCCCGACAGCGTGAAGGGCCGGTTCACCATCA
GCCGGGACAACGCCAAGAACAGCCTGTACCTGCAGATGAACAGCCTGAGAGCC
GAGGACACAGCCGTGTACTACTGCGCCAGAGAGGCCATCTTCACCTACTGGGG
CAGAGGCACCCTGGTCACAAGCAGCGGAGGCGGAGGAAGTGGAGGGGGAGGA
TCAGGCGGCGGAGGCAGCGATATCCAGCTGACCCAGAGCCCTAGCAGCCTGAG
CGCCAGCGTGGGCGACAGAGTGACCATCACATGCAAGGCCAGCCAGGACATCA
ACAACTACCTGAGCTGGTATCAGCAGAAGCCCGGCCAGGCCCCAGACTGCTG
ATCTACCGGGCCAACAGACTGGTGGACGGCGTGCCCGATAGATTCAGCGGCAG
CGGCTACGGCACCGACTTCACCCTGACCATCAACAACATCGAGTCCGAGGACG
CCGCCTACTACTTCTGCCTGAAGTACGACGTGTTCCCCTACACCTTCGGCCAGG
GCACCAAGGTGGAGATCAAGGATCTC***GAGCCCAAATCTTGTGACAAAACTCACACAT
GCCCACCGTGCCCG*GATCCCAAG<u>TTCTGGGTGCTGGTGGTCGTGGGCGGAGTGCTGG
CCTGTTACAGCCTGCTCGTGACCGTGGCCTTCATCATCTTTGGGTGCGCAGCAAGC
GGAGCCGGCTGCTGCACAGCGACTACATGAACATGACCCCAGACGGCCTGGCCCC
ACCAGAAAGCACTACCAGCCTTACGCCCCTCCCAGAGACTTCGCCGCCTACCGGTCC</u>

FIG. 6B

*AGAGTGAAGTTCAGCAGAAGCGCCGACGCCCCTGCCTATCAGCAGGGCCAGAACCAG*
*CTGTACAACGAGCTGAACCTGGGCAGACGGGAAGAGTACGACGTGCTGGACAAGCGG*
*AGAGGCAGGGACCCTGAGATGGGCGGCAAGCCCAGAAGAAAGAACCCCAGGAAGG*
*CCTGTATAACGAACTGCAGAAAGACAAGATGGCCGAGGCCTACAGCGAGATCGGCAT*
*GAAGGGCGAGCGGAGAAGAGGCAAGGGCCACGATGGCCTGTACCAGGGACTGAGCA*
*CCGCCACCAAGGACACCTACGACGCCCTGCACATGCAGGCCCTGCCTCCAAGA*GCCT
CTAGAGCC<u>GAGGGCAGAGGCAGCCTGCTGACATGTGGCGACGTGGAAGAGAACCCAGG
CCCCATGCCTCCCCCCAGACTGCTGTTCTTCCTGCTGTTCCTGACCCCTATGGAAGTG
CGGCCCGAGGAACCCCTGGTCGTGAAAGTGGAAGAGGGCGACAACGCCGTGCTGCA
GTGTCTGAAGGGCACCTCCGATGGCCCTACCCAGCAGCTGACCTGGTCCAGAGAGA
GCCCCCTGAAGCCCTTCCTGAAGCTGTCTCTGGGCCTGCCTGGCCTGGGCATCCATA
TGAGGCCACTGGCCATCTGGCTGTTCATCTTCAACGTGTCCCAGCAGATGGGAGGCT
TCTACCTGTGCCAGCCTGGCCCACCTTCTGAGAAGGCTTGGCAGCCTGGCTGGACCG
TGAACGTGGAAGGATCTGGCGAGCTGTTCCGGTGGAACGTGTCCGATCTGGGCGGC
CTGGGATGCGGCCTGAAGAACAGATCTAGCGAGGGCCCCAGCAGCCCCAGCGGCAA
ACTGATGAGCCCCAAGCTGTACGTGTGGGCCAAGGACAGACCCGAGATTTGGGAGG
GCGAGCCCCCTTGCCTGCCCCTAGAGATAGCCTGAACCAGAGCCTGAGCCAGGAC
CTGACAATGGCCCCTGGCAGCACACTGTGGCTGAGCTGTGGCGTGCCACCCGACTCT
GTGTCTAGAGGCCCTCTGAGCTGGACCCACGTGCACCCTAAGGGCCCTAAGAGCCT
GCTGTCCCTGGAACTGAAGGACGACAGGCCCGCCAGAGATATGTGGGTCATGGAAA
CCGGCCTGCTGCTGCCTAGAGCCACAGCCCAGGATGCCGGCAAGTACTACTGCCAC
AGAGGCAACCTGACCATGAGCTTCCACCTGGAAATCACCGCCAGACCCGTGCTGTG
GCACTGGCTGCTGAGAACCGGCGGATGGAAAGTGTCCGCCGTGACTCTGGCCTACC
TGATCTTCTGCCTGTGCTCCCTCGTGGGCATCCTGCATCTGCAGAGGGCTCTGGTGCT
GCGGCGGAAGCGGAAGAGAATGACCGACCCTACCCGGCGGTTCTAA</u>

FIG. 6C
4-1BB.ζ.CAR
Underline: Leader Sequence
Bold: scFv 4H5
*Italic: IgG1 Core Hinge*
Dashed underline: CD8a Transmembrane Domain
Bold and underline: 41BB
*Bold italic: CD3 Zeta*
*Italic and underline: T2A*
Wave underline: Truncated CD19

Amino Acid Sequence (SEQ ID NO:5):
MDWIWRILFLVGAATGAHSQVQLLESGGGLVQPGGSLRLSCAASGFTFSSYTMSWV RQAPGQALEWMGTISSGGTYTYYPDSVKGRFTISRDNAKNSLYLQMNSLRAEDTA VYYCAREAIFTYWGRGTLVTSSGGGGSGGGGSGGGGSDIQLTQSPSSLSASVGDRV TITCKASQDINNYLSWYQQKPGQAPRLLIYRANRLVDGVPDRFSGSGYGTDFTLTIN NIESEDAAYYFCLKYDVFPYTFGQGTKVEIKDL*EPKSCDKTHTCPPCP*DPKCDIYIWAP LAGTCGVLLLSLVITLYCNHRNKRGRKKLLYIFKQPFMRPVQTTQEEDGCSCRFPEE EEGGCEL*RVKFSRSADAPAYQQGQNQLYNELNLGRREEYDVLDKRRGRDPEMGGKPR RKNPQEGLYNELQKDKMAEAYSEIGMKGERRRGKGHDGLYQGLSTATKDTYDALHMQ ALPPR***ASRA*EGRGSLLTCGDVEENPGP*MPPPRLLFFLLFLTPMEVRPEEPLVVKVEEGDN AVLQCLKGTSDGPTQQLTWSRESPLKPFLKLSLGLPGLGIHMRPLAIWLFIFNVSQQMGG FYLCQPGPPSEKAWQPGWTVNVEGSGELFRWNVSDLGGLGCGLKNRSSEGPSSPSGKL MSPKLYVWAKDRPEIWEGEPPCLPPRDSLNQSLSQDLTMAPGSTLWLSCGVPPDSVSRG PLSWTHVHPKGPKSLLSLELKDDRPARDMWVMETGLLLPRATAQDAGKYYCHRGNLT MSFHLEITARPVLWHWLLRTGGWKVSAVTLAYLIFCLCSLVGILHLQRALVLRRKRKR MTDPTRRF*

Nucleotide Sequence (SEQ ID NO:6):
ATGGACTGGATCTGGCGGATTCTGTTCCTCGTGGGAGCCGCCACAGGCGCTCACTCA CAGGTGCAGCTGCTGGAATCTGGCGGCGGACTGGTGCAGCCTGGCGGCAGCC TGAGACTGAGCTGCGCCGCCAGCGGCTTCACCTTCAGCAGCTACACCATGAGC TGGGTCCGGCAGGCTCCTGGACAGGCCCTGGAATGGATGGGCACCATCAGCAG CGGCGGCACCTACACCTACTACCCCGACAGCGTGAAGGGCCGGTTCACCATCA GCCGGGACAACGCCAAGAACAGCCTGTACCTGCAGATGAACAGCCTGAGAGCC GAGGACACAGCCGTGTACTACTGCGCCAGAGAGGCCATCTTCACCTACTGGGG CAGAGGCACCCTGGTCACAAGCAGCGGAGGCGGAGGAAGTGGAGGGGGAGGA TCAGGCGGCGGAGGCAGCGATATCCAGCTGACCCAGAGCCCTAGCAGCCTGAG CGCCAGCGTGGGCGACAGAGTGACCATCACATGCAAGGCCAGCCAGGACATCA ACAACTACCTGAGCTGGTATCAGCAGAAGCCCGGCCAGGCCCCCAGACTGCTG ATCTACCGGGCCAACAGACTGGTGGACGGCGTGCCCGATAGATTCAGCGGCAG CGGCTACGGCACCGACTTCACCCTGACCATCAACAACATCGAGTCCGAGGACG CCGCCTACTACTTCTGCCTGAAGTACGACGTGTTCCCCTACACCTTCGGCCAGG GCACCAAGGTGGAGATCAAGGATCTC*GAGCCCAAATCTTGTGACAAAACTCACACAT GCCCACCGTGCCCGGATCCCAAGT*GCGACATCTACATCTGGGCCCCTCTGGCCGGCA CATGTGGCGTGCTGCTGCTGAGCCTCGTGATCACCCTGTACTGCAACCACCGGAACA AGCGGGGCAGAAAGAAGCTGCTGTACATCTTCAAGCAGCCCTTCATGCGGCCC

FIG. 6D

**GTGCAGACCACCCAGGAAGAGGACGGCTGCTCCTGCAGATTCCCCGAGGAAGA
AGAAGGCGGCTGCGAGCTG**///AGAGTGAAGTTCAGCAGAAGCGCCGACGCCCCTGCC
TATCAGCAGGGCCAGAACCAGCTGTACAACGAGCTGAACCTGGGCAGACGGGAAGAG
TACGACGTGCTGGACAAGCGGAGAGGCAGGGACCCTGAGATGGGCGGCAAGCCCAG
AAGAAAGAACCCCCAGGAAGGCCTGTATAACGAACTGCAGAAAGACAAGATGGCCGA
GGCCTACAGCGAGATCGGAATGAAGGGCGAGCGGAGAAGAGGCAAGGGCCACGATG
GCCTGTACCAGGGCCTGAGCACCGCCACCAAGGACACCTATGACGCCCTGCACATGC
AGGCCCTGCCCCCTAGA///GCCTCTAGAGCC*GAGGGAAGAGGCAGCCTGCTGACCTGTGG
GGACGTGGAAGAGAACCCTGGCCCT*ATGCCCCCTCCCCGGCTGCTGTTCTTCCTGCTG
TTCCTGACCCCTATGGAAGTGCGGCCCGAGGAACCCCTGGTCGTGAAAGTGGAAGA
GGGCGACAACGCCGTGCTGCAGTGTCTGAAGGGCACCTCCGATGGCCCTACCCAGC
AGCTGACCTGGTCCAGAGAGAGCCCCCTGAAGCCCTTCCTGAAGCTGTCTCTGGGCC
TGCCTGGCCTGGGCATCCATATGAGGCCACTGGCCATCTGGCTGTTCATCTTTAACG
TGTCCCAGCAGATGGGAGGCTTCTACCTGTGCCAGCCTGGCCCCCATCTGAGAAAG
CTTGGCAGCCTGGCTGGACCGTGAACGTGGAAGGATCTGGCGAGCTGTTCAGATGG
AACGTGTCCGACCTGGGCGGCCTGGGCTGTGGCCTGAAGAATAGAAGCAGCGAGGG
CCCCAGCAGCCCCAGCGGAAAACTGATGAGCCCCAAGCTGTACGTGTGGGCCAAGG
ACAGACCCGAGATCTGGGAGGGCGAGCCTCCTTGCCTGCCTCCCAGAGATAGCCTG
AACCAGAGCCTGTCCCAGGATCTGACAATGGCCCCTGGCAGCACCCTGTGGCTGTCT
TGCGGAGTGCCTCCCGACTCCGTGTCTAGAGGCCCTCTGAGCTGGACCCACGTGCAC
CCTAAGGGCCCTAAGAGCCTGCTGTCCCTGGAACTGAAGGACGACAGGCCCGCCAG
AGATATGTGGGTCATGGAAACCGGCCTGCTGCTGCCTAGAGCCACTGCCCAGGATG
CCGGCAAGTACTACTGCCACAGAGGCAACCTGACCATGAGCTTCCACCTGGAAATC
ACCGCCAGACCCGTGCTGTGGCACTGGCTGCTGAGAACCGGCGGCTGGAAAGTGTC
TGCCGTGACCCTGGCCTACCTGATCTTCTGCCTGTGCTCCCTCGTGGGCATCCTGCAT
CTGCAGAGGGCTCTGGTGCTGCGGCGGAAGCGGAAGAGAATGACCGACCCCACCCG
GCGGTTCTAA*

FIG. 6E
Myd88.CD40.ζ.CAR
Underline: Leader Sequence (SEQ ID NO:7 (aa); SEQ ID NO:8 (na))
Bold: scFv 4H5 (SEQ ID NO:9 (aa); SEQ ID NO:10 (na))
*Italic: IgG1 Core Hinge (SEQ ID NO:11 (aa); SEQ ID NO:12 (na))*
Dashed underline: CD28 Transmembrane Domain (SEQ ID NO:13 (aa); SEQ ID NO:14(na))
Double underline: MyD88 (SEQ ID NO:15 (aa); SEQ ID NO:16 (na))
Bold and underline: CD40 (SEQ ID NO:17 (aa); SEQ ID NO:18 (na))
*Bold italic: CD3 Zeta (SEQ ID NO:19 (aa); SEQ ID NO:20 (na))*
*Italic and underline: T2A (SEQ ID NO:21 (aa); SEQ ID NO:22 (na))*
Wave underline: Truncated CD19 (SEQ ID NO:23 (aa); SEQ ID NO:24 (na))

Amino Acid Sequence (SEQ ID NO:1):
MDWIWRILFLVGAATGAHS**QVQLLESGGGLVQPGGSLRLSCAASGFTFSSYTMSWV
RQAPGQALEWMGTISSGGTYTYYPDSVKGRFTISRDNAKNSLYLQMNSLRAEDTA
VYYCAREAIFTYWGRGTLVTSSGGGGSGGGGSGGGGSDIQLTQSPSSLSASVGDRV
TITCKASQDINNYLSWYQQKPGQAPRLLIYRANRLVDGVPDRFSGSGYGTDFTLTIN
NIESEDAAYYFCLKYDVFPYTFGQGTKVEIK**D*LEPKSCDKTHTCPPCP*DPKFWVLVVV
GGVLACYSLLVTVAFIIFWVAAGGPGAGSAAPVSSTSSLPLAALNMRVRRRLSFLNVR
TQVAADWTALAEEMDFEYLEIRQLETQADPTGRLLDAWQGRPGASVGRLLELLTKLGR
DDVLLELGPSIEEDCQKYILKQQQEEAEKPLQVAAVDSSVPRTAELAGITTLDDPLGHMP
ERFDAFICYPSDIVE**KKVAKKPTNKAPHPKQEPQEINFPDDLPGSNTAAPVQETLHG
CQPVTQEDGKESRISVQERQR***VKFSRSADAPAYQQGQNQLYNELNLGRREEYDVLDK
RRGRDPEMGGKPRRKNPQEGLYNELQKDKMAEAYSEIGMKGERRRGKGHDGLYQGLS
TATKDTYDALHMQALPPR***ASRA*EGRGSLLTCGDVEENPGP*MPPPRLLFFLLFLTPMEVRP
EEPLVVKVEEGDNAVLQCLKGTSDGPTQQLTWSRESPLKPFLKLSLGLPGLGIHMRPLAI
WLFIFNVSQQMGGFYLCQPGPPSEKAWQPGWTVNVEGSGELFRWNVSDLGGLGCGLK
NRSSEGPSSPSGKLMSPKLYVWAKDRPEIWEGEPPCLPPRDSLNQSLSQDLTMAPGSTL
WLSCGVPPDSVSRGPLSWTHVHPKGPKSLLSLELKDDRPARDMWVMETGLLLPRATAQ
DAGKYYCHRGNLTMSFHLEITARPVLHWLLRTGGWKVSAVTLAYLIFCLCSLVGILH
LQRALVLRRKRKRMTDPTRRF*

Nucleotide Sequence (SEQ ID NO:2):
ATGGACTGGATCTGGCGGATTCTGTTCCTCGTGGGAGCCGCCACAGGCGCTCACTCA
CAGGTGCAGCTGCTGGAATCTGGCGGCGGACTGGTGCAGCCTGGCGGCAGCC
TGAGACTGAGCTGCGCCGCCAGCGGCTTCACCTTCAGCAGCTACACCATGAGC
TGGGTCCGGCAGGCTCCTGGACAGGCCCTGGAATGGATGGGCACCATCAGCAG
CGGCGGCACCTACACCTACTACCCCGACAGCGTGAAGGGCCGGTTCACCATCA
GCCGGGACAACGCCAAGAACAGCCTGTACCTGCAGATGAACAGCCTGAGAGCC
GAGGACACAGCCGTGTACTACTGCGCCAGAGAGGCCATCTTCACCTACTGGGG
CAGAGGCACCCTGGTCACAAGCAGCGGAGGCGGAGGAAGTGGAGGGGGAGGA
TCAGGCGGCGGAGGCAGCGATATCCAGCTGACCCAGAGCCCTAGCAGCCTGAG
CGCCAGCGTGGGCGACAGAGTGACCATCACATGCAAGGCCAGCCAGGACATCA
ACAACTACCTGAGCTGGTATCAGCAGAAGCCCGGCCAGGCCCCCAGACTGCTG
ATCTACCGGGCCAACAGACTGGTGGACGGCGTGCCCGATAGATTCAGCGGCAG
CGGCTACGGCACCGACTTCACCCTGACCATCAACAACATCGAGTCCGAGGACG
CCGCCTACTACTTCTGCCTGAAGTACGACGTGTTCCCCTACACCTTCGGCCAGG

FIG. 6F

GCACCAAGGTGGAGATCAAGGATCTC*GAGCCCAAATCTTGTGACAAAACTCACACAT
GCCCACCGTGCCCG*GATCCCAAAT<u>TTTGGGTGCTGGTGGTGGTTGGTGGAGTCCTGG
CTTGCTATAGCTTGCTAGTAACAGTGGCCTTTATTATTTTCTGGGTGGCTGCTGGCGG
ACCTGGCGCCGGATCTGCTGCTCCTGTGTCTAGCACAAGCAGCCTGCCTCTGGCCGC
CCTGAACATGAGAGTGCGGAGAAGGCTGAGCCTGTTCCTGAACGTGCGGACACAGG
TGGCCGCCGATTGGACAGCCCTGGCCGAGGAAATGGACTTCGAGTACCTGGAAATC
CGGCAGCTGGAAACCCAGGCCGACCCTACAGGCAGACTGCTGGATGCTTGGCAGGG
CAGACCAGGCGCTTCTGTGGGAAGGCTGCTGGAACTGCTGACCAAGCTGGGCAGGG
ACGACGTGCTGCTGGAACTGGGCCCTAGCATCGAAGAGGACTGCCAGAAGTACATC
CTGAAGCAGCAGCAGGAAGAGGCCGAGAAGCCTCTGCAGGTGGCAGCCGTGGATA
GCAGCGTGCCAAGAACAGCCGAGCTGGCCGGCATCACCACCCTGGATGATCCTCTG
GGCCACATGCCCGAGAGATTCGACGCCTTCATCTGCTACTGCCCCAGCGACATCGTG
GAA**AAGAAGGTGGCCAAGAAGCCCACCAACAAGGCCCCCACCCCAAGCAGGA
ACCCCAGGAAATCAACTTCCCCGACGACCTGCCCGGCAGCAATACTGCTGCAC
CCGTGCAGGAAACCCTGCACGGCTGTCAGCCTGTGACCCAGGAAGATGGCAAA
GAAAGCCGGATCTCTGTGCAGGAACGCCAG**AGAGTGAAGTTCAGCAGGAGCGCA
GACGCCCCGCGTACCAGCAGGGCCAGAACCAGCTCTATAACGAGCTCAATCTAGGA
CGAAGAGAGGAGTACGATGTTTTGGACAAGAGACGTGGCCGGGACCCTGAGATGGGC
GGCAAGCCCAGAAGAAAGAACCCCAGGAAGGCCTGTATAACGAACTGCAGAAAGAC
AAGATGGCCGAGGCCTACAGCGAGATCGGCATGAAGGGCGAGCGGAGAAGAGGCAA
GGGCCACGATGGCCTGTACCAGGGACTGAGCACCGCCACCAAGGACACCTACGACGC
CCTGCACATGCAGGCCCTGCCTCCAAG*AGCCTCTAGAGCC<u>GAGGGCAGAGGCAGCCT
GCTGACATGTGGCGACGTGGAAGAGAACCCAGGCCCC*ATGCCTCCCCCCAGACTGCTG
TTCTTCCTGCTGTTCCTGACCCCTATGGAAGTGCGGCCCGAGGAACCCCTGGTCGTG
AAAGTGGAAGAGGGCGACAACGCCGTGCTGCAGTGTCTGAAGGGCACCTCCGATGG
CCCTACCCAGCAGCTGACCTGGTCCAGAGAGAGCCCCCTGAAGCCCTTCCTGAAGCT
GTCTCTGGGCCTGCCTGGCCTGGGCATCCATATGAGGCCACTGGCCATCTGGCTGTT
CATCTTCAACGTGTCCCAGCAGATGGGAGGCTTCTACCTGTGCCAGCCTGGCCCACC
TTCTGAGAAGGCTTGGCAGCCTGGCTGGACCGTGAACGTGGAAGGATCTGGCGAGC
TGTTCCGGTGGAACGTGTCCGATCTGGGCGGCCTGGGATGCGGCCTGAAGAACAGA
TCTAGCGAGGGCCCCAGCAGCCCCAGCGGCAAACTGATGAGCCCCAAGCTGTACGT
GTGGGCCAAGGACAGACCCGAGATTTGGGAGGGCGAGCCCCCTTGCCTGCCCCCTA
GAGATAGCCTGAACCAGAGCCTGAGCCAGGACCTGACAATGGCCCCTGGCAGCACA
CTGTGGCTGAGCTGTGGCGTGCCACCCGACTCTGTGTCTAGAGGCCCTCTGAGCTGG
ACCCACGTGCACCCTAAGGGCCCTAAGAGCCTGCTGTCCCTGGAACTGAAGGACGA
CAGGCCCGCCAGAGATATGTGGGTCATGGAAACCGGCCTGCTGCTGCCTAGAGCCA
CAGCCCAGGATGCCGGCAAGTACTACTGCCACAGAGGCAACCTGACCATGAGCTTC
CACCTGGAAATCACCGCCAGACCCGTGCTGTGGCACTGGCTGCTGAGAACCGGCGG
ATGGAAAGTGTCCGCCGTGACTCTGGCCTACCTGATCTTCTGCCTGTGCTCCCTCGTG
GGCATCCTGCATCTGCAGAGGGCTCTGGTGCTGCGGCGGAAGCGGAAGAGAATGAC
CGACCCTACCCGGCGGTTCTAA</u>

FIG. 7B m47.MyD88.CD40.z
Underline: Leader Sequence
Bold: scFv m47
*Italic: IgG1 Core Hinge*
Dashed underline: CD28 Transmembrane Domain
Double underline: MyD88
Bold and underline: CD40
*Bold italic: CD3 Zeta*

Amino Acid Sequence (SEQ ID NO: 63):
MDWIWRILFLVGAATGAHSQVQLQQPGAELVRPGAELVRPGASVKLSCKASGYTFSNYLMNWVKQRPEQDLDWIGRI
DPYDGDIDYNQNFKDKAILTVDKSSSTAYMQLSSLTSEDSAVYYCARGYGTAYGVDYWGQGTSVTVSSAK
TTPPKLEEGEFSEARVDIVLTQSPASLAVSLGQRATISCRASESVDNYGISFMNWFQQKPGQPPKLLIYA
ASRQGSGVPARFSGSGSGTDFSLNIHPMEEDDTAMYFCQQSKEVPWTFGGGTKLEIKD*LEPKSCDKTHTC*
*PPCPDPKFWVLVVVGGVLACYSLLVTVAFIIFWV*AAGGPGAGSAAPVSSTSSLPLAALNMRVRRRLSLFL
NVRTQVAADWTALAEEMDFEYLEIRQLETQADPTGRLLDAWQGRPGASVGRLLELLTKLGRDDVLLELGP
SIEEDCQKYILKQQQEEAEKPLQVAAVDSSVPRTAELAGITTLDDPLGHMPERFDAFICYCPSDIVEKKV
AKKPTNKAPHPKQEPQEINFPDDLPGSNTAAPVQETLHGCQPVTQEDGKESRISVQERQRVKFSRSADAP
AYQQGQNQLYNELNLGRREEYDVLDKRRGRDPEMGGKPRRKNPQEGLYNELQKDKMAEAYSEIGMKGERR
RGKGHDGLYQGLSTATKDTYDALHMQALPPR*

Nucleotide Sequence (SEQ ID NO: 64):
ATGGACTGGATCTGGCGCATCCTGTTTCTCGTGGGAGCCGCCACAGGCGCCCATTCTCAGGTGCAGCTGC
AGCAGCCTGGCGCTGAACTCGTGCGGCCAGGCGCTTCTGTGAAGCTGAGCTGTAAAGCCAGCGGCTACAC
CTTCAGCAACTACCTGATGAACTGGGTCAAGCAGCGGCCCGAGCAGGACCTGGATTGGATCGGCAGAATC
GACCCCTACGACGGCGACATCGACTACAACCAGAACTTCAAGGACAAGGCCATCCTGACCGTGGACAAGA
GCAGCAGCACCGCCTACATGCAGCTGTCCAGCCTGACCAGCGAGGACAGCGCCGTGTACTACTGCGCCAG
AGGCTACGGCACAGCCTACGGCGTGGACTATTGGGGCCAGGGCACAAGCGTGACCGTGTCCAGCGCCAAG
ACCACCCCCCCTAAGCTGGAAGAGGGCGAGTTCTCCGAGGCCCGGGTGGACATTGTGCTGACACAGTCTC
CAGCCAGCCTGGCCGTGTCCCTGGGACAGAGAGCCACCATCAGCTGTAGGGCCAGCGAGAGCGTGGACAA
CTACGGCATCAGCTTCATGAATTGGTTCCAGCAGAAGCCCGGCCAGCCCCCAAGCTGCTGATCTATGCC
GCCAGCAGACAGGGCAGCGGAGTGCCTGCCAGATTTTCTGGCAGCGGCTCCGGCACCGACTTCAGCCTGA
ACATCCACCCTATGGAAGAGGACGACACCGCCATGTACTTTTGCCAGCAGAGCAAAGAGGTGCCCTGGAC
CTTTGGCGGAGGCACCAAGCTGGAAATCAAGGATCTC*GAGCCCAAATCTTGTGACAAAACTCACACATGC*
*CCACCGTGCCCGGA*TCCCAAATTTTGGGTGCTGGTGGTGGTTGGTGGAGTCCTGGCTTGCTATAGCTTGC
TAGTAACAGTGGCCTTTATTATTTTCTGGGTGGCTGCTGGCGGACCTGGCGCCGGATCTGCTGCTCCTGT
GTCTAGCACAAGCAGCCTGCCTCTGGCCGCCCTGAACATGAGAGTGCGGAGAAGGCTGAGCCTGTTCCTG
AACGTGCGGACACAGGTGGCCGCCGATTGGACAGCCCTGGCCGAGGAAATGGACTTCGAGTACCTGGAAA
TCCGGCAGCTGGAAACCCAGGCCGACCCTACAGGCAGACTGCTGGATGCTTGGCAGGGCAGACCAGGCGC
TTCTGTGGGAAGGCTGCTGGAACTGCTGACCAAGCTGGGCAGGGACGACGTGCTGCTGGAACTGGGCCCT
AGCATCGAAGAGGACTGCCAGAAGTACATCCTGAAGCAGCAGCAGGAAGAGGCCGAGAAGCCTCTGCAGG
TGGCAGCCGTGGATAGCAGCGTGCCAAGAACAGCCGAGCTGGCCGGCATCACCACCCTGGATGATCCTCT
GGGCCACATGCCCGAGAGATTCGACGCCTTCATCTGCTACTGCCCCAGCGACATCGTGGAAAAGAAGGTG
GCCAAGAAGCCCACCAACAAGGCCCCCCACCCCAAGCAGGAACCCCAGGAAATCAACTTCCCCGACGACC
TGCCCGGCAGCAATACTGCTGCACCCGTGCAGGAAACCCTGCACGGCTGTCAGCCTGTGACCCAGGAAGA
TGGCAAAGAAAGCCGGATCTCTGTGCAGGAACGCCAGAGAGTGAAGTTCAGCAGGAGCGCAGACGCCCCC
GCGTACCAGCAGGGCCAGAACCAGCTCTATAACGAGCTCAATCTAGGACGAAGAGAGGAGTACGATGTTT
TGGACAAGAGACGTGGCCGGGACCCTGAGATGGGGGGAAAGCCGAGAAGGAAGAACCCTCAGGAAGGCCT
GTACAATGAACTGCAGAAAGATAAGATGGCGGAGGCCTACAGTGAGATTGGGATGAAAGGCGAGCGCCGG
AGGGGCAAGGGGCACGATGGCCTTTACCAGGGTCTCAGTACAGCCACCAAGGACACCTACGACGCCCTTC
ACATGCAGGCCCTGCCCCCTCGCTAA

FIG. 7C m47.MyD88.z
Underline: Leader Sequence
Bold: scFv m47
*Italic: IgG1 Core Hinge*
Dashed underline: CD28 Transmembrane Domain
Double underline: MyD88
*Bold italic: CD3 Zeta*

Amino Acid Sequence (SEQ ID NO: 65):
<u>MDWIWRILFLVGAATGAHS</u>**QVQLQQPGAELVRPGASVKLSCKASGYTFSNYLMNWVKQRPEQDLDWI
GRIDPYDGDIDYNQNFKDKAILTVDKSSSTAYMQLSSLTSEDSAVYYCARGYGTAYGVDYWGQGTSV
TVSSAKTTPPKLEEGEFSEARVDIVLTQSPASLAVSLGQRATISCRASESVDNYGISFMNWFQQKPG
QPPKLLIYAASRQGSGVPARFSGSGSGTDFSLNIHPMEEDDTAMYFCQQSKEVPWTFGGGTKLEIKD**
*LEPKSCDKTHTCPPCPDPKFWVLVVVGGVLACYSLLVTVAFIIFWV*<span style="border-bottom: 1px dashed">AAGGPGAGSAAPVSSTSSLPL</span>
<u><u>AALNMRVRRRLSLFLNVRTQVAADWTALAEEMDFEYLEIRQLETQADPTGRLLDAWQGRPGASVGRL
LELLTKLGRDDVLLELGPSIEEDCQKYILKQQQEEAEKPLQVAAVDSSVPRTAELAGITTLDDPLGH
MPERFDAFICYCPSDI</u></u>***RVKFSRSADAPAYQQGQNQLYNELNLGRREEYDVLDKRRGRDPEMGGKPRR
KNPQEGLYNELQKDKMAEAYSEIGMKGERRRGKGHDGLYQGLSTATKDTYDALHMQALPPR*****

Nucleotide Sequence (SEQ ID NO: 66):
<u>ATGGACTGGATCTGGCGCATCCTGTTTCTCGTGGGAGCCGCCACAGGCGCCCATTCT</u>**CAGGTGCAGC
TGCAGCAGCCTGGCGCTGAACTCGTGCGGCCAGGCGCTTCTGTGAAGCTGAGCTGTAAAGCCAGCGG
CTACACCTTCAGCAACTACCTGATGAACTGGGTCAAGCAGCGGCCCGAGCAGGACCTGGATTGGATC
GGCAGAATCGACCCCTACGACGGCGACATCGACTACAACCAGAACTTCAAGGACAAGGCCATCCTGA
CCGTGGACAAGAGCAGCAGCACCGCCTACATGCAGCTGTCCAGCCTGACCAGCGAGGACAGCGCCGT
GTACTACTGCGCCAGAGGCTACGGCACAGCCTACGGCGTGGACTATTGGGGCCAGGGCACAAGCGTG
ACCGTGTCCAGCGCCAAGACCACCCCCCCTAAGCTGGAAGAGGGCGAGTTCTCCGAGGCCCGGGTGG
ACATTGTGCTGACACAGTCTCCAGCCAGCCTGGCCGTGTCCCTGGGACAGAGAGCCACCATCAGCTG
TAGGGCCAGCGAGAGCGTGGACAACTACGGCATCAGCTTCATGAATTGGTTCCAGCAGAAGCCCGGC
CAGCCCCCCAAGCTGCTGATCTATGCCGCCAGCAGACAGGGCAGCGGAGTGCCTGCCAGATTTTCTG
GCAGCGGCTCCGGCACCGACTTCAGCCTGAACATCCACCCTATGGAAGAGGACGACACCGCCATGTA
CTTTTGCCAGCAGAGCAAAGAGGTGCCCTGGACCTTTGGCGGAGGCACCAAGCTGGAAATCAAG**<u>GAT
CTC</u>*GAGCCCAAATCTTGTGACAAAACTCACACATGCCCACCGTGCCCGGATCCCAAATTTTGGGTGC*
<span style="border-bottom: 1px dashed">TGGTGGTGGTTGGTGGAGTCCTGGCTTGCTATAGCTTGCTAGTAACAGTGGCCTTTATTATTTTCTG
GGTGGCTGCTGGCGGACCTGGCGCCGGATCTGCTGCTCCTGTGTCTAGCACAAGCAGCCTGCCTCTG</span>
<u><u>GCCGCCCTGAACATGAGAGTGCGGAGAAGGCTGAGCCTGTTCCTGAACGTGCGGACACAGGTGGCCG
CCGATTGGACAGCCCTGGCCGAGGAAATGGACTTCGAGTACCTGGAAATCCGGCAGCTGGAAACCCA
GGCCGACCCTACAGGCAGACTGCTGGATGCTTGGCAGGGCAGACCAGGCGCTTCTGTGGGAAGGCTG
CTGGAACTGCTGACCAAGCTGGGCAGGGACGACGTGCTGCTGGAACTGGGCCCTAGCATCGAAGAGG
ACTGCCAGAAGTACATCCTGAAGCAGCAGCAGGAAGAGGCCGAGAAGCCTCTGCAGGTGGCAGCCGT
GGATAGCAGCGTGCCAAGAACAGCCGAGCTGGCCGGCATCACCACCCTGGATGATCCTCTGGGCCAC
ATGCCCGAGAGATTCGACGCCTTCATCTGCTACTGCCCCAGCGACATC</u></u>***AGAGTGAAGTTCAGCAGGA
GCGCAGACGCCCCCGCGTACCAGCAGGGCCAGAACCAGCTCTATAACGAGCTCAATCTAGGACGAAG
AGAGGAGTACGATGTTTTGGACAAGAGACGTGGCCGGGACCCTGAGATGGGGGGAAAGCCGAGAAGG
AAGAACCCTCAGGAAGGCCTGTACAATGAACTGCAGAAAGATAAGATGGCGGAGGCCTACAGTGAGA
TTGGGATGAAAGGCGAGCGCCGGAGGGGCAAGGGGCACGATGGCCTTTACCAGGGTCTCAGTACAGC
CACCAAGGACACCTACGACGCCCTTCACATGCAGGCCCTGCCCCCTCGC*TAA

FIG. 7D m47.CD28.z
Underline: Leader Sequence
Bold: scFv m47
*Italic: IgG1 Core Hinge*
Dashed underline: CD28 Transmembrane and Cytoplasmic Domain
*Bold italic: CD3 Zeta*

Amino Acid Sequence (SEQ ID NO: 67):
<u>MDWIWRILFLVGAATGAHS</u>**QVQLQQPGAELVRPGASVKLSCKASGYTFSNYLMNWVKQRPEQDL
DWIGRIDPYDGDIDYNQNFKDKAILTVDKSSSTAYMQLSSLTSEDSAVYYCARGYGTAYGVDYW
GQGTSVTVSSAKTTPPKLEEGEFSEARVDIVLTQSPASLAVSLGQRATISCRASESVDNYGISF
MNWFQQKPGQPPKLLIYAASRQGSGVPARFSGSGSGTDFSLNIHPMEEDDTAMYFCQQSKEVPW
TFGGGTKLEIK**D*LEPKSCDKTHTCPPCP*DPKFWVLVVVGGVLACYSLLVTVAFIIFWVRSKRSR
LLHSDYMNMTPRRPGPTRKHYQPYAPPRDFAAYRS****RVKFSRSADAPAYQQGQNQLYNELNLGRR
EEYDVLDKRRGRDPEMGGKPRRKNPQEGLYNELQKDKMAEAYSEIGMKGERRRGKGHDGLYQGL
STATKDTYDALHMQALPPR*****

Nucleotide Sequence (SEQ ID NO: 68):
<u>ATGGACTGGATCTGGCGCATCCTGTTTCTCGTGGGAGCCGCCACAGGCGCCCATTCT</u>**CAGGTGC
AGCTGCAGCAGCCTGGCGCTGAACTCGTGCGGCCAGGCGCTTCTGTGAAGCTGAGCTGTAAAGC
CAGCGGCTACACCTTCAGCAACTACCTGATGAACTGGGTCAAGCAGCGGCCCGAGCAGGACCTG
GATTGGATCGGCAGAATCGACCCCTACGACGGCGACATCGACTACAACCAGAACTTCAAGGACA
AGGCCATCCTGACCGTGGACAAGAGCAGCAGCACCGCCTACATGCAGCTGTCCAGCCTGACCAG
CGAGGACAGCGCCGTGTACTACTGCGCCAGAGGCTACGGCACAGCCTACGGCGTGGACTATTGG
GGCCAGGGCACAAGCGTGACCGTGTCCAGCGCCAAGACCACCCCCCCTAAGCTGGAAGAGGGCG
AGTTCTCCGAGGCCCGGGTGGACATTGTGCTGACACAGTCTCCAGCCAGCCTGGCCGTGTCCCT
GGGACAGAGAGCCACCATCAGCTGTAGGGCCAGCGAGAGCGTGGACAACTACGGCATCAGCTTC
ATGAATTGGTTCCAGCAGAAGCCCGGCCAGCCCCCCAAGCTGCTGATCTATGCCGCCAGCAGAC
AGGGCAGCGGAGTGCCTGCCAGATTTTCTGGCAGCGGCTCCGGCACCGACTTCAGCCTGAACAT
CCACCCTATGGAAGAGGACGACACCGCCATGTACTTTGCCAGCAGAGCAAAGAGGTGCCCTGG
ACCTTTGGCGGAGGCACCAAGCTGGAAATCAAG**GATCTC*GAGCCCAAATCTTGTGACAAAACTC
ACACATGCCCACCGTGCCCGGATCCCAAATTTTGGGTGCTGGTGGTGGTTGGTGGAGTCCTGGC
TTGCTATAGCTTGCTAGTAACAGTGGCCTTTATTATTTTCTGGGTGAGGAGTAAGAGGAGCAGG
CTCCTGCACAGTGACTACATGAACATGACTCCCCGCCGCCCCGGGCCCACCCGCAAGCATTACC
AGCCCTATGCCCCACCACGCGACTTCGCAGCCTATCGCTCC****AGAGTGAAGTTCAGCAGGAGCGC
AGACGCCCCCGCGTACCAGCAGGGCCAGAACCAGCTCTATAACGAGCTCAATCTAGGACGAAGA
GAGGAGTACGATGTTTTGGACAAGAGACGTGGCCGGGACCCTGAGATGGGGGGAAAGCCGAGAA
GGAAGAACCCTCAGGAAGGCCTGTACAATGAACTGCAGAAAGATAAGATGGCGGAGGCCTACAG
TGAGATTGGGATGAAAGGCGAGCGCCGGAGGGGCAAGGGGCACGATGGCCTTTACCAGGGTCTC
AGTACAGCCACCAAGGACACCTACGACGCCCTTCACATGCAGGCCCTGCCCCCTCGC***TAA FIG. 7E
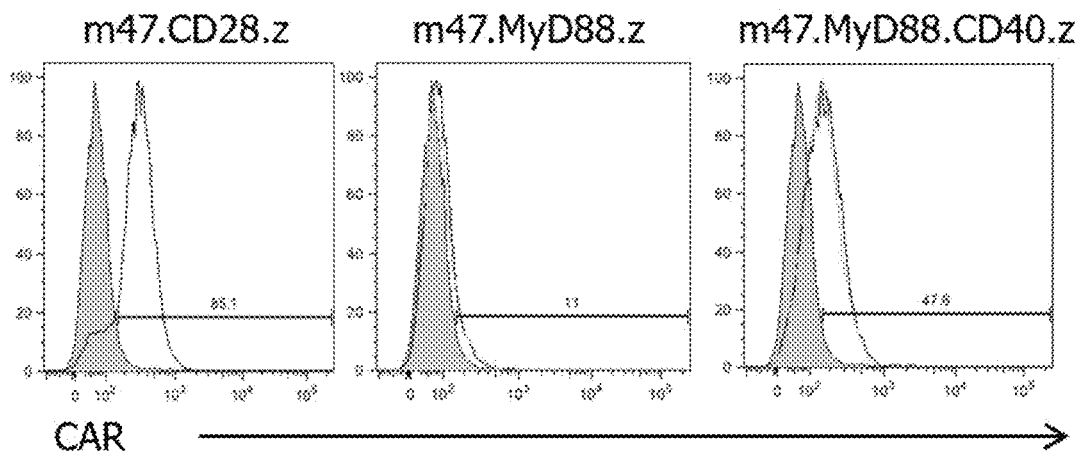
FIG. 7F
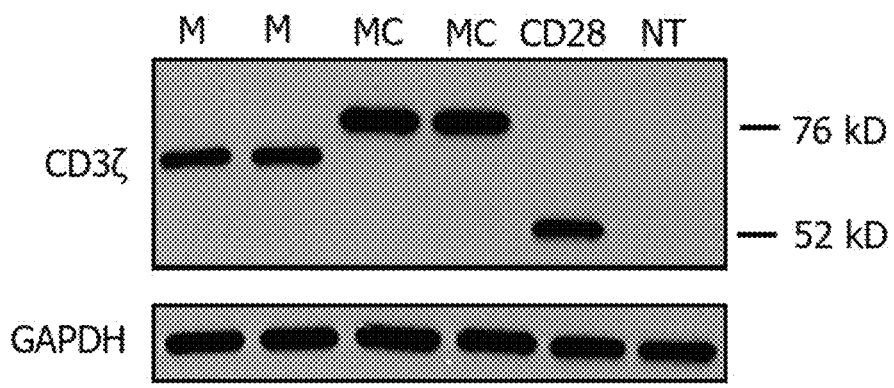
M: m47.SH.MyD88.z
MC: m47.SH.MyD88.CD40.z
CD28: m47.SH.CD28.z
NT: non-transduced
FIG. 7G
| CARs | Cytotoxicity |
|---|---|
| m47.MyD88.CD40.z | - |
| m47.MyD88.z | - |
| m47.CD28.z | ++ |

FIG. 8B

FRP5.MyD88.CD40.z (SH.TMCD28)
Underline: Leader Sequence
Bold: scFv FRP5
*Italic: IgG1 Core Hinge*
Dashed underline: CD28 Transmembrane Domain
Double underline: MyD88
Bold and underline: CD40
*Bold italic: CD3 Zeta*

Amino Acid Sequence (SEQ ID NO: 69):
MDWIWRILFLVGAATGAHS**EVQLQQSGPELKKPGETVKISCKASGYPFTNYGMNWVKQAPGQGL
KWMGWINTSTGESTFADDFKGRFDFSLETSANTAYLQINNLKSEDMATYFCARWEVYHGYVPYW
GQGTTVTVSSGGGGSGGGGSGGGGSDIQLTQSHKFLSTSVGDRVSITCKASQDVYNAVAWYQQK
PGQSPKLLIYSASSRYTGVPSRFTGSGSGPDFTFTISSVQAEDLAVYFCQQHFRTPFTFGSGTK
LEIKAL**DL*EPKSCDKTHTCPPCP*DPKFWVLVVVGGVLACYSLLVTVAFIIFWVAAGGPGAGSAA
PVSSTSSLPLAALNMRVRRRLSLFLNVRTQVAADWTALAEEMDFEYLEIRQLETQADPTGRLLD
AWQGRPGASVGRLLELLTKLGRDDVLLELGPSIEEDCQKYILKQQQEEAEKPLQVAAVDSSVPR
TAELAGITTLDDPLGHMPERFDAFICYCPSDIVE**KKVAKKPTNKAPHPKQEPQEINFPDDLPGS
NTAAPVQETLHGCQPVTQEDGKESRISVQERQ**RVKFSRSADAPAYQQGQNQLYNELNLGRREEY
DVLDKRRGRDPEMGGKPRRKNPQEGLYNELQKDKMAEAYSEIGMKGERRRGKGHDGLYQGLSTA
TKDTYDALHMQALPPR**

Nucleotide Sequence (SEQ ID NO: 70):
ATGGACTGGATCTGGCGCATCCTCTTCCTCGTCGGCGCTGCTACCGGCGCTCATTCT**GAGGTAC
AACTGCAGCAGTCTGGACCTGAACTGAAGAAGCCTGGAGAGACAGTCAAGATCTCCTGCAAGGC
CTCTGGGTATCCTTTCACAAACTATGGAATGAACTGGGTGAAGCAGGCTCCAGGACAGGGTTTA
AAGTGGATGGGCTGGATTAACACCTCCACTGGAGAGTCAACATTTGCTGATGACTTCAAGGGAC
GGTTTGACTTCTCTTTGGAAACCTCTGCCAACACTGCCTATTTGCAGATCAACAACCTCAAAAG
TGAAGACATGGCTACATATTTCTGTGCAAGATGGGAGGTTTACCACGGCTACGTTCCTTACTGG
GGCCAAGGGACCACGGTCACCGTTTCCTCTGGCGGTGGCGGTTCTGGTGGCGGTGGCTCCGGCG
GTGGCGGTTCTGACATCCAGCTGACCCAGTCTCACAAATTCCTGTCCACTTCAGTAGGAGACAG
GGTCAGCATCACCTGCAAGGCCAGTCAGGATGTGTATAATGCTGTTGCCTGGTATCAACAGAAA
CCAGGACAATCTCCTAAACTTCTGATTTACTCGGCATCCTCCCGGTACACTGGAGTCCCTTCTC
GCTTCACTGGCAGTGGCTCTGGGCCGGATTTCACTTTCACCATCAGCAGTGTGCAGGCTGAAGA
CCTGGCAGTTTATTTCTGTCAGCAACATTTTCGTACTCCATTCACGTTCGGCTCGGGGACAAAA
TTGGAGATCAAGCTCTA**GATCTC*GAGCCCAAATCTTGTGACAAAACTCACACATGCCCACCGT
GCCCGGATCCCAAATTTTGG*GTGCTGGTGGTGGTTGGTGGAGTCCTGGCTTGCTATAGCTTGCT
AGTAACAGTGGCCTTTATTATTTTCTGGGTGGCTGCTGGCGGACCTGGCGCCGGATCTGCTGCT
CCTGTGTCTAGCACAAGCAGCCTGCCTCTGGCCGCCCTGAACATGAGAGTGCGGAGAAGGCTGA
GCCTGTTCCTGAACGTGCGGACACAGGTGGCCGCCGATTGGACAGCCCTGGCCGAGGAAATGGA
CTTCGAGTACCTGGAAATCCGGCAGCTGGAAACCCAGGCCGACCCTACAGGCAGACTGCTGGAT
GCTTGGCAGGGCAGACCAGGCGCTTCTGTGGGAAGGCTGCTGGAACTGCTGACCAAGCTGGGCA
GGGACGACGTGCTGCTGGAACTGGGCCCTAGCATCGAAGAGGACTGCCAGAAGTACATCCTGAA
GCAGCAGCAGGAAGAGGCCGAGAAGCCTCTGCAGGTGGCAGCCGTGGATAGCAGCGTGCCAAGA
ACAGCCGAGCTGGCCGGCATCACCACCCTGGATGATCCTCTGGGCCACATGCCCGAGAGATTCG
ACGCCTTCATCTGCTACTGCCCCAGCGACATCGTGGAAAAGAAGGTGGCCAAGAAGCCCACCAA

FIG. 8C

CAAGGCCCCCCACCCCAAGCAGGAACCCCAGGAAATCAACTTCCCCGACGACCTGCCCGGCAGC
AATACTGCTGCACCCGTGCAGGAAACCCTGCACGGCTGTCAGCCTGTGACCCAGGAAGATGGCA
AAGAAAGCCGGATCTCTGTGCAGGAACGCCAGAGAGTGAAGTTCAGCAGGAGCGCAGACGCCCC
CGCGTACCAGCAGGGCCAGAACCAGCTCTATAACGAGCTCAATCTAGGACGAAGAGAGGAGTAC
GATGTTTTGGACAAGAGACGTGGCCGGGACCCTGAGATGGGGGGAAAGCCGAGAAGGAAGAACC
CTCAGGAAGGCCTGTACAATGAACTGCAGAAAGATAAGATGGCGGAGGCCTACAGTGAGATTGG
GATGAAAGGCGAGCGCCGGAGGGGCAAGGGGCACGATGGCCTTTACCAGGGTCTCAGTACAGCC
ACCAAGGACACCTACGACGCCCTTCACATGCAGGCCCTGCCCCCTCGCTAA

FIG. 8D

FRP5.MyD88.z
Underline: Leader Sequence
Bold: scFv FRP5
*Italic: IgG1 Core Hinge*
Dashed underline: CD28 Transmembrane Domain
Double underline: MyD88
*Bold italic: CD3 Zeta*

Amino Acid Sequence (SEQ ID NO: 71):
<u>MDWIWRILFLVGAATGAHS</u>**EVQLQQSGPELKKPGETVKISCKASGYPFTNYGMNWVKQAPGQGLKWM
GWINTSTGESTFADDFKGRFDFSLETSANTAYLQINNLKSEDMATYFCARWEVYHGYVPYWGQGTTV
TVSSGGGGSGGGGSGGGGSDIQLTQSHKFLSTSVGDRVSITCKASQDVYNAVAWYQQKPGQSPKLLI
YSASSRYTGVPSRFTGSGSGPDFTFTISSVQAEDLAVYFCQQHFRTPFTFGSGTKLEIKAL**DL*EPKS
CDKTHTCPPCP*DPKFWVLVVVGGVLACYSLLVTVAFIIFWV<u>AAGGPGAGSAAPVSSTSSLPLAALNM
RVRRRLSLFLNVRTQVAADWTALAEEMDFEYLEIRQLETQADPTGRLLDAWQGRPGASVGRLLELLT
KLGRDDVLLELGPSIEEDCQKYILKQQQEEAEKPLQVAAVDSSVPRTAELAGITTLDDPLGHMPERF
DAFICYCPSDI</u>***RVKFSRSADAPAYQQGQNQLYNELNLGRREEYDVLDKRRGRDPEMGGKPRRKNPQE
GLYNELQKDKMAEAYSEIGMKGERRRGKGHDGLYQGLSTATKDTYDALHMQALPPR*****

Nucleotide Sequence (SEQ ID NO: 72):
<u>ATGGACTGGATCTGGCGCATCCTCTTCCTCGTCGGCGCTGCTACCGGCGCTCATTCT</u>**GAGGTACAAC
TGCAGCAGTCTGGACCTGAACTGAAGAAGCCTGGAGAGACAGTCAAGATCTCCTGCAAGGCCTCTGG
GTATCCTTTCACAAACTATGGAATGAACTGGGTGAAGCAGGCTCCAGGACAGGGTTTAAAGTGGATG
GGCTGGATTAACACCTCCACTGGAGAGTCAACATTTGCTGATGACTTCAAGGGACGGTTTGACTTCT
CTTTGGAAACCTCTGCCAACACTGCCTATTTGCAGATCAACAACCTCAAAAGTGAAGACATGGCTAC
ATATTTCTGTGCAAGATGGGAGGTTTACCACGGCTACGTTCCTTACTGGGGCCAAGGGACCACGGTC
ACCGTTTCCTCTGGCGGTGGCGGTTCTGGTGGCGGTGGCTCCGGCGGTGGCGGTTCTGACATCCAGC
TGACCCAGTCTCACAAATTCCTGTCCACTTCAGTAGGAGACAGGGTCAGCATCACCTGCAAGGCCAG
TCAGGATGTGTATAATGCTGTTGCCTGGTATCAACAGAAACCAGGACAATCTCCTAAACTTCTGATT
TACTCGGCATCCTCCCGGTACACTGGAGTCCCTTCTCGCTTCACTGGCAGTGGCTCTGGGCCGGATT
TCACTTTCACCATCAGCAGTGTGCAGGCTGAAGACCTGGCAGTTTATTTCTGTCAGCAACATTTTCG
TACTCCATTCACGTTCGGCTCGGGGACAAAATTGGAGATCAAAGCTCTA**GATCTC*GAGCCCAAATCT
TGTGACAAAACTCACACATGCCCACCGTGCCCGGATCCCAAATTTTGGGTGCTGGTGGTGGTTGGTG
*GAGTCCTGGCTTGCTATAGCTTGCTAGTAACAGTGGCCTTTATTATTTTCTGGGT<span style="border-bottom: 1px dashed">GGCTGCTGGCGG
ACCTGGCGCCGGATCTGCTGCTCCTGTGTCTAGCACAAGCAGCCTGCCTCTGGCCGCCCTGAACATG</span>
<u>AGAGTGCGGAGAAGGCTGAGCCTGTTCCTGAACGTGCGGACACAGGTGGCCGCCGATTGGACAGCCC
TGGCCGAGGAAATGGACTTCGAGTACCTGGAAATCCGGCAGCTGGAAACCCAGGCCGACCCTACAGG
CAGACTGCTGGATGCTTGGCAGGGCAGACCAGGCGCTTCTGTGGGAAGGCTGCTGGAACTGCTGACC
AAGCTGGGCAGGGACGACGTGCTGCTGGAACTGGGCCCTAGCATCGAAGAGGACTGCCAGAAGTACA
TCCTGAAGCAGCAGCAGGAAGAGGCCGAGAAGCCTCTGCAGGTGGCAGCCGTGGATAGCAGCGTGCC
AAGAACAGCCGAGCTGGCCGGCATCACCACCCTGGATGATCCTCTGGGCCACATGCCCGAGAGATTC
GACGCCTTCATCTGCTACTGCCCCAGCGACATC</u>***AGAGTGAAGTTCAGCAGGAGCGCAGACGCCCCCG
CGTACCAGCAGGGCCAGAACCAGCTCTATAACGAGCTCAATCTAGGACGAAGAGAGGAGTACGATGT
TTTGGACAAGAGACGTGGCCGGGACCCTGAGATGGGGGGAAAGCCGAGAAGGAAGAACCCTCAGGAA
GGCCTGTACAATGAACTGCAGAAAGATAAGATGGCGGAGGCCTACAGTGAGATTGGGATGAAAGGCG
AGCGCCGGAGGGGCAAGGGGCACGATGGCCTTTACCAGGGTCTCAGTACAGCCACCAAGGACACCTA
CGACGCCCTTCACATGCAGGCCCTGCCCCCTCGCT**AA

FIG. 8E

FRP5.CD40.z
<u>Underline: Leader Sequence</u>
Bold: scFv FRP5
*Italic: IgG1 Core Hinge*
<u>Dashed underline: CD28 Transmembrane Domain</u>
<u>Bold and underline: CD40</u>
*Bold italic: CD3 Zeta*

Amino Acid Sequence (SEQ ID NO: 73):
<u>MDWIWRILFLVGAATGAHS</u>**EVQLQQSGPELKKPGETVKISCKASGYPFTNYGMNWVKQAPGQGL
KWMGWINTSTGESTFADDFKGRFDFSLETSANTAYLQINNLKSEDMATYFCARWEVYHGYVPYW
GQGTTVTVSSGGGGSGGGGSGGGGSDIQLTQSHKFLSTSVGDRVSITCKASQDVYNAVAWYQQK
PGQSPKLLIYSASSRYTGVPSRFTGSGSGPDFTFTISSVQAEDLAVYFCQQHFRTPFTFGSGTK
LEIKAL**D*LEPKSCDKTHTCPPCPDPKFWVLVVVGGVLA*<u>CYSLLVTVAFIIFWV</u>**KKVAKKPTNKA
PHPKQEPQEINFPDDLPGSNTAAPVQETLHGCQPVTQEDGKESRISVQERQR*VKFSRSADAPAY
QQGQNQLYNELNLGRREEYDVLDKRRGRDPEMGGKPRRKNPQEGLYNELQKDKMAEAYSEIGMK
GERRRGKGHDGLYQGLSTATKDTYDALHMQALPPR*****

Nucleotide Sequence (SEQ ID NO: 74):
<u>ATGGACTGGATCTGGCGCATCCTCTTCCTCGTCGGCGCTGCTACCGGCGCTCATTCT</u>**GAGGTAC
AACTGCAGCAGTCTGGACCTGAACTGAAGAAGCCTGGAGAGACAGTCAAGATCTCCTGCAAGGC
CTCTGGGTATCCTTTCACAAACTATGGAATGAACTGGGTGAAGCAGGCTCCAGGACAGGGTTTA
AAGTGGATGGGCTGGATTAACACCTCCACTGGAGAGTCAACATTTGCTGATGACTTCAAGGGAC
GGTTTGACTTCTCTTTGGAAACCTCTGCCAACACTGCCTATTTGCAGATCAACAACCTCAAAAG
TGAAGACATGGCTACATATTTCTGTGCAAGATGGGAGGTTTACCACGGCTACGTTCCTTACTGG
GGCCAAGGGACCACGGTCACCGTTTCCTCTGGCGGTGGCGGTTCTGGTGGCGGTGGCTCCGGCG
GTGGCGGTTCTGACATCCAGCTGACCCAGTCTCACAAATTCCTGTCCACTTCAGTAGGAGACAG
GGTCAGCATCACCTGCAAGGCCAGTCAGGATGTGTATAATGCTGTTGCCTGGTATCAACAGAAA
CCAGGACAATCTCCTAAACTTCTGATTTACTCGGCATCCTCCCGGTACACTGGAGTCCCTTCTC
GCTTCACTGGCAGTGGCTCTGGGCCGGATTTCACTTTCACCATCAGCAGTGTGCAGGCTGAAGA
CCTGGCAGTTTATTTCTGTCAGCAACATTTTCGTACTCCATTCACGTTCGGCTCGGGGACAAAA
TTGGAGATCAAAGCTCTA**GATCTC*GAGCCCAAATCTTGTGACAAAACTCACACATGCCCACCGT
GCCCGGATCCCAAATTT*<u>TGGGTGCTGGTGGTGGTTGGTGGAGTCCTGGCTTGCTATAGCTTGCT
AGTAACAGTGGCCTTTATTATTTTCTGGGT</u>**GAAGAAGGTGGCCAAGAAGCCCACCAACAAGGCC
CCCCACCCCAAGCAGGAACCCCAGGAAATCAACTTCCCCGACGACCTGCCCGGCAGCAATACTG
CTGCACCCGTGCAGGAAACCCTGCACGGCTGTCAGCCTGTGACCCAGGAAGATGGCAAAGAAAG
CCGGATCTCTGTGCAGGAACGCCAGAGAGTGAAGTTCAGCAGGAGCGCAGACGCCCCCGCGTAC**
***CAGCAGGGCCAGAACCAGCTCTATAACGAGCTCAATCTAGGACGAAGAGAGGAGTACGATGTTT
TGGACAAGAGACGTGGCCGGGACCCTGAGATGGGGGGAAAGCCGAGAAGGAAGAACCCTCAGGA
AGGCCTGTACAATGAACTGCAGAAAGATAAGATGGCGGAGGCCTACAGTGAGATTGGGATGAAA
GGCGAGCGCCGGAGGGGCAAGGGGCACGATGGCCTTTACCAGGGTCTCAGTACAGCCACCAAGG
ACACCTACGACGCCCTTCACATGCAGGCCCTGCCCCCTCGCT*AA

FIG. 8F

FRP5.CD28.z
Underline: Leader Sequence
Bold: scFv FRP5
*Italic: IgG1 Core Hinge*
Dashed underline: CD28 Transmembrane and Cytoplasmic Domain
*Bold italic: CD3 Zeta*

Amino Acid Sequence (SEQ ID NO: 75):
<u>MDWIWRILFLVGAATGAHS</u>**EVQLQQSGPELKKPGETVKISCKASGYPFTNYGMNWVKQAPGQGL
KWMGWINTSTGESTFADDFKGRFDFSLETSANTAYLQINNLKSEDMATYFCARWEVYHGYVPYW
GQGTTVTVSSGGGGSGGGGSGGGGSDIQLTQSHKFLSTSVGDRVSITCKASQDVYNAVAWYQQK
PGQSPKLLIYSASSRYTGVPSRFTGSGSGPDFTFTISSVQAEDLAVYFCQQHFRTPFTFGSGTK
LEIKAL**D*LEPKSCDKTHTCPPCPDPKF*<u>WVLVVVGGVLACYSLLVTVAFIIFWVRSKRSRLLHSD
YMNMTPRRPGPTRKHYQPYAPPRDFAAYRS</u>***RVKFSRSADAPAYQQGQNQLYNELNLGRREEYDV
LDKRRGRDPEMGGKPRRKNPQEGLYNELQKDKMAEAYSEIGMKGERRRGKGHDGLYQGLSTATK
DTYDALHMQALPPR*****

Nucleotide Sequence (SEQ ID NO: 76):
<u>ATGGACTGGATCTGGCGCATCCTCTTCCTCGTCGGCGCTGCTACCGGCGCTCATTCT</u>**GAGGTAC
AACTGCAGCAGTCTGGACCTGAACTGAAGAAGCCTGGAGAGACAGTCAAGATCTCCTGCAAGGC
CTCTGGGTATCCTTTCACAAACTATGGAATGAACTGGGTGAAGCAGGCTCCAGGACAGGGTTTA
AAGTGGATGGGCTGGATTAACACCTCCACTGGAGAGTCAACATTTGCTGATGACTTCAAGGGAC
GGTTTGACTTCTCTTTGGAAACCTCTGCCAACACTGCCTATTTGCAGATCAACAACCTCAAAAG
TGAAGACATGGCTACATATTTCTGTGCAAGATGGGAGGTTTACCACGGCTACGTTCCTTACTGG
GGCCAAGGGACCACGGTCACCGTTTCCTCTGGCGGTGGCGGTTCTGGTGGCGGTGGCTCCGGCG
GTGGCGGTTCTGACATCCAGCTGACCCAGTCTCACAAATTCCTGTCCACTTCAGTAGGAGACAG
GGTCAGCATCACCTGCAAGGCCAGTCAGGATGTGTATAATGCTGTTGCCTGGTATCAACAGAAA
CCAGGACAATCTCCTAAACTTCTGATTTACTCGGCATCCTCCCGGTACACTGGAGTCCCTTCTC
GCTTCACTGGCAGTGGCTCTGGGCCGGATTTCACTTTCACCATCAGCAGTGTGCAGGCTGAAGA
CCTGGCAGTTTATTTCTGTCAGCAACATTTTCGTACTCCATTCACGTTCGGCTCGGGGACAAAA
TTGGAGATCAAAGCTCTA**GATCTC*GAGCCCAAATCTTGTGACAAAACTCACACATGCCCACCGT
GCCCGGATCCCAAATTTT*<u>GGGTGCTGGTGGTGGTTGGTGGAGTCCTGGCTTGCTATAGCTTGCT
AGTAACAGTGGCCTTTATTATTTTCTGGGTGAGGAGTAAGAGGAGCAGGCTCCTGCACAGTGAC
TACATGAACATGACTCCCCGCCGCCCCGGGCCCACCCGCAAGCATTACCAGCCCTATGCCCCAC
CACGCGACTTCGCAGCCTATCGCTCC</u>***AGAGTGAAGTTCAGCAGGAGCGCAGACGCCCCCGCGTA
CCAGCAGGGCCAGAACCAGCTCTATAACGAGCTCAATCTAGGACGAAGAGAGGAGTACGATGTT
TTGGACAAGAGACGTGGCCGGGACCCTGAGATGGGGGGAAAGCCGAGAAGGAAGAACCCTCAGG
AAGGCCTGTACAATGAACTGCAGAAAGATAAGATGGCGGAGGCCTACAGTGAGATTGGGATGAA
AGGCGAGCGCCGGAGGGGCAAGGGGCACGATGGCCTTTACCAGGGTCTCAGTACAGCCACCAAG
GACACCTACGACGCCCTTCACATGCAGGCCCTGCCCCCTCGC***TAA FIG. 8H
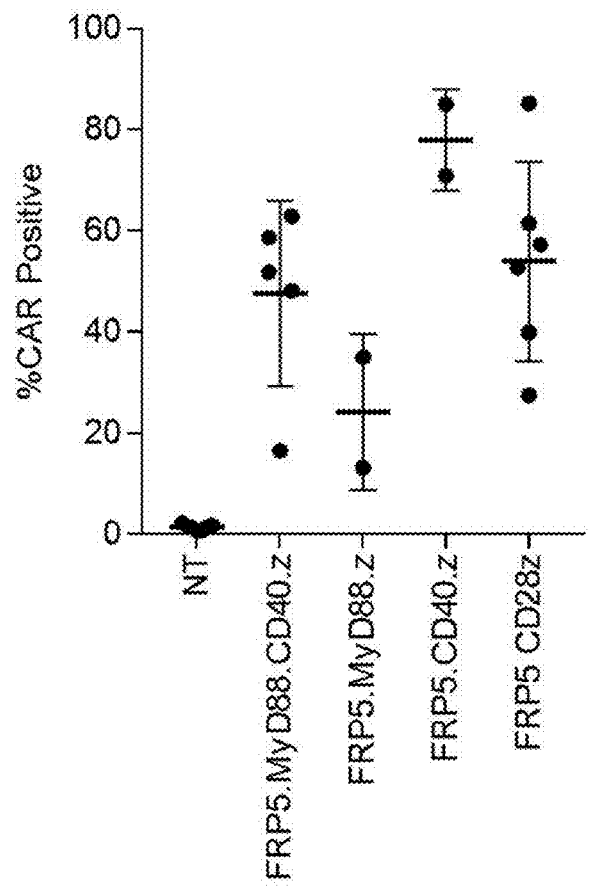
FIG. 8I
| CARs | Cytotoxicity |
|---|---|
| FRP5.MyD88.CD40.z | +/- |
| FRP5.MyD88.z | + |
| FRP5.CD40.z | ++ |
| FRP5.CD28.z | +++ |
FIG. 9A
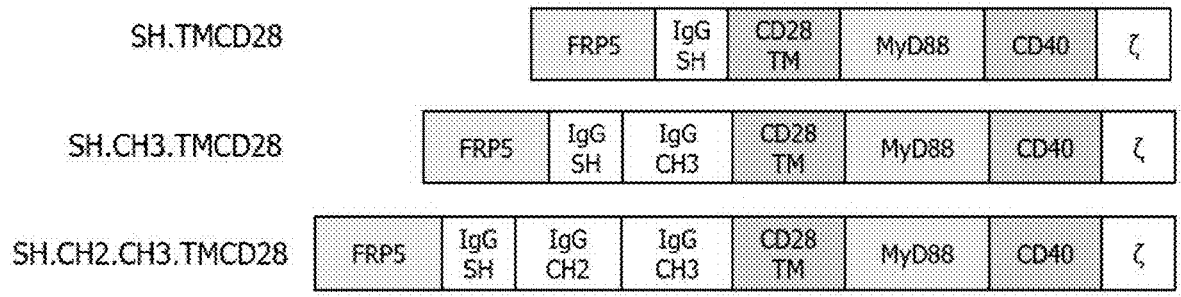

FIG. 9B

FRP5.MyD88.CD40.z (SH.CH3.TMCD28)
Underline: Leader Sequence
Bold: scFv FRP5
*Italic: IgG2 Core Hinge and CH3 Domain*
<u>Dashed underline: CD28 Transmembrane Domain</u>
<u>Double underline: MyD88</u>
<u>Bold and underline: CD40</u>
*Bold italic: CD3 Zeta*

Amino Acid Sequence (SEQ ID NO: 77):
<u>MDWIWRILFLVGAATGAHS</u>**EVQLQQSGPELKKPGETVKISCKASGYPFTNYGMNWVKQAPGQGL
KWMGWINTSTGESTFADDFKGRFDFSLETSANTAYLQINNLKSEDMATYFCARWEVYHGYVPYW
GQGTTVTVSSGGGGSGGGGSGGGGSDIQLTQSHKFLSTSVGDRVSITCKASQDVYNAVAWYQQK
PGQSPKLLIYSASSRYTGVPSRFTGSGSGPDFTFTISSVQAEDLAVYFCQQHFRTPFTFGSTK
LEIKAL**<i>DLEERKCCVECPPCPGQPREPQVYTLPPSREEMTKNQVSLTCLVKGFYPSDISVEWES
NGQPENNYKTTPPMLDSDGSFFLYSKLTVDKSRWQQGNVFSCSVMHEALHNHYTQKSLSLSPGK</i>
<u>DPKFWVLVVVGGVLACYSLLVTVAFIIFWV</u><u>AAGGPGAGSAAPVSSTSSLPLAALNMRVRRRLSL
FLNVRTQVAADWTALAEEMDFEYLEIRQLETQADPTGRLLDAWQGRPGASVGRLLELLTKLGRD
DVLLELGPSIEEDCQKYILKQQQEEAEKPLQVAAVDSSVPRTAELAGITTLDDPLGHMPERFDA
FICYCPSDIVE</u>**<u>KKVAKKPTNKAPHPKQEPQEINFPDDLPGSNTAAPVQETLHGCQPVTQEDGKE
SRISVQERQ</u>****<i>RVKFSRSADAPAYQQGQNQLYNELNLGRREEYDVLDKRRGRDPEMGGKPRRKNPQ
EGLYNELQKDKMAEAYSEIGMKGERRRGKGHDGLYQGLSTATKDTYDALHMQALPPR</i>*\*

Nucleotide Sequence (SEQ ID NO: 78):
<u>ATGGACTGGATCTGGCGCATCCTCTTCCTCGTCGGCGCTGCTACCGGCGCTCATTCT</u>**GAGGTAC
AACTGCAGCAGTCTGGACCTGAACTGAAGAAGCCTGGAGAGACAGTCAAGATCTCCTGCAAGGC
CTCTGGGTATCCTTTCACAAACTATGGAATGAACTGGGTGAAGCAGGCTCCAGGACAGGGTTTA
AAGTGGATGGGCTGGATTAACACCTCCACTGGAGAGTCAACATTTGCTGATGACTTCAAGGGAC
GGTTTGACTTCTCTTTGGAAACCTCTGCCAACACTGCCTATTTGCAGATCAACAACCTCAAAAG
TGAAGACATGGCTACATATTTCTGTGCAAGATGGGAGGTTTACCACGGCTACGTTCCTTACTGG
GGCCAAGGGACCACGGTCACCGTTTCCTCGGCGGTGGCGGTTCTGGTGGCGGTGGCTCCGGCG
GTGGCGGTTCTGACATCCAGCTGACCCAGTCTCACAAATTCCTGTCCACTTCAGTAGGAGACAG
GGTCAGCATCACCTGCAAGGCCAGTCAGGATGTGTATAATGCTGTTGCCTGGTATCAACAGAAA
CCAGGACAATCTCCTAAACTTCTGATTTACTCGGCATCCTCCCGGTACACTGGAGTCCCTTCTC
GCTTCACTGGCAGTGGCTCTGGGCCGGATTTCACTTTCACCATCAGCAGTGTGCAGGCTGAAGA
CCTGGCAGTTTATTTCTGTCAGCAACATTTTCGTACTCCATTCACGTTCGGCTCGGGGACAAAA
TTGGAGATCAAAGCTCTA**<i>GATCTCGAGGAGAGAAAATGTTGTGTGGAATGTCCACCATGCCCCG
GCCAACCCCGGGAGCCGCAGGTGTACACACTCCCCCCTAGCAGGGAGGAGATGACAAAGAATCA
GGTGTCCCTGACGTGTCTTGTGAAGGGGTTTTACCCCAGCGACATATCGGTGGAATGGGAGAGT
AACGGCCAACCCGAGAACAACTACAAAACAACCCCACCCATGTTGGACTCCGATGGCTCTTTCT
TTCTATATTCTAAGCTGACCGTGGACAAATCTAGATGGCAGCAAGGCAATGTCTTCAGTTGCTC
CGTTATGCATGAGGCCCTGCACAATCACTATACCCAGAAGTCTCTCTCACTGTCTCCGGGTAAG</i>
<u>GATCCCAAATTTTGGGTGCTGGTGGTGGTTGGTGGAGTCCTGGCTTGCTATAGCTTGCTAGTAA
CAGTGGCCTTTATTATTTTCTGGGTGGCTGCTGGCGGACCTGGCGCCGGATCTGCTGCTCCTGT
GTCTAGCACAAGCAGCCTGCCTCTGGCCGCCCTGAACATGAGAGTGCGGAGAAGGCTGAGCCTG
TTCCTGAACGTGCGGACACAGGTGGCCGCCGATTGGACAGCCCTGGCCGAGGAAATGGACTTCG</u>

FIG. 9C

AGTACCTGGAAATCCGGCAGCTGGAAACCCAGGCCGACCCTACAGGCAGACTGCTGGATGCTTG
GCAGGGCAGACCAGGCGCTTCTGTGGGAAGGCTGCTGGAACTGCTGACCAAGCTGGGCAGGGAC
GACGTGCTGCTGGAACTGGGCCCTAGCATCGAAGAGGACTGCCAGAAGTACATCCTGAAGCAGC
AGCAGGAAGAGGCCGAGAAGCCTCTGCAGGTGGCAGCCGTGGATAGCAGCGTGCCAAGAACAGC
CGAGCTGGCCGGCATCACCACCCTGGATGATCCTCTGGGCCACATGCCCGAGAGATTCGACGCC
TTCATCTGCTACTGCCCCAGCGACATCGTGGAA**AAGAAGGTGGCCAAGAAGCCCACCAACAAGG
CCCCCCACCCCAAGCAGGAACCCCAGGAAATCAACTTCCCCGACGACCTGCCCGGCAGCAATAC
TGCTGCACCCGTGCAGGAAACCCTGCACGGCTGTCAGCCTGTGACCCAGGAAGATGGCAAAGAA
AGCCGGATCTCTGTGCAGGAACGCCAGAGAGTGAAGTTCAGCAGGAGCGCAGACGCCCCCGCGT**
*ACCAGCAGGGCCAGAACCAGCTCTATAACGAGCTCAATCTAGGACGAAGAGAGGAGTACGATGT
TTTGGACAAGAGACGTGGCCGGGACCCTGAGATGGGGGGAAAGCCGAGAAGGAAGAACCCTCAG
GAAGGCCTGTACAATGAACTGCAGAAAGATAAGATGGCGGAGGCCTACAGTGAGATTGGGATGA
AAGGCGAGCGCCGGAGGGGCAAGGGGCACGATGGCCTTTACCAGGGTCTCAGTACAGCCACCAA
GGACACCTACGACGCCCTTCACATGCAGGCCCTGCCCCCTCGC*TAA

FIG. 9D

FRP5.MyD88.CD40.z (SH.CH2.CH3.TMCD28)
Underline: Leader Sequence
Bold: scFv FRP5
*Italic: IgG1 Core Hinge.CH2.CH3 (Shaded character indicates changes in the CH2CH3 domain to mutate the Fc receptor binding site)*
Dashed underline: CD28 Transmembrane Domain
Double underline: MyD88
Bold and underline: CD40
*Bold italic: CD3 Zeta*

Amino Acid Sequence (SEQ ID NO: 79):
<u>MDWIWRILFLVGAATGAHS</u>**EVQLQQSGPELKKPGETVKISCKASGYPFTNYGMNWVKQAPGQGL
KWMGWINTSTGESTFADDFKGRFDFSLETSANTAYLQINNLKSEDMATYFCARWEVYHGYVPYW
GQGTTVTVSSGGGGSGGGGSGGGGSDIQLTQSHKFLSTSVGDRVSITCKASQDVYNAVAWYQQK
PGQSPKLLIYSASSRYTGVPSRFTGSGSGPDFTFTISSVQAEDLAVYFCQQHFRTPFTFGSGTK
LEIKAL**DLEPKS*D*KTHTCPCPAP*E*V*A*GPSVFLFPPKPKDTLMISRTPEVTCVVVDVSHEDPE
VKFNWYVDGVEVHNAKTKPREEQY*N*STYRVVSVLTVLHQDWLNGKEYKCKVSNKALPAPIEKTI
SKAKGQPREPQVYTLPPSRDELTKNQVSLTCLVKGFYPSDIAVEWESNGQPENNYKTTPPVLDS
DGSFFLYSKLTVDKSRWQQGNVFSCSVMHEALHNHYTQKSLSLSPGKKDPKFWVLVVVGGVLAC
YSLLVTVAFIIFWV*AAGGPGAGSAAPVSSTSSLPLAALNMRVRRRLSLFLNVRTQVAADWTALA
EEMDFEYLEIRQLETQADPTGRLLDAWQGRPGASVGRLLELLTKLGRDDVLLELGPSIEEDCQK
YILKQQQEEAEKPLQVAAVDSSVPRTAELAGITTLDDPLGHMPERFDAFICYCPSDIVE***KKVAK
KPTNKAPHPKQEPQEINFPDDLPGSNTAAPVQETLHGCQPVTQEDGKESRISVQER***QRVKFSRS
ADAPAYQQGQNQLYNELNLGRREEYDVLDKRRGRDPEMGGKPRRKNPQEGLYNELQKDKMAEAY
SEIGMKGERRRGKGHDGLYQGLSTATKDTYDALHMQALPPR****

Nucleotide Sequence (SEQ ID NO: 80):
ATGGACTGGATCTGGCGCATCCTCTTCCTCGTCGGCGCTGCTACCGGCGCTCATTCT**GAGGTAC
AACTGCAGCAGTCTGGACCTGAACTGAAGAAGCCTGGAGAGACAGTCAAGATCTCCTGCAAGGC
CTCTGGGTATCCTTTCACAAACTATGGAATGAACTGGGTGAAGCAGGCTCCAGGACAGGGTTTA
AAGTGGATGGGCTGGATTAACACCTCCACTGGAGAGTCAACATTTGCTGATGACTTCAAGGGAC
GGTTTGACTTCTCTTTGGAAACCTCTGCCAACACTGCCTATTTGCAGATCAACAACCTCAAAAG
TGAAGACATGGCTACATATTTCTGTGCAAGATGGGAGGTTTACCACGGCTACGTTCCTTACTGG
GGCCAAGGGACCACGGTCACCGTTTCCTCTGGCGGTGGCGGTTCTGGTGGCGGTGGCTCCGGCG
GTGGCGGTTCTGACATCCAGCTGACCCAGTCTCACAAATTCCTGTCCACTTCAGTAGGAGACAG
GGTCAGCATCACCTGCAAGGCCAGTCAGGATGTGTATAATGCTGTTGCCTGGTATCAACAGAAA
CCAGGACAATCTCCTAAACTTCTGATTTACTCGGCATCCTCCCGGTACACTGGAGTCCCTTCTC
GCTTCACTGGCAGTGGCTCTGGGCCGGATTTCACTTTCACCATCAGCAGTGTGCAGGCTGAAGA
CCTGGCAGTTTATTTCTGTCAGCAACATTTTCGTACTCCATTCACGTTCGGCTCGGGGACAAAA
TTGGAGATCAAAGCTCTA**GATCTC*GAGCCCAAATCTCCTGACAAAACTCACACATGCCCACCGT
GCCCAGCACCTCCTGTGGCCGGACCGTCAGTCTTCCTCTTCCCCCCAAAACCCAAGGACACCCT
CATGATCTCCCGGACCCCTGAGGTCACATGCGTGGTGGTGGACGTGAGCCACGAAGACCCTGAG
GTCAAGTTCAACTGGTACGTGGACGGCGTGGAGGTGCATAATGCCAAGACAAAGCCGCGGGAGG
AGCAGTACCAGAGCACGTACCGTGTGGTCAGCGTCCTCACCGTCCTGCACCAGGACTGGCTGAA
TGGCAAGGAGTACAAGTGCAAGGTCTCCAACAAAGCCCTCCCAGCCCCCATCGAGAAAACCATC*

FIG. 9E

*TCCAAAGCCAAAGGGCAGCCCCGAGAACCACAGGTGTACACCCTGCCCCCATCCCGGGATGAGC*
*TGACCAAGAACCAGGTCAGCCTGACCTGCCTGGTCAAAGGCTTCTATCCCAGCGACATCGCCGT*
*GGAGTGGGAGAGCAATGGGCAACCGGAGAACAACTACAAGACCACGCCTCCCGTGCTGGACTCC*
*GACGGCTCCTTCTTCCTCTACAGCAAGCTCACCGTGGACAAGAGCAGGTGGCAGCAGGGGAACG*
*TCTTCTCATGCTCCGTGATGCATGAGGCTCTGCACAACCACTACACGCAGAAGAGCCTCTCCCT*
*GTCTCCGGGTAAAAAGATCCCAAATTTTGGGTGCTGGTGGTGGTTGGTGGAGTCCTGGCTTGC*
TATAGCTTGCTAGTAACAGTGGCCTTTATTATTTTCTGGGTGGCTGCTGGCGGACCTGGCGCCG
GATCTGCTGCTCCTGTGTCTAGCACAAGCAGCCTGCCTCTGGCCGCCCTGAACATGAGAGTGCG
GAGAAGGCTGAGCCTGTTCCTGAACGTGCGGACACAGGTGGCCGCCGATTGGACAGCCCTGGCC
GAGGAAATGGACTTCGAGTACCTGGAAATCCGGCAGCTGGAAACCCAGGCCGACCCTACAGGCA
GACTGCTGGATGCTTGGCAGGGCAGACCAGGCGCTTCTGTGGGAAGGCTGCTGGAACTGCTGAC
CAAGCTGGGCAGGGACGACGTGCTGCTGGAACTGGGCCCTAGCATCGAAGAGGACTGCCAGAAG
TACATCCTGAAGCAGCAGCAGGAAGAGGCCGAGAAGCCTCTGCAGGTGGCAGCCGTGGATAGCA
GCGTGCCAAGAACAGCCGAGCTGGCCGGCATCACCACCCTGGATGATCCTCTGGGCCACATGCC
CGAGAGATTCGACGCCTTCATCTGCTACTGCCCCAGCGACATCGTGGAAAAGAAGGTGGCCAAG
AAGCCCACCAACAAGGCCCCCCACCCCAAGCAGGAACCCCAGGAAATCAACTTCCCCGACGACC
TGCCCGGCAGCAATACTGCTGCACCCGTGCAGGAAACCCTGCACGGCTGTCAGCCTGTGACCCA
GGAAGATGGCAAAGAAAGCCGGATCTCTGTGCAGGAACGCCAGAGAGTGAAGTTCAGCAGGAGC
GCAGACGCCCCCGCGTACCAGCAGGGCCAGAACCAGCTCTATAACGAGCTCAATCTAGGACGAA
GAGAGGAGTACGATGTTTTGGACAAGAGACGTGGCCGGGACCCTGAGATGGGGGGAAAGCCGAG
AAGGAAGAACCCTCAGGAAGGCCTGTACAATGAACTGCAGAAAGATAAGATGGCGGAGGCCTAC
AGTGAGATTGGGATGAAAGGCGAGCGCCGGAGGGGCAAGGGGCACGATGGCCTTTACCAGGGTC
TCAGTACAGCCACCAAGGACACCTACGACGCCCTTCACATGCAGGCCCTGCCCCCTCGCTAA

CAR →

| CARs | Cytotoxicity |
|---|---|
| SH.TMCD28 | +/- |
| SH.CH3.TMCD28 | +/- |
| SH.CH2.CH3.TMCD28 | +/- |

FIG. 10B

FRP5.MyD88.CD40.z (SH.TMCD8a)
Underline: Leader Sequence
Bold: scFv FRP5
*Italic: IgG1 Short Hinge*
Dashed underline: CD8a Transmembrane Domain
Double underline: MyD88
Bold and underline: CD40
*Bold italic: CD3 Zeta*

Amino Acid Sequence (SEQ ID NO: 88):
MDWIWRILFLVGAATGAHS**EVQLQQSGPELKKPGETVKISCKASGYPFTNYGMNWVKQAPGQGLKWMGWI
NTSTGESTFADDFKGRFDFSLETSANTAYLQINNLKSEDMATYFCARWEVYHGYVPYWGQGTTVTVSSGG
GGSGGGGSGGGGSDIQLTQSHKFLSTSVGDRVSITCKASQDVYNAVAWYQQKPGQSPKLLIYSASSRYTG
VPSRFTGSGSGPDFTFTISSVQAEDLAVYFCQQHFRTPFTFGSGTKLEIKAL**D*LEPKSCDKTHTCPPCPD
PKCD*IYIWAPLAGTCGVLLLSLVITLYCNHRNAAGGPGAGSAAPVSSTSSLPLAALNMRVRRRLSLFLNV
RTQVAADWTALAEEMDFEYLEIRQLETQADPTGRLLDAWQGRPGASVGRLLELLTKLGRDDVLLELGPSI
EEDCQKYILKQQQEEAEKPLQVAAVDSSVPRTAELAGITTLDDPLGHMPERFDAFICYCPSDIVE**KKVAK
KPTNKAPHPKQEPQEINFPDDLPGSNTAAPVQETLHGCQPVTQEDGKESRISVQERQ**RVKFSRSADAPAY
QQGQNQLYNELNLGRREEYDVLDKRRGRDPEMGGKPRRKNPQEGLYNELQKDKMAEAYSEIGMKGERRRG
KGHDGLYQGLSTATKDTYDALHMQALPPR**

Nucleotide Sequence (SEQ ID NO: 89):
ATGGACTGGATCTGGCGCATCCTCTTCCTCGTCGGCGCTGCTACCGGCGCTCATTCT**GAGGTACAACTGC
AGCAGTCTGGACCTGAACTGAAGAAGCCTGGAGAGACAGTCAAGATCTCCTGCAAGGCCTCTGGGTATCC
TTTCACAAACTATGGAATGAACTGGGTGAAGCAGGCTCCAGGACAGGGTTTAAAGTGGATGGGCTGGATT
AACACCTCCACTGGAGAGTCAACATTTGCTGATGACTTCAAGGGACGGTTTGACTTCTCTTTGGAAACCT
CTGCCAACACTGCCTATTTGCAGATCAACAACCTCAAAAGTGAAGACATGGCTACATATTTCTGTGCAAG
ATGGGAGGTTTACCACGGCTACGTTCCTTACTGGGGCCAAGGGACCACGGTCACCGTTTCCTCTGGCGGT
GGCGGTTCTGGTGGCGGTGGCTCCGGCGGTGGCGGTTCTGACATCCAGCTGACCCAGTCTCACAAATTCC
TGTCCACTTCAGTAGGAGACAGGGTCAGCATCACCTGCAAGGCCAGTCAGGATGTGTATAATGCTGTTGC
CTGGTATCAACAGAAACCAGGACAATCTCCTAAACTTCTGATTTACTCGGCATCCTCCCGGTACACTGGA
GTCCCTTCTCGCTTCACTGGCAGTGGCTCTGGGCCGGATTTCACTTTCACCATCAGCAGTGTGCAGGCTG
AAGACCTGGCAGTTTATTTCTGTCAGCAACATTTTCGTACTCCATTCACGTTCGGCTCGGGGACAAAATT
GGAGATCAAAGCTCTA**GATCTCGAGCCCAAATCTTGTGACAAAACTCACACATGCCCACCGTGCCCGGAT
CCCAAGTGCGACATCTACATCTGGGCCCCTCTGGCCGGCACATGTGGCGTGCTGCTGCTGAGCCTCGTGA
TCACCCTGTACTGCAACCACCGGAACGCTGCTGGCGGACCTGGCGCCGGATCTGCTGCTCCTGTGTCTAG
CACAAGCAGCCTGCCTCTGGCCGCCCTGAACATGAGAGTGCGGAGAAGGCTGAGCCTGTTCCTGAACGTG
CGGACACAGGTGGCCGCCGATTGGACAGCCCTGGCCGAGGAAATGGACTTCGAGTACCTGGAAATCCGGC
AGCTGGAAACCCAGGCCGACCCTACAGGCAGACTGCTGGATGCTTGGCAGGGCAGACCAGGCGCTTCTGT
GGGAAGGCTGCTGGAACTGCTGACCAAGCTGGGCAGGGACGACGTGCTGCTGGAACTGGGCCCTAGCATC
GAAGAGGACTGCCAGAAGTACATCCTGAAGCAGCAGCAGGAAGAGGCCGAGAAGCCTCTGCAGGTGGCAG
CCGTGGATAGCAGCGTGCCAAGAACAGCCGAGCTGGCCGGCATCACCACCCTGGATGATCCTCTGGGCCA
CATGCCCGAGAGATTCGACGCCTTCATCTGCTACTGCCCCAGCGACATCGTGGAA**AAGAAGGTGGCCAAG
AAGCCCACCAACAAGGCCCCCCACCCCAAGCAGGAACCCCAGGAAATCAACTTCCCCGACGACCTGCCCG
GCAGCAATACTGCTGCACCCGTGCAGGAAACCCTGCACGGCTGTCAGCCTGTGACCCAGGAAGATGGCAA
AGAAAGCCGGATCTCTGTGCAGGAACGCCAGAGAGTGAAGTTCAGCAGGAGCGCAGACGCCCCCGCGTAC***
***CAGCAGGGCCAGAACCAGCTCTATAACGAGCTCAATCTAGGACGAAGAGAGGAGTACGATGTTTTGGACA
AGAGACGTGGCCGGGACCCTGAGATGGGGGGAAAGCCGAGAAGGAAGAACCCTCAGGAAGGCCTGTACAA
TGAACTGCAGAAAGATAAGATGGCGGAGGCCTACAGTGAGATTGGGATGAAAGGCGAGCGCCGGAGGGGC
AAGGGGCACGATGGCCTTTACCAGGGTCTCAGTACAGCCACCAAGGACACCTACGACGCCCTTCACATGC
AGGCCCTGCCCCCTCGC***TAA

FIG. 10C

FRP5.MyD88.CD40.z (8a.TMCD8a)
<u>Underline: Leader Sequence</u>
Bold: scFv FRP5
<u>Dashed underline: CD8a Stalk and Transmembrane Domain</u>
<u>Double underline: MyD88</u>
<u>Bold and underline: CD40</u>
*Bold italic: CD3 Zeta*

Amino Acid Sequence (SEQ ID NO: 90):
<u>MDWIWRILFLVGAATGAHSE</u>VQLQQSGPELKKPGETVKISCKASGYPFTNYGMNWVKQAPGQGLKWMGWI NTSTGESTFADDFKGRFDFSLETSANTAYLQINNLKSEDMATYFCARWEVYHGYVPYWGQGTTVTVSSGG GGSGGGGSGGGGSDIQLTQSHKFLSTSVGDRVSITCKASQDVYNAVAWYQQKPGQSPKLLIYSASSRYTG VPSRFTGSGSGPDFTFTISSVQAEDLAVYFCQQHFRTPFTFGSGTKLEIKAL<u>PAKPTTTPAPRPPTPAPT IASQPLSLRPEACRPAAGGAVHTRGLDFACDIYIWAPLAGTCGVLLLSLVITLYCNHRN</u><u>AAGGPGAGSAA PVSSTSSLPLAALNMRVRRRLSLFLNVRTQVAADWTALAEEMDFEYLEIRQLETQADPTGRLLDAWQGRP GASVGRLLELLTKLGRDDVLLELGPSIEEDCQKYILKQQQEEAEKPLQVAAVDSSVPRTAELAGITTLDD PLGHMPERFDAFICYCPSDIVE</u><u>KKVAKKPTNKAPHPKQEPQEINFPDDLPGSNTAAPVQETLHGCQPVTQ EDGKESRISVQERQ</u>RVKFSRSADAPAYQQGQNQLYNELNLGRREEYDVLDKRRGRDPEMGGKPRRKNPQE GLYNELQKDKMAEAYSEIGMKGERRRGKGHDGLYQGLSTATKDTYDALHMQALPPR****

Nucleotide Sequence (SEQ ID NO: 91):
<u>ATGGACTGGATCTGGCGCATCCTCTTCCTCGTCGGCGCTGCTACCGGCGCTCATTCT</u>GAGGTACAACTGC AGCAGTCTGGACCTGAACTGAAGAAGCCTGGAGAGACAGTCAAGATCTCCTGCAAGGCCTCTGGGTATCC TTTCACAAACTATGGAATGAACTGGGTGAAGCAGGCTCCAGGACAGGGTTTAAAGTGGATGGGCTGGATT AACACCTCCACTGGAGAGTCAACATTTGCTGATGACTTCAAGGGACGGTTTGACTTCTCTTTGGAAACCT CTGCCAACACTGCCTATTTGCAGATCAACAACCTCAAAAGTGAAGACATGGCTACATATTTCTGTGCAAG ATGGGAGGTTTACCACGGCTACGTTCCTTACTGGGGCCAAGGGACCACGGTCACCGTTTCCTCTGGCGGT GGCGGTTCTGGTGGCGGTGGCTCCGGCGGTGGCGGTTCTGACATCCAGCTGACCCAGTCTCACAAATTCC TGTCCACTTCAGTAGGAGACAGGGTCAGCATCACCTGCAAGGCCAGTCAGGATGTGTATAATGCTGTTGC CTGGTATCAACAGAAACCAGGACAATCTCCTAAACTTCTGATTTACTCGGCATCCTCCCGGTACACTGGA GTCCCTTCTCGCTTCACTGGCAGTGGCTCTGGGCCGGATTTCACTTTCACCATCAGCAGTGTGCAGGCTG AAGACCTGGCAGTTTATTTCTGTCAGCAACATTTTCGTACTCCATTCACGTTCGGCTCGGGGACAAAATT GGAGATCAAAGCTCTA<u>CCAGCCAAGCCCACCACAACCCCTGCTCCTAGACCTCCTACCCCAGCCCCTACC ATTGCCTCCCAGCCACTGTCTCTGAGGCCCGAGGCTTGTAGACCTGCTGCAGGCGGAGCCGTGCACACCA GAGGACTGGATTTCGCCTGCGACATCTATATCTGGGCCCCTCTGGCCGGCACCTGTGGCGTGCTGCTGCT GTCACTCGTGATCACCCTGTACTGCAACCACCGGAACGCTGCTGGCGGACCTGGCGCCGGATCTGCTGCT CCTGTGTCTAGCACAAGCAGCCTGCCTCTGGCCGCCCTGAACATGAGAGTGCGGAGAAGGCTGAGCCTGT TCCTGAACGTGCGGACACAGGTGGCCGCCGATTGGACAGCCCTGGCCGAGGAAATGGACTTCGAGTACCT GGAAATCCGGCAGCTGGAAACCCAGGCCGACCCTACAGGCAGACTGCTGGATGCTTGGCAGGGCAGACCA GGCGCTTCTGTGGGAAGGCTGCTGGAACTGCTGACCAAGCTGGGCAGGGACGACGTGCTGCTGGAACTGG GCCCTAGCATCGAAGAGGACTGCCAGAAGTACATCCTGAAGCAGCAGCAGGAAGAGGCCGAGAAGCCTCT GCAGGTGGCAGCCGTGGATAGCAGCGTGCCAAGAACAGCCGAGCTGGCCGGCATCACCACCCTGGATGAT CCTCTGGGCCACATGCCCGAGAGATTCGACGCCTTCATCTGCTACTGCCCCAGCGACATCGTGGAA</u>AAGA AGGTGGCCAAGAAGCCCACCAACAAGGCCCCCCACCCCAAGCAGGAACCCCAGGAAATCAACTTCCCCGA CGACCTGCCCGGCAGCAATACTGCTGCACCCGTGCAGGAAACCCTGCACGGCTGTCAGCCTGTGACCCAG GAAGATGGCAAAGAAAGCCGGATCTCTGTGCAGGAACGCCAGAGAGTGAAGTTCAGCAGGAGCGCAGACG CCCCCGCGTACCAGCAGGGCCAGAACCAGCTCTATAACGAGCTCAATCTAGGACGAAGAGAGGAGTACGA TGTTTTGGACAAGAGACGTGGCCGGGACCCTGAGATGGGGGGAAAGCCGAGAAGGAAGAACCCTCAGGAA GGCCTGTACAATGAACTGCAGAAAGATAAGATGGCGGAGGCCTACAGTGAGATTGGGATGAAGGCGAGC GCCGGAGGGGCAAGGGGCACGATGGCCTTTACCAGGGTCTCAGTACAGCCACCAAGGACACCTACGACGC CCTTCACATGCAGGCCCTGCCCCCTCGCTAA

FIG. 10D

FRP5.MyD88.CD40.z (8a.TMCD8a+8aa)
<u>Underline: Leader Sequence</u>
Bold: scFv FRP5
<u>Dashed underline: CD8a Stalk and Transmembrane Domain+8aa</u>
<u>Double underline: MyD88</u>
<u>Bold and underline: CD40</u>
*Bold italic: CD3 Zeta*

Amino Acid Sequence (SEQ ID NO: 92):
<u>MDWIWRILFLVGAATGAHS</u>**EVQLQQSGPELKKPGETVKISCKASGYPFTNYGMNWVKQAPGQGLKWMGWI
NTSTGESTFADDFKGRFDFSLETSANTAYLQINNLKSEDMATYFCARWEVYHGYVPYWGQGTTVTVSSGG
GGSGGGGSGGGGSDIQLTQSHKFLSTSVGDRVSITCKASQDVYNAVAWYQQKPGQSPKLLIYSASSRYTG
VPSRFTGSGSGPDFTFTISSVQAEDLAVYFCQQHFRTPFTFGSGTKLEIKAL**<u>PAKPTTTPAPRPPTPAPT
IASQPLSLRPEACRPAAGGAVHTRGLDFACDIYIWAPLAGTCGVLLLSLVITLYCNHRNRRRVCKCPRPV
VAAGGPGAGSAAPVSSTSSLPLAALNMRVRRRLSLFLNVRTQVAADWTALAEEMDFEYLEIRQLETQADP
TGRLLDAWQGRPGASVGRLLELLTKLGRDDVLLELGPSIEEDCQKYILKQQQEEAEKPLQVAAVDSSVPR
TAELAGITTLDDPLGHMPERFDAFICYCPSDIVE</u>**KKVAKKPTNKAPHPKQEPQEINFPDDLPGSNTAAPV
QETLHGCQPVTQEDGKESRISVQERQRVKFSRSADAPAYQQGQNQLYNELNLGRREEYDVLDKRRGRDPE**
*MGGKPRRKNPQEGLYNELQKDKMAEAYSEIGMKGERRRGKGHDGLYQGLSTATKDTYDALHMQALPPR**

Nucleotide Sequence (SEQ ID NO: 93):
<u>ATGGACTGGATCTGGCGCATCCTCTTCCTCGTCGGCGCTGCTACCGGCGCTCATTCT</u>**GAGGTACAACTGC
AGCAGTCTGGACCTGAACTGAAGAAGCCTGGAGAGACAGTCAAGATCTCCTGCAAGGCCTCTGGGTATCC
TTTCACAAACTATGGAATGAACTGGGTGAAGCAGGCTCCAGGACAGGGTTTAAAGTGGATGGGCTGGATT
AACACCTCCACTGGAGAGTCAACATTTGCTGATGACTTCAAGGGACGGTTTGACTTCTCTTTGGAAACCT
CTGCCAACACTGCCTATTTGCAGATCAACAACCTCAAAAGTGAAGACATGGCTACATATTTCTGTGCAAG
ATGGGAGGTTTACCACGGCTACGTTCCTTACTGGGGCCAAGGGACCACGGTCACCGTTTCCTCTGGCGGT
GGCGGTTCTGGTGGCGGTGGCTCCGGCGGTGGCGGTTCTGACATCCAGCTGACCCAGTCTCACAAATTCC
TGTCCACTTCAGTAGGAGACAGGGTCAGCATCACCTGCAAGGCCAGTCAGGATGTGTATAATGCTGTTGC
CTGGTATCAACAGAAACCAGGACAATCTCCTAAACTTCTGATTTACTCGGCATCCTCCCGGTACACTGGA
GTCCCTTCTCGCTTCACTGGCAGTGGCTCTGGGCCGGATTTCACTTTCACCATCAGCAGTGTGCAGGCTG
AAGACCTGGCAGTTTATTTCTGTCAGCAACATTTTCGTACTCCATTCACGTTCGGCTCGGGGACAAAATT
GGAGATCAAAGCTCTA**<u>CCAGCCAAGCCCACCACAACCCCTGCTCCTAGACCTCCTACCCCAGCCCCTACC
ATTGCCTCCCAGCCACTGTCTCTGAGGCCCGAGGCTTGTAGACCTGCTGCAGGCGGAGCCGTGCACACCA
GAGGACTGGATTTCGCCTGCGACATCTATATCTGGGCCCCTCTGGCCGGCACCTGTGGCGTGCTGCTGCT
GTCACTCGTGATCACCCTGTACTGCAACCACCGGAACCGGCGGAGAGTGTGCAAGTGCCCTAGACCCGTC
GTGGCTGCTGGCGGACCTGGCGCCGGATCTGCTGCTCCTGTGTCTAGCACAAGCAGCCTGCCTCTGGCCG
CCCTGAACATGAGAGTGCGGAGAAGGCTGAGCCTGTTCCTGAACGTGCGGACACAGGTGGCCGCCGATTG
GACAGCCCTGGCCGAGGAAATGGACTTCGAGTACCTGGAAATCCGGCAGCTGGAAACCCAGGCCGACCCT
ACAGGCAGACTGCTGGATGCTTGGCAGGGCAGACCAGGCGCTTCTGTGGGAAGGCTGCTGGAACTGCTGA
CCAAGCTGGGCAGGGACGACGTGCTGCTGGAACTGGGCCCTAGCATCGAAGAGGACTGCCAGAAGTACAT
CCTGAAGCAGCAGCAGGAAGAGGCCGAGAAGCCTCTGCAGGTGGCAGCCGTGGATAGCAGCGTGCCAAGA
ACAGCCGAGCTGGCCGGCATCACCACCCTGGATGATCCTCTGGGCCACATGCCCGAGAGATTCGACGCCT
TCATCTGCTACTGCCCCAGCGACATCGTGGAA</u>**AAGAAGGTGGCCAAGAAGCCCACCAACAAGGCCCCCA
CCCCAAGCAGGAACCCCAGGAAATCAACTTCCCGACGACCTGCCCGGCAGCAATACTGCTGCACCCGTG
CAGGAAACCCTGCACGGCTGTCAGCCTGTGACCCAGGAAGATGGCAAAGAAAGCCGGATCTCTGTGCAGG
AACGCCAGAGAGTGAAGTTCAGCAGGAGCGCAGACGCCCCCGCGTACCAGCAGGGCCAGAACCAGCTCTA**
*TAACGAGCTCAATCTAGGACGAAGAGAGGAGTACGATGTTTTGGACAAGAGACGTGGCCGGGACCCTGAG
ATGGGGGGAAAGCCGAGAAGGAAGAACCCTCAGGAAGGCCTGTACAATGAACTGCAGAAAGATAAGATGG
CGGAGGCCTACAGTGAGATTGGGATGAAAGGCGAGCGCCGGAGGGGCAAGGGGCACGATGGCCTTTACCA
GGGTCTCAGTACAGCCACCAAGGACACCTACGACGCCCTTCACATGCAGGCCCTGCCCCCTCGC*TAA

| CARs | Cytotoxicity |
|---|---|
| SH.TMCD28 | +/- |
| SH.TMCD8α | +/- |
| 8α.TMCD8α | +/- |
| 8α.TMCD8α+8aa | + |

FIG. 11
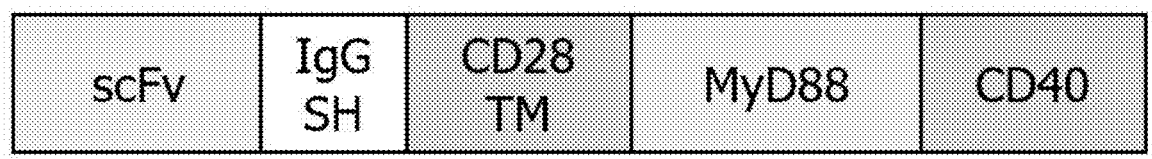
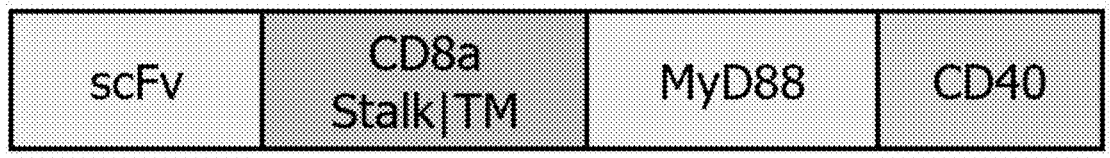

SEQUENCE LISTING

```
<160> NUMBER OF SEQ ID NOS: 98

<210> SEQ ID NO 1
<211> LENGTH: 1004
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 1

Met Asp Trp Ile Trp Arg Ile Leu Phe Leu Val Gly Ala Ala Thr Gly
1               5                   10                  15

Ala His Ser Gln Val Gln Leu Leu Glu Ser Gly Gly Gly Leu Val Gln
                20                  25                  30

Pro Gly Gly Ser Leu Arg Leu Ser Cys Ala Ala Ser Gly Phe Thr Phe
            35                  40                  45

Ser Ser Tyr Thr Met Ser Trp Val Arg Gln Ala Pro Gly Gln Ala Leu
        50                  55                  60

Glu Trp Met Gly Thr Ile Ser Ser Gly Gly Thr Tyr Thr Tyr Tyr Pro
65                  70                  75                  80

Asp Ser Val Lys Gly Arg Phe Thr Ile Ser Arg Asp Asn Ala Lys Asn
                85                  90                  95

Ser Leu Tyr Leu Gln Met Asn Ser Leu Arg Ala Glu Asp Thr Ala Val
                100                 105                 110

Tyr Tyr Cys Ala Arg Glu Ala Ile Phe Thr Tyr Trp Gly Arg Gly Thr
            115                 120                 125

Leu Val Thr Ser Ser Gly Gly Gly Ser Gly Gly Gly Gly Ser Gly
        130                 135                 140

Gly Gly Gly Ser Asp Ile Gln Leu Thr Gln Ser Pro Ser Ser Leu Ser
145                 150                 155                 160

Ala Ser Val Gly Asp Arg Val Thr Ile Thr Cys Lys Ala Ser Gln Asp
                165                 170                 175

Ile Asn Asn Tyr Leu Ser Trp Tyr Gln Gln Lys Pro Gly Gln Ala Pro
                180                 185                 190

Arg Leu Leu Ile Tyr Arg Ala Asn Arg Leu Val Asp Gly Val Pro Asp
            195                 200                 205

Arg Phe Ser Gly Ser Gly Tyr Gly Thr Asp Phe Thr Leu Thr Ile Asn
        210                 215                 220

Asn Ile Glu Ser Glu Asp Ala Ala Tyr Tyr Phe Cys Leu Lys Tyr Asp
225                 230                 235                 240
```

-continued

```
Val Phe Pro Tyr Thr Phe Gly Gln Gly Thr Lys Val Glu Ile Lys Asp
                245                 250                 255

Leu Glu Pro Lys Ser Cys Asp Lys Thr His Thr Cys Pro Pro Cys Pro
                260                 265                 270

Asp Pro Lys Phe Trp Val Leu Val Val Gly Gly Val Leu Ala Cys
                275                 280                 285

Tyr Ser Leu Leu Val Thr Val Ala Phe Ile Ile Phe Trp Val Ala Ala
                290                 295                 300

Gly Gly Pro Gly Ala Gly Ser Ala Ala Pro Val Ser Ser Thr Ser Ser
305                 310                 315                 320

Leu Pro Leu Ala Ala Leu Asn Met Arg Val Arg Arg Arg Leu Ser Leu
                325                 330                 335

Phe Leu Asn Val Arg Thr Gln Val Ala Ala Asp Trp Thr Ala Leu Ala
                340                 345                 350

Glu Glu Met Asp Phe Glu Tyr Leu Glu Ile Arg Gln Leu Glu Thr Gln
                355                 360                 365

Ala Asp Pro Thr Gly Arg Leu Leu Asp Ala Trp Gln Gly Arg Pro Gly
                370                 375                 380

Ala Ser Val Gly Arg Leu Leu Glu Leu Leu Thr Lys Leu Gly Arg Asp
385                 390                 395                 400

Asp Val Leu Leu Glu Leu Gly Pro Ser Ile Glu Glu Asp Cys Gln Lys
                405                 410                 415

Tyr Ile Leu Lys Gln Gln Gln Glu Glu Ala Glu Lys Pro Leu Gln Val
                420                 425                 430

Ala Ala Val Asp Ser Ser Val Pro Arg Thr Ala Glu Leu Ala Gly Ile
                435                 440                 445

Thr Thr Leu Asp Asp Pro Leu Gly His Met Pro Glu Arg Phe Asp Ala
                450                 455                 460

Phe Ile Cys Tyr Cys Pro Ser Asp Ile Val Glu Lys Val Ala Lys
465                 470                 475                 480

Lys Pro Thr Asn Lys Ala Pro His Pro Lys Gln Glu Pro Gln Glu Ile
                485                 490                 495

Asn Phe Pro Asp Asp Leu Pro Gly Ser Asn Thr Ala Ala Pro Val Gln
                500                 505                 510

Glu Thr Leu His Gly Cys Gln Pro Val Thr Gln Glu Asp Gly Lys Glu
                515                 520                 525

Ser Arg Ile Ser Val Gln Glu Arg Gln Arg Val Lys Phe Ser Arg Ser
                530                 535                 540

Ala Asp Ala Pro Ala Tyr Gln Gln Gly Gln Asn Gln Leu Tyr Asn Glu
545                 550                 555                 560

Leu Asn Leu Gly Arg Arg Glu Glu Tyr Asp Val Leu Asp Lys Arg Arg
                565                 570                 575

Gly Arg Asp Pro Glu Met Gly Gly Lys Pro Arg Arg Lys Asn Pro Gln
                580                 585                 590

Glu Gly Leu Tyr Asn Glu Leu Gln Lys Asp Lys Met Ala Glu Ala Tyr
                595                 600                 605

Ser Glu Ile Gly Met Lys Gly Glu Arg Arg Arg Gly Lys Gly His Asp
                610                 615                 620

Gly Leu Tyr Gln Gly Leu Ser Thr Ala Thr Lys Asp Thr Tyr Asp Ala
625                 630                 635                 640

Leu His Met Gln Ala Leu Pro Pro Arg Ala Ser Arg Ala Glu Gly Arg
                645                 650                 655
```

```
Gly Ser Leu Leu Thr Cys Gly Asp Val Glu Asn Pro Gly Pro Met
            660                 665                 670

Pro Pro Pro Arg Leu Leu Phe Phe Leu Leu Phe Leu Thr Pro Met Glu
        675                 680                 685

Val Arg Pro Glu Glu Pro Leu Val Val Lys Val Glu Glu Gly Asp Asn
    690                 695                 700

Ala Val Leu Gln Cys Leu Lys Gly Thr Ser Asp Gly Pro Thr Gln Gln
705                 710                 715                 720

Leu Thr Trp Ser Arg Glu Ser Pro Leu Lys Pro Phe Leu Lys Leu Ser
            725                 730                 735

Leu Gly Leu Pro Gly Leu Gly Ile His Met Arg Pro Leu Ala Ile Trp
        740                 745                 750

Leu Phe Ile Phe Asn Val Ser Gln Gln Met Gly Gly Phe Tyr Leu Cys
        755                 760                 765

Gln Pro Gly Pro Pro Ser Glu Lys Ala Trp Gln Pro Gly Trp Thr Val
    770                 775                 780

Asn Val Glu Gly Ser Gly Glu Leu Phe Arg Trp Asn Val Ser Asp Leu
785                 790                 795                 800

Gly Gly Leu Gly Cys Gly Leu Lys Asn Arg Ser Ser Glu Gly Pro Ser
            805                 810                 815

Ser Pro Ser Gly Lys Leu Met Ser Pro Lys Leu Tyr Val Trp Ala Lys
        820                 825                 830

Asp Arg Pro Glu Ile Trp Glu Gly Glu Pro Pro Cys Leu Pro Pro Arg
        835                 840                 845

Asp Ser Leu Asn Gln Ser Leu Ser Gln Asp Leu Thr Met Ala Pro Gly
850                 855                 860

Ser Thr Leu Trp Leu Ser Cys Gly Val Pro Pro Asp Ser Val Ser Arg
865                 870                 875                 880

Gly Pro Leu Ser Trp Thr His Val His Pro Lys Gly Pro Lys Ser Leu
            885                 890                 895

Leu Ser Leu Glu Leu Lys Asp Asp Arg Pro Ala Arg Asp Met Trp Val
        900                 905                 910

Met Glu Thr Gly Leu Leu Leu Pro Arg Ala Thr Ala Gln Asp Ala Gly
        915                 920                 925

Lys Tyr Tyr Cys His Arg Gly Asn Leu Thr Met Ser Phe His Leu Glu
    930                 935                 940

Ile Thr Ala Arg Pro Val Leu Trp His Trp Leu Leu Arg Thr Gly Gly
945                 950                 955                 960

Trp Lys Val Ser Ala Val Thr Leu Ala Tyr Leu Ile Phe Cys Leu Cys
            965                 970                 975

Ser Leu Val Gly Ile Leu His Leu Gln Arg Ala Leu Val Leu Arg Arg
        980                 985                 990

Lys Arg Lys Arg Met Thr Asp Pro  Thr Arg Arg Phe
    995                 1000
```

<210> SEQ ID NO 2
<211> LENGTH: 3015
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 2
atggactgga tctggcggat tctgttcctc gtgggagccg ccacaggcgc tcactcacag       60

```
gtgcagctgc tggaatctgg cggcggactg gtgcagcctg gcggcagcct gagactgagc    120
tgcgccgcca gcggcttcac cttcagcagc tacaccatga gctgggtccg gcaggctcct    180
ggacaggccc tggaatggat gggcaccatc agcagcggcg gcacctacac ctactacccc    240
gacagcgtga agggccggtt caccatcagc cgggacaacg ccaagaacag cctgtacctg    300
cagatgaaca gcctgagagc cgaggacaca gccgtgtact actgcgccag agaggccatc    360
ttcacctact gggcagagg cacccctggtc acaagcagcg gaggcggagg aagtggaggg    420
ggaggatcag gcggcggagg cagcgatatc cagctgaccc agagccctag cagcctgagc    480
gccagcgtgg gcgacagagt gaccatcaca tgcaaggcca gccaggacat caacaactac    540
ctgagctggt atcagcagaa gcccggccag gcccccagac tgctgatcta ccgggccaac    600
agactggtgg acgcgtgcc cgatagattc agcggcagcg gctacggcac cgacttcacc    660
ctgaccatca acaacatcga gtccgaggac gccgcctact acttctgcct gaagtacgac    720
gtgttcccct acaccttcgg ccagggcacc aaggtggaga tcaaggatct cgagcccaaa    780
tcttgtgaca aaactcacac atgcccaccg tgcccgatc ccaaatttg ggtgctggtg    840 gtggttggtg gagtcctggc ttgctatagc ttgctagtaa cagtggcctt tattattttc    900
tgggtggctg ctggcggacc tggcgccgga tctgctgctc ctgtgtctag cacaagcagc    960
ctgcctctgg ccgccctgaa catgagagtg cggagaaggc tgagcctgtt cctgaacgtg    1020
cggacacagg tggccgccga ttggacagcc ctggccgagg aaatggactt cgagtacctg    1080
gaaatccggc agctggaaac ccaggccgac cctacaggca gactgctgga tgcttggcag    1140
ggcagaccag gcgcttctgt gggaaggctg ctggaactgc tgaccaagct gggcagggac    1200
gacgtgctgc tggaactggg ccctagcatc gaagaggact gccagaagta catcctgaag    1260
cagcagcagg aagaggccga gaagcctctg caggtggcag ccgtggatag cagcgtgcca    1320
agaacagccg agctggccgg catcaccacc ctggatgatc ctctgggcca catgccgag    1380 agattcgacg ccttcatctg ctactgcccc agcgacatcg tggaaaagaa ggtggccaag    1440
aagcccacca caaggccccc cacccaagg caggaacccc aggaaatcaa cttccccgac    1500
gacctgcccg gcagcaatac tgctgcaccc gtgcaggaaa ccctgcacgg ctgtcagcct    1560
gtgacccagg aagatggcaa agaaagccgg atctctgtgc aggaacgcca gagagtgaag    1620
ttcagcagga gcgcagacgc ccccgcgtac cagcagggcc agaaccagct ctataacgag    1680
ctcaatctag gacgaagaga ggagtacgat gttttggaca gagacgtgg ccgggaccct    1740 gagatgggcg gcaagcccag aagaaagaac ccccaggaag gctgtataa cgaactgcag    1800 aaagacaaga tggccgaggc ctacagcgag atcggcatga agggcgagcg gagaagaggc    1860
aagggccacg atggcctgta ccagggactg agcaccgcca ccaaggacac ctacgacgcc    1920
ctgcacatgc aggccctgcc tccaagagcc tctagagccg agggcagagg cagcctgctg    1980
acatgtggcg acgtggaaga aacccaggc cccatgcctc cccccagact gctgttcttc    2040
ctgctgttcc tgaccctat ggaagtgcgg cccgaggaac ccctggtcgt gaaagtggaa    2100
gagggcgaca acgccgtgct gcagtgtctg aagggcacct ccgatggccc tacccagcag    2160
ctgacctggt ccagagagag ccccctgaag cccttcctga gctgtctct gggcctgcct    2220 ggcctgggca tccatatgag gccactggcc atctggctgt tcatcttcaa cgtgtcccag    2280
cagatgggag gcttctacct gtgccagcct ggcccacctt ctgagaaggc ttggcagcct    2340
ggctggaccg tgaacgtgga aggatctggc gagctgttcc ggtggaacgt gtccgatctg    2400
ggcggcctgg gatgcggcct gaagaacaga tctagcgagg ccccagcag ccccagcggc    2460
```

-continued

```
aaactgatga gccccaagct gtacgtgtgg gccaaggaca gacccgagat tgggagggc    2520 gagccccctt gcctgccccc tagagatagc ctgaaccaga gcctgagcca ggacctgaca    2580 atggccctg gcagcacact gtggctgagc tgtggcgtgc acccgactc tgtgtctaga    2640 ggccctctga gctggaccca cgtgcaccct aagggcccta agagcctgct gtccctggaa    2700
ctgaaggacg acaggcccgc cagagatatg tgggtcatgg aaaccggcct gctgctgcct    2760
agagccacag cccaggatgc cggcaagtac tactgccaca gaggcaacct gaccatgagc    2820
ttccacctgg aaatcaccgc cagacccgtg ctgtggcact ggctgctgag aaccggcgga    2880
tggaaagtgt ccgccgtgac tctggcctac ctgatcttct gcctgtgctc cctcgtgggc    2940
atcctgcatc tgcagagggc tctggtgctg cggcggaagc ggaagagaat gaccgaccct    3000
acccggcggt tctaa                                                    3015
```

<210> SEQ ID NO 3
<211> LENGTH: 810
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 3

```
Met Asp Trp Ile Trp Arg Ile Leu Phe Leu Val Gly Ala Ala Thr Gly
1               5                   10                  15

Ala His Ser Gln Val Gln Leu Leu Glu Ser Gly Gly Gly Leu Val Gln
                20                  25                  30

Pro Gly Gly Ser Leu Arg Leu Ser Cys Ala Ala Ser Gly Phe Thr Phe
            35                  40                  45

Ser Ser Tyr Thr Met Ser Trp Val Arg Gln Ala Pro Gly Gln Ala Leu
        50                  55                  60

Glu Trp Met Gly Thr Ile Ser Ser Gly Gly Thr Tyr Thr Tyr Tyr Pro
65                  70                  75                  80

Asp Ser Val Lys Gly Arg Phe Thr Ile Ser Arg Asp Asn Ala Lys Asn
                85                  90                  95

Ser Leu Tyr Leu Gln Met Asn Ser Leu Arg Ala Glu Asp Thr Ala Val
            100                 105                 110

Tyr Tyr Cys Ala Arg Glu Ala Ile Phe Thr Tyr Trp Gly Arg Gly Thr
        115                 120                 125

Leu Val Thr Ser Ser Gly Gly Gly Ser Gly Gly Gly Ser Gly
    130                 135                 140

Gly Gly Gly Ser Asp Ile Gln Leu Thr Gln Ser Pro Ser Ser Leu Ser
145                 150                 155                 160

Ala Ser Val Gly Asp Arg Val Thr Ile Thr Cys Lys Ala Ser Gln Asp
                165                 170                 175

Ile Asn Asn Tyr Leu Ser Trp Tyr Gln Gln Lys Pro Gly Gln Ala Pro
            180                 185                 190

Arg Leu Leu Ile Tyr Arg Ala Asn Arg Leu Val Asp Gly Val Pro Asp
        195                 200                 205

Arg Phe Ser Gly Ser Gly Tyr Gly Thr Asp Phe Thr Leu Thr Ile Asn
    210                 215                 220

Asn Ile Glu Ser Glu Asp Ala Ala Tyr Tyr Phe Cys Leu Lys Tyr Asp
225                 230                 235                 240

Val Phe Pro Tyr Thr Phe Gly Gln Gly Thr Lys Val Glu Ile Lys Asp
                245                 250                 255
```

```
Leu Glu Pro Lys Ser Cys Asp Lys Thr His Thr Cys Pro Cys Pro
            260                 265                 270

Asp Pro Lys Phe Trp Val Leu Val Val Gly Gly Val Leu Ala Cys
            275                 280                 285

Tyr Ser Leu Leu Val Thr Val Ala Phe Ile Ile Phe Trp Val Arg Ser
            290                 295                 300

Lys Arg Ser Arg Leu Leu His Ser Asp Tyr Met Asn Met Thr Pro Arg
305                 310                 315                 320

Arg Pro Gly Pro Thr Arg Lys His Tyr Gln Pro Tyr Ala Pro Pro Arg
                325                 330                 335

Asp Phe Ala Ala Tyr Arg Ser Arg Val Lys Phe Ser Arg Ser Ala Asp
            340                 345                 350

Ala Pro Ala Tyr Gln Gln Gly Gln Asn Gln Leu Tyr Asn Glu Leu Asn
            355                 360                 365

Leu Gly Arg Arg Glu Glu Tyr Asp Val Leu Asp Lys Arg Arg Gly Arg
370                 375                 380

Asp Pro Glu Met Gly Gly Lys Pro Arg Arg Lys Asn Pro Gln Glu Gly
385                 390                 395                 400

Leu Tyr Asn Glu Leu Gln Lys Asp Lys Met Ala Glu Ala Tyr Ser Glu
                405                 410                 415

Ile Gly Met Lys Gly Glu Arg Arg Arg Gly Lys Gly His Asp Gly Leu
            420                 425                 430

Tyr Gln Gly Leu Ser Thr Ala Thr Lys Asp Thr Tyr Asp Ala Leu His
            435                 440                 445

Met Gln Ala Leu Pro Pro Arg Ala Ser Arg Ala Glu Gly Arg Gly Ser
450                 455                 460

Leu Leu Thr Cys Gly Asp Val Glu Glu Asn Pro Gly Pro Met Pro Pro
465                 470                 475                 480

Pro Arg Leu Leu Phe Phe Leu Leu Phe Leu Thr Pro Met Glu Val Arg
                485                 490                 495

Pro Glu Glu Pro Leu Val Val Lys Val Glu Glu Gly Asp Asn Ala Val
            500                 505                 510

Leu Gln Cys Leu Lys Gly Thr Ser Asp Gly Pro Thr Gln Gln Leu Thr
            515                 520                 525

Trp Ser Arg Glu Ser Pro Leu Lys Pro Phe Leu Lys Leu Ser Leu Gly
530                 535                 540

Leu Pro Gly Leu Gly Ile His Met Arg Pro Leu Ala Ile Trp Leu Phe
545                 550                 555                 560

Ile Phe Asn Val Ser Gln Gln Met Gly Gly Phe Tyr Leu Cys Gln Pro
                565                 570                 575

Gly Pro Pro Ser Glu Lys Ala Trp Gln Pro Gly Trp Thr Val Asn Val
            580                 585                 590

Glu Gly Ser Gly Glu Leu Phe Arg Trp Asn Val Ser Asp Leu Gly Gly
            595                 600                 605

Leu Gly Cys Gly Leu Lys Asn Arg Ser Ser Glu Gly Pro Ser Ser Pro
610                 615                 620

Ser Gly Lys Leu Met Ser Pro Lys Leu Tyr Val Trp Ala Lys Asp Arg
625                 630                 635                 640

Pro Glu Ile Trp Glu Gly Glu Pro Pro Cys Leu Pro Pro Arg Asp Ser
                645                 650                 655

Leu Asn Gln Ser Leu Ser Gln Asp Leu Thr Met Ala Pro Gly Ser Thr
            660                 665                 670
```

| | | | | | | | | | | | | |
|---|---|---|---|---|---|---|---|---|---|---|---|---|
|Leu|Trp|Leu|Ser|Cys|Gly|Val|Pro|Pro|Asp|Ser|Val|Ser|Arg|Gly|Pro|
| | | |675| | | |680| | | |685| |

Leu Ser Trp Thr His Val His Pro Lys Gly Pro Lys Ser Leu Leu Ser
    690                      695                700

Leu Glu Leu Lys Asp Asp Arg Pro Ala Arg Asp Met Trp Val Met Glu
705              710                  715                  720

Thr Gly Leu Leu Leu Pro Arg Ala Thr Ala Gln Asp Ala Gly Lys Tyr
              725                  730                  735

Tyr Cys His Arg Gly Asn Leu Thr Met Ser Phe His Leu Glu Ile Thr
            740                  745                  750

Ala Arg Pro Val Leu Trp His Trp Leu Leu Arg Thr Gly Gly Trp Lys
            755                  760                  765

Val Ser Ala Val Thr Leu Ala Tyr Leu Ile Phe Cys Leu Cys Ser Leu
770              775                  780

Val Gly Ile Leu His Leu Gln Arg Ala Leu Val Leu Arg Arg Lys Arg
785              790                  795                  800

Lys Arg Met Thr Asp Pro Thr Arg Arg Phe
            805                  810

<210> SEQ ID NO 4
<211> LENGTH: 2433
<212> TYPE: DNA
<213> ORGANISM: Artificial Sequence
<220> FEATURE:
<223> OTHER INFORMATION: Description of Artificial Sequence: Synthetic
    polynucleotide

<400> SEQUENCE: 4

```
atggactgga tctggcggat tctgttcctc gtgggagccg ccacaggcgc tcactcacag      60
gtgcagctgc tggaatctgg cggcggactg gtgcagcctg gcggcagcct gagactgagc     120
tgcgccgcca gcggcttcac cttcagcagc tacaccatga gctgggtccg caggctcct     180 ggacaggccc tggaatggat gggcaccatc agcagcggcg gcacctacac ctactacccc    240
gacagcgtga agggccggtt caccatcagc cgggacaacg ccaagaacag cctgtacctg    300
cagatgaaca gcctgagagc cgaggacaca gccgtgtact actgcgccag agaggccatc    360
ttcacctact ggggcagagg caccctggtc acaagcagcg gaggcggagg aagtggaggg    420
ggaggatcag gcgcggagg cagcgatatc agctgacccc agagccctag cagcctgagc    480
gccagcgtgg gcgacagagt gaccatcaca tgcaaggcca gcaggacat caacaactac    540 ctgagctggt atcagcagaa gcccggccag ccccccagac tgctgatcta ccgggccaac    600
agactggtgg acggcgtgcc cgatagattc agcggcagcg gctacggcac cgacttcacc    660
ctgaccatca acaacatcga gtccgaggac gccgcctact acttctgcct gaagtacgac    720
gtgttcccct acaccttcgg ccagggcacc aaggtggaga tcaaggatct cgagcccaaa    780
tcttgtgaca aaactcacac atgcccaccg tgcccggatc ccaagttctg ggtgctggtg    840
gtcgtgggcg gagtgctggc ctgttacagc ctgctcgtga ccgtggcctt catcatcttt    900
tgggtgcgca gcaagcggag ccggctgctg cacagcgact acatgaacat gaccccccaga   960 cggcctggcc ccaccagaaa gcactaccag ccttacgccc ctcccagaga cttcgccgcc   1020
taccggtcca gagtgaagtt cagcagaagc gccgacgccc ctgcctatca gcagggccag   1080
aaccagctgt acaacgagct gaacctgggc agacgggaag agtacgacgt gctggacaag   1140
cggagaggca gggaccctga gatggcggca agcccagaa gaagaacccc caggaaggc    1200 ctgtataacg aactgcagaa agacaagatg gccgaggcct acagcgagat cggcatgaag   1260
```

```
ggcgagcgga gaagaggcaa gggccacgat ggcctgtacc agggactgag caccgccacc    1320
aaggacacct acgacgccct gcacatgcag gccctgcctc caagagcctc tagagccgag    1380
ggcagaggca gcctgctgac atgtggcgac gtggaagaga acccaggccc catgcctccc    1440
cccagactgc tgttcttcct gctgttcctg acccctatgg aagtgcggcc cgaggaaccc    1500
ctggtcgtga agtggaaga gggcgacaac gccgtgctgc agtgtctgaa gggcacctcc    1560
gatgccccta cccagcagct gacctggtcc agagagagcc ccctgaagcc cttcctgaag    1620
ctgtctctgg gcctgcctgg cctgggcatc catatgaggc cactggccat ctggctgttc    1680
atcttcaacg tgtcccagca gatgggaggc ttctacctgt gccagcctgg cccaccttct    1740
gagaaggctt ggcagcctgg ctggaccgtg aacgtggaag atctggcga gctgttccgg    1800 tggaacgtgt ccgatctggg cggcctggga tgcggcctga gaacagatc tagcgagggc    1860 cccagcagcc ccagcggcaa actgatgagc ccaagctgt acgtgtgggc caaggacaga    1920
cccgagattt ggagggcga gccccctgc ctgcсccccta gagatagcct gaaccagagc    1980
ctgagccagg acctgacaat ggcccctggc agcacactgt ggctgagctg tggcgtgcca    2040
cccgactctg tgtctagagg ccctctgagc tggacccacg tgcaccctaa gggccctaag    2100
agcctgctgt ccctggaact gaaggacgac aggcccgcca gagatatgtg ggtcatggaa    2160
accggcctgc tgctgcctag agccacagcc caggatgccg gcaagtacta ctgccacaga    2220
ggcaacctga ccatgagctt ccacctggaa atcaccgcca gacccgtgct gtggcactgg    2280
ctgctgagaa ccggcggatg gaaagtgtcc gccgtgactc tggcctacct gatcttctgc    2340
ctgtgctccc tcgtgggcat cctgcatctg cagagggctc tggtgctgcg gcggaagcgg    2400
aagagaatga ccgaccctac ccggcggttc taa                                2433
```

<210> SEQ ID NO 5
<211> LENGTH: 814
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 5

Met Asp Trp Ile Trp Arg Ile Leu Phe Leu Val Gly Ala Ala Thr Gly
1               5                   10                  15

Ala His Ser Gln Val Gln Leu Leu Glu Ser Gly Gly Gly Leu Val Gln
                20                  25                  30

Pro Gly Gly Ser Leu Arg Leu Ser Cys Ala Ala Ser Gly Phe Thr Phe
            35                  40                  45

Ser Ser Tyr Thr Met Ser Trp Val Arg Gln Ala Pro Gly Gln Ala Leu
        50                  55                  60

Glu Trp Met Gly Thr Ile Ser Ser Gly Gly Thr Tyr Thr Tyr Tyr Pro
65                  70                  75                  80

Asp Ser Val Lys Gly Arg Phe Thr Ile Ser Arg Asp Asn Ala Lys Asn
                85                  90                  95

Ser Leu Tyr Leu Gln Met Asn Ser Leu Arg Ala Glu Asp Thr Ala Val
                100                 105                 110

Tyr Tyr Cys Ala Arg Glu Ala Ile Phe Thr Tyr Trp Gly Arg Gly Thr
            115                 120                 125

Leu Val Thr Ser Ser Gly Gly Gly Gly Ser Gly Gly Gly Gly Ser Gly
        130                 135                 140

```
Gly Gly Gly Ser Asp Ile Gln Leu Thr Gln Ser Pro Ser Ser Leu Ser
145                 150                 155                 160

Ala Ser Val Gly Asp Arg Val Thr Ile Thr Cys Lys Ala Ser Gln Asp
                165                 170                 175

Ile Asn Asn Tyr Leu Ser Trp Tyr Gln Gln Lys Pro Gly Gln Ala Pro
            180                 185                 190

Arg Leu Leu Ile Tyr Arg Ala Asn Arg Leu Val Asp Gly Val Pro Asp
        195                 200                 205

Arg Phe Ser Gly Ser Gly Tyr Gly Thr Asp Phe Thr Leu Thr Ile Asn
    210                 215                 220

Asn Ile Glu Ser Glu Asp Ala Ala Tyr Tyr Phe Cys Leu Lys Tyr Asp
225                 230                 235                 240

Val Phe Pro Tyr Thr Phe Gly Gln Gly Thr Lys Val Glu Ile Lys Asp
                245                 250                 255

Leu Glu Pro Lys Ser Cys Asp Lys Thr His Thr Cys Pro Pro Cys Pro
            260                 265                 270

Asp Pro Lys Cys Asp Ile Tyr Ile Trp Ala Pro Leu Ala Gly Thr Cys
        275                 280                 285

Gly Val Leu Leu Leu Ser Leu Val Ile Thr Leu Tyr Cys Asn His Arg
    290                 295                 300

Asn Lys Arg Gly Arg Lys Lys Leu Leu Tyr Ile Phe Lys Gln Pro Phe
305                 310                 315                 320

Met Arg Pro Val Gln Thr Thr Gln Glu Glu Asp Gly Cys Ser Cys Arg
                325                 330                 335

Phe Pro Glu Glu Glu Glu Gly Gly Cys Glu Leu Arg Val Lys Phe Ser
            340                 345                 350

Arg Ser Ala Asp Ala Pro Ala Tyr Gln Gln Gly Gln Asn Gln Leu Tyr
        355                 360                 365

Asn Glu Leu Asn Leu Gly Arg Arg Glu Glu Tyr Asp Val Leu Asp Lys
    370                 375                 380

Arg Arg Gly Arg Asp Pro Glu Met Gly Gly Lys Pro Arg Arg Lys Asn
385                 390                 395                 400

Pro Gln Glu Gly Leu Tyr Asn Glu Leu Gln Lys Asp Lys Met Ala Glu
                405                 410                 415

Ala Tyr Ser Glu Ile Gly Met Lys Gly Glu Arg Arg Arg Gly Lys Gly
            420                 425                 430

His Asp Gly Leu Tyr Gln Gly Leu Ser Thr Ala Thr Lys Asp Thr Tyr
        435                 440                 445

Asp Ala Leu His Met Gln Ala Leu Pro Pro Arg Ala Ser Arg Ala Glu
    450                 455                 460

Gly Arg Gly Ser Leu Leu Thr Cys Gly Asp Val Glu Glu Asn Pro Gly
465                 470                 475                 480

Pro Met Pro Pro Pro Arg Leu Leu Phe Phe Leu Leu Phe Leu Thr Pro
                485                 490                 495

Met Glu Val Arg Pro Glu Glu Pro Leu Val Val Lys Val Glu Glu Gly
            500                 505                 510

Asp Asn Ala Val Leu Gln Cys Leu Lys Gly Thr Ser Asp Gly Pro Thr
        515                 520                 525

Gln Gln Leu Thr Trp Ser Arg Glu Ser Pro Leu Lys Pro Phe Leu Lys
    530                 535                 540

Leu Ser Leu Gly Leu Pro Gly Leu Gly Ile His Met Arg Pro Leu Ala
545                 550                 555                 560

Ile Trp Leu Phe Ile Phe Asn Val Ser Gln Gln Met Gly Gly Phe Tyr
```

```
                    565                 570                 575
Leu Cys Gln Pro Gly Pro Ser Glu Lys Ala Trp Gln Pro Gly Trp
                580                 585                 590

Thr Val Asn Val Glu Gly Ser Gly Glu Leu Phe Arg Trp Asn Val Ser
            595                 600                 605

Asp Leu Gly Gly Leu Gly Cys Gly Leu Lys Asn Arg Ser Ser Glu Gly
        610                 615                 620

Pro Ser Pro Ser Gly Lys Leu Met Ser Pro Lys Leu Tyr Val Trp
625                 630                 635                 640

Ala Lys Asp Arg Pro Glu Ile Trp Glu Gly Glu Pro Pro Cys Leu Pro
                645                 650                 655

Pro Arg Asp Ser Leu Asn Gln Ser Leu Ser Gln Asp Leu Thr Met Ala
                660                 665                 670

Pro Gly Ser Thr Leu Trp Leu Ser Cys Gly Val Pro Pro Asp Ser Val
            675                 680                 685

Ser Arg Gly Pro Leu Ser Trp Thr His Val His Pro Lys Gly Pro Lys
        690                 695                 700

Ser Leu Leu Ser Leu Glu Leu Lys Asp Asp Arg Pro Ala Arg Asp Met
705                 710                 715                 720

Trp Val Met Glu Thr Gly Leu Leu Leu Pro Arg Ala Thr Ala Gln Asp
                725                 730                 735

Ala Gly Lys Tyr Tyr Cys His Arg Gly Asn Leu Thr Met Ser Phe His
            740                 745                 750

Leu Glu Ile Thr Ala Arg Pro Val Leu Trp His Trp Leu Leu Arg Thr
        755                 760                 765

Gly Gly Trp Lys Val Ser Ala Val Thr Leu Ala Tyr Leu Ile Phe Cys
        770                 775                 780

Leu Cys Ser Leu Val Gly Ile Leu His Leu Gln Arg Ala Leu Val Leu
785                 790                 795                 800

Arg Arg Lys Arg Lys Arg Met Thr Asp Pro Thr Arg Phe
                805                 810

<210> SEQ ID NO 6
<211> LENGTH: 2445
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 6
atggactgga tctggcggat tctgttcctc gtgggagccg ccacaggcgc tcactcacag      60
gtgcagctgc tggaatctgg cggcggactg gtgcagcctg gcggcagcct gagactgagc     120
tgcgccgcca gcggcttcac cttcagcagc tacaccatga gctgggtccg gcaggctcct     180
ggacaggccc tggaatggat gggcaccatc agcagcggcg gcacctacac ctactacccc     240
gacagcgtga agggccggtt caccatcagc cgggacaacg ccaagaacag cctgtacctg     300
cagatgaaca gcctgagagc cgaggacaca gccgtgtact actgcgccag agaggccatc     360
ttcacctact ggggcagagg cacccggtc acaagcagcg gaggcggagg aagtggaggg     420
ggaggatcag gcggcggagg cagcgatatc agctgacccc agagccctag cagcctgagc     480
gccagcgtgg gcgacagagt gaccatcaca tgcaaggcca gcaggacat caacaactac     540 ctgagctggt atcagcagaa gcccggccag gcccccgac tgctgatcta ccgggccaac     600
agactggtgg acggcgtgcc cgatagattc agcggcagcg gctacggcac cgacttcacc     660
```

| | |
|---|---|
| ctgaccatca acaacatcga gtccgaggac gccgcctact acttctgcct gaagtacgac | 720 |
| gtgttcccct acaccttcgg ccagggcacc aaggtggaga tcaaggatct cgagcccaaa | 780 |
| tcttgtgaca aaactcacac atgcccaccg tgcccggatc ccaagtgcga catctacatc | 840 |
| tgggcccctc tggccggcac atgtggcgtg ctgctgctga cctcgtgat cacccctgtac | 900 |
| tgcaaccacc ggaacaagcg gggcagaaag aagctgctgt acatcttcaa gcagcccttc | 960 |
| atgcggcccg tgcagaccac ccaggaagag acggctgct cctgcagatt ccccgaggaa | 1020 |
| gaagaaggcg gctgcgagct gagagtgaag ttcagcagaa gcgccgacgc ccctgcctat | 1080 |
| cagcagggcc agaaccagct gtacaacgag ctgaacctgg gcagacggga agagtacgac | 1140 |
| gtgctggaca gcggagagg cagggaccct gagatgggcg gcaagcccag aagaaagaac | 1200 |
| ccccaggaag gcctgtataa cgaactgcag aaagacaaga tggccgaggc ctacagcgag | 1260 |
| atcggaatga agggcgagcg gagaagaggc aagggccacg atggcctgta ccagggcctg | 1320 |
| agcaccgcca ccaaggacac ctatgacgcc ctgcacatgc aggccctgcc ccctagagcc | 1380 |
| tctagagccg agggaagagg cagcctgctg acctgtgggg acgtggaaga gaaccctggc | 1440 |
| cctatgcccc ctcccggct gctgttcttc ctgctgttcc tgaccccctat ggaagtgcgg | 1500 |
| cccgaggaac ccctggtcgt gaaagtggaa gagggcgaca acgccgtgct gcagtgtctg | 1560 |
| aagggcacct ccgatggccc tacccagcag ctgacctggt ccagagagag ccccctgaag | 1620 |
| cccttcctga agctgtctct gggcctgcct ggcctgggca tccatatgag gccactggcc | 1680 |
| atctggctgt tcatctttaa cgtgtcccag cagatgggag gcttctacct gtgccagcct | 1740 |
| ggcccccat ctgagaaagc ttggcagcct ggctggaccg tgaacgtgga aggatctggc | 1800 |
| gagctgttca gatggaacgt gtccgacctg ggcggcctgg gctgtggcct gaagaataga | 1860 |
| agcagcgagg gccccagcag ccccagcgga aaactgatga gcccaagct gtacgtgtgg | 1920 |
| gccaaggaca gacccgagat ctgggagggc gagcctcctt gcctgcctcc cagagatagc | 1980 |
| ctgaaccaga gcctgtccca ggatctgaca atggcccctg gcagcaccct gtggctgtct | 2040 |
| tgcggagtgc ctcccgactc cgtgtctaga ggccctctga gctggaccca cgtgcacccct | 2100 |
| aagggcccta gagcctgct gtccctggaa ctgaaggacg acaggcccgc cagagatatg | 2160 |
| tgggtcatgg aaaccggcct gctgctgcct agagccactg cccaggatgc cggcaagtac | 2220 |
| tactgccaca gaggcaacct gaccatgagc ttccacctgg aaatcaccgc cagacccgtg | 2280 |
| ctgtggcact ggctgctgag aaccggcggc tggaaagtgt ctgccgtgac cctggcctac | 2340 |
| ctgatcttct gcctgtgctc cctcgtgggc atcctgcatc tgcagagggc tctggtgctg | 2400 |
| cggcggaagc ggaagagaat gaccgacccc acccggcggt tctaa | 2445 |

<210> SEQ ID NO 7
<211> LENGTH: 19
<212> TYPE: PRT
<213> ORGANISM: Unknown
<220> FEATURE:
<223> OTHER INFORMATION: Description of Unknown:
    Leader sequence

<400> SEQUENCE: 7

Met Asp Trp Ile Trp Arg Ile Leu Phe Leu Val Gly Ala Ala Thr Gly
1               5                   10                  15

Ala His Ser

<210> SEQ ID NO 8

-continued

<211> LENGTH: 57
<212> TYPE: DNA
<213> ORGANISM: Unknown
<220> FEATURE:
<223> OTHER INFORMATION: Description of Unknown:
      Leader sequence

<400> SEQUENCE: 8
atggactgga tctggcggat tctgttcctc gtgggagccg ccacaggcgc tcactca        57

<210> SEQ ID NO 9
<211> LENGTH: 236
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 9

Gln Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Thr Met Ser Trp Val Arg Gln Ala Pro Gly Gln Ala Leu Glu Trp Met
        35                  40                  45

Gly Thr Ile Ser Ser Gly Gly Thr Tyr Thr Tyr Tyr Pro Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Glu Ala Ile Phe Thr Tyr Trp Gly Arg Gly Thr Leu Val Thr
            100                 105                 110

Ser Ser Gly Gly Gly Gly Ser Gly Gly Gly Gly Ser Gly Gly Gly Gly
        115                 120                 125

Ser Asp Ile Gln Leu Thr Gln Ser Pro Ser Ser Leu Ser Ala Ser Val
    130                 135                 140

Gly Asp Arg Val Thr Ile Thr Cys Lys Ala Ser Gln Asp Ile Asn Asn
145                 150                 155                 160

Tyr Leu Ser Trp Tyr Gln Gln Lys Pro Gly Gln Ala Pro Arg Leu Leu
                165                 170                 175

Ile Tyr Arg Ala Asn Arg Leu Val Asp Gly Val Pro Asp Arg Phe Ser
            180                 185                 190

Gly Ser Gly Tyr Gly Thr Asp Phe Thr Leu Thr Ile Asn Asn Ile Glu
        195                 200                 205

Ser Glu Asp Ala Ala Tyr Tyr Phe Cys Leu Lys Tyr Asp Val Phe Pro
    210                 215                 220

Tyr Thr Phe Gly Gln Gly Thr Lys Val Glu Ile Lys
225                 230                 235

<210> SEQ ID NO 10
<211> LENGTH: 708
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 10
caggtgcagc tgctggaatc tggcggcgga ctggtgcagc ctggcggcag cctgagactg     60

```
agctgcgccg ccagcggctt caccttcagc agctacacca tgagctgggt ccggcaggct    120
cctggacagg ccctggaatg gatgggcacc atcagcagcg gcggcaccta cacctactac    180
cccgacagcg tgaagggccg gttcaccatc agccgggaca acgccaagaa cagcctgtac    240
ctgcagatga acagcctgag agccgaggac acagccgtgt actactgcgc cagagaggcc    300
atcttcacct actggggcag aggcaccctg gtcacaagca gcggaggcgg aggaagtgga    360 ggggaggat caggcggcgg aggcagcgat atccagctga cccagagccc tagcagcctg    420
agcgccagcg tgggcgacag agtgaccatc acatgcaagg ccagccagga catcaacaac    480
tacctgagct ggtatcagca gaagcccggc caggcccca gactgctgat ctaccgggcc    540
aacagactgg tggacggcgt gcccgataga ttcagcggca gcggctacgg caccgacttc    600
accctgacca tcaacaacat cgagtccgag gacgccgcct actacttctg cctgaagtac    660
gacgtgttcc cctacacctt cggccagggc accaaggtgg agatcaag              708
```

<210> SEQ ID NO 11
<211> LENGTH: 15
<212> TYPE: PRT
<213> ORGANISM: Unknown
<220> FEATURE:
<223> OTHER INFORMATION: Description of Unknown:
      IgG1 sequence

<400> SEQUENCE: 11

Glu Pro Lys Ser Cys Asp Lys Thr His Thr Cys Pro Pro Cys Pro
1               5                   10                  15

<210> SEQ ID NO 12
<211> LENGTH: 45
<212> TYPE: DNA
<213> ORGANISM: Unknown
<220> FEATURE:
<223> OTHER INFORMATION: Description of Unknown:
      IgG1 sequence

<400> SEQUENCE: 12
gagcccaaat cttgtgacaa aactcacaca tgcccaccgt gcccg                  45

<210> SEQ ID NO 13
<211> LENGTH: 27
<212> TYPE: PRT
<213> ORGANISM: Unknown
<220> FEATURE:
<223> OTHER INFORMATION: Description of Unknown:
      CD28 sequence

<400> SEQUENCE: 13

Phe Trp Val Leu Val Val Val Gly Gly Val Leu Ala Cys Tyr Ser Leu
1               5                   10                  15

Leu Val Thr Val Ala Phe Ile Ile Phe Trp Val
            20                  25

<210> SEQ ID NO 14
<211> LENGTH: 81
<212> TYPE: DNA
<213> ORGANISM: Unknown
<220> FEATURE:
<223> OTHER INFORMATION: Description of Unknown:
      CD28 sequence

<400> SEQUENCE: 14
ttttgggtgc tggtggtggt tggtggagtc ctggcttgct atagcttgct agtaacagtg    60

<210> SEQ ID NO 15
<211> LENGTH: 171
<212> TYPE: PRT
<213> ORGANISM: Homo sapiens

<400> SEQUENCE: 15

Ala Ala Gly Gly Pro Gly Ala Gly Ser Ala Ala Pro Val Ser Ser Thr
1               5                   10                  15

Ser Ser Leu Pro Leu Ala Ala Leu Asn Met Arg Val Arg Arg Arg Leu
            20                  25                  30

Ser Leu Phe Leu Asn Val Arg Thr Gln Val Ala Ala Asp Trp Thr Ala
        35                  40                  45

Leu Ala Glu Glu Met Asp Phe Glu Tyr Leu Glu Ile Arg Gln Leu Glu
    50                  55                  60

Thr Gln Ala Asp Pro Thr Gly Arg Leu Leu Asp Ala Trp Gln Gly Arg
65                  70                  75                  80

Pro Gly Ala Ser Val Gly Arg Leu Leu Glu Leu Leu Thr Lys Leu Gly
                85                  90                  95

Arg Asp Asp Val Leu Leu Glu Leu Gly Pro Ser Ile Glu Glu Asp Cys
            100                 105                 110

Gln Lys Tyr Ile Leu Lys Gln Gln Gln Glu Glu Ala Glu Lys Pro Leu
        115                 120                 125

Gln Val Ala Ala Val Asp Ser Ser Val Pro Arg Thr Ala Glu Leu Ala
    130                 135                 140

Gly Ile Thr Thr Leu Asp Asp Pro Leu Gly His Met Pro Glu Arg Phe
145                 150                 155                 160

Asp Ala Phe Ile Cys Tyr Cys Pro Ser Asp Ile
                165                 170

<210> SEQ ID NO 16
<211> LENGTH: 513
<212> TYPE: DNA
<213> ORGANISM: Homo sapiens

<400> SEQUENCE: 16
gctgctggcg gacctggcgc cggatctgct gctcctgtgt ctagcacaag cagcctgcct    60
ctggccgccc tgaacatgag agtgcggaga aggctgagcc tgttcctgaa cgtgcggaca   120
caggtggccg ccgattggac agccctggcc gaggaaatgg acttcgagta cctggaaatc   180
cggcagctgg aaacccaggc cgaccctaca ggcagactgc tggatgcttg cagggcaga   240 ccaggcgctt ctgtgggaag gctgctgaa ctgctgacca gctgggcag ggacgacgtg    300 ctgctggaac tgggccctag catcgaagag gactgccaga agtacatcct gaagcagcag   360
caggaagagg ccgagaagcc tctgcaggtg cagccgtgg atagcagcgt gccaagaaca    420
gccgagctgg ccggcatcac caccctggat gatcctctgg gccacatgcc cgagagattc   480
gacgccttca tctgctactg ccccagcgac atc                                513

<210> SEQ ID NO 17
<211> LENGTH: 62
<212> TYPE: PRT
<213> ORGANISM: Homo sapiens

<400> SEQUENCE: 17

Lys Lys Val Ala Lys Lys Pro Thr Asn Lys Ala Pro His Pro Lys Gln

```
                1               5                   10                  15
            Glu Pro Gln Glu Ile Asn Phe Pro Asp Asp Leu Pro Gly Ser Asn Thr
                            20                  25                  30
            Ala Ala Pro Val Gln Glu Thr Leu His Gly Cys Gln Pro Val Thr Gln
                        35                  40                  45
            Glu Asp Gly Lys Glu Ser Arg Ile Ser Val Gln Glu Arg Gln
                    50                  55                  60

<210> SEQ ID NO 18
<211> LENGTH: 186
<212> TYPE: DNA
<213> ORGANISM: Homo sapiens

<400> SEQUENCE: 18
aagaaggtgg ccaagaagcc caccaacaag gcccccacc  ccaagcagga accccaggaa      60
atcaacttcc ccgacgacct gcccggcagc aatactgctg cacccgtgca ggaaaccctg    120
cacggctgtc agcctgtgac ccaggaagat ggcaaagaaa gccggatctc tgtgcaggaa    180
cgccag                                                                186

<210> SEQ ID NO 19
<211> LENGTH: 112
<212> TYPE: PRT
<213> ORGANISM: Unknown
<220> FEATURE:
<223> OTHER INFORMATION: Description of Unknown:
      CD3-zeta sequence

<400> SEQUENCE: 19

Arg Val Lys Phe Ser Arg Ser Ala Asp Ala Pro Ala Tyr Gln Gln Gly
            1               5                   10                  15
            Gln Asn Gln Leu Tyr Asn Glu Leu Asn Leu Gly Arg Arg Glu Glu Tyr
                            20                  25                  30
            Asp Val Leu Asp Lys Arg Arg Gly Arg Asp Pro Glu Met Gly Gly Lys
                        35                  40                  45
            Pro Arg Arg Lys Asn Pro Gln Glu Gly Leu Tyr Asn Glu Leu Gln Lys
                    50                  55                  60
            Asp Lys Met Ala Glu Ala Tyr Ser Glu Ile Gly Met Lys Gly Glu Arg
            65                  70                  75                  80
            Arg Arg Gly Lys Gly His Asp Gly Leu Tyr Gln Gly Leu Ser Thr Ala
                            85                  90                  95
            Thr Lys Asp Thr Tyr Asp Ala Leu His Met Gln Ala Leu Pro Pro Arg
                        100                 105                 110

<210> SEQ ID NO 20
<211> LENGTH: 336
<212> TYPE: DNA
<213> ORGANISM: Unknown
<220> FEATURE:
<223> OTHER INFORMATION: Description of Unknown:
      CD3-zeta sequence

<400> SEQUENCE: 20
agagtgaagt tcagcaggag cgcagacgcc cccgcgtacc agcagggcca gaaccagctc      60
tataacgagc tcaatctagg acgaagagag gagtacgatg ttttggacaa gagacgtggc    120
cgggaccctg agatgggcgg caagccccaga agaagaaacc cccaggaagg cctgtataac    180
gaactgcaga agacaagat  ggccgaggcc tacagcgaga tcggcatgaa gggcgagcgg    240
agaagaggca agggccacga tggcctgtac cagggactga gcaccgccac caaggacacc    300
```
tacgacgccc tgcacatgca ggccctgcct ccaaga                336

<210> SEQ ID NO 21
<211> LENGTH: 18
<212> TYPE: PRT
<213> ORGANISM: Thoseaasigna virus

<400> SEQUENCE: 21

Glu Gly Arg Gly Ser Leu Leu Thr Cys Gly Asp Val Glu Glu Asn Pro
1               5                   10                  15

Gly Pro

<210> SEQ ID NO 22
<211> LENGTH: 54
<212> TYPE: DNA
<213> ORGANISM: Thoseaasigna virus

<400> SEQUENCE: 22
gagggcagag gcagcctgct gacatgtggc gacgtggaag agaacccagg cccc     54

<210> SEQ ID NO 23
<211> LENGTH: 333
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 23

Met Pro Pro Pro Arg Leu Leu Phe Phe Leu Leu Phe Leu Thr Pro Met
1               5                   10                  15

Glu Val Arg Pro Glu Glu Pro Leu Val Val Lys Val Glu Glu Gly Asp
                20                  25                  30

Asn Ala Val Leu Gln Cys Leu Lys Gly Thr Ser Asp Gly Pro Thr Gln
            35                  40                  45

Gln Leu Thr Trp Ser Arg Glu Ser Pro Leu Lys Pro Phe Leu Lys Leu
        50                  55                  60

Ser Leu Gly Leu Pro Gly Leu Gly Ile His Met Arg Pro Leu Ala Ile
65                  70                  75                  80

Trp Leu Phe Ile Phe Asn Val Ser Gln Gln Met Gly Gly Phe Tyr Leu
                85                  90                  95

Cys Gln Pro Gly Pro Pro Ser Glu Lys Ala Trp Gln Pro Gly Trp Thr
            100                 105                 110

Val Asn Val Glu Gly Ser Gly Glu Leu Phe Arg Trp Asn Val Ser Asp
        115                 120                 125

Leu Gly Gly Leu Gly Cys Gly Leu Lys Asn Arg Ser Ser Glu Gly Pro
130                 135                 140

Ser Ser Pro Ser Gly Lys Leu Met Ser Pro Lys Leu Tyr Val Trp Ala
145                 150                 155                 160

Lys Asp Arg Pro Glu Ile Trp Glu Gly Glu Pro Cys Leu Pro Pro
                165                 170                 175

Arg Asp Ser Leu Asn Gln Ser Leu Ser Gln Asp Leu Thr Met Ala Pro
            180                 185                 190

Gly Ser Thr Leu Trp Leu Ser Cys Gly Val Pro Pro Asp Ser Val Ser
        195                 200                 205

Arg Gly Pro Leu Ser Trp Thr His Val His Pro Lys Gly Pro Lys Ser
210                 215                 220

Leu Leu Ser Leu Glu Leu Lys Asp Asp Arg Pro Ala Arg Asp Met Trp
225                 230                 235                 240

Val Met Glu Thr Gly Leu Leu Leu Pro Arg Ala Thr Ala Gln Asp Ala
            245                 250                 255

Gly Lys Tyr Tyr Cys His Arg Gly Asn Leu Thr Met Ser Phe His Leu
        260                 265                 270

Glu Ile Thr Ala Arg Pro Val Leu Trp His Trp Leu Leu Arg Thr Gly
    275                 280                 285

Gly Trp Lys Val Ser Ala Val Thr Leu Ala Tyr Leu Ile Phe Cys Leu
290                 295                 300

Cys Ser Leu Val Gly Ile Leu His Leu Gln Arg Ala Leu Val Leu Arg
305                 310                 315                 320

Arg Lys Arg Lys Arg Met Thr Asp Pro Thr Arg Arg Phe
            325                 330

<210> SEQ ID NO 24
<211> LENGTH: 999
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 24
atgcctcccc ccagactgct gttcttcctg ctgttcctga cccctatgga agtgcggccc    60
gaggaacccc tggtcgtgaa agtggaagag ggcgacaacg ccgtgctgca gtgtctgaag   120
ggcacctccg atgccctac ccagcagctg acctggtcca gagagagccc cctgaagccc   180
ttcctgaagc tgtctctggg cctgcctggc ctgggcatcc atatgaggcc actggccatc   240
tggctgttca tcttcaacgt gtcccagcag atgggaggct tctacctgtg ccagcctggc   300
ccaccttctg agaaggcttg gcagcctggc tggaccgtga acgtggaagg atctggcgag   360
ctgttccggt ggaacgtgtc cgatctgggc ggcctgggat gcggcctgaa gaacagatct   420
agcgagggcc ccagcagccc cagcggcaaa ctgatgagcc caagctgta cgtgtgggcc   480 aaggacagac ccgagatttg ggagggcgag ccccccttgcc tgcccccctag agatagcctg   540 aaccagagcc tgagccagga cctgacaatg gcccctggca gcacactgtg gctgagctgt   600
ggcgtgccac ccgactctgt gtctagaggc cctctgagct ggacccacgt gcaccctaag   660
ggccctaaga gcctgctgtc cctggaactg aaggacgaca ggcccgccag agatatgtgg   720
gtcatggaaa ccggcctgct gctgcctaga gccacagccc aggatgccgg caagtactac   780
tgccacagag gcaacctgac catgagcttc cacctggaaa tcaccgccag acccgtgctg   840
tggcactggc tgctgagaac cggcggatgg aaagtgtccg ccgtgactct ggcctacctg   900
atcttctgcc tgtgctccct cgtgggcatc ctgcatctgc agagggctct ggtgctgcgg   960
cggaagcgga agagaatgac cgaccctacc cggcggttc                          999

<210> SEQ ID NO 25
<211> LENGTH: 295
<212> TYPE: PRT
<213> ORGANISM: Homo sapiens

<400> SEQUENCE: 25

Ala Ala Gly Gly Pro Gly Ala Gly Ser Ala Ala Pro Val Ser Ser Thr
1               5                   10                  15

Ser Ser Leu Pro Leu Ala Ala Leu Asn Met Arg Val Arg Arg Arg Leu
            20                  25                  30

```
Ser Leu Phe Leu Asn Val Arg Thr Gln Val Ala Ala Asp Trp Thr Ala
        35                  40                  45

Leu Ala Glu Glu Met Asp Phe Glu Tyr Leu Glu Ile Arg Gln Leu Glu
 50                  55                  60

Thr Gln Ala Asp Pro Thr Gly Arg Leu Leu Asp Ala Trp Gln Gly Arg
 65                  70                  75                  80

Pro Gly Ala Ser Val Gly Arg Leu Leu Glu Leu Leu Thr Lys Leu Gly
                 85                  90                  95

Arg Asp Asp Val Leu Leu Glu Leu Gly Pro Ser Ile Glu Glu Asp Cys
                 100                 105                 110

Gln Lys Tyr Ile Leu Lys Gln Gln Glu Glu Ala Glu Lys Pro Leu
        115                 120                 125

Gln Val Ala Ala Val Asp Ser Ser Val Pro Arg Thr Ala Glu Leu Ala
 130                 135                 140

Gly Ile Thr Thr Leu Asp Asp Pro Leu Gly His Met Pro Glu Arg Phe
 145                 150                 155                 160

Asp Ala Phe Ile Cys Tyr Cys Pro Ser Asp Ile Gln Phe Val Gln Glu
                 165                 170                 175

Met Ile Arg Gln Leu Glu Gln Thr Asn Tyr Arg Leu Lys Leu Cys Val
        180                 185                 190

Ser Asp Arg Asp Val Leu Pro Gly Thr Cys Val Trp Ser Ile Ala Ser
        195                 200                 205

Glu Leu Ile Glu Lys Arg Cys Arg Arg Met Val Val Val Val Ser Asp
 210                 215                 220

Asp Tyr Leu Gln Ser Lys Glu Cys Asp Phe Gln Thr Lys Phe Ala Leu
 225                 230                 235                 240

Ser Leu Ser Pro Gly Ala His Gln Lys Arg Leu Ile Pro Ile Lys Tyr
                 245                 250                 255

Lys Ala Met Lys Lys Glu Phe Pro Ser Ile Leu Arg Phe Ile Thr Val
        260                 265                 270

Cys Asp Tyr Thr Asn Pro Cys Thr Lys Ser Trp Phe Trp Thr Arg Leu
        275                 280                 285

Ala Lys Ala Leu Ser Leu Pro
        290                 295

<210> SEQ ID NO 26
<211> LENGTH: 649
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 26

Met Asp Trp Ile Trp Arg Ile Leu Phe Leu Val Gly Ala Ala Thr Gly
 1               5                  10                  15

Ala His Ser Gln Val Gln Leu Leu Glu Ser Gly Gly Gly Leu Val Gln
                 20                  25                  30

Pro Gly Gly Ser Leu Arg Leu Ser Cys Ala Ala Ser Gly Phe Thr Phe
         35                  40                  45

Ser Ser Tyr Thr Met Ser Trp Val Arg Gln Ala Pro Gly Gln Ala Leu
         50                  55                  60

Glu Trp Met Gly Thr Ile Ser Ser Gly Gly Thr Tyr Thr Tyr Tyr Pro
 65                  70                  75                  80

Asp Ser Val Lys Gly Arg Phe Thr Ile Ser Arg Asp Asn Ala Lys Asn
```

```
                      85                  90                  95
Ser Leu Tyr Leu Gln Met Asn Ser Leu Arg Ala Glu Asp Thr Ala Val
                100                 105                 110

Tyr Tyr Cys Ala Arg Glu Ala Ile Phe Thr Tyr Trp Gly Arg Gly Thr
            115                 120                 125

Leu Val Thr Ser Ser Gly Gly Gly Ser Gly Gly Gly Gly Ser Gly
        130                 135                 140

Gly Gly Gly Ser Asp Ile Gln Leu Thr Gln Ser Pro Ser Ser Leu Ser
145                 150                 155                 160

Ala Ser Val Gly Asp Arg Val Thr Ile Thr Cys Lys Ala Ser Gln Asp
                165                 170                 175

Ile Asn Asn Tyr Leu Ser Trp Tyr Gln Gln Lys Pro Gly Gln Ala Pro
                180                 185                 190

Arg Leu Leu Ile Tyr Arg Ala Asn Arg Leu Val Asp Gly Val Pro Asp
                195                 200                 205

Arg Phe Ser Gly Ser Gly Tyr Gly Thr Asp Phe Thr Leu Thr Ile Asn
        210                 215                 220

Asn Ile Glu Ser Glu Asp Ala Ala Tyr Tyr Phe Cys Leu Lys Tyr Asp
225                 230                 235                 240

Val Phe Pro Tyr Thr Phe Gly Gln Gly Thr Lys Val Glu Ile Lys Asp
                245                 250                 255

Leu Glu Pro Lys Ser Cys Asp Lys Thr His Thr Cys Pro Pro Cys Pro
                260                 265                 270

Asp Pro Lys Phe Trp Val Leu Val Val Gly Gly Val Leu Ala Cys
        275                 280                 285

Tyr Ser Leu Leu Val Thr Val Ala Phe Ile Ile Phe Trp Val Ala Ala
        290                 295                 300

Gly Gly Pro Gly Ala Gly Ser Ala Ala Pro Val Ser Thr Ser Ser
305                 310                 315                 320

Leu Pro Leu Ala Ala Leu Asn Met Arg Val Arg Arg Arg Leu Ser Leu
                325                 330                 335

Phe Leu Asn Val Arg Thr Gln Val Ala Ala Asp Trp Thr Ala Leu Ala
                340                 345                 350

Glu Glu Met Asp Phe Glu Tyr Leu Glu Ile Arg Gln Leu Glu Thr Gln
        355                 360                 365

Ala Asp Pro Thr Gly Arg Leu Leu Asp Ala Trp Gln Gly Arg Pro Gly
        370                 375                 380

Ala Ser Val Gly Arg Leu Leu Glu Leu Leu Thr Lys Leu Gly Arg Asp
385                 390                 395                 400

Asp Val Leu Leu Glu Leu Gly Pro Ser Ile Glu Glu Asp Cys Gln Lys
                405                 410                 415

Tyr Ile Leu Lys Gln Gln Gln Glu Glu Ala Glu Lys Pro Leu Gln Val
                420                 425                 430

Ala Ala Val Asp Ser Ser Val Pro Arg Thr Ala Glu Leu Ala Gly Ile
            435                 440                 445

Thr Thr Leu Asp Asp Pro Leu Gly His Met Pro Glu Arg Phe Asp Ala
        450                 455                 460

Phe Ile Cys Tyr Cys Pro Ser Asp Ile Val Lys Lys Val Ala Lys
465                 470                 475                 480

Lys Pro Thr Asn Lys Ala Pro His Pro Lys Gln Glu Pro Gln Glu Ile
                485                 490                 495

Asn Phe Pro Asp Asp Leu Pro Gly Ser Asn Thr Ala Ala Pro Val Gln
                500                 505                 510
```

```
Glu Thr Leu His Gly Cys Gln Pro Val Thr Gln Glu Asp Gly Lys Glu
            515                 520                 525

Ser Arg Ile Ser Val Gln Glu Arg Gln Arg Val Lys Phe Ser Arg Ser
        530                 535                 540

Ala Asp Ala Pro Ala Tyr Gln Gln Gly Gln Asn Gln Leu Tyr Asn Glu
545                 550                 555                 560

Leu Asn Leu Gly Arg Arg Glu Glu Tyr Asp Val Leu Asp Lys Arg Arg
                565                 570                 575

Gly Arg Asp Pro Glu Met Gly Gly Lys Pro Arg Arg Lys Asn Pro Gln
                580                 585                 590

Glu Gly Leu Tyr Asn Glu Leu Gln Lys Asp Lys Met Ala Glu Ala Tyr
            595                 600                 605

Ser Glu Ile Gly Met Lys Gly Glu Arg Arg Arg Gly Lys Gly His Asp
        610                 615                 620

Gly Leu Tyr Gln Gly Leu Ser Thr Ala Thr Lys Asp Thr Tyr Asp Ala
625                 630                 635                 640

Leu His Met Gln Ala Leu Pro Pro Arg
                645

<210> SEQ ID NO 27
<211> LENGTH: 1947
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 27
atggactgga tctggcggat tctgttcctc gtgggagccg ccacaggcgc tcactcacag      60
gtgcagctgc tggaatctgg cggcggactg gtgcagcctg gcggcagcct gagactgagc     120
tgcgccgcca gcggcttcac cttcagcagc taccatga gctgggtccg gcaggctcct       180
ggacaggccc tggaatggat gggcaccatc agcagcggcg gcacctacac ctactacccc     240
gacagcgtga agggccggtt caccatcagc cgggacaacg ccaagaacag cctgtacctg     300
cagatgaaca gcctgagagc cgaggacaca gccgtgtact actgcgccag agaggccatc     360
ttcacctact ggggcagagg caccctggtc acaagcagcg aggcggagg aagtggaggg      420 ggaggatcag gcggcgagg cagcgatatc agctgacccc agagcccctag cagcctgagc     480 gccagcgtgg gcgacagagt gaccatcaca tgcaaggcca gccaggacat caacaactac     540
ctgagctggt atcagcagaa gcccggccag gcccccagac tgctgatcta ccgggccaac     600
agactggtgg acggcgtgcc cgatagattc agcggcagcg gctacggcac cgacttcacc     660
ctgaccatca caacatcga gtccgaggac gccgcctact acttctgcct gaagtacgac     720
gtgttcccct acaccttcgg ccagggcacc aaggtggaga tcaaggatct cgagcccaaa     780
tcttgtgaca aaactcacac atgcccaccg tgcccggatc ccaaattttg ggtgctggtg     840
gtggttggtg gagtcctggc ttgctatagc ttgctagtaa cagtggcctt tattattttc     900
tgggtggctg ctggcggacc tgcgccgga tctgctgctc ctgtgtctag cacaagcagc     960
ctgcctctgg ccgccctgaa catgagagtg cggagaaggc tgagcctgtt cctgaacgtg    1020
cggacacagg tggccgccga ttggacagcc ctggccgagg aaatggactt cgagtacctg    1080
gaaatccggc agctgaaaac ccaggccgac cctacaggca gactgctgga tgcttggcag    1140
ggcagaccag gcgcttctgt gggaaggctg ctggaactgc tgaccaagct gggcagggac    1200
```

-continued

```
gacgtgctgc tggaactggg ccctagcatc gaagaggact gccagaagta catcctgaag    1260
cagcagcagg aagaggccga gaagcctctg caggtggcag ccgtggatag cagcgtgcca    1320
agaacagccg agctggccgg catcaccacc ctggatgatc ctctgggcca catgcccgag    1380
agattcgacg ccttcatctg ctactgcccc agcgacatcg tggaaaagaa ggtggccaag    1440
aagcccacca caaggcccc ccaccccaag caggaaccc aggaaatcaa cttccccgac    1500
gacctgcccg gcagcaatac tgctgcaccc gtgcaggaaa ccctgcacgg ctgtcagcct    1560
gtgacccagg aagatggcaa agaaagccgg atctctgtgc aggaacgcca gagagtgaag    1620
ttcagcagga gcgcagacgc ccccgcgtac cagcagggcc agaaccagct ctataacgag    1680
ctcaatctag gacgaagaga ggagtacgat gttttggaca agagacgtgg ccgggacccct   1740 gagatgggcg gcaagcccag aagaaagaac ccccaggaag gcctgtataa cgaactgcag    1800
aaagacaaga tggccgaggc ctacagcgag atcggcatga agggcgagcg gagaagaggc    1860
aagggccacg atggcctgta ccagggactg agcaccgcca ccaaggacac ctacgacgcc    1920
ctgcacatgc aggccctgcc tccaaga                                        1947
```

<210> SEQ ID NO 28
<211> LENGTH: 172
<212> TYPE: PRT
<213> ORGANISM: Homo sapiens

<400> SEQUENCE: 28

```
Met Ala Ala Gly Gly Pro Gly Ala Gly Ser Ala Ala Pro Val Ser Ser
1               5                   10                  15

Thr Ser Ser Leu Pro Leu Ala Ala Leu Asn Met Arg Val Arg Arg Arg
            20                  25                  30

Leu Ser Leu Phe Leu Asn Val Arg Thr Gln Val Ala Ala Asp Trp Thr
        35                  40                  45

Ala Leu Ala Glu Glu Met Asp Phe Glu Tyr Leu Glu Ile Arg Gln Leu
    50                  55                  60

Glu Thr Gln Ala Asp Pro Thr Gly Arg Leu Leu Asp Ala Trp Gln Gly
65                  70                  75                  80

Arg Pro Gly Ala Ser Val Gly Arg Leu Leu Asp Leu Leu Thr Lys Leu
                85                  90                  95

Gly Arg Asp Asp Val Leu Leu Glu Leu Gly Pro Ser Ile Glu Glu Asp
            100                 105                 110

Cys Gln Lys Tyr Ile Leu Lys Gln Gln Gln Glu Glu Ala Glu Lys Pro
        115                 120                 125

Leu Gln Val Ala Ala Val Asp Ser Ser Val Pro Arg Thr Ala Glu Leu
    130                 135                 140

Ala Gly Ile Thr Thr Leu Asp Asp Pro Leu Gly His Met Pro Glu Arg
145                 150                 155                 160

Phe Asp Ala Phe Ile Cys Tyr Cys Pro Ser Asp Ile
                165                 170
```

<210> SEQ ID NO 29
<211> LENGTH: 516
<212> TYPE: DNA
<213> ORGANISM: Homo sapiens

<400> SEQUENCE: 29

```
atggccgctg ggggcccagg cgccggatca gctgctcccg tatcttctac ttcttctttg      60
ccgctggctg ctctgaacat gcgcgtgaga agacgcctct ccctgttcct taacgttcgc    120
```

```
acacaagtcg ctgccgattg gaccgccctt gccgaagaaa tggactttga atacctggaa      180
attagacaac ttgaaacaca ggccgacccc actggcagac tcctggacgc atggcaggga      240
agacctggtg caagcgttgg acggctcctg gatctcctga caaaactggg acgcgacgac      300
gtactgcttg aactcggacc tagcattgaa gaagactgcc aaaaatatat cctgaaacaa      360
caacaagaag aagccgaaaa acctctccaa gtcgcagcag tggactcatc agtaccccga      420
acagctgagc ttgctgggat tactacactc gacgacccac tcggacatat gcctgaaaga      480
ttcgacgctt tcatttgcta ttgcccctct gacata                                516
```

<210> SEQ ID NO 30
<211> LENGTH: 317
<212> TYPE: PRT
<213> ORGANISM: Homo sapiens

<400> SEQUENCE: 30

```
Met Arg Pro Asp Arg Ala Glu Ala Pro Gly Pro Ala Met Ala Ala
1               5                   10                  15

Gly Gly Pro Gly Ala Gly Ser Ala Ala Pro Val Ser Ser Thr Ser Ser
                20                  25                  30

Leu Pro Leu Ala Ala Leu Asn Met Arg Val Arg Arg Leu Ser Leu
            35                  40                  45

Phe Leu Asn Val Arg Thr Gln Val Ala Ala Asp Trp Thr Ala Leu Ala
50                  55                      60

Glu Met Asp Phe Glu Tyr Leu Glu Ile Arg Gln Leu Glu Thr Gln
65                  70                  75                  80

Ala Asp Pro Thr Gly Arg Leu Leu Asp Ala Trp Gln Gly Arg Pro Gly
                85                  90                  95

Ala Ser Val Gly Arg Leu Leu Glu Leu Thr Lys Leu Gly Arg Asp
                100                 105                 110

Asp Val Leu Leu Glu Leu Gly Pro Ser Ile Glu Glu Asp Cys Gln Lys
                115                 120                 125

Tyr Ile Leu Lys Gln Gln Gln Glu Glu Ala Glu Lys Pro Leu Gln Val
                130                 135                 140

Ala Ala Val Asp Ser Ser Val Pro Arg Thr Ala Glu Leu Ala Gly Ile
145                 150                 155                 160

Thr Thr Leu Asp Asp Pro Leu Gly His Met Pro Glu Arg Phe Asp Ala
                165                 170                 175

Phe Ile Cys Tyr Cys Pro Ser Asp Ile Gln Phe Val Gln Glu Met Ile
                180                 185                 190

Arg Gln Leu Glu Gln Thr Asn Tyr Arg Leu Lys Leu Cys Val Ser Asp
                195                 200                 205

Arg Asp Val Leu Pro Gly Thr Cys Val Trp Ser Ile Ala Ser Glu Leu
                210                 215                 220

Ile Glu Lys Arg Leu Ala Arg Arg Pro Arg Gly Gly Cys Arg Met
225                 230                 235                 240

Val Val Val Val Ser Asp Asp Tyr Leu Gln Ser Lys Glu Cys Asp Phe
                245                 250                 255

Gln Thr Lys Phe Ala Leu Ser Leu Ser Pro Gly Ala His Gln Lys Arg
                260                 265                 270

Leu Ile Pro Ile Lys Tyr Lys Ala Met Lys Lys Glu Phe Pro Ser Ile
                275                 280                 285

Leu Arg Phe Ile Thr Val Cys Asp Tyr Thr Asn Pro Cys Thr Lys Ser
                290                 295                 300
```

```
Trp Phe Trp Thr Arg Leu Ala Lys Ala Leu Ser Leu Pro
305                 310                 315
```

<210> SEQ ID NO 31
<211> LENGTH: 309
<212> TYPE: PRT
<213> ORGANISM: Homo sapiens

<400> SEQUENCE: 31

```
Met Arg Pro Asp Arg Ala Glu Ala Pro Gly Pro Pro Ala Met Ala Ala
1               5                   10                  15

Gly Gly Pro Gly Ala Gly Ser Ala Ala Pro Val Ser Ser Thr Ser Ser
            20                  25                  30

Leu Pro Leu Ala Ala Leu Asn Met Arg Val Arg Arg Arg Leu Ser Leu
        35                  40                  45

Phe Leu Asn Val Arg Thr Gln Val Ala Ala Asp Trp Thr Ala Leu Ala
50                  55                  60

Glu Glu Met Asp Phe Glu Tyr Leu Glu Ile Arg Gln Leu Glu Thr Gln
65                  70                  75                  80

Ala Asp Pro Thr Gly Arg Leu Leu Asp Ala Trp Gln Gly Arg Pro Gly
                85                  90                  95

Ala Ser Val Gly Arg Leu Leu Glu Leu Leu Thr Lys Leu Gly Arg Asp
            100                 105                 110

Asp Val Leu Leu Glu Leu Gly Pro Ser Ile Glu Glu Asp Cys Gln Lys
        115                 120                 125

Tyr Ile Leu Lys Gln Gln Gln Glu Glu Ala Glu Lys Pro Leu Gln Val
130                 135                 140

Ala Ala Val Asp Ser Ser Val Pro Arg Thr Ala Glu Leu Ala Gly Ile
145                 150                 155                 160

Thr Thr Leu Asp Asp Pro Leu Gly His Met Pro Glu Arg Phe Asp Ala
                165                 170                 175

Phe Ile Cys Tyr Cys Pro Ser Asp Ile Gln Phe Val Gln Glu Met Ile
            180                 185                 190

Arg Gln Leu Glu Gln Thr Asn Tyr Arg Leu Lys Leu Cys Val Ser Asp
        195                 200                 205

Arg Asp Val Leu Pro Gly Thr Cys Val Trp Ser Ile Ala Ser Glu Leu
210                 215                 220

Ile Glu Lys Arg Cys Arg Arg Met Val Val Val Val Ser Asp Asp Tyr
225                 230                 235                 240

Leu Gln Ser Lys Glu Cys Asp Phe Gln Thr Lys Phe Ala Leu Ser Leu
                245                 250                 255

Ser Pro Gly Ala His Gln Lys Arg Leu Ile Pro Ile Lys Tyr Lys Ala
            260                 265                 270

Met Lys Lys Glu Phe Pro Ser Ile Leu Arg Phe Ile Thr Val Cys Asp
        275                 280                 285

Tyr Thr Asn Pro Cys Thr Lys Ser Trp Phe Trp Thr Arg Leu Ala Lys
290                 295                 300

Ala Leu Ser Leu Pro
305
```

<210> SEQ ID NO 32
<211> LENGTH: 277
<212> TYPE: PRT
<213> ORGANISM: Homo sapiens

<400> SEQUENCE: 32

```
Met Val Arg Leu Pro Leu Gln Cys Val Leu Trp Gly Cys Leu Leu Thr
1               5                   10                  15

Ala Val His Pro Glu Pro Thr Ala Cys Arg Glu Lys Gln Tyr Leu
            20                  25                  30

Ile Asn Ser Gln Cys Cys Ser Leu Cys Gln Pro Gly Gln Lys Leu Val
            35                  40                  45

Ser Asp Cys Thr Glu Phe Thr Glu Thr Glu Cys Leu Pro Cys Gly Glu
50                      55                  60

Ser Glu Phe Leu Asp Thr Trp Asn Arg Glu Thr His Cys His Gln His
65                  70                  75                  80

Lys Tyr Cys Asp Pro Asn Leu Gly Leu Arg Val Gln Gln Lys Gly Thr
                85                  90                  95

Ser Glu Thr Asp Thr Ile Cys Thr Cys Glu Glu Gly Trp His Cys Thr
            100                 105                 110

Ser Glu Ala Cys Glu Ser Cys Val Leu His Arg Ser Cys Ser Pro Gly
            115                 120                 125

Phe Gly Val Lys Gln Ile Ala Thr Gly Val Ser Asp Thr Ile Cys Glu
            130                 135                 140

Pro Cys Pro Val Gly Phe Phe Ser Asn Val Ser Ser Ala Phe Glu Lys
145                 150                 155                 160

Cys His Pro Trp Thr Ser Cys Glu Thr Lys Asp Leu Val Val Gln Gln
                165                 170                 175

Ala Gly Thr Asn Lys Thr Asp Val Val Cys Gly Pro Gln Asp Arg Leu
            180                 185                 190

Arg Ala Leu Val Val Ile Pro Ile Ile Phe Gly Ile Leu Phe Ala Ile
            195                 200                 205

Leu Leu Val Leu Val Phe Ile Lys Lys Val Ala Lys Lys Pro Thr Asn
            210                 215                 220

Lys Ala Pro His Pro Lys Gln Glu Pro Gln Glu Ile Asn Phe Pro Asp
225                 230                 235                 240

Asp Leu Pro Gly Ser Asn Thr Ala Ala Pro Val Gln Glu Thr Leu His
                245                 250                 255

Gly Cys Gln Pro Val Thr Gln Glu Asp Gly Lys Glu Ser Arg Ile Ser
            260                 265                 270

Val Gln Glu Arg Gln
            275

<210> SEQ ID NO 33
<211> LENGTH: 296
<212> TYPE: PRT
<213> ORGANISM: Homo sapiens

<400> SEQUENCE: 33

Met Ala Ala Gly Gly Pro Gly Ala Gly Ser Ala Ala Pro Val Ser Ser
1               5                   10                  15

Thr Ser Ser Leu Pro Leu Ala Ala Leu Asn Met Arg Val Arg Arg Arg
            20                  25                  30

Leu Ser Leu Phe Leu Asn Val Arg Thr Gln Val Ala Ala Asp Trp Thr
            35                  40                  45

Ala Leu Ala Glu Glu Met Asp Phe Glu Tyr Leu Glu Ile Arg Gln Leu
50                  55                  60

Glu Thr Gln Ala Asp Pro Thr Gly Arg Leu Leu Asp Ala Trp Gln Gly
65                  70                  75                  80

Arg Pro Gly Ala Ser Val Gly Arg Leu Leu Glu Leu Leu Thr Lys Leu
            85                  90                  95
```

Gly Arg Asp Asp Val Leu Leu Glu Leu Gly Pro Ser Ile Glu Glu Asp
            100                 105                 110

Cys Gln Lys Tyr Ile Leu Lys Gln Gln Glu Ala Glu Lys Pro
            115                 120                 125

Leu Gln Val Ala Ala Val Asp Ser Ser Val Pro Arg Thr Ala Glu Leu
    130                 135                 140

Ala Gly Ile Thr Thr Leu Asp Asp Pro Leu Gly His Met Pro Glu Arg
145                 150                 155                 160

Phe Asp Ala Phe Ile Cys Tyr Cys Pro Ser Asp Ile Gln Phe Val Gln
                165                 170                 175

Glu Met Ile Arg Gln Leu Glu Gln Thr Asn Tyr Arg Leu Lys Leu Cys
            180                 185                 190

Val Ser Asp Arg Asp Val Leu Pro Gly Thr Cys Val Trp Ser Ile Ala
        195                 200                 205

Ser Glu Leu Ile Glu Lys Arg Cys Arg Arg Met Val Val Val Val Ser
    210                 215                 220

Asp Asp Tyr Leu Gln Ser Lys Glu Cys Asp Phe Gln Thr Lys Phe Ala
225                 230                 235                 240

Leu Ser Leu Ser Pro Gly Ala His Gln Lys Arg Leu Ile Pro Ile Lys
                245                 250                 255

Tyr Lys Ala Met Lys Lys Glu Phe Pro Ser Ile Leu Arg Phe Ile Thr
            260                 265                 270

Val Cys Asp Tyr Thr Asn Pro Cys Thr Lys Ser Trp Phe Trp Thr Arg
        275                 280                 285

Leu Ala Lys Ala Leu Ser Leu Pro
    290                 295

<210> SEQ ID NO 34
<211> LENGTH: 951
<212> TYPE: DNA
<213> ORGANISM: Homo sapiens

<400> SEQUENCE: 34
aagaggaagc gctggcagac aatgcgaccc gaccgcgctg aggctccagg accgcccgcc      60
atggctgcag gaggtcccgg cgcggggtct gcggccccgg tctcctccac atcctccctt    120
cccctggctg ctctcaacat gcgagtgcgg cgccgcctgt ctctgttctt gaacgtgcgg    180
acacaggtgg cggccgactg gaccgcgctg gcggaggaga tggactttga gtacttggag    240
atccggcaac tggagacaca gcggaccccc actggcaggc tgctggacgc ctggcaggga    300
cgccctggcg cctctgtagg ccgactgctc gagctgctta ccaagctggg ccgcgacgac    360
gtgctgctgg agctgggacc cagcattgag gaggattgcc aaaagtatat cttgaagcag    420
cagcaggagg aggctgagaa gcctttacag gtggccgctg tagacagcag tgtcccacgg    480
acagcagagc tggcgggcat caccacactt gatgaccccc tggggcatat gcctgagcgt    540
ttcgatgcct tcatctgcta ttgccccagc gacatccagt ttgtgcagga gatgatccgg    600
caactggaac agacaaacta tcgactgaag ttgtgtgtgt ctgaccgcga tgtcctgcct    660
ggcacctgtg tctggtctat tgctagtgag ctcatcgaaa agaggtgccg ccggatggtg    720
gtggttgtct ctgatgatta cctgcagagc aaggaatgtg acttccagac caaatttgca    780
ctcagcctct ctccaggtgc ccatcagaag cgactgatcc ccatcaagta caaggcaatg    840
aagaaagagt tccccagcat cctgaggttc atcactgtct gcgactacac caaccccctgc   900 accaaatctt ggttctggac tcgccttgcc aaggccttgt ccctgccctg a             951

```
<210> SEQ ID NO 35
<211> LENGTH: 12
<212> TYPE: PRT
<213> ORGANISM: Unknown
<220> FEATURE:
<223> OTHER INFORMATION: Description of Unknown:
      IgG2 sequence

<400> SEQUENCE: 35

Glu Arg Lys Cys Cys Val Glu Cys Pro Pro Cys Pro
1               5                   10

<210> SEQ ID NO 36
<211> LENGTH: 62
<212> TYPE: PRT
<213> ORGANISM: Unknown
<220> FEATURE:
<223> OTHER INFORMATION: Description of Unknown:
      IgG3 sequence

<400> SEQUENCE: 36

Glu Leu Lys Thr Pro Leu Gly Asp Thr Thr His Thr Cys Pro Arg Cys
1               5                   10                  15

Pro Glu Pro Lys Ser Cys Asp Thr Pro Pro Pro Cys Pro Arg Cys Pro
            20                  25                  30

Glu Pro Lys Ser Cys Asp Thr Pro Pro Pro Cys Pro Arg Cys Pro Glu
        35                  40                  45

Pro Lys Ser Cys Asp Thr Pro Pro Pro Cys Pro Arg Cys Pro
    50                  55                  60

<210> SEQ ID NO 37
<211> LENGTH: 12
<212> TYPE: PRT
<213> ORGANISM: Unknown
<220> FEATURE:
<223> OTHER INFORMATION: Description of Unknown:
      IgG4 sequence

<400> SEQUENCE: 37

Glu Ser Lys Tyr Gly Pro Pro Cys Pro Ser Cys Pro
1               5                   10

<210> SEQ ID NO 38
<211> LENGTH: 21
<212> TYPE: PRT
<213> ORGANISM: Thoseaasigna virus

<400> SEQUENCE: 38

Gly Ser Gly Glu Gly Arg Gly Ser Leu Leu Thr Cys Gly Asp Val Glu
1               5                   10                  15

Glu Asn Pro Gly Pro
            20

<210> SEQ ID NO 39
<211> LENGTH: 63
<212> TYPE: PRT
<213> ORGANISM: Foot and mouth disease virus

<400> SEQUENCE: 39

Gly Ser Gly Ser Arg Val Thr Glu Leu Leu Tyr Arg Met Lys Arg Ala
1               5                   10                  15

Glu Thr Tyr Cys Pro Arg Pro Leu Leu Ala Ile His Pro Thr Glu Ala
            20                  25                  30
```

Arg His Lys Gln Lys Ile Val Ala Pro Val Lys Gln Leu Leu Asn Phe
        35                  40                  45

Asp Leu Leu Lys Leu Ala Gly Asp Val Glu Ser Asn Pro Gly Pro
    50                  55                  60

<210> SEQ ID NO 40
<211> LENGTH: 19
<212> TYPE: PRT
<213> ORGANISM: Amphimedon queenslandica

<400> SEQUENCE: 40

Leu Leu Cys Phe Leu Leu Leu Leu Ser Gly Asp Val Glu Leu Asn
1               5                   10                  15

Pro Gly Pro

<210> SEQ ID NO 41
<211> LENGTH: 20
<212> TYPE: PRT
<213> ORGANISM: Amphimedon queenslandica

<400> SEQUENCE: 41

His His Phe Met Phe Leu Leu Leu Leu Ala Gly Asp Ile Glu Leu
1               5                   10                  15

Asn Pro Gly Pro
            20

<210> SEQ ID NO 42
<211> LENGTH: 20
<212> TYPE: PRT
<213> ORGANISM: Saccoglossus kowalevskii

<400> SEQUENCE: 42

Trp Phe Leu Val Leu Leu Ser Phe Ile Leu Ser Gly Asp Ile Glu Val
1               5                   10                  15

Asn Pro Gly Pro
            20

<210> SEQ ID NO 43
<211> LENGTH: 20
<212> TYPE: PRT
<213> ORGANISM: Branchiostoma floridae

<400> SEQUENCE: 43

Lys Asn Cys Ala Met Tyr Met Leu Leu Leu Ser Gly Asp Val Glu Thr
1               5                   10                  15

Asn Pro Gly Pro
            20

<210> SEQ ID NO 44
<211> LENGTH: 20
<212> TYPE: PRT
<213> ORGANISM: Branchiostoma floridae

<400> SEQUENCE: 44

Met Val Ile Ser Gln Leu Met Leu Lys Leu Ala Gly Asp Val Glu Glu
1               5                   10                  15

Asn Pro Gly Pro
            20

<210> SEQ ID NO 45
<211> LENGTH: 22

```
<212> TYPE: PRT
<213> ORGANISM: Porcine teschovirus-1

<400> SEQUENCE: 45

Gly Ser Gly Ala Thr Asn Phe Ser Leu Leu Lys Gln Ala Gly Asp Val
1               5                   10                  15

Glu Glu Asn Pro Gly Pro
            20

<210> SEQ ID NO 46
<211> LENGTH: 23
<212> TYPE: PRT
<213> ORGANISM: Equine rhinitis A virus

<400> SEQUENCE: 46

Gly Ser Gly Gln Cys Thr Asn Tyr Ala Leu Leu Lys Leu Ala Gly Asp
1               5                   10                  15

Val Glu Ser Asn Pro Gly Pro
            20

<210> SEQ ID NO 47
<211> LENGTH: 8
<212> TYPE: PRT
<213> ORGANISM: Artificial Sequence
<220> FEATURE:
<223> OTHER INFORMATION: Description of Artificial Sequence: Synthetic
      2A consensus sequence
<220> FEATURE:
<221> NAME/KEY: MOD_RES
<222> LOCATION: (2)..(2)
<223> OTHER INFORMATION: Any amino acid
<220> FEATURE:
<221> NAME/KEY: MOD_RES
<222> LOCATION: (4)..(4)
<223> OTHER INFORMATION: Any amino acid

<400> SEQUENCE: 47

Asp Xaa Glu Xaa Asn Pro Gly Pro
1               5

<210> SEQ ID NO 48
<211> LENGTH: 30
<212> TYPE: PRT
<213> ORGANISM: Unknown
<220> FEATURE:
<223> OTHER INFORMATION: Description of Unknown:
      CD8-alpha transmembrane domain sequence

<400> SEQUENCE: 48

Cys Asp Ile Tyr Ile Trp Ala Pro Leu Ala Gly Thr Cys Gly Val Leu
1               5                   10                  15

Leu Leu Ser Leu Val Ile Thr Leu Tyr Cys Asn His Arg Asn
            20                  25                  30

<210> SEQ ID NO 49
<211> LENGTH: 90
<212> TYPE: DNA
<213> ORGANISM: Unknown
<220> FEATURE:
<223> OTHER INFORMATION: Description of Unknown:
      CD8-alpha transmembrane domain sequence

<400> SEQUENCE: 49
tgcgacatct acatctgggc ccctctggcc ggcacatgtg gcgtgctgct gctgagcctc    60
gtgatcaccc tgtactgcaa ccaccggaac                                    90
```

```
<210> SEQ ID NO 50
<211> LENGTH: 630
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 50
```

| | | | | | | | | | | | | | | |
|---|---|---|---|---|---|---|---|---|---|---|---|---|---|---|
| Gln | Val | Gln | Leu | Leu | Glu | Ser | Gly | Gly | Gly | Leu | Val | Gln | Pro | Gly |
| 1 | | | | 5 | | | | | 10 | | | | | 15 |
| Gly | Ser | Leu | Arg | Leu | Ser | Cys | Ala | Ala | Ser | Gly | Phe | Thr | Phe | Ser |
| | | | 20 | | | | | 25 | | | | | 30 | |
| Ser | Tyr | Thr | Met | Ser | Trp | Val | Arg | Gln | Ala | Pro | Gly | Gln | Ala | Leu |
| | | | 35 | | | | | 40 | | | | | 45 | |
| Glu | Trp | Met | Gly | Thr | Ile | Ser | Ser | Gly | Gly | Thr | Tyr | Thr | Tyr | Tyr |
| 50 | | | | | 55 | | | | | 60 | | | | |
| Pro | Asp | Ser | Val | Lys | Gly | Arg | Phe | Thr | Ile | Ser | Arg | Asp | Asn | Ala |
| 65 | | | | 70 | | | | | 75 | | | | | 80 |
| Lys | Asn | Ser | Leu | Tyr | Leu | Gln | Met | Asn | Ser | Leu | Arg | Ala | Glu | Asp |
| | | | | 85 | | | | | 90 | | | | | 95 |
| Thr | Ala | Val | Tyr | Tyr | Cys | Ala | Arg | Glu | Ala | Ile | Phe | Thr | Tyr | Trp |
| | | | 100 | | | | | 105 | | | | | 110 | |
| Gly | Arg | Gly | Thr | Leu | Val | Thr | Ser | Ser | Gly | Gly | Gly | Gly | Ser | Gly |
| | | 115 | | | | | 120 | | | | | 125 | | |
| Gly | Gly | Gly | Ser | Asp | Ile | Gln | Leu | Thr | Gln | Ser | Pro | Ser | Ser | Leu |
| 130 | | | | | 135 | | | | | 140 | | | | |
| Ser | Ala | Ser | Val | Gly | Asp | Arg | Val | Thr | Ile | Thr | Cys | Lys | Ala | Ser |
| 145 | | | | 150 | | | | | 155 | | | | | 160 |
| Gln | Asp | Ile | Asn | Asn | Tyr | Leu | Ser | Trp | Tyr | Gln | Gln | Lys | Pro | Gly |
| | | | | 165 | | | | | 170 | | | | | 175 |
| Gln | Ala | Pro | Arg | Leu | Leu | Ile | Tyr | Arg | Ala | Asn | Arg | Leu | Val | Asp |
| | | | 180 | | | | | 185 | | | | | 190 | |
| Gly | Val | Pro | Asp | Arg | Phe | Ser | Gly | Ser | Gly | Tyr | Gly | Thr | Asp | Phe |
| | | 195 | | | | | 200 | | | | | 205 | | |
| Thr | Leu | Thr | Ile | Asn | Asn | Ile | Glu | Ser | Glu | Asp | Ala | Ala | Tyr | Tyr |
| 210 | | | | | 215 | | | | | 220 | | | | |
| Phe | Cys | Leu | Lys | Tyr | Asp | Val | Phe | Pro | Tyr | Thr | Phe | Gly | Gln | Gly |
| 225 | | | | 230 | | | | | 235 | | | | | 240 |
| Thr | Lys | Val | Glu | Ile | Lys | Asp | Leu | Glu | Pro | Lys | Ser | Cys | Asp | Lys |
| | | | | 245 | | | | | 250 | | | | | 255 |
| Thr | His | Thr | Cys | Pro | Pro | Cys | Pro | Asp | Pro | Lys | Phe | Trp | Val | Leu |
| | | | 260 | | | | | 265 | | | | | 270 | |
| Val | Val | Val | Gly | Gly | Val | Leu | Ala | Cys | Tyr | Ser | Leu | Leu | Val | Thr |
| | | 275 | | | | | 280 | | | | | 285 | | |
| Val | Ala | Phe | Ile | Ile | Phe | Trp | Val | Ala | Gly | Gly | Pro | Gly | Ala | Gly |
| 290 | | | | | 295 | | | | | 300 | | | | |
| Ser | Ala | Ala | Pro | Val | Ser | Ser | Thr | Ser | Ser | Leu | Pro | Leu | Ala | Ala |
| 305 | | | | 310 | | | | | 315 | | | | | 320 |
| Leu | Asn | Met | Arg | Val | Arg | Arg | Arg | Leu | Ser | Leu | Phe | Leu | Asn | Val |
| | | | | 325 | | | | | 330 | | | | | 335 |
| Arg | Thr | Gln | Val | Ala | Ala | Asp | Trp | Thr | Ala | Leu | Ala | Glu | Glu | Met |
| | | | 340 | | | | | 345 | | | | | 350 | |
| Asp | Phe | Glu | Tyr | Leu | Glu | Ile | Arg | Gln | Leu | Glu | Thr | Gln | Ala | Asp |
| | | 355 | | | | | 360 | | | | | 365 | | |
| Pro | Thr | Gly | Arg | Leu | Leu | Asp | Ala | Trp | Gln | Gly | Arg | Pro | Gly | Ala |

Gly Arg Leu Leu Glu Leu Leu Thr Lys Leu Gly Arg Asp Asp Val Leu
    370                 375                 380

Leu Glu Leu Gly Pro Ser Ile Glu Glu Asp Cys Gln Lys Tyr Ile Leu
385                 390                 395                 400

Lys Gln Gln Gln Glu Glu Ala Glu Lys Pro Leu Gln Val Ala Ala Val
                405                 410                 415

Asp Ser Ser Val Pro Arg Thr Ala Glu Leu Ala Gly Ile Thr Thr Leu
            420                 425                 430

Asp Asp Pro Leu Gly His Met Pro Glu Arg Phe Asp Ala Phe Ile Cys
        435                 440                 445

Tyr Cys Pro Ser Asp Ile Val Glu Lys Val Ala Lys Lys Pro Thr
    450                 455                 460

Asn Lys Ala Pro His Pro Lys Gln Glu Pro Gln Glu Ile Asn Phe Pro
465                 470                 475                 480

Asp Asp Leu Pro Gly Ser Asn Thr Ala Ala Pro Val Gln Glu Thr Leu
            485                 490                 495

His Gly Cys Gln Pro Val Thr Gln Glu Asp Gly Lys Glu Ser Arg Ile
        500                 505                 510

Ser Val Gln Glu Arg Gln Arg Val Lys Phe Ser Arg Ser Ala Asp Ala
    515                 520                 525

Pro Ala Tyr Gln Gln Gly Gln Asn Gln Leu Tyr Asn Glu Leu Asn Leu
    530                 535                 540

Gly Arg Arg Glu Glu Tyr Asp Val Leu Asp Lys Arg Arg Gly Arg Asp
545                 550                 555                 560

Pro Glu Met Gly Gly Lys Pro Arg Arg Lys Asn Pro Gln Glu Gly Leu
                565                 570                 575

Tyr Asn Glu Leu Gln Lys Asp Lys Met Ala Glu Ala Tyr Ser Glu Ile
            580                 585                 590

Gly Met Lys Gly Glu Arg Arg Arg Gly Lys Gly His Asp Gly Leu Tyr
        595                 600                 605

Gln Gly Leu Ser Thr Ala Thr Lys Asp Thr Tyr Asp Ala Leu His Met
    610                 615                 620

Gln Ala Leu Pro Pro Arg
625                 630

<210> SEQ ID NO 51
<211> LENGTH: 1890
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 51
caggtgcagc tgctggaatc tggcggcgga ctggtgcagc ctggcggcag cctgagactg      60
agctgcgccg ccagcggctt caccttcagc agctacacca tgagctgggt ccggcaggct     120
cctggacagg ccctggaatg gatgggcacc atcagcagcg gcggcaccta cacctactac     180
cccgacagcg tgaagggccg gttcaccatc agccgggaca cgccaagaa cagcctgtac     240 ctgcagatga acagcctgag agccgaggac acagccgtgt actactgcgc cagagaggcc     300
atcttcacct actggggcag aggcaccctg gtcacaagca gcggaggcgg aggaagtgga     360
gggggaggat caggcggcgg aggcagcgat atccagctga cccagagccc tagcagcctg     420
agcgccagcg tgggcgacag agtgaccatc acatgcaagg ccagccagga catcaacaac     480

| | |
|---|---|
| tacctgagct ggtatcagca gaagcccggc caggcccca gactgctgat ctaccgggcc | 540 |
| aacagactgg tggacggcgt gcccgataga ttcagcggca gcggctacgg caccgacttc | 600 |
| accctgacca tcaacaacat cgagtccgag gacgccgcct actacttctg cctgaagtac | 660 |
| gacgtgttcc cctacacctt cggccagggc accaaggtgg agatcaagga tctcgagccc | 720 |
| aaatcttgtg acaaaactca cacatgccca ccgtgcccgg atcccaaatt ttgggtgctg | 780 |
| gtggtggttg gtggagtcct ggcttgctat agcttgctag taacagtggc ctttattatt | 840 |
| ttctgggtgg ctgctggcgg acctggcgcc ggatctgctg ctcctgtgtc tagcacaagc | 900 |
| agcctgcctc tggccgccct gaacatgaga gtgcggagaa ggctgagcct gttcctgaac | 960 |
| gtgcggacac aggtggccgc cgattggaca gccctggccg aggaaatgga cttcgagtac | 1020 |
| ctggaaatcc ggcagctgga aacccaggcc gaccctacag gcagactgct ggatgcttgg | 1080 |
| cagggcagac aggcgcttc tgtgggaagg ctgctggaac tgctgaccaa gctgggcagg | 1140 |
| gacgacgtgc tgctggaact gggccctagc atcgaagagg actgccagaa gtacatcctg | 1200 |
| aagcagcagc aggaagaggc cgagaagcct ctgcaggtgg cagccgtgga tagcagcgtg | 1260 |
| ccaagaacag ccgagctggc cggcatcacc accctggatg atcctctggg ccacatgccc | 1320 |
| gagagattcg acgccttcat ctgctactgc cccagcgaca tcgtgaaaaa gaaggtggcc | 1380 |
| aagaagccca ccaacaaggc ccccacccc aagcaggaac cccaggaaat caacttcccc | 1440 |
| gacgacctgc ccggcagcaa tactgctgca cccgtgcagg aaaccctgca cggctgtcag | 1500 |
| cctgtgaccc aggaagatgg caaagaaagc cggatctctg tgcaggaacg ccagagagtg | 1560 |
| aagttcagca ggagcgcaga cgcccccgcg taccagcagg gccagaacca gctctataac | 1620 |
| gagctcaatc taggacgaag agaggagtac gatgttttgg acaagagacg tggccgggac | 1680 |
| cctgagatgg gcgcaagcc agaagaaag aacccccagg aaggcctgta taacgaactg | 1740 |
| cagaaagaca agatggccga ggcctacagc gagatcggca tgaagggcga gcggagaaga | 1800 |
| ggcaagggcc acgatggcct gtaccaggga ctgagcaccg ccaccaagga cacctacgac | 1860 |
| gccctgcaca tgcaggccct gcctccaaga | 1890 |

<210> SEQ ID NO 52
<211> LENGTH: 650
<212> TYPE: PRT
<213> ORGANISM: Artificial Sequence
<220> FEATURE:
<223> OTHER INFORMATION: Description of Artificial Sequence: Synthetic
    polypeptide

<400> SEQUENCE: 52

Met Asp Trp Ile Trp Arg Ile Leu Phe Leu Val Gly Ala Ala Thr Gly
1               5                   10                  15

Ala His Ser Gln Val Gln Leu Leu Glu Ser Gly Gly Gly Leu Val Gln
            20                  25                  30

Pro Gly Gly Ser Leu Arg Leu Ser Cys Ala Ala Ser Gly Phe Thr Phe
        35                  40                  45

Ser Ser Tyr Thr Met Ser Trp Val Arg Gln Ala Pro Gly Gln Ala Leu
    50                  55                  60

Glu Trp Met Gly Thr Ile Ser Ser Gly Gly Thr Tyr Thr Tyr Tyr Pro
65                  70                  75                  80

Asp Ser Val Lys Gly Arg Phe Thr Ile Ser Arg Asp Asn Ala Lys Asn
                85                  90                  95

Ser Leu Tyr Leu Gln Met Asn Ser Leu Arg Ala Glu Asp Thr Ala Val
            100                 105                 110

```
Tyr Tyr Cys Ala Arg Glu Ala Ile Phe Thr Tyr Trp Gly Arg Gly Thr
            115                 120                 125

Leu Val Thr Ser Ser Gly Gly Gly Ser Gly Gly Gly Ser Gly
        130                 135                 140

Gly Gly Gly Ser Asp Ile Gln Leu Thr Gln Ser Pro Ser Ser Leu Ser
145                 150                 155                 160

Ala Ser Val Gly Asp Arg Val Thr Ile Thr Cys Lys Ala Ser Gln Asp
                165                 170                 175

Ile Asn Asn Tyr Leu Ser Trp Tyr Gln Gln Lys Pro Gly Gln Ala Pro
            180                 185                 190

Arg Leu Leu Ile Tyr Arg Ala Asn Arg Leu Val Asp Gly Val Pro Asp
        195                 200                 205

Arg Phe Ser Gly Ser Gly Tyr Gly Thr Asp Phe Thr Leu Thr Ile Asn
    210                 215                 220

Asn Ile Glu Ser Glu Asp Ala Ala Tyr Tyr Phe Cys Leu Lys Tyr Asp
225                 230                 235                 240

Val Phe Pro Tyr Thr Phe Gly Gln Gly Thr Lys Val Glu Ile Lys Asp
                245                 250                 255

Leu Glu Pro Lys Ser Cys Asp Lys Thr His Thr Cys Pro Pro Cys Pro
            260                 265                 270

Asp Pro Lys Phe Trp Val Leu Val Val Gly Gly Val Leu Ala Cys
        275                 280                 285

Tyr Ser Leu Leu Val Thr Val Ala Phe Ile Ile Phe Trp Val Met Ala
    290                 295                 300

Ala Gly Gly Pro Gly Ala Gly Ser Ala Ala Pro Val Ser Ser Thr Ser
305                 310                 315                 320

Ser Leu Pro Leu Ala Ala Leu Asn Met Arg Val Arg Arg Arg Leu Ser
                325                 330                 335

Leu Phe Leu Asn Val Arg Thr Gln Val Ala Ala Asp Trp Thr Ala Leu
            340                 345                 350

Ala Glu Glu Met Asp Phe Glu Tyr Leu Glu Ile Arg Gln Leu Glu Thr
        355                 360                 365

Gln Ala Asp Pro Thr Gly Arg Leu Leu Asp Ala Trp Gln Gly Arg Pro
    370                 375                 380

Gly Ala Ser Val Gly Arg Leu Leu Asp Leu Leu Thr Lys Leu Gly Arg
385                 390                 395                 400

Asp Asp Val Leu Leu Glu Leu Gly Pro Ser Ile Glu Glu Asp Cys Gln
                405                 410                 415

Lys Tyr Ile Leu Lys Gln Gln Gln Glu Ala Glu Lys Pro Leu Gln
            420                 425                 430

Val Ala Ala Val Asp Ser Ser Val Pro Arg Thr Ala Glu Leu Ala Gly
        435                 440                 445

Ile Thr Thr Leu Asp Asp Pro Leu Gly His Met Pro Glu Arg Phe Asp
    450                 455                 460

Ala Phe Ile Cys Tyr Cys Pro Ser Asp Ile Glu Lys Lys Val Ala
465                 470                 475                 480

Lys Lys Pro Thr Asn Lys Ala Pro His Pro Lys Gln Glu Pro Gln Glu
                485                 490                 495

Ile Asn Phe Pro Asp Asp Leu Pro Gly Ser Asn Thr Ala Ala Pro Val
            500                 505                 510

Gln Glu Thr Leu His Gly Cys Gln Pro Val Thr Gln Glu Asp Gly Lys
        515                 520                 525
```

```
Glu Ser Arg Ile Ser Val Gln Glu Arg Gln Arg Val Lys Phe Ser Arg
        530                 535                 540

Ser Ala Asp Ala Pro Ala Tyr Gln Gln Gly Gln Asn Gln Leu Tyr Asn
545                 550                 555                 560

Glu Leu Asn Leu Gly Arg Arg Glu Glu Tyr Asp Val Leu Asp Lys Arg
                565                 570                 575

Arg Gly Arg Asp Pro Glu Met Gly Gly Lys Pro Arg Arg Lys Asn Pro
            580                 585                 590

Gln Glu Gly Leu Tyr Asn Glu Leu Gln Lys Asp Lys Met Ala Glu Ala
        595                 600                 605

Tyr Ser Glu Ile Gly Met Lys Gly Glu Arg Arg Arg Gly Lys Gly His
    610                 615                 620

Asp Gly Leu Tyr Gln Gly Leu Ser Thr Ala Thr Lys Asp Thr Tyr Asp
625                 630                 635                 640

Ala Leu His Met Gln Ala Leu Pro Pro Arg
            645                 650
```

<210> SEQ ID NO 53
<211> LENGTH: 1950
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 53

| | |
|---|---|
| atggactgga tctggcggat tctgttcctc gtgggagccg ccacaggcgc tcactcacag | 60 |
| gtgcagctgc tggaatctgg cggcggactg gtgcagcctg gcggcagcct gagactgagc | 120 |
| tgcgccgcca gcggcttcac cttcagcagc tacaccatga gctgggtccg gcaggctcct | 180 |
| ggacaggccc tggaatggat gggcaccatc agcagcggcg gcacctacac ctactacccc | 240 |
| gacagcgtga agggccggtt caccatcagc cgggacaacg ccaagaacag cctgtacctg | 300 |
| cagatgaaca gcctgagagc cgaggacaca gccgtgtact actgcgccag agaggccatc | 360 |
| ttcacctact ggggcagagg caccctggtc acaagcagcg aggcggagga agtggaggg | 420 |
| ggaggatcag gcgcggagg cagcgatatc cagctgaccc agagccctag cagcctgagc | 480 |
| gccagcgtgg gcgacagagt gaccatcaca tgcaaggcca gcaggacat caacaactac | 540 |
| ctgagctggt atcagcagaa gcccggccag gcccccagac tgctgatcta ccgggccaac | 600 |
| agactggtgg acggcgtgcc cgatagattc agcggcagcg gctacggcac cgacttcacc | 660 |
| ctgaccatca caacatcga gtccgaggac gccgcctact acttctgcct gaagtacgac | 720 |
| gtgttcccct acaccttcgg ccagggcacc aaggtggaga tcaaggatct cgagcccaaa | 780 |
| tcttgtgaca aaactcacac atgcccaccg tgcccggatc ccaaattttg ggtgctggtg | 840 |
| gtggttggtg gagtcctggc ttgctatagc ttgctagtaa cagtggcctt tattattttc | 900 |
| tgggtgatgg ccgctggggg cccaggcgcc ggatcagctg ctcccgtatc ttctacttct | 960 |
| tctttgccgc tggctgctct gaacatgcgc gtgagaagac gcctctccct gttccttaac | 1020 |
| gttcgcacac aagtcgctgc cgattggacc gcccttgccg aagaaatgga ctttgaatac | 1080 |
| ctggaaatta gacaacttga aacacaggcc gaccccactg cagactcct ggacgcatgg | 1140 |
| cagggaagac tggtgcaag cgttggacgg ctcctggatc tcctgacaaa actgggacgc | 1200 |
| gacgacgtac tgcttgaact cggacctagc attgaagaag actgccaaaa atatatcctg | 1260 |
| aaacaacaac aagaagaagc cgaaaaacct ctccaagtcg cagcagtgga ctcatcagta | 1320 |

```
ccccgaacag ctgagcttgc tgggattact acactcgacg acccactcgg acatatgcct   1380
gaaagattcg acgctttcat ttgctattgc ccctctgaca tagtggaaaa gaaggtggcc   1440
aagaagccca ccaacaaggc ccccaccccc aagcaggaac cccaggaaat caacttcccc   1500
gacgacctgc ccggcagcaa tactgctgca cccgtgcagg aaaccctgca cggctgtcag   1560
cctgtgaccc aggaagatgg caaagaaagc cggatctctg tgcaggaacg ccagagagtg   1620
aagttcagca ggagcgcaga cgcccccgcg taccagcagg ccagaaccca gctctataac   1680
gagctcaatc taggacgaag agaggagtac gatgttttgg acaagagacg tggccgggac   1740
cctgagatgg gcggcaagcc cagaagaaag aaccccagg aaggcctgta taacgaactg    1800
cagaaagaca agatggccga ggcctacagc gagatcggca tgaagggcga gcggagaaga   1860
ggcaagggcc acgatggcct gtaccaggga ctgagcaccg ccaccaagga cacctacgac   1920
gccctgcaca tgcaggccct gcctccaaga                                    1950
```

<210> SEQ ID NO 54
<211> LENGTH: 649
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 54

```
Met Asp Trp Ile Trp Arg Ile Leu Phe Leu Val Gly Ala Ala Thr Gly
1               5                   10                  15

Ala His Ser Gln Val Gln Leu Leu Glu Ser Gly Gly Gly Leu Val Gln
            20                  25                  30

Pro Gly Gly Ser Leu Arg Leu Ser Cys Ala Ala Ser Gly Phe Thr Phe
        35                  40                  45

Ser Ser Tyr Thr Met Ser Trp Val Arg Gln Ala Pro Gly Gln Ala Leu
    50                  55                  60

Glu Trp Met Gly Thr Ile Ser Ser Gly Gly Thr Tyr Thr Tyr Tyr Pro
65                  70                  75                  80

Asp Ser Val Lys Gly Arg Phe Thr Ile Ser Arg Asp Asn Ala Lys Asn
                85                  90                  95

Ser Leu Tyr Leu Gln Met Asn Ser Leu Arg Ala Glu Asp Thr Ala Val
            100                 105                 110

Tyr Tyr Cys Ala Arg Glu Ala Ile Phe Thr Tyr Trp Gly Arg Gly Thr
        115                 120                 125

Leu Val Thr Ser Ser Gly Gly Gly Gly Ser Gly Gly Gly Gly Ser Gly
    130                 135                 140

Gly Gly Gly Ser Asp Ile Gln Leu Thr Gln Ser Pro Ser Ser Leu Ser
145                 150                 155                 160

Ala Ser Val Gly Asp Arg Val Thr Ile Thr Cys Lys Ala Ser Gln Asp
                165                 170                 175

Ile Asn Asn Tyr Leu Ser Trp Tyr Gln Gln Lys Pro Gly Gln Ala Pro
            180                 185                 190

Arg Leu Leu Ile Tyr Arg Ala Asn Arg Leu Val Asp Gly Val Pro Asp
        195                 200                 205

Arg Phe Ser Gly Ser Gly Tyr Gly Thr Asp Phe Thr Leu Thr Ile Asn
    210                 215                 220

Asn Ile Glu Ser Glu Asp Ala Ala Tyr Tyr Phe Cys Leu Lys Tyr Asp
225                 230                 235                 240

Val Phe Pro Tyr Thr Phe Gly Gln Gly Thr Lys Val Glu Ile Lys Asp
```

```
                245                 250                 255
Leu Glu Pro Lys Ser Cys Asp Lys Thr His Thr Cys Pro Pro Cys Pro
            260                 265                 270

Asp Pro Lys Phe Trp Val Leu Val Val Val Gly Gly Val Leu Ala Cys
            275                 280                 285

Tyr Ser Leu Leu Val Thr Val Ala Phe Ile Ile Phe Trp Val Ala Ala
            290                 295                 300

Gly Gly Pro Gly Ala Gly Ser Ala Ala Pro Val Ser Ser Thr Ser Ser
305                 310                 315                 320

Leu Pro Leu Ala Ala Leu Asn Met Arg Val Arg Arg Leu Ser Leu
                325                 330                 335

Phe Leu Asn Val Arg Thr Gln Val Ala Ala Asp Trp Thr Ala Leu Ala
                340                 345                 350

Glu Glu Met Asp Phe Glu Tyr Leu Glu Ile Arg Gln Leu Glu Thr Gln
                355                 360                 365

Ala Asp Pro Thr Gly Arg Leu Leu Asp Ala Trp Gln Gly Arg Pro Gly
            370                 375                 380

Ala Ser Val Gly Arg Leu Leu Asp Leu Leu Thr Lys Leu Gly Arg Asp
385                 390                 395                 400

Asp Val Leu Leu Glu Leu Gly Pro Ser Ile Glu Asp Cys Gln Lys
                405                 410                 415

Tyr Ile Leu Lys Gln Gln Gln Glu Glu Ala Glu Lys Pro Leu Gln Val
                420                 425                 430

Ala Ala Val Asp Ser Ser Val Pro Arg Thr Ala Glu Leu Ala Gly Ile
                435                 440                 445

Thr Thr Leu Asp Asp Pro Leu Gly His Met Pro Glu Arg Phe Asp Ala
    450                 455                 460

Phe Ile Cys Tyr Cys Pro Ser Asp Ile Val Glu Lys Lys Val Ala Lys
465                 470                 475                 480

Lys Pro Thr Asn Lys Ala Pro His Pro Lys Gln Glu Pro Gln Glu Ile
                485                 490                 495

Asn Phe Pro Asp Asp Leu Pro Gly Ser Asn Thr Ala Ala Pro Val Gln
            500                 505                 510

Glu Thr Leu His Gly Cys Gln Pro Val Thr Gln Glu Asp Gly Lys Glu
    515                 520                 525

Ser Arg Ile Ser Val Gln Glu Arg Gln Arg Val Lys Phe Ser Arg Ser
    530                 535                 540

Ala Asp Ala Pro Ala Tyr Gln Gln Gly Gln Asn Gln Leu Tyr Asn Glu
545                 550                 555                 560

Leu Asn Leu Gly Arg Arg Glu Glu Tyr Asp Val Leu Asp Lys Arg Arg
            565                 570                 575

Gly Arg Asp Pro Glu Met Gly Gly Lys Pro Arg Arg Lys Asn Pro Gln
            580                 585                 590

Glu Gly Leu Tyr Asn Glu Leu Gln Lys Asp Lys Met Ala Glu Ala Tyr
            595                 600                 605

Ser Glu Ile Gly Met Lys Gly Glu Arg Arg Arg Gly Lys Gly His Asp
    610                 615                 620

Gly Leu Tyr Gln Gly Leu Ser Thr Ala Thr Lys Asp Thr Tyr Asp Ala
625                 630                 635                 640

Leu His Met Gln Ala Leu Pro Pro Arg
                645
```

<210> SEQ ID NO 55

<211> LENGTH: 1947
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 55

| | | | | | |
|---|---|---|---|---|---|
| atggactgga | tctggcggat | tctgttcctc | gtgggagccg | ccacaggcgc | tcactcacag | 60 |
| gtgcagctgc | tggaatctgg | cggcggactg | gtgcagcctg | gcggcagcct | gagactgagc | 120 |
| tgcgccgcca | gcggcttcac | cttcagcagc | tacaccatga | gctgggtccg | gcaggctcct | 180 |
| ggacaggccc | tggaatggat | gggcaccatc | agcagcggcg | gcacctacac | ctactacccc | 240 |
| gacagcgtga | agggccggtt | caccatcagc | cgggacaacg | ccaagaacag | cctgtacctg | 300 |
| cagatgaaca | gcctgagagc | cgaggacaca | gccgtgtact | actgcgccag | agaggccatc | 360 |
| ttcacctact | ggggcagagg | caccctggtc | acaagcagcg | gaggcggagg | aagtggaggg | 420 |
| ggaggatcag | gcggcggagg | cagcgatatc | cagctgaccc | agagccctag | cagcctgagc | 480 |
| gccagcgtgg | gcgacagagt | gaccatcaca | tgcaaggcca | gcaggacat | caacaactac | 540 |
| ctgagctggt | atcagcagaa | gcccggccag | gcccccagac | tgctgatcta | ccgggccaac | 600 |
| agactggtgg | acggcgtgcc | cgatagattc | agcggcagcg | gctacggcac | cgacttcacc | 660 |
| ctgaccatca | caacatcga | gtccgaggac | gccgcctact | acttctgcct | gaagtacgac | 720 |
| gtgttcccct | acaccttcgg | ccagggcacc | aaggtggaga | tcaaggatct | cgagcccaaa | 780 |
| tcttgtgaca | aaactcacac | atgcccaccg | tgcccggatc | ccaaattttg | ggtgctggtg | 840 |
| gtggttggtg | gagtcctggc | ttgctatagc | ttgctagtaa | cagtggcctt | tattattttc | 900 |
| tgggtggccg | ctggggggccc | aggcgccgga | tcagctgctc | ccgtatcttc | tacttcttct | 960 |
| ttgccgctgg | ctgctctgaa | catgcgcgtg | agaagacgcc | tctccctgtt | ccttaacgtt | 1020 |
| cgcacacaag | tcgctgccga | ttggaccgcc | cttgccgaag | aaatggactt | tgaatacctg | 1080 |
| gaaattagac | aacttgaaac | acaggccgac | cccactggca | gactcctgga | cgcatggcag | 1140 |
| ggaagacctg | gtgcaagcgt | tggacggctc | ctggatctcc | tgacaaaact | gggacgcgac | 1200 |
| gacgtactgc | ttgaactcgg | acctagcatt | gaagaagact | gccaaaaata | tatcctgaaa | 1260 |
| caacaacaag | aagaagccga | aaaacctctc | caagtcgcag | cagtggactc | atcagtaccc | 1320 |
| cgaacagctg | agcttgctgg | gattactaca | ctcgacgacc | cactcggaca | tatgcctgaa | 1380 |
| agattcgacg | ctttcatttg | ctattgcccc | tctgacatag | tggaaaagaa | ggtggccaag | 1440 |
| aagcccacca | caaggccccc | caccccaag | caggaaccc | aggaaatcaa | cttccccgac | 1500 |
| gacctgcccg | gcagcaatac | tgctgcaccc | gtgcaggaaa | ccctgcacgg | ctgtcagcct | 1560 |
| gtgacccagg | aagatggcaa | agaaagccgg | atctctgtgc | aggaacgcca | gagagtgaag | 1620 |
| ttcagcagga | gcgcagacgc | ccccgcgtac | cagcagggcc | agaaccagct | ctataacgag | 1680 |
| ctcaatctag | gacgaagaga | ggagtacgat | gttttggaca | agagacgtgg | ccgggaccct | 1740 |
| gagatgggcg | gcaagcccag | aagaaagaac | ccccaggaag | gcctgtataa | cgaactgcag | 1800 |
| aaagacaaga | tggccgaggc | ctacagcgag | atcggcatga | agggcgagcg | gagaagaggc | 1860 |
| aagggccacg | atggcctgta | ccagggactg | agcaccgcca | ccaaggacac | ctacgacgcc | 1920 |
| ctgcacatgc | aggccctgcc | tccaaga | | | | 1947 |

<210> SEQ ID NO 56
<211> LENGTH: 631
<212> TYPE: PRT

<213> ORGANISM: Artificial Sequence
<220> FEATURE:
<223> OTHER INFORMATION: Description of Artificial Sequence: Synthetic polypeptide

<400> SEQUENCE: 56

```
Gln Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Thr Met Ser Trp Val Arg Gln Ala Pro Gly Gln Ala Leu Glu Trp Met
        35                  40                  45

Gly Thr Ile Ser Ser Gly Gly Thr Tyr Thr Tyr Tyr Pro Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Glu Ala Ile Phe Thr Tyr Trp Gly Arg Gly Thr Leu Val Thr
            100                 105                 110

Ser Ser Gly Gly Gly Gly Ser Gly Gly Gly Gly Ser Gly Gly Gly Gly
            115                 120                 125

Ser Asp Ile Gln Leu Thr Gln Ser Pro Ser Ser Leu Ser Ala Ser Val
    130                 135                 140

Gly Asp Arg Val Thr Ile Thr Cys Lys Ala Ser Gln Asp Ile Asn Asn
145                 150                 155                 160

Tyr Leu Ser Trp Tyr Gln Gln Lys Pro Gly Gln Ala Pro Arg Leu Leu
                165                 170                 175

Ile Tyr Arg Ala Asn Arg Leu Val Asp Gly Val Pro Asp Arg Phe Ser
            180                 185                 190

Gly Ser Gly Tyr Gly Thr Asp Phe Thr Leu Thr Ile Asn Asn Ile Glu
        195                 200                 205

Ser Glu Asp Ala Ala Tyr Tyr Phe Cys Leu Lys Tyr Asp Val Phe Pro
    210                 215                 220

Tyr Thr Phe Gly Gln Gly Thr Lys Val Glu Ile Lys Asp Leu Glu Pro
225                 230                 235                 240

Lys Ser Cys Asp Lys Thr His Thr Cys Pro Pro Cys Pro Asp Pro Lys
                245                 250                 255

Phe Trp Val Leu Val Val Val Gly Gly Val Leu Ala Cys Tyr Ser Leu
            260                 265                 270

Leu Val Thr Val Ala Phe Ile Ile Phe Trp Val Met Ala Ala Gly Gly
        275                 280                 285

Pro Gly Ala Gly Ser Ala Ala Pro Val Ser Ser Thr Ser Ser Leu Pro
    290                 295                 300

Leu Ala Ala Leu Asn Met Arg Val Arg Arg Arg Leu Ser Leu Phe Leu
305                 310                 315                 320

Asn Val Arg Thr Gln Val Ala Ala Asp Trp Thr Ala Leu Ala Glu Glu
                325                 330                 335

Met Asp Phe Glu Tyr Leu Glu Ile Arg Gln Leu Glu Thr Gln Ala Asp
            340                 345                 350

Pro Thr Gly Arg Leu Leu Asp Ala Trp Gln Gly Arg Pro Gly Ala Ser
        355                 360                 365

Val Gly Arg Leu Leu Asp Leu Leu Thr Lys Leu Gly Arg Asp Asp Val
    370                 375                 380
```

```
Leu Leu Glu Leu Gly Pro Ser Ile Glu Glu Asp Cys Gln Lys Tyr Ile
385                 390                 395                 400

Leu Lys Gln Gln Gln Glu Glu Ala Glu Lys Pro Leu Gln Val Ala Ala
            405                 410                 415

Val Asp Ser Ser Val Pro Arg Thr Ala Glu Leu Ala Gly Ile Thr Thr
            420                 425                 430

Leu Asp Asp Pro Leu Gly His Met Pro Glu Arg Phe Asp Ala Phe Ile
        435                 440                 445

Cys Tyr Cys Pro Ser Asp Ile Val Glu Lys Lys Val Ala Lys Lys Pro
    450                 455                 460

Thr Asn Lys Ala Pro His Pro Lys Gln Glu Pro Gln Glu Ile Asn Phe
465                 470                 475                 480

Pro Asp Asp Leu Pro Gly Ser Asn Thr Ala Ala Pro Val Gln Glu Thr
            485                 490                 495

Leu His Gly Cys Gln Pro Val Thr Gln Glu Asp Gly Lys Glu Ser Arg
        500                 505                 510

Ile Ser Val Gln Glu Arg Gln Arg Val Lys Phe Ser Arg Ser Ala Asp
    515                 520                 525

Ala Pro Ala Tyr Gln Gln Gly Gln Asn Gln Leu Tyr Asn Glu Leu Asn
530                 535                 540

Leu Gly Arg Arg Glu Glu Tyr Asp Val Leu Asp Lys Arg Arg Gly Arg
545                 550                 555                 560

Asp Pro Glu Met Gly Gly Lys Pro Arg Arg Lys Asn Pro Gln Glu Gly
            565                 570                 575

Leu Tyr Asn Glu Leu Gln Lys Asp Lys Met Ala Glu Ala Tyr Ser Glu
        580                 585                 590

Ile Gly Met Lys Gly Glu Arg Arg Arg Gly Lys Gly His Asp Gly Leu
    595                 600                 605

Tyr Gln Gly Leu Ser Thr Ala Thr Lys Asp Thr Tyr Asp Ala Leu His
    610                 615                 620

Met Gln Ala Leu Pro Pro Arg
625                 630

<210> SEQ ID NO 57
<211> LENGTH: 1893
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 57
caggtgcagc tgctggaatc tggcggcgga ctggtgcagc ctggcggcag cctgagactg     60
agctgcgccg ccagcggctt caccttcagc agctacacca tgagctgggt ccggcaggct    120
cctggacagg ccctggaatg gatgggcacc atcagcagcg gcggcaccta cacctactac    180
cccgacagcg tgaagggccg gttcaccatc agcggcgaca cgccaagaa cagcctgtac    240 ctgcagatga acagcctgag agccgaggac acagccgtgt actactgcgc cagagaggcc    300
atcttcacct actggggcag aggcacccct gtcacaagca gcggaggcgg aggaagtgga    360
gggggaggat caggcggcgg aggcagcgat atccagctga cccagagccc tagcagcctg    420
agcgccagcg tgggcgacag agtgaccatc acatgcaagg ccagccagga catcaacaac    480
tacctgagct ggtatcagca gaagcccggc caggccccca gactgctgat ctaccgggcc    540
aacagactgg tggacggcgt gcccgataga ttcagcggca gcggctacgg caccgacttc    600
```

| | |
|---|---|
| accctgacca tcaacaacat cgagtccgag gacgccgcct actacttctg cctgaagtac | 660 |
| gacgtgttcc cctacacctt cggccagggc accaaggtgg agatcaagga tctcgagccc | 720 |
| aaatcttgtg acaaaactca cacatgccca ccgtgcccgg atcccaaatt ttgggtgctg | 780 |
| gtggtggttg gtggagtcct ggcttgctat agcttgctag taacagtggc ctttattatt | 840 |
| ttctgggtga tggccgctgg gggcccaggc gccggatcag ctgctcccgt atcttctact | 900 |
| tcttctttgc cgctggctgc tctgaacatg cgcgtgagaa gacgcctctc cctgttcctt | 960 |
| aacgttcgca cacaagtcgc tgccgattgg accgcccttg ccgaagaaat ggactttgaa | 1020 |
| tacctggaaa ttagacaact tgaaacacag gccgacccca ctggcagact cctggacgca | 1080 |
| tggcagggaa gacctggtgc aagcgttgga cggctcctgg atctcctgac aaaactggga | 1140 |
| cgcgacgacg tactgcttga actcggacct agcattgaag aagactgcca aaaatatatc | 1200 |
| ctgaacaac aacaagaaga agccgaaaaa cctctccaag tcgcagcagt ggactcatca | 1260 |
| gtaccccgaa cagctgagct tgctgggatt actacactcg acgacccact cggacatatg | 1320 |
| cctgaaagat tcgacgcttt catttgctat tgcccctctg acatagtgga aaagaaggtg | 1380 |
| gccaagaagc ccaccaacaa ggccccccac cccaagcagg aaccccagga atcaacttc | 1440 |
| cccgacgacc tgcccggcag caatactgct gcacccgtgc aggaaaccct gcacggctgt | 1500 |
| cagcctgtga cccaggaaga tggcaaagaa agccggatct ctgtgcagga acgccagaga | 1560 |
| gtgaagttca gcaggagcgc agacgccccc gcgtaccagc agggccagaa ccagctctat | 1620 |
| aacgagctca atctaggacg aagagaggag tacgatgttt tggacaagag acgtggccgg | 1680 |
| gaccctgaga tgggcggcaa gcccagaaga aagaaccccc aggaaggcct gtataacgaa | 1740 |
| ctgcagaaag acaagatggc cgaggcctac agcgagatcg gcatgaaggg cgagcggaga | 1800 |
| agaggcaagg gccacgatgg cctgtaccag ggactgagca ccgccaccaa ggacacctac | 1860 |
| gacgccctgc acatgcaggc cctgcctcca aga | 1893 |

<210> SEQ ID NO 58
<211> LENGTH: 630
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 58

Gln Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Thr Met Ser Trp Val Arg Gln Ala Pro Gly Gln Ala Leu Glu Trp Met
        35                  40                  45

Gly Thr Ile Ser Ser Gly Gly Thr Tyr Thr Tyr Tyr Pro Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Glu Ala Ile Phe Thr Tyr Trp Gly Arg Gly Thr Leu Val Thr
            100                 105                 110

Ser Ser Gly Gly Gly Gly Ser Gly Gly Gly Gly Ser Gly Gly Gly Gly
        115                 120                 125

```
Ser Asp Ile Gln Leu Thr Gln Ser Pro Ser Ser Leu Ser Ala Ser Val
    130                 135                 140

Gly Asp Arg Val Thr Ile Thr Cys Lys Ala Ser Gln Asp Ile Asn Asn
145                 150                 155                 160

Tyr Leu Ser Trp Tyr Gln Gln Lys Pro Gly Gln Ala Pro Arg Leu Leu
                165                 170                 175

Ile Tyr Arg Ala Asn Arg Leu Val Asp Gly Val Pro Asp Arg Phe Ser
            180                 185                 190

Gly Ser Gly Tyr Gly Thr Asp Phe Thr Leu Thr Ile Asn Asn Ile Glu
        195                 200                 205

Ser Glu Asp Ala Ala Tyr Tyr Phe Cys Leu Lys Tyr Asp Val Phe Pro
    210                 215                 220

Tyr Thr Phe Gly Gln Gly Thr Lys Val Glu Ile Lys Asp Leu Glu Pro
225                 230                 235                 240

Lys Ser Cys Asp Lys Thr His Thr Cys Pro Pro Cys Pro Asp Pro Lys
                245                 250                 255

Phe Trp Val Leu Val Val Val Gly Gly Val Leu Ala Cys Tyr Ser Leu
            260                 265                 270

Leu Val Thr Val Ala Phe Ile Ile Phe Trp Val Ala Ala Gly Gly Pro
        275                 280                 285

Gly Ala Gly Ser Ala Ala Pro Val Ser Ser Thr Ser Ser Leu Pro Leu
    290                 295                 300

Ala Ala Leu Asn Met Arg Val Arg Arg Arg Leu Ser Leu Phe Leu Asn
305                 310                 315                 320

Val Arg Thr Gln Val Ala Ala Asp Trp Thr Ala Leu Ala Glu Glu Met
                325                 330                 335

Asp Phe Glu Tyr Leu Glu Ile Arg Gln Leu Glu Thr Gln Ala Asp Pro
            340                 345                 350

Thr Gly Arg Leu Leu Asp Ala Trp Gln Gly Arg Pro Gly Ala Ser Val
        355                 360                 365

Gly Arg Leu Leu Asp Leu Thr Lys Leu Gly Arg Asp Asp Val Leu
    370                 375                 380

Leu Glu Leu Gly Pro Ser Ile Glu Glu Asp Cys Gln Lys Tyr Ile Leu
385                 390                 395                 400

Lys Gln Gln Gln Glu Glu Ala Glu Lys Pro Leu Gln Val Ala Ala Val
                405                 410                 415

Asp Ser Ser Val Pro Arg Thr Ala Glu Leu Ala Gly Ile Thr Thr Leu
            420                 425                 430

Asp Asp Pro Leu Gly His Met Pro Glu Arg Phe Asp Ala Phe Ile Cys
        435                 440                 445

Tyr Cys Pro Ser Asp Ile Val Glu Lys Val Ala Lys Lys Pro Thr
    450                 455                 460

Asn Lys Ala Pro His Pro Lys Gln Glu Pro Gln Glu Ile Asn Phe Pro
465                 470                 475                 480

Asp Asp Leu Pro Gly Ser Asn Thr Ala Ala Pro Val Gln Glu Thr Leu
                485                 490                 495

His Gly Cys Gln Pro Val Thr Gln Glu Asp Gly Lys Glu Ser Arg Ile
            500                 505                 510

Ser Val Gln Glu Arg Gln Arg Val Lys Phe Ser Arg Ser Ala Asp Ala
        515                 520                 525

Pro Ala Tyr Gln Gln Gly Gln Asn Gln Leu Tyr Asn Glu Leu Asn Leu
    530                 535                 540

Gly Arg Arg Glu Glu Tyr Asp Val Leu Asp Lys Arg Arg Gly Arg Asp
```

```
                545                 550                 555                 560
             Pro Glu Met Gly Gly Lys Pro Arg Arg Lys Asn Pro Gln Glu Gly Leu
                             565                 570                 575

Tyr Asn Glu Leu Gln Lys Asp Lys Met Ala Glu Ala Tyr Ser Glu Ile
                         580                 585                 590

Gly Met Lys Gly Glu Arg Arg Gly Lys Gly His Asp Gly Leu Tyr
                     595                 600                 605

Gln Gly Leu Ser Thr Ala Thr Lys Asp Thr Tyr Asp Ala Leu His Met
                 610                 615                 620

Gln Ala Leu Pro Pro Arg
             625                 630

<210> SEQ ID NO 59
<211> LENGTH: 1890
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 59
caggtgcagc tgctggaatc tggcggcgga ctggtgcagc ctggcggcag cctgagactg      60
agctgcgccg ccagcggctt caccttcagc agctacacca tgagctgggt ccggcaggct     120
cctggacagg ccctggaatg gatgggcacc atcagcagcg gcggcaccta cacctactac     180
cccgacagcg tgaagggccg gttcaccatc agccgggaca acgccaagaa cagcctgtac     240
ctgcagatga acagcctgag agccgaggac acagccgtgt actactgcgc cagagaggcc     300
atcttcacct actggggcag aggcaccctg gtcacaagca gcggaggcgg aggaagtgga     360
gggggaggat caggcggcgg aggcagcgat atccagctga cccagagccc tagcagcctg     420
agcgccagcg tgggcgacag agtgaccatc acatgcaagg ccagccagga catcaacaac     480
tacctgagct ggtatcagca gaagcccggc caggccccca gactgctgat ctaccgggcc     540
aacagactgg tggacggcgt gcccgataga ttcagcggca gcggctacgg caccgacttc     600
accctgacca tcaacaacat cgagtccgag gacgccgcct actacttctg cctgaagtac     660
gacgtgttcc cctacaccct cggccagggc accaaggtgg agatcaagga tctcgagccc     720
aaatcttgtg acaaaactca cacatgccca ccgtgcccgg atcccaaatt ttgggtgctg     780
gtggtggttg gtggagtcct ggcttgctat agcttgctag taacagtggc ctttattatt     840
ttctgggtgg ccgctggggg cccaggcgcc ggatcagctg ctcccgtatc ttctacttct     900
tctttgccgc tggctgctct gaacatgcgc gtgagaagac gcctctccct gttccttaac     960
gttcgcacac aagtcgctgc cgattggacc gcccttgccg aagaaatgga ctttgaatac    1020
ctggaaatta gacaacttga acacaggcc gaccccactg gcagactcct ggacgcatgg    1080
cagggaagac tggtgcaag cgttggacgg ctcctggatc tcctgacaaa actgggacgc    1140
gacgacgtac tgcttgaact cggacctagc attgaagaag actgccaaaa atatatcctg    1200
aaacaacaac aagaagaagc cgaaaaacct ctccaagtcg cagcagtgga ctcatcagta    1260
ccccgaacag ctgagcttgc tgggattact acactgacg acccactcgg acatatgcct    1320
gaaagattcg acgctttcat tgctattgc ccctctgaca tagtggaaaa gaaggtggcc    1380
aagaagccca ccaacaaggc cccccacccc aagcaggaac cccaggaaat caacttcccc    1440
gacgacctgc ccgcagcaa tactgctgca ccgtgcagg aaaccctgca cggctgtcag    1500
cctgtgaccc aggaagatgg caaagaaagc cggatctctg tgcaggaacg ccagagagtg    1560
```

```
aagttcagca ggagcgcaga cgcccccgcg taccagcagg gccagaacca gctctataac    1620
gagctcaatc taggacgaag agaggagtac gatgttttgg acaagagacg tggccgggac    1680
cctgagatgg gcggcaagcc cagaagaaag aaccccaagg aaggcctgta taacgaactg    1740
cagaaagaca gatggccgga ggcctacagc gagatcggca tgaagggcga gcggagaaga    1800
ggcaagggcc acgatggcct gtaccaggga ctgagcaccg ccaccaagga cacctacgac    1860
gccctgcaca tgcaggccct gcctccaaga                                     1890
```

<210> SEQ ID NO 60
<211> LENGTH: 171
<212> TYPE: PRT
<213> ORGANISM: Homo sapiens

<400> SEQUENCE: 60

```
Ala Ala Gly Gly Pro Gly Ala Gly Ser Ala Ala Pro Val Ser Ser Thr
1               5                   10                  15

Ser Ser Leu Pro Leu Ala Ala Leu Asn Met Arg Val Arg Arg Arg Leu
            20                  25                  30

Ser Leu Phe Leu Asn Val Arg Thr Gln Val Ala Ala Asp Trp Thr Ala
        35                  40                  45

Leu Ala Glu Glu Met Asp Phe Glu Tyr Leu Glu Ile Arg Gln Leu Glu
    50                  55                  60

Thr Gln Ala Asp Pro Thr Gly Arg Leu Leu Asp Ala Trp Gln Gly Arg
65                  70                  75                  80

Pro Gly Ala Ser Val Gly Arg Leu Leu Asp Leu Leu Thr Lys Leu Gly
                85                  90                  95

Arg Asp Asp Val Leu Leu Glu Leu Gly Pro Ser Ile Glu Glu Asp Cys
            100                 105                 110

Gln Lys Tyr Ile Leu Lys Gln Gln Gln Glu Glu Ala Glu Lys Pro Leu
        115                 120                 125

Gln Val Ala Ala Val Asp Ser Ser Val Pro Arg Thr Ala Glu Leu Ala
    130                 135                 140

Gly Ile Thr Thr Leu Asp Asp Pro Leu Gly His Met Pro Glu Arg Phe
145                 150                 155                 160

Asp Ala Phe Ile Cys Tyr Cys Pro Ser Asp Ile
                165                 170
```

<210> SEQ ID NO 61
<211> LENGTH: 513
<212> TYPE: DNA
<213> ORGANISM: Homo sapiens

<400> SEQUENCE: 61

```
gccgctgggg gcccaggcgc cggatcagct gctcccgtat cttctacttc ttctttgccg      60
ctggctgctc tgaacatgcg cgtgagaaga cgcctctccc tgttccttaa cgttcgcaca    120
caagtcgctg ccgattggac cgcccttgcc gaagaaatgg actttgaata cctggaaatt    180
agacaacttg aaacacaggc cgaccccact ggcagactcc tggacgcatg cagggaaga    240 cctggtgcaa gcgttggacg gctcctggat ctcctgacaa actgggacg cgacgacgta    300 ctgcttgaac tcggacctag cattgaagaa gactgccaaa aatatatcct gaaacaacaa    360
caagaagaag ccgaaaaacc tctccaagtc gcagcagtgg actcatcagt accccgaaca    420
gctgagcttg ctgggattac tacactcgac gaccactcg acatatgcc tgaaagattc    480 gacgctttca tttgctattg cccctctgac ata                                 513
```

<210> SEQ ID NO 62
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 62 gggggggccgc tcacccgcaa                                               20

<210> SEQ ID NO 63
<211> LENGTH: 661
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 63

Met Asp Trp Ile Trp Arg Ile Leu Phe Leu Val Gly Ala Ala Thr Gly
1               5                   10                  15

Ala His Ser Gln Val Gln Leu Gln Gln Pro Gly Ala Glu Leu Val Arg
            20                  25                  30

Pro Gly Ala Ser Val Lys Leu Ser Cys Lys Ala Ser Gly Tyr Thr Phe
        35                  40                  45

Ser Asn Tyr Leu Met Asn Trp Val Lys Gln Arg Pro Glu Gln Asp Leu
    50                  55                  60

Asp Trp Ile Gly Arg Ile Asp Pro Tyr Asp Gly Asp Ile Asp Tyr Asn
65                  70                  75                  80

Gln Asn Phe Lys Asp Lys Ala Ile Leu Thr Val Asp Lys Ser Ser Ser
                85                  90                  95

Thr Ala Tyr Met Gln Leu Ser Ser Leu Thr Ser Glu Asp Ser Ala Val
            100                 105                 110

Tyr Tyr Cys Ala Arg Gly Tyr Gly Thr Ala Tyr Gly Val Asp Tyr Trp
        115                 120                 125

Gly Gln Gly Thr Ser Val Thr Val Ser Ser Ala Lys Thr Thr Pro Pro
    130                 135                 140

Lys Leu Glu Glu Gly Glu Phe Ser Glu Ala Arg Val Asp Ile Val Leu
145                 150                 155                 160

Thr Gln Ser Pro Ala Ser Leu Ala Val Ser Leu Gly Gln Arg Ala Thr
                165                 170                 175

Ile Ser Cys Arg Ala Ser Glu Ser Val Asp Asn Tyr Gly Ile Ser Phe
            180                 185                 190

Met Asn Trp Phe Gln Gln Lys Pro Gly Gln Pro Pro Lys Leu Leu Ile
        195                 200                 205

Tyr Ala Ala Ser Arg Gln Gly Ser Gly Val Pro Ala Arg Phe Ser Gly
    210                 215                 220

Ser Gly Ser Gly Thr Asp Phe Ser Leu Asn Ile His Pro Met Glu Glu
225                 230                 235                 240

Asp Asp Thr Ala Met Tyr Phe Cys Gln Gln Ser Lys Glu Val Pro Trp
                245                 250                 255

Thr Phe Gly Gly Gly Thr Lys Leu Glu Ile Lys Asp Leu Glu Pro Lys
            260                 265                 270

Ser Cys Asp Lys Thr His Thr Cys Pro Pro Cys Pro Asp Pro Lys Phe
        275                 280                 285

Trp Val Leu Val Val Val Gly Gly Val Leu Ala Cys Tyr Ser Leu Leu
290                 295                 300

Val Thr Val Ala Phe Ile Ile Phe Trp Val Ala Ala Gly Gly Pro Gly
305                 310                 315                 320

Ala Gly Ser Ala Ala Pro Val Ser Ser Thr Ser Ser Leu Pro Leu Ala
            325                 330                 335

Ala Leu Asn Met Arg Val Arg Arg Arg Leu Ser Leu Phe Leu Asn Val
            340                 345                 350

Arg Thr Gln Val Ala Ala Asp Trp Thr Ala Leu Ala Glu Glu Met Asp
        355                 360                 365

Phe Glu Tyr Leu Glu Ile Arg Gln Leu Glu Thr Gln Ala Asp Pro Thr
370                 375                 380

Gly Arg Leu Leu Asp Ala Trp Gln Gly Arg Pro Gly Ala Ser Val Gly
385                 390                 395                 400

Arg Leu Leu Glu Leu Leu Thr Lys Leu Gly Arg Asp Asp Val Leu Leu
                405                 410                 415

Glu Leu Gly Pro Ser Ile Glu Glu Asp Cys Gln Lys Tyr Ile Leu Lys
            420                 425                 430

Gln Gln Gln Glu Glu Ala Glu Lys Pro Leu Gln Val Ala Ala Val Asp
        435                 440                 445

Ser Ser Val Pro Arg Thr Ala Glu Leu Ala Gly Ile Thr Thr Leu Asp
450                 455                 460

Asp Pro Leu Gly His Met Pro Glu Arg Phe Asp Ala Phe Ile Cys Tyr
465                 470                 475                 480

Cys Pro Ser Asp Ile Val Glu Lys Lys Val Ala Lys Lys Pro Thr Asn
                485                 490                 495

Lys Ala Pro His Pro Lys Gln Glu Pro Gln Glu Ile Asn Phe Pro Asp
            500                 505                 510

Asp Leu Pro Gly Ser Asn Thr Ala Ala Pro Val Gln Glu Thr Leu His
        515                 520                 525

Gly Cys Gln Pro Val Thr Gln Glu Asp Gly Lys Glu Ser Arg Ile Ser
530                 535                 540

Val Gln Glu Arg Gln Arg Val Lys Phe Ser Arg Ser Ala Asp Ala Pro
545                 550                 555                 560

Ala Tyr Gln Gln Gly Gln Asn Gln Leu Tyr Asn Glu Leu Asn Leu Gly
                565                 570                 575

Arg Arg Glu Glu Tyr Asp Val Leu Asp Lys Arg Arg Gly Arg Asp Pro
            580                 585                 590

Glu Met Gly Gly Lys Pro Arg Arg Lys Asn Pro Gln Glu Gly Leu Tyr
        595                 600                 605

Asn Glu Leu Gln Lys Asp Lys Met Ala Glu Ala Tyr Ser Glu Ile Gly
610                 615                 620

Met Lys Gly Glu Arg Arg Arg Gly Lys Gly His Asp Gly Leu Tyr Gln
625                 630                 635                 640

Gly Leu Ser Thr Ala Thr Lys Asp Thr Tyr Asp Ala Leu His Met Gln
                645                 650                 655

Ala Leu Pro Pro Arg
            660

<210> SEQ ID NO 64
<211> LENGTH: 1986
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 64

```
atggactgga tctggcgcat cctgtttctc gtgggagccg ccacaggcgc ccattctcag    60
gtgcagctgc agcagcctgg cgctgaactc gtgcggccag gcgcttctgt gaagctgagc   120
tgtaaagcca gcggctacac cttcagcaac tacctgatga actgggtcaa gcagcggccc   180
gagcaggacc tggattggat cggcagaatc gaccccctacg acggcgacat cgactacaac   240
cagaacttca aggacaaggc catcctgacc gtggacaaga gcagcagcac cgcctacatg   300
cagctgtcca gcctgaccag cgaggacagc gccgtgtact actgcgccag aggctacggc   360
acagcctacg gcgtggacta ttggggccag ggcacaagcg tgaccgtgtc cagcgccaag   420
accaccccccc ctaagctgga gagggcgag ttctccgagg cccgggtgga cattgtgctg   480
acacagtctc cagccagcct ggccgtgtcc ctggacagag agccaccat cagctgtagg   540
gccagcgaga gcgtggacaa ctacggcatc agcttcatga attggttcca gcagaagccc   600
ggccagcccc ccaagctgct gatctatgcc gccagcagac agggcagcgg agtgcctgcc   660
agattttctg gcagcggctc cggcaccgac ttcagcctga acatccaccc tatggaagag   720
gacgacaccg ccatgtactt tgccagcag agcaaagagg tgccctggac ctttggcgga   780
ggcaccaagc tggaaatcaa ggatctcgag cccaaatctt gtgacaaaac tcacacatgc   840
ccaccgtgcc cggatcccaa attttgggtg ctggtggtgg ttggtggagt cctggcttgc   900
tatagcttgc tagtaacagt ggcctttatt attttctggg tggctgctgg cggacctggc   960
gccggatctg ctgctcctgt gtctagcaca agcagcctgc ctctggccgc cctgaacatg  1020
agagtgcgga gaaggctgag cctgttcctg aacgtgcgga cacaggtggc cgccgattgg  1080
acagccctgg ccgaggaaat ggacttcgag tacctggaaa tccggcagct ggaaacccag  1140
gccgacccta caggcagact gctggatgct tggcagggca gaccaggcgc ttctgtggga  1200
aggctgctga aactgctgac caagctgggc agggacgacg tgctgctgga actgggccct  1260
agcatcgaag aggactgcca aagtacatc ctgaagcagc agcaggaaga ggccgagaag  1320
cctctgcagg tggcagccgt ggatagcagc gtgccaagaa cagccgagct ggccggcatc  1380
accaccctgg atgatcctct gggccacatg cccgagagat cgacgcctt catctgctac  1440
tgccccagcg acatcgtgga aaagaaggtg ccaagaagc ccaccaacaa gccccccac   1500
cccaagcagg aaccccagga aatcaacttc cccgacgacc tgcccggcag caatactgct   1560
gcacccgtgc aggaaaccct gcacggctgt cagcctgtga cccaggaaga tgcaaagaa   1620
agccggatct ctgtgcagga acgccagaga gtgaagttca gcaggagcgc agacgccccc  1680
gcgtaccagc agggccagaa ccagctctat aacgagctca atctaggacg aagagaggag  1740
tacgatgttt tggacaagag acgtggccgg gaccctgaga tgggggaaa gccgagaagg  1800
aagaaccctc aggaaggcct gtacaatgaa ctgcagaaag ataagatggc ggaggcctac  1860
agtgagattg ggatgaaagg cgagcgccgg aggggcaagg ggcacgatgg cctttaccag  1920
ggtctcagta cagccaccaa ggacacctac gacgcccttc acatgcaggc cctgcccct   1980
cgctaa                                                             1986
```

<210> SEQ ID NO 65
<211> LENGTH: 597
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 65

```
Met Asp Trp Ile Trp Arg Ile Leu Phe Leu Val Gly Ala Ala Thr Gly
1               5                   10                  15

Ala His Ser Gln Val Gln Leu Gln Gln Pro Gly Ala Glu Leu Val Arg
            20                  25                  30

Pro Gly Ala Ser Val Lys Leu Ser Cys Lys Ala Ser Gly Tyr Thr Phe
        35                  40                  45

Ser Asn Tyr Leu Met Asn Trp Val Lys Gln Arg Pro Glu Gln Asp Leu
    50                  55                  60

Asp Trp Ile Gly Arg Ile Asp Pro Tyr Asp Gly Asp Ile Asp Tyr Asn
65                  70                  75                  80

Gln Asn Phe Lys Asp Lys Ala Ile Leu Thr Val Asp Lys Ser Ser Ser
            85                  90                  95

Thr Ala Tyr Met Gln Leu Ser Ser Leu Thr Ser Glu Asp Ser Ala Val
        100                 105                 110

Tyr Tyr Cys Ala Arg Gly Tyr Gly Thr Ala Tyr Gly Val Asp Tyr Trp
    115                 120                 125

Gly Gln Gly Thr Ser Val Thr Val Ser Ser Ala Lys Thr Thr Pro Pro
130                 135                 140

Lys Leu Glu Glu Gly Glu Phe Ser Glu Ala Arg Val Asp Ile Val Leu
145                 150                 155                 160

Thr Gln Ser Pro Ala Ser Leu Ala Val Ser Leu Gly Gln Arg Ala Thr
            165                 170                 175

Ile Ser Cys Arg Ala Ser Glu Ser Val Asp Asn Tyr Gly Ile Ser Phe
        180                 185                 190

Met Asn Trp Phe Gln Gln Lys Pro Gly Gln Pro Pro Lys Leu Leu Ile
    195                 200                 205

Tyr Ala Ala Ser Arg Gln Gly Ser Gly Val Pro Ala Arg Phe Ser Gly
210                 215                 220

Ser Gly Ser Gly Thr Asp Phe Ser Leu Asn Ile His Pro Met Glu Glu
225                 230                 235                 240

Asp Asp Thr Ala Met Tyr Phe Cys Gln Gln Ser Lys Glu Val Pro Trp
            245                 250                 255

Thr Phe Gly Gly Gly Thr Lys Leu Glu Ile Lys Asp Leu Glu Pro Lys
        260                 265                 270

Ser Cys Asp Lys Thr His Thr Cys Pro Pro Cys Pro Asp Pro Lys Phe
    275                 280                 285

Trp Val Leu Val Val Val Gly Gly Val Leu Ala Cys Tyr Ser Leu Leu
290                 295                 300

Val Thr Val Ala Phe Ile Ile Phe Trp Val Ala Ala Gly Gly Pro Gly
305                 310                 315                 320

Ala Gly Ser Ala Ala Pro Val Ser Ser Thr Ser Ser Leu Pro Leu Ala
            325                 330                 335

Ala Leu Asn Met Arg Val Arg Arg Leu Ser Leu Phe Leu Asn Val
        340                 345                 350

Arg Thr Gln Val Ala Ala Asp Trp Thr Ala Leu Ala Glu Glu Met Asp
    355                 360                 365

Phe Glu Tyr Leu Glu Ile Arg Gln Leu Glu Thr Gln Ala Asp Pro Thr
370                 375                 380

Gly Arg Leu Leu Asp Ala Trp Gln Gly Arg Pro Gly Ala Ser Val Gly
385                 390                 395                 400
```

```
Arg Leu Leu Glu Leu Leu Thr Lys Leu Gly Arg Asp Asp Val Leu Leu
                405                 410                 415

Glu Leu Gly Pro Ser Ile Glu Glu Asp Cys Gln Lys Tyr Ile Leu Lys
            420                 425                 430

Gln Gln Gln Glu Glu Ala Glu Lys Pro Leu Gln Val Ala Ala Val Asp
        435                 440                 445

Ser Ser Val Pro Arg Thr Ala Glu Leu Ala Gly Ile Thr Thr Leu Asp
    450                 455                 460

Asp Pro Leu Gly His Met Pro Glu Arg Phe Asp Ala Phe Ile Cys Tyr
465                 470                 475                 480

Cys Pro Ser Asp Ile Arg Val Lys Phe Ser Arg Ser Ala Asp Ala Pro
                485                 490                 495

Ala Tyr Gln Gln Gly Gln Asn Gln Leu Tyr Asn Glu Leu Asn Leu Gly
            500                 505                 510

Arg Arg Glu Glu Tyr Asp Val Leu Asp Lys Arg Arg Gly Arg Asp Pro
        515                 520                 525

Glu Met Gly Gly Lys Pro Arg Arg Lys Asn Pro Gln Glu Gly Leu Tyr
    530                 535                 540

Asn Glu Leu Gln Lys Asp Lys Met Ala Glu Ala Tyr Ser Glu Ile Gly
545                 550                 555                 560

Met Lys Gly Glu Arg Arg Arg Gly Lys Gly His Asp Gly Leu Tyr Gln
                565                 570                 575

Gly Leu Ser Thr Ala Thr Lys Asp Thr Tyr Asp Ala Leu His Met Gln
            580                 585                 590

Ala Leu Pro Pro Arg
        595

<210> SEQ ID NO 66
<211> LENGTH: 1794
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 66
atggactgga tctggcgcat cctgtttctc gtgggagccg ccacaggcgc ccattctcag      60
gtgcagctgc agcagcctgg cgctgaactc gtgcggccag cgcttctgt gaagctgagc     120 tgtaaagcca gcggctacac cttcagcaac tacctgatga actgggtcaa gcagcggccc     180
gagcaggacc tggattggat cggcagaatc gaccctacg acggcgacat cgactacaac     240
cagaacttca aggacaaggc catcctgacc gtggacaaga gcagcagcac cgcctacatg     300
cagctgtcca gcctgaccag cgaggacagc gccgtgtact actgcgccag aggctacggc     360
acagcctacg cgtggactat tggggccag gcacaagcg tgaccgtgtc cagcgccaag     420 accaccccc ctaagctgga agagggcgag ttctccgagg cccgggtgga cattgtgctg     480
acacagtctc cagccagcct ggccgtgtcc ctgggacaga gagccaccat cagctgtagg     540
gccagcgaga gcgtggacaa ctacggcatc agcttcatga attggttcca gcagaagccc     600
ggccagcccc caagctgct gatctatgcc gccagcagac agggcagcgg agtgcctgcc     660
agattttctg gcagcggctc cggcaccgac ttcagcctga acatccaccc tatggaagag     720
gacgacaccg ccatgtactt tgccagcag agcaaagagg tgccctggac ctttggcgga     780
ggcaccaagc tggaaatcaa ggatctcgag cccaaatctt gtgacaaaac tcacacatgc     840
ccaccgtgcc cggatcccaa attttgggtg ctggtggtgg ttggtggagt cctggcttgc     900
```

```
tatagcttgc tagtaacagt ggcctttatt attttctggg tggctgctgg cggacctggc      960
gccggatctg ctgctcctgt gtctagcaca agcagcctgc ctctggccgc cctgaacatg     1020
agagtgcgga gaaggctgag cctgttcctg aacgtgcgga cacaggtggc cgccgattgg     1080
acagccctgg ccgaggaaat ggacttcgag tacctggaaa tccggcagct ggaaacccag     1140
gccgaccota caggcagact gctggatgct tggcagggca gaccaggcgc ttctgtggga     1200
aggctgctga aactgctgac caagctgggc agggacgacg tgctgctgga actgggccct     1260
agcatcgaag aggactgcca gaagtacatc ctgaagcagc agcaggaaga ggccgagaag     1320
cctctgcagg tggcagccgt ggatagcagc gtgccaagaa cagccgagct ggccggcatc     1380
accaccctgg atgatcctct gggccacatg cccgagagat cgacgccttc atctgctac      1440
tgccccagcg acatcagagt gaagttcagc aggagcgcag acgccccgc gtaccagcag      1500
ggccagaacc agctctataa cgagctcaat ctaggacgaa gagaggagta cgatgttttg     1560
gacaagagac gtggccggga ccctgagatg ggggaaagc cgagaaggaa gaaccctcag      1620
gaaggcctgt acaatgaact gcagaaagat aagatggcgg aggcctacag tgagattggg     1680
atgaaaggcg agcgccggag gggcaagggg cacgatggcc tttaccaggg tctcagtaca     1740
gccaccaagg acacctacga cgcccttcac atgcaggccc tgccccctcg ctaa           1794
```

<210> SEQ ID NO 67
<211> LENGTH: 467
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 67

```
Met Asp Trp Ile Trp Arg Ile Leu Phe Leu Val Gly Ala Ala Thr Gly
1               5                   10                  15

Ala His Ser Gln Val Gln Leu Gln Gln Pro Gly Ala Glu Leu Val Arg
            20                  25                  30

Pro Gly Ala Ser Val Lys Leu Ser Cys Lys Ala Ser Gly Tyr Thr Phe
        35                  40                  45

Ser Asn Tyr Leu Met Asn Trp Val Lys Gln Arg Pro Glu Gln Asp Leu
    50                  55                  60

Asp Trp Ile Gly Arg Ile Asp Pro Tyr Asp Gly Asp Ile Asp Tyr Asn
65                  70                  75                  80

Gln Asn Phe Lys Asp Lys Ala Ile Leu Thr Val Asp Lys Ser Ser Ser
                85                  90                  95

Thr Ala Tyr Met Gln Leu Ser Ser Leu Thr Ser Glu Asp Ser Ala Val
            100                 105                 110

Tyr Tyr Cys Ala Arg Gly Tyr Gly Thr Ala Tyr Gly Val Asp Tyr Trp
        115                 120                 125

Gly Gln Gly Thr Ser Val Thr Val Ser Ser Ala Lys Thr Thr Pro Pro
    130                 135                 140

Lys Leu Glu Glu Gly Glu Phe Ser Glu Ala Arg Val Asp Ile Val Leu
145                 150                 155                 160

Thr Gln Ser Pro Ala Ser Leu Ala Val Ser Leu Gly Gln Arg Ala Thr
                165                 170                 175

Ile Ser Cys Arg Ala Ser Glu Ser Val Asp Asn Tyr Gly Ile Ser Phe
            180                 185                 190

Met Asn Trp Phe Gln Gln Lys Pro Gly Gln Pro Pro Lys Leu Leu Ile
```

```
            195                 200                 205
Tyr Ala Ala Ser Arg Gln Gly Ser Gly Val Pro Ala Arg Phe Ser Gly
    210                 215                 220

Ser Gly Ser Gly Thr Asp Phe Ser Leu Asn Ile His Pro Met Glu Glu
225                 230                 235                 240

Asp Asp Thr Ala Met Tyr Phe Cys Gln Gln Ser Lys Glu Val Pro Trp
                245                 250                 255

Thr Phe Gly Gly Gly Thr Lys Leu Glu Ile Lys Asp Leu Glu Pro Lys
            260                 265                 270

Ser Cys Asp Lys Thr His Thr Cys Pro Pro Cys Pro Asp Pro Lys Phe
        275                 280                 285

Trp Val Leu Val Val Val Gly Gly Val Leu Ala Cys Tyr Ser Leu Leu
    290                 295                 300

Val Thr Val Ala Phe Ile Ile Phe Trp Val Arg Ser Lys Arg Ser Arg
305                 310                 315                 320

Leu Leu His Ser Asp Tyr Met Asn Met Thr Pro Arg Arg Pro Gly Pro
                325                 330                 335

Thr Arg Lys His Tyr Gln Pro Tyr Ala Pro Pro Arg Asp Phe Ala Ala
            340                 345                 350

Tyr Arg Ser Arg Val Lys Phe Ser Arg Ser Ala Asp Ala Pro Ala Tyr
        355                 360                 365

Gln Gln Gly Gln Asn Gln Leu Tyr Asn Glu Leu Asn Leu Gly Arg Arg
    370                 375                 380

Glu Glu Tyr Asp Val Leu Asp Lys Arg Arg Gly Arg Asp Pro Glu Met
385                 390                 395                 400

Gly Gly Lys Pro Arg Arg Lys Asn Pro Gln Glu Gly Leu Tyr Asn Glu
                405                 410                 415

Leu Gln Lys Asp Lys Met Ala Glu Ala Tyr Ser Glu Ile Gly Met Lys
            420                 425                 430

Gly Glu Arg Arg Arg Gly Lys Gly His Asp Gly Leu Tyr Gln Gly Leu
        435                 440                 445

Ser Thr Ala Thr Lys Asp Thr Tyr Asp Ala Leu His Met Gln Ala Leu
    450                 455                 460

Pro Pro Arg
465

<210> SEQ ID NO 68
<211> LENGTH: 1404
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 68
atggactgga tctggcgcat cctgtttctc gtgggagccg ccacaggcgc ccattctcag      60
gtgcagctgc agcagcctgg cgctgaactc gtgcggccag gcgcttctgt gaagctgagc     120
tgtaaagcca gcggctacac cttcagcaac tacctgatga actgggtcaa gcagcggccc     180
gagcaggacc tggattggat cggcagaatc gaccccctac gacggcgaca tcgactacaac     240 cagaacttca aggacaaggc catcctgacc gtggacaaga gcagcagcac cgcctacatg     300
cagctgtcca gcctgaccag cgaggacagc gccgtgtact actgcgccag aggctacggc     360
acagcctacg cgtggactta ttggggccag ggcacaagcg tgaccgtgtc cagcgccaag     420
accacccccc ctaagctgga agagggcgag ttctccgagg cccggtgga cattgtgctg       480
```

```
acacagtctc cagccagcct ggccgtgtcc ctgggacaga gagccaccat cagctgtagg    540
gccagcgaga gcgtggacaa ctacggcatc agcttcatga attggttcca gcagaagccc    600
ggccagcccc ccaagctgct gatctatgcc gccagcagac agggcagcgg agtgcctgcc    660
agattttctg gcagcggctc cggcaccgac ttcagcctga acatccaccc tatggaagag    720
gacgacaccg ccatgtactt ttgccagcag agcaaagagg tgccctggac ctttggcgga    780
ggcaccaagc tggaaatcaa ggatctcgag cccaaatctt gtgacaaaac tcacacatgc    840
ccaccgtgcc cggatcccaa attttgggtg ctggtggtgg ttggtggagt cctggcttgc    900
tatagcttgc tagtaacagt ggcctttatt attttctggg tgaggagtaa gaggagcagg    960
ctcctgcaca gtgactacat gaacatgact ccccgccgcc ccgggcccac ccgcaagcat   1020
taccagcccc atgccccacc acgcgacttc gcagcctatc gctccagagt gaagttcagc   1080
aggagcgcag acgcccccgc gtaccagcag ggccagaacc agctctataa cgagctcaat   1140
ctaggacgaa gagaggagta cgatgttttg gacaagagac gtggccggga ccctgagatg   1200
gggggaaagc cgagaaggaa gaaccctcag gaaggcctgt acaatgaact gcagaaagat   1260
aagatggcgg aggcctacag tgagattggg atgaaaggcg agcgccggag gggcaagggg   1320
cacgatggcc tttaccaggg tctcagtaca gccaccaagg acacctacga cgcccttcac   1380
atgcaggccc tgccccctcg ctaa                                          1404

<210> SEQ ID NO 69
<211> LENGTH: 656
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 69

Met Asp Trp Ile Trp Arg Ile Leu Phe Leu Val Gly Ala Ala Thr Gly
1               5                   10                  15

Ala His Ser Glu Val Gln Leu Gln Gln Ser Gly Pro Glu Leu Lys Lys
                20                  25                  30

Pro Gly Glu Thr Val Lys Ile Ser Cys Lys Ala Ser Gly Tyr Pro Phe
            35                  40                  45

Thr Asn Tyr Gly Met Asn Trp Val Lys Gln Ala Pro Gly Gln Gly Leu
        50                  55                  60

Lys Trp Met Gly Trp Ile Asn Thr Ser Thr Gly Glu Ser Thr Phe Ala
65                  70                  75                  80

Asp Asp Phe Lys Gly Arg Phe Asp Phe Ser Leu Glu Thr Ser Ala Asn
                85                  90                  95

Thr Ala Tyr Leu Gln Ile Asn Asn Leu Lys Ser Glu Asp Met Ala Thr
            100                 105                 110

Tyr Phe Cys Ala Arg Trp Glu Val Tyr His Gly Tyr Val Pro Tyr Trp
        115                 120                 125

Gly Gln Gly Thr Thr Val Thr Val Ser Ser Gly Gly Gly Gly Ser Gly
    130                 135                 140

Gly Gly Gly Ser Gly Gly Gly Gly Ser Asp Ile Gln Leu Thr Gln Ser
145                 150                 155                 160

His Lys Phe Leu Ser Thr Ser Val Gly Asp Arg Val Ser Ile Thr Cys
                165                 170                 175

Lys Ala Ser Gln Asp Val Tyr Asn Ala Val Ala Trp Tyr Gln Gln Lys
            180                 185                 190
```

```
Pro Gly Gln Ser Pro Lys Leu Leu Ile Tyr Ser Ala Ser Arg Tyr
        195                 200                 205

Thr Gly Val Pro Ser Arg Phe Thr Gly Ser Gly Ser Gly Pro Asp Phe
    210                 215                 220

Thr Phe Thr Ile Ser Ser Val Gln Ala Glu Asp Leu Ala Val Tyr Phe
225                 230                 235                 240

Cys Gln Gln His Phe Arg Thr Pro Phe Thr Phe Gly Ser Gly Thr Lys
                245                 250                 255

Leu Glu Ile Lys Ala Leu Asp Leu Glu Pro Lys Ser Cys Asp Lys Thr
                260                 265                 270

His Thr Cys Pro Pro Cys Pro Asp Pro Lys Phe Trp Val Leu Val Val
            275                 280                 285

Val Gly Gly Val Leu Ala Cys Tyr Ser Leu Leu Val Thr Val Ala Phe
        290                 295                 300

Ile Ile Phe Trp Val Ala Ala Gly Gly Pro Gly Ala Gly Ser Ala Ala
305                 310                 315                 320

Pro Val Ser Ser Thr Ser Ser Leu Pro Leu Ala Ala Leu Asn Met Arg
                325                 330                 335

Val Arg Arg Arg Leu Ser Leu Phe Leu Asn Val Arg Thr Gln Val Ala
            340                 345                 350

Ala Asp Trp Thr Ala Leu Ala Glu Glu Met Asp Phe Glu Tyr Leu Glu
        355                 360                 365

Ile Arg Gln Leu Glu Thr Gln Ala Asp Pro Thr Gly Arg Leu Leu Asp
        370                 375                 380

Ala Trp Gln Gly Arg Pro Gly Ala Ser Val Gly Arg Leu Leu Glu Leu
385                 390                 395                 400

Leu Thr Lys Leu Gly Arg Asp Asp Val Leu Leu Glu Leu Gly Pro Ser
                405                 410                 415

Ile Glu Glu Asp Cys Gln Lys Tyr Ile Leu Lys Gln Gln Gln Glu Glu
                420                 425                 430

Ala Glu Lys Pro Leu Gln Val Ala Ala Val Asp Ser Ser Val Pro Arg
            435                 440                 445

Thr Ala Glu Leu Ala Gly Ile Thr Thr Leu Asp Asp Pro Leu Gly His
        450                 455                 460

Met Pro Glu Arg Phe Asp Ala Phe Ile Cys Tyr Cys Pro Ser Asp Ile
465                 470                 475                 480

Val Glu Lys Lys Val Ala Lys Lys Pro Thr Asn Lys Ala Pro His Pro
                485                 490                 495

Lys Gln Glu Pro Gln Glu Ile Asn Phe Pro Asp Asp Leu Pro Gly Ser
                500                 505                 510

Asn Thr Ala Ala Pro Val Gln Glu Thr Leu His Gly Cys Gln Pro Val
            515                 520                 525

Thr Gln Glu Asp Gly Lys Glu Ser Arg Ile Ser Val Gln Glu Arg Gln
        530                 535                 540

Arg Val Lys Phe Ser Arg Ser Ala Asp Ala Pro Ala Tyr Gln Gln Gly
545                 550                 555                 560

Gln Asn Gln Leu Tyr Asn Glu Leu Asn Leu Gly Arg Arg Glu Glu Tyr
                565                 570                 575

Asp Val Leu Asp Lys Arg Arg Gly Arg Asp Pro Glu Met Gly Gly Lys
            580                 585                 590

Pro Arg Arg Lys Asn Pro Gln Glu Gly Leu Tyr Asn Glu Leu Gln Lys
        595                 600                 605
```

```
Asp Lys Met Ala Glu Ala Tyr Ser Glu Ile Gly Met Lys Gly Glu Arg
    610                 615                 620

Arg Arg Gly Lys Gly His Asp Gly Leu Tyr Gln Gly Leu Ser Thr Ala
625                 630                 635                 640

Thr Lys Asp Thr Tyr Asp Ala Leu His Met Gln Ala Leu Pro Pro Arg
                645                 650                 655

<210> SEQ ID NO 70
<211> LENGTH: 1971
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 70
```

| | | | | | |
|---|---|---|---|---|---|
| atggactgga | tctggcgcat | cctcttcctc | gtcggcgctg | ctaccggcgc | tcattctgag | 60 |
| gtacaactgc | agcagtctgg | acctgaactg | aagaagcctg | agagacagt | caagatctcc | 120 |
| tgcaaggcct | ctgggtatcc | tttcacaaac | tatggaatga | actgggtgaa | gcaggctcca | 180 |
| ggacagggtt | taaagtggat | gggctggatt | aacacctcca | ctggagagtc | aacatttgct | 240 |
| gatgacttca | agggacggtt | tgacttctct | ttggaaacct | ctgccaacac | tgcctatttg | 300 |
| cagatcaaca | acctcaaaag | tgaagacatg | gctacatatt | tctgtgcaag | atgggaggtt | 360 |
| taccacggct | acgttcctta | ctggggccaa | gggaccacgg | tcaccgtttc | ctctggcggt | 420 |
| ggcggttctg | gtggcggtgg | ctccggcggt | ggcggttctg | acatccagct | gacccagtct | 480 |
| cacaaattcc | tgtccacttc | agtaggagac | agggtcagca | tcacctgcaa | ggccagtcag | 540 |
| gatgtgtata | atgctgttgc | ctggtatcaa | cagaaaccag | gacaatctcc | taaacttctg | 600 |
| atttactcgg | catcctcccg | gtacactgga | gtcccttctc | gcttcactgg | cagtggctct | 660 |
| gggccggatt | tcactttcac | catcagcagt | gtgcaggctg | aagacctggc | agtttatttc | 720 |
| tgtcagcaac | attttcgtac | tccattcacg | ttcggctcgg | gacaaaatt | ggagatcaaa | 780 |
| gctctagatc | tcgagcccaa | atcttgtgac | aaaactcaca | catgcccacc | gtgcccggat | 840 |
| cccaaatttt | gggtgctggt | ggtggttggt | ggagtcctgg | cttgctatag | cttgctagta | 900 |
| acagtggcct | ttattatttt | ctgggtggct | gctggcggac | ctggcgccgg | atctgctgct | 960 |
| cctgtgtcta | gcacaagcag | cctgcctctg | gccgccctga | acatgagagt | gcggagaagg | 1020 |
| ctgagcctgt | tcctgaacgt | gcggacacag | gtggccgccg | attggacagc | cctggccgag | 1080 |
| gaaatggact | cgagtacct | ggaaatccgg | cagctggaaa | cccaggccga | ccctacaggc | 1140 |
| agactgctgg | atgcttggca | gggcagacca | ggcgcttctg | tgggaaggct | gctggaactg | 1200 |
| ctgaccaagc | tgggcaggga | cgacgtgctg | ctggaactgg | ccctagcat | cgaagaggac | 1260 |
| tgccagaagt | acatcctgaa | gcagcagcag | gaagaggccg | agaagcctct | gcaggtggca | 1320 |
| gccgtggata | gcagcgtgcc | aagaacagcc | gagctggccg | gcatcaccac | cctggatgat | 1380 |
| cctctgggcc | acatgcccga | gagattcgac | gccttcatct | gctactgccc | cagcgacatc | 1440 |
| gtggaaaaga | aggtggccaa | gaagcccacc | aacaaggccc | ccacccccaa | gcaggaaccc | 1500 |
| caggaaatca | acttccccga | cgacctgccc | ggcagcaata | ctgctgcacc | cgtgcaggaa | 1560 |
| accctgcacg | gctgtcagcc | tgtgacccag | gaagatggca | agaaagccg | gatctctgtg | 1620 |
| caggaacgcc | agagagtgaa | gttcagcagg | agcgcagacg | cccccgcgta | ccagcagggc | 1680 |
| cagaaccagc | tctataacga | gctcaatcta | ggacgaagag | aggagtacga | tgttttggac | 1740 |
| aagagacgtg | gccgggaccc | tgagatgggg | ggaaagccga | agaggaagaa | ccctcaggaa | 1800 |

```
ggcctgtaca atgaactgca gaaagataag atggcggagg cctacagtga gattgggatg   1860
aaaggcgagc gccggagggg caaggggcac gatggccttt accagggtct cagtacagcc   1920
accaaggaca cctacgacgc ccttcacatg caggccctgc cccctcgcta a            1971
```

<210> SEQ ID NO 71
<211> LENGTH: 592
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 71

```
Met Asp Trp Ile Trp Arg Ile Leu Phe Leu Val Gly Ala Ala Thr Gly
1               5                   10                  15

Ala His Ser Glu Val Gln Leu Gln Gln Ser Gly Pro Glu Leu Lys Lys
            20                  25                  30

Pro Gly Glu Thr Val Lys Ile Ser Cys Lys Ala Ser Gly Tyr Pro Phe
        35                  40                  45

Thr Asn Tyr Gly Met Asn Trp Val Lys Gln Ala Pro Gly Gln Gly Leu
    50                  55                  60

Lys Trp Met Gly Trp Ile Asn Thr Ser Thr Gly Glu Ser Thr Phe Ala
65                  70                  75                  80

Asp Asp Phe Lys Gly Arg Phe Asp Phe Ser Leu Glu Thr Ser Ala Asn
                85                  90                  95

Thr Ala Tyr Leu Gln Ile Asn Asn Leu Lys Ser Glu Asp Met Ala Thr
            100                 105                 110

Tyr Phe Cys Ala Arg Trp Glu Val Tyr His Gly Tyr Val Pro Tyr Trp
        115                 120                 125

Gly Gln Gly Thr Thr Val Thr Val Ser Ser Gly Gly Gly Gly Ser Gly
    130                 135                 140

Gly Gly Gly Ser Gly Gly Gly Ser Asp Ile Gln Leu Thr Gln Ser
145                 150                 155                 160

His Lys Phe Leu Ser Thr Ser Val Gly Asp Arg Val Ser Ile Thr Cys
                165                 170                 175

Lys Ala Ser Gln Asp Val Tyr Asn Ala Val Ala Trp Tyr Gln Gln Lys
            180                 185                 190

Pro Gly Gln Ser Pro Lys Leu Leu Ile Tyr Ser Ala Ser Ser Arg Tyr
        195                 200                 205

Thr Gly Val Pro Ser Arg Phe Thr Gly Ser Gly Ser Gly Pro Asp Phe
    210                 215                 220

Thr Phe Thr Ile Ser Ser Val Gln Ala Glu Asp Leu Ala Val Tyr Phe
225                 230                 235                 240

Cys Gln Gln His Phe Arg Thr Pro Phe Thr Phe Gly Ser Gly Thr Lys
                245                 250                 255

Leu Glu Ile Lys Ala Leu Asp Leu Glu Pro Lys Ser Cys Asp Lys Thr
            260                 265                 270

His Thr Cys Pro Pro Cys Pro Asp Pro Lys Phe Trp Val Leu Val Val
        275                 280                 285

Val Gly Gly Val Leu Ala Cys Tyr Ser Leu Leu Val Thr Val Ala Phe
    290                 295                 300

Ile Ile Phe Trp Val Ala Ala Gly Gly Pro Gly Ala Gly Ser Ala Ala
305                 310                 315                 320

Pro Val Ser Ser Thr Ser Ser Leu Pro Leu Ala Ala Leu Asn Met Arg
```

325                 330                 335
Val Arg Arg Arg Leu Ser Leu Phe Leu Asn Val Arg Thr Gln Val Ala
            340                 345                 350

Ala Asp Trp Thr Ala Leu Ala Glu Glu Met Asp Phe Glu Tyr Leu Glu
        355                 360                 365

Ile Arg Gln Leu Glu Thr Gln Ala Asp Pro Thr Gly Arg Leu Leu Asp
    370                 375                 380

Ala Trp Gln Gly Arg Pro Gly Ala Ser Val Gly Arg Leu Leu Glu Leu
385                 390                 395                 400

Leu Thr Lys Leu Gly Arg Asp Asp Val Leu Leu Glu Leu Gly Pro Ser
            405                 410                 415

Ile Glu Glu Asp Cys Gln Lys Tyr Ile Leu Lys Gln Gln Glu Glu
        420                 425                 430

Ala Glu Lys Pro Leu Gln Val Ala Ala Val Asp Ser Ser Val Pro Arg
    435                 440                 445

Thr Ala Glu Leu Ala Gly Ile Thr Thr Leu Asp Asp Pro Leu Gly His
        450                 455                 460

Met Pro Glu Arg Phe Asp Ala Phe Ile Cys Tyr Cys Pro Ser Asp Ile
465                 470                 475                 480

Arg Val Lys Phe Ser Arg Ser Ala Asp Ala Pro Ala Tyr Gln Gln Gly
            485                 490                 495

Gln Asn Gln Leu Tyr Asn Glu Leu Asn Leu Gly Arg Arg Glu Glu Tyr
        500                 505                 510

Asp Val Leu Asp Lys Arg Arg Gly Arg Asp Pro Glu Met Gly Gly Lys
    515                 520                 525

Pro Arg Arg Lys Asn Pro Gln Glu Gly Leu Tyr Asn Glu Leu Gln Lys
530                 535                 540

Asp Lys Met Ala Glu Ala Tyr Ser Glu Ile Gly Met Lys Gly Glu Arg
545                 550                 555                 560

Arg Arg Gly Lys Gly His Asp Gly Leu Tyr Gln Gly Leu Ser Thr Ala
            565                 570                 575

Thr Lys Asp Thr Tyr Asp Ala Leu His Met Gln Ala Leu Pro Pro Arg
        580                 585                 590

<210> SEQ ID NO 72
<211> LENGTH: 1779
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 72
atggactgga tctggcgcat cctcttcctc gtcggcgctg ctaccggcgc tcattctgag      60
gtacaactgc agcagtctgg acctgaactg aagaagcctg agagacagtt caagatctcc     120
tgcaaggcct ctgggtatcc tttcacaaac tatggaatga actgggtgaa gcaggctcca     180
ggacagggtt taaagtggat gggctggatt aacacctcca ctggagagtc aacatttgct     240
gatgacttca agggacggtt tgacttctct ttggaaacct ctgccaacac tgcctatttg     300
cagatcaaca acctcaaaag tgaagacatg gctacatatt tctgtgcaag atgggaggtt     360
taccacggct acgttcctta ctggggccaa gggaccacgg tcaccgtttc ctctggcggt     420
ggcggttctg gtggcggtgg ctccggcggt ggcggttctg acatccagct gacccagtct     480
cacaaattcc tgtccacttc agtaggagac agggtcagca tcacctgcaa ggccagtcag     540

```
gatgtgtata atgctgttgc ctggtatcaa cagaaaccag acaatctcc taaacttctg    600 atttactcgg catcctcccg gtacactgga gtcccttctc gcttcactgg cagtggctct    660
gggccggatt tcactttcac catcagcagt gtgcaggctg aagacctggc agtttatttc    720
tgtcagcaac attttcgtac tccattcacg ttcggctcgg gacaaaatt ggagatcaaa    780 gctctagatc tcgagcccaa atcttgtgac aaaactcaca catgcccacc gtgcccggat    840
cccaaatttt gggtgctggt ggtggttggt ggagtcctgg cttgctatag cttgctagta    900
acagtggcct ttattatttt ctgggtggct gctggcggac ctggcgccgg atctgctgct    960
cctgtgtcta gcacaagcag cctgcctctg gccgccctga acatgagagt gcggagaagg   1020
ctgagcctgt tcctgaacgt gcggacacag gtggccgccg attggacagc cctggccgag   1080
gaaatggact cgagtacct ggaaatccgg cagctggaaa cccaggccga ccctacaggc   1140
agactgctgg atgcttggca gggcagacca ggcgcttctg tgggaaggct gctggaactg   1200
ctgaccaagc tgggcaggga cgacgtgctg ctggaactgg ccctagcat cgaagaggac   1260 tgccagaagt acatcctgaa gcagcagcag gaagaggcca gaagcctct gcaggtggca   1320 gccgtggata gcagcgtgcc aagaacagcc gagctggccg gcatcaccac cctggatgat   1380
cctctgggcc acatgcccga gagattcgac gccttcatct gctactgccc agcgacatc   1440 agagtgaagt tcagcaggag cgcagacgcc cccgcgtacc agcagggcca gaaccagctc   1500
tataacgagc tcaatctagg acgaagagag gagtacgatg tttggacaa gagacgtggc   1560 cgggaccctg agatgggggg aaagccgaga aggaagaacc ctcaggaagg cctgtacaat   1620
gaactgcaga aagataagat ggcggaggcc tacagtgaga ttgggatgaa aggcgagcgc   1680
cggaggggca aggggcacga tggccttac cagggtctca gtacagccac caaggacacc   1740
tacgacgccc ttcacatgca ggccctgccc cctcgctaa                           1779
```

<210> SEQ ID NO 73
<211> LENGTH: 483
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 73

```
Met Asp Trp Ile Trp Arg Ile Leu Phe Leu Val Gly Ala Ala Thr Gly
1               5                   10                  15

Ala His Ser Glu Val Gln Leu Gln Gln Ser Gly Pro Glu Leu Lys Lys
            20                  25                  30

Pro Gly Glu Thr Val Lys Ile Ser Cys Lys Ala Ser Gly Tyr Pro Phe
        35                  40                  45

Thr Asn Tyr Gly Met Asn Trp Val Lys Gln Ala Pro Gly Gln Gly Leu
    50                  55                  60

Lys Trp Met Gly Trp Ile Asn Thr Ser Thr Gly Glu Ser Thr Phe Ala
65                  70                  75                  80

Asp Asp Phe Lys Gly Arg Phe Asp Phe Ser Leu Glu Thr Ser Ala Asn
                85                  90                  95

Thr Ala Tyr Leu Gln Ile Asn Asn Leu Lys Ser Glu Asp Met Ala Thr
            100                 105                 110

Tyr Phe Cys Ala Arg Trp Glu Val Tyr His Gly Tyr Val Pro Tyr Trp
        115                 120                 125

Gly Gln Gly Thr Thr Val Thr Val Ser Ser Gly Gly Gly Gly Ser Gly
    130                 135                 140
```

Gly Gly Gly Ser Gly Gly Gly Ser Asp Ile Gln Leu Thr Gln Ser
145                 150                 155                 160

His Lys Phe Leu Ser Thr Ser Val Gly Asp Arg Val Ser Ile Thr Cys
                165                 170                 175

Lys Ala Ser Gln Asp Val Tyr Asn Ala Val Ala Trp Tyr Gln Gln Lys
            180                 185                 190

Pro Gly Gln Ser Pro Lys Leu Leu Ile Tyr Ser Ala Ser Ser Arg Tyr
        195                 200                 205

Thr Gly Val Pro Ser Arg Phe Thr Gly Ser Gly Ser Gly Pro Asp Phe
    210                 215                 220

Thr Phe Thr Ile Ser Ser Val Gln Ala Glu Asp Leu Ala Val Tyr Phe
225                 230                 235                 240

Cys Gln Gln His Phe Arg Thr Pro Phe Thr Phe Gly Ser Gly Thr Lys
                245                 250                 255

Leu Glu Ile Lys Ala Leu Asp Leu Glu Pro Lys Ser Cys Asp Lys Thr
            260                 265                 270

His Thr Cys Pro Pro Cys Pro Asp Pro Lys Phe Trp Val Leu Val Val
        275                 280                 285

Val Gly Gly Val Leu Ala Cys Tyr Ser Leu Leu Val Thr Val Ala Phe
    290                 295                 300

Ile Ile Phe Trp Val Lys Lys Val Ala Lys Lys Pro Thr Asn Lys Ala
305                 310                 315                 320

Pro His Pro Lys Gln Glu Pro Gln Glu Ile Asn Phe Pro Asp Asp Leu
                325                 330                 335

Pro Gly Ser Asn Thr Ala Ala Pro Val Gln Glu Thr Leu His Gly Cys
            340                 345                 350

Gln Pro Val Thr Gln Glu Asp Gly Lys Glu Ser Arg Ile Ser Val Gln
        355                 360                 365

Glu Arg Gln Arg Val Lys Phe Ser Arg Ser Ala Asp Ala Pro Ala Tyr
    370                 375                 380

Gln Gln Gly Gln Asn Gln Leu Tyr Asn Glu Leu Asn Leu Gly Arg Arg
385                 390                 395                 400

Glu Glu Tyr Asp Val Leu Asp Lys Arg Gly Arg Asp Pro Glu Met
                405                 410                 415

Gly Gly Lys Pro Arg Arg Lys Asn Pro Gln Glu Gly Leu Tyr Asn Glu
            420                 425                 430

Leu Gln Lys Asp Lys Met Ala Glu Ala Tyr Ser Glu Ile Gly Met Lys
        435                 440                 445

Gly Glu Arg Arg Arg Gly Lys Gly His Asp Gly Leu Tyr Gln Gly Leu
    450                 455                 460

Ser Thr Ala Thr Lys Asp Thr Tyr Asp Ala Leu His Met Gln Ala Leu
465                 470                 475                 480

Pro Pro Arg

<210> SEQ ID NO 74
<211> LENGTH: 1452
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 74
atggactgga tctggcgcat cctcttcctc gtcggcgctg ctaccggcgc tcattctgag    60

```
gtacaactgc agcagtctgg acctgaactg aagaagcctg agagacagt caagatctcc    120
tgcaaggcct ctgggtatcc tttcacaaac tatggaatga actgggtgaa gcaggctcca    180
ggacagggtt taaagtggat gggctggatt aacacctcca ctggagagtc aacatttgct    240
gatgacttca agggacggtt tgacttctct ttggaaacct ctgccaacac tgcctatttg    300
cagatcaaca acctcaaaag tgaagacatg gctacatatt tctgtgcaag atgggaggtt    360
taccacggct acgttcctta ctggggccaa gggaccacgg tcaccgtttc ctctggcggt    420
ggcggttctg gtggcggtgg ctccggcggt ggcggttctg acatccagct gacccagtct    480
cacaaattcc tgtccacttc agtaggagac agggtcagca tcacctgcaa ggccagtcag    540
gatgtgtata atgctgttgc ctggtatcaa cagaaaccag gacaatctcc taaacttctg    600
atttactcgg catcctcccg gtacactgga gtcccttctc gcttcactgg cagtggctct    660
gggccggatt tcactttcac catcagcagt gtgcaggctg aagacctggc agtttatttc    720
tgtcagcaac atttcgtac tccattcacg ttcggctcgg gacaaaatt ggagatcaaa    780
gctctagatc tcgagcccaa atcttgtgac aaaactcaca catgcccacc gtgcccggat    840
cccaaatttt gggtgctggt ggtggttggt ggagtcctgg cttgctatag cttgctagta    900
acagtggcct ttattatttt ctgggtgaag aaggtggcca agaagcccac caacaaggcc    960
ccccacccca gcaggaacc ccaggaaatc aacttccccg acgacctgcc cggcagcaat   1020
actgctgcac ccgtgcagga aaccctgcac ggctgtcagc ctgtgaccca ggaagatggc   1080
aaagaaagcc ggatctctgt gcaggaacgc agagagtga agttcagcag gagcgcagac   1140
gcccccgcgt accagcaggg ccagaaccag ctctataacg agctcaatct aggacgaaga   1200
gaggagtacg atgttttgga caagagacgt ggccgggacc ctgagatggg gggaaagccg   1260
agaaggaaga accctcagga aggcctgtac aatgaactgc agaaagataa gatggcggag   1320
gcctacagtg agattgggat gaaaggcgag cgccggaggg gcaaggggca cgatggcctt   1380
taccagggtc tcagtacagc caccaaggac acctacgacg cccttcacat gcaggccctg   1440
ccccctcgct aa                                                       1452
```

<210> SEQ ID NO 75
<211> LENGTH: 462
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 75

Met Asp Trp Ile Trp Arg Ile Leu Phe Leu Val Gly Ala Ala Thr Gly
1               5                   10                  15

Ala His Ser Glu Val Gln Leu Gln Gln Ser Gly Pro Glu Leu Lys Lys
            20                  25                  30

Pro Gly Glu Thr Val Lys Ile Ser Cys Lys Ala Ser Gly Tyr Pro Phe
        35                  40                  45

Thr Asn Tyr Gly Met Asn Trp Val Lys Gln Ala Pro Gly Gln Gly Leu
    50                  55                  60

Lys Trp Met Gly Trp Ile Asn Thr Ser Thr Gly Glu Ser Thr Phe Ala
65                  70                  75                  80

Asp Asp Phe Lys Gly Arg Phe Asp Phe Ser Leu Glu Thr Ser Ala Asn
                85                  90                  95

Thr Ala Tyr Leu Gln Ile Asn Asn Leu Lys Ser Glu Asp Met Ala Thr
            100                 105                 110

Tyr Phe Cys Ala Arg Trp Glu Val Tyr His Gly Tyr Pro Tyr Trp
            115                 120                 125
Gly Gln Gly Thr Thr Val Thr Val Ser Ser Gly Gly Gly Ser Gly
        130                 135                 140
Gly Gly Gly Ser Gly Gly Gly Ser Asp Ile Gln Leu Thr Gln Ser
145                 150                 155                 160
His Lys Phe Leu Ser Thr Ser Val Gly Asp Arg Val Ser Ile Thr Cys
                165                 170                 175
Lys Ala Ser Gln Asp Val Tyr Asn Ala Val Ala Trp Tyr Gln Gln Lys
                180                 185                 190
Pro Gly Gln Ser Pro Lys Leu Leu Ile Tyr Ser Ala Ser Ser Arg Tyr
            195                 200                 205
Thr Gly Val Pro Ser Arg Phe Thr Gly Ser Gly Ser Gly Pro Asp Phe
        210                 215                 220
Thr Phe Thr Ile Ser Ser Val Gln Ala Glu Asp Leu Ala Val Tyr Phe
225                 230                 235                 240
Cys Gln Gln His Phe Arg Thr Pro Phe Thr Phe Gly Ser Gly Thr Lys
                245                 250                 255
Leu Glu Ile Lys Ala Leu Asp Leu Glu Pro Lys Ser Cys Asp Lys Thr
            260                 265                 270
His Thr Cys Pro Pro Cys Pro Asp Pro Lys Phe Trp Val Leu Val Val
        275                 280                 285
Val Gly Gly Val Leu Ala Cys Tyr Ser Leu Leu Val Thr Val Ala Phe
        290                 295                 300
Ile Ile Phe Trp Val Arg Ser Lys Arg Ser Arg Leu Leu His Ser Asp
305                 310                 315                 320
Tyr Met Asn Met Thr Pro Arg Arg Pro Gly Pro Thr Arg Lys His Tyr
                325                 330                 335
Gln Pro Tyr Ala Pro Pro Arg Asp Phe Ala Ala Tyr Arg Ser Arg Val
            340                 345                 350
Lys Phe Ser Arg Ser Ala Asp Ala Pro Ala Tyr Gln Gln Gly Gln Asn
        355                 360                 365
Gln Leu Tyr Asn Glu Leu Asn Leu Gly Arg Arg Glu Glu Tyr Asp Val
        370                 375                 380
Leu Asp Lys Arg Arg Gly Arg Asp Pro Glu Met Gly Gly Lys Pro Arg
385                 390                 395                 400
Arg Lys Asn Pro Gln Glu Gly Leu Tyr Asn Glu Leu Gln Lys Asp Lys
                405                 410                 415
Met Ala Glu Ala Tyr Ser Glu Ile Gly Met Lys Gly Glu Arg Arg Arg
            420                 425                 430
Gly Lys Gly His Asp Gly Leu Tyr Gln Gly Leu Ser Thr Ala Thr Lys
        435                 440                 445
Asp Thr Tyr Asp Ala Leu His Met Gln Ala Leu Pro Pro Arg
450                 455                 460

<210> SEQ ID NO 76
<211> LENGTH: 1389
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 76
atggactgga tctggcgcat cctcttcctc gtcggcgctg ctaccggcgc tcattctgag     60

```
gtacaactgc agcagtctgg acctgaactg aagaagcctg agagacagt caagatctcc    120 tgcaaggcct ctgggtatcc tttcacaaac tatggaatga actgggtgaa gcaggctcca    180
ggacagggtt taaagtggat gggctggatt aacacctcca ctggagagtc aacatttgct    240
gatgacttca agggacggtt tgacttctct ttggaaacct ctgccaacac tgcctatttg    300
cagatcaaca acctcaaaag tgaagacatg gctacatatt tctgtgcaag atgggaggtt    360
taccacggct acgttcctta ctggggccaa gggaccacgg tcaccgtttc ctctggcggt    420
ggcggttctg gtggcggtgg ctccggcggt ggcggttctg acatccagct gacccagtct    480
cacaaattcc tgtccacttc agtaggagac agggtcagca tcacctgcaa ggccagtcag    540
gatgtgtata atgctgttgc ctggtatcaa cagaaaccag gacaatctcc taaacttctg    600
atttactcgg catcctcccg gtacactgga gtcccttctc gcttcactgg cagtggctct    660
gggccggatt tcactttcac catcagcagt gtgcaggctg aagacctggc agtttatttc    720
tgtcagcaac attttcgtac tccattcacg ttcggctcgg gacaaaatt ggagatcaaa    780 gctctagatc tcgagcccaa atcttgtgac aaaactcaca catgcccacc gtgcccggat    840
cccaaatttt gggtgctggt ggtggttggt ggagtcctgg cttgctatag cttgctagta    900
acagtggcct ttattatttt ctgggtgagg agtaagagga gcaggctcct gcacagtgac    960
tacatgaaca tgactccccg ccgcccgggg cccacccgca agcattacca gcccatgcc   1020 ccaccacgcg acttcgcagc ctatcgctcc agagtgaagt tcagcaggag cgcagacgcc   1080
cccgcgtacc agcagggcca gaaccagctc tataacgagc tcaatctagg acgaagagag   1140
gagtacgatg tttggacaa gagacgtggc cgggaccctg agatgggggg aaagccgaga   1200
aggaagaacc ctcaggaagg cctgtacaat gaactgcaga agataagat ggcggaggcc   1260 tacagtgaga ttgggatgaa aggcgagcgc cggagggca aggggcacga tggcctttac   1320
cagggtctca gtacagccac caaggacacc tacgacgccc ttcacatgca ggccctgccc   1380
cctcgctaa                                                          1389
```

<210> SEQ ID NO 77
<211> LENGTH: 761
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 77

```
Met Asp Trp Ile Trp Arg Ile Leu Phe Leu Val Gly Ala Ala Thr Gly
1               5                   10                  15

Ala His Ser Glu Val Gln Leu Gln Gln Ser Gly Pro Glu Leu Lys Lys
            20                  25                  30

Pro Gly Glu Thr Val Lys Ile Ser Cys Lys Ala Ser Gly Tyr Pro Phe
        35                  40                  45

Thr Asn Tyr Gly Met Asn Trp Val Lys Gln Ala Pro Gly Gln Gly Leu
    50                  55                  60

Lys Trp Met Gly Trp Ile Asn Thr Ser Thr Gly Glu Ser Thr Phe Ala
65                  70                  75                  80

Asp Asp Phe Lys Gly Arg Phe Asp Phe Ser Leu Glu Thr Ser Ala Asn
                85                  90                  95

Thr Ala Tyr Leu Gln Ile Asn Asn Leu Lys Ser Glu Asp Met Ala Thr
            100                 105                 110
```

```
Tyr Phe Cys Ala Arg Trp Glu Val Tyr His Gly Tyr Pro Tyr Trp
            115                 120                 125

Gly Gln Gly Thr Thr Val Thr Val Ser Ser Gly Gly Gly Ser Gly
130                 135                 140

Gly Gly Gly Ser Gly Gly Gly Ser Asp Ile Gln Leu Thr Gln Ser
145                 150                 155                 160

His Lys Phe Leu Ser Thr Ser Val Gly Asp Arg Val Ser Ile Thr Cys
                165                 170                 175

Lys Ala Ser Gln Asp Val Tyr Asn Ala Val Ala Trp Tyr Gln Gln Lys
            180                 185                 190

Pro Gly Gln Ser Pro Lys Leu Leu Ile Tyr Ser Ala Ser Ser Arg Tyr
        195                 200                 205

Thr Gly Val Pro Ser Arg Phe Thr Gly Ser Gly Ser Gly Pro Asp Phe
    210                 215                 220

Thr Phe Thr Ile Ser Ser Val Gln Ala Glu Asp Leu Ala Val Tyr Phe
225                 230                 235                 240

Cys Gln Gln His Phe Arg Thr Pro Phe Thr Phe Gly Ser Gly Thr Lys
                245                 250                 255

Leu Glu Ile Lys Ala Leu Asp Leu Glu Glu Arg Lys Cys Cys Val Glu
            260                 265                 270

Cys Pro Pro Cys Pro Gly Gln Pro Arg Glu Pro Gln Val Tyr Thr Leu
        275                 280                 285

Pro Pro Ser Arg Glu Glu Met Thr Lys Asn Gln Val Ser Leu Thr Cys
    290                 295                 300

Leu Val Lys Gly Phe Tyr Pro Ser Asp Ile Ser Val Glu Trp Glu Ser
305                 310                 315                 320

Asn Gly Gln Pro Glu Asn Asn Tyr Lys Thr Thr Pro Pro Met Leu Asp
                325                 330                 335

Ser Asp Gly Ser Phe Phe Leu Tyr Ser Lys Leu Thr Val Asp Lys Ser
            340                 345                 350

Arg Trp Gln Gln Gly Asn Val Phe Ser Cys Ser Val Met His Glu Ala
        355                 360                 365

Leu His Asn His Tyr Thr Gln Lys Ser Leu Ser Leu Ser Pro Gly Lys
    370                 375                 380

Asp Pro Lys Phe Trp Val Leu Val Val Val Gly Gly Val Leu Ala Cys
385                 390                 395                 400

Tyr Ser Leu Leu Val Thr Val Ala Phe Ile Ile Phe Trp Val Ala Ala
                405                 410                 415

Gly Gly Pro Gly Ala Gly Ser Ala Ala Pro Val Ser Thr Ser Ser
            420                 425                 430

Leu Pro Leu Ala Ala Leu Asn Met Arg Val Arg Arg Leu Ser Leu
        435                 440                 445

Phe Leu Asn Val Arg Thr Gln Val Ala Ala Asp Trp Thr Ala Leu Ala
    450                 455                 460

Glu Glu Met Asp Phe Glu Tyr Leu Glu Ile Arg Gln Leu Glu Thr Gln
465                 470                 475                 480

Ala Asp Pro Thr Gly Arg Leu Leu Asp Ala Trp Gln Gly Arg Pro Gly
                485                 490                 495

Ala Ser Val Gly Arg Leu Leu Glu Leu Leu Thr Lys Leu Gly Arg Asp
            500                 505                 510

Asp Val Leu Leu Glu Leu Gly Pro Ser Ile Glu Glu Asp Cys Gln Lys
        515                 520                 525

Tyr Ile Leu Lys Gln Gln Gln Glu Glu Ala Glu Lys Pro Leu Gln Val
```

```
                530                535                540
Ala Ala Val Asp Ser Ser Val Pro Arg Thr Ala Glu Leu Ala Gly Ile
545                550                555                560

Thr Thr Leu Asp Asp Pro Leu Gly His Met Pro Glu Arg Phe Asp Ala
                565                570                575

Phe Ile Cys Tyr Cys Pro Ser Asp Ile Val Glu Lys Lys Val Ala Lys
                580                585                590

Lys Pro Thr Asn Lys Ala Pro His Pro Lys Gln Glu Pro Gln Glu Ile
                595                600                605

Asn Phe Pro Asp Asp Leu Pro Gly Ser Asn Thr Ala Ala Pro Val Gln
610                615                620

Glu Thr Leu His Gly Cys Gln Pro Val Thr Gln Glu Asp Gly Lys Glu
625                630                635                640

Ser Arg Ile Ser Val Gln Glu Arg Gln Arg Val Lys Phe Ser Arg Ser
                645                650                655

Ala Asp Ala Pro Ala Tyr Gln Gln Gly Gln Asn Gln Leu Tyr Asn Glu
                660                665                670

Leu Asn Leu Gly Arg Arg Glu Glu Tyr Asp Val Leu Asp Lys Arg Arg
                675                680                685

Gly Arg Asp Pro Glu Met Gly Gly Lys Pro Arg Arg Lys Asn Pro Gln
690                695                700

Glu Gly Leu Tyr Asn Glu Leu Gln Lys Asp Lys Met Ala Glu Ala Tyr
705                710                715                720

Ser Glu Ile Gly Met Lys Gly Glu Arg Arg Gly Lys Gly His Asp
                725                730                735

Gly Leu Tyr Gln Gly Leu Ser Thr Ala Thr Lys Asp Thr Tyr Asp Ala
                740                745                750

Leu His Met Gln Ala Leu Pro Pro Arg
                755                760

<210> SEQ ID NO 78
<211> LENGTH: 2286
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 78
atggactgga tctggcgcat cctcttcctc gtcggcgctg ctaccggcgc tcattctgag      60
gtacaactgc agcagtctgg acctgaactg aagaagcctg agagacagt caagatctcc     120 tgcaaggcct ctgggtatcc tttcacaaac tatggaatga actgggtgaa gcaggctcca     180
ggacagggtt taaagtggat gggctggatt aacacctcca ctggagagtc aacatttgct     240
gatgacttca agggacggtt tgacttctct ttggaaacct ctgccaacac tgcctatttg     300
cagatcaaca acctcaaaag tgaagacatg gctacatatt tctgtgcaag atgggaggtt     360
taccacggct acgttcctta ctggggccaa gggaccacgg tcaccgtttc ctctggcggt     420
ggcggttctg gtggcggtgg ctccggcggt ggcggttctg acatccagct gacccagtct     480
cacaaattcc tgtccacttc agtaggagac agggtcagca tcacctgcaa ggccagtcag     540
gatgtgtata tgctgttgc ctggtatcaa cagaaaccag acaatctcc taaacttctg     600 atttactcgg catcctcccg gtacactgga gtcccttctc gcttcactgg cagtggctct     660
gggccggatt tcactttcac catcagcagt gtgcaggctg aagacctggc agtttatttc     720
```

```
tgtcagcaac attttcgtac tccattcacg ttcggctcgg ggacaaaatt ggagatcaaa    780
gctctagatc tcgaggagag aaaatgttgt gtggaatgtc caccatgccc cggccaaccc    840
cgggagccgc aggtgtacac actccccct agcagggagg agatgacaaa gaatcaggtg    900
tccctgacgt gtcttgtgaa ggggttttac cccagcgaca tatcggtgga atgggagagt    960
aacggccaac ccgagaacaa ctacaaaaca accccaccca tgttggactc cgatggctct   1020
ttctttctat attctaagct gaccgtggac aaatctagat ggcagcaagg caatgtcttc   1080
agttgctccg ttatgcatga ggccctgcac aatcactata cccagaagtc tctctcactg   1140
tctcccggta aggatcccaa attttgggtg ctggtggtgg ttggtggagt cctggcttgc   1200
tatagcttgc tagtaacagt ggcctttatt attttctggg tggctgctgg cggacctggc   1260
gccggatctg ctgctcctgt gtctagcaca agcagcctgc ctctggccgc cctgaacatg   1320
agagtgcgga gaaggctgag cctgttcctg aacgtgcgga cacaggtggc cgccgattgg   1380
acagccctgg ccgaggaaat ggacttcgag tacctggaaa tccggcagct ggaaacccag   1440
gccgacccta caggcagact gctggatgct tgcagggca gaccaggcgc ttctgtggga   1500
aggctgctgg aactgctgac caagctgggc agggacgacg tgctgctgga actgggccct   1560
agcatcgaag gactgcca gaagtacatc ctgaagcagc agcaggaaga ggccgagaag   1620
cctctgcagg tggcagccgt ggatagcagc gtgccaagaa cagccgagct ggccggcatc   1680
accaccctgg atgatcctct gggccacatg cccgagagat cgacgcctt catctgctac   1740 tgccccagcg acatcgtgga aagaaggtg gccaagaagc caccaacaa ggccccccac   1800 cccaagcagg aacccagga atcaacttc cccgacgacc tgcccggcag caatactgct   1860
gcacccgtgc aggaaaccct gcacggctgt cagcctgtga cccaggaaga tgcaaagaa   1920 agccggatct ctgtgcagga acgccagaga gtgaagttca gcaggagcgc agacgccccc   1980
gcgtaccagc agggccagaa ccagctctat aacgagctca atctaggacg aagagaggag   2040
tacgatgttt tggacaagag acgtggccgg gaccctgaga tgggggggaaa gccgagaagg   2100 aagaaccctc aggaaggcct gtacaatgaa ctgcagaaag ataagatggc ggaggcctac   2160
agtgagattg ggatgaaagg cgagcgccgg aggggcaagg ggcacgatgg cctttaccag   2220
ggtctcagta cagccaccaa ggacaccttac gacgcccttc acatgcaggc cctgcccct   2280 cgctaa                                                              2286
```

<210> SEQ ID NO 79  
<211> LENGTH: 873  
<212> TYPE: PRT  
<213> ORGANISM: Artificial Sequence  
<220> FEATURE:  
<223> OTHER INFORMATION: Description of Artificial Sequence: Synthetic  
    polypeptide

<400> SEQUENCE: 79

```
Met Asp Trp Ile Trp Arg Ile Leu Phe Leu Val Gly Ala Ala Thr Gly
  1               5                  10                  15

Ala His Ser Glu Val Gln Leu Gln Gln Ser Gly Pro Glu Leu Lys Lys
                 20                  25                  30

Pro Gly Glu Thr Val Lys Ile Ser Cys Lys Ala Ser Gly Tyr Pro Phe
             35                  40                  45

Thr Asn Tyr Gly Met Asn Trp Val Lys Gln Ala Pro Gly Gln Gly Leu
         50                  55                  60

Lys Trp Met Gly Trp Ile Asn Thr Ser Thr Gly Glu Ser Thr Phe Ala
 65                  70                  75                  80
```

```
Asp Asp Phe Lys Gly Arg Phe Asp Phe Ser Leu Glu Thr Ser Ala Asn
                85                  90                  95

Thr Ala Tyr Leu Gln Ile Asn Asn Leu Lys Ser Glu Asp Met Ala Thr
            100                 105                 110

Tyr Phe Cys Ala Arg Trp Glu Val Tyr His Gly Tyr Val Pro Tyr Trp
        115                 120                 125

Gly Gln Gly Thr Thr Val Thr Val Ser Ser Gly Gly Gly Gly Ser Gly
    130                 135                 140

Gly Gly Gly Ser Gly Gly Gly Ser Asp Ile Gln Leu Thr Gln Ser
145                 150                 155                 160

His Lys Phe Leu Ser Thr Ser Val Gly Asp Arg Val Ser Ile Thr Cys
                165                 170                 175

Lys Ala Ser Gln Asp Val Tyr Asn Ala Val Ala Trp Tyr Gln Gln Lys
            180                 185                 190

Pro Gly Gln Ser Pro Lys Leu Leu Ile Tyr Ser Ala Ser Ser Arg Tyr
        195                 200                 205

Thr Gly Val Pro Ser Arg Phe Thr Gly Ser Gly Ser Gly Pro Asp Phe
    210                 215                 220

Thr Phe Thr Ile Ser Ser Val Gln Ala Glu Asp Leu Ala Val Tyr Phe
225                 230                 235                 240

Cys Gln Gln His Phe Arg Thr Pro Phe Thr Phe Gly Ser Gly Thr Lys
                245                 250                 255

Leu Glu Ile Lys Ala Leu Asp Leu Glu Pro Lys Ser Pro Asp Lys Thr
            260                 265                 270

His Thr Cys Pro Pro Cys Pro Ala Pro Val Ala Gly Pro Ser Val
                275                 280                 285

Phe Leu Phe Pro Pro Lys Pro Lys Asp Thr Leu Met Ile Ser Arg Thr
    290                 295                 300

Pro Glu Val Thr Cys Val Val Val Asp Val Ser His Glu Asp Pro Glu
305                 310                 315                 320

Val Lys Phe Asn Trp Tyr Val Asp Gly Val Glu Val His Asn Ala Lys
                325                 330                 335

Thr Lys Pro Arg Glu Glu Gln Tyr Gln Ser Thr Tyr Arg Val Val Ser
            340                 345                 350

Val Leu Thr Val Leu His Gln Asp Trp Leu Asn Gly Lys Glu Tyr Lys
        355                 360                 365

Cys Lys Val Ser Asn Lys Ala Leu Pro Ala Pro Ile Glu Lys Thr Ile
    370                 375                 380

Ser Lys Ala Lys Gly Gln Pro Arg Glu Pro Gln Val Tyr Thr Leu Pro
385                 390                 395                 400

Pro Ser Arg Asp Glu Leu Thr Lys Asn Gln Val Ser Leu Thr Cys Leu
                405                 410                 415

Val Lys Gly Phe Tyr Pro Ser Asp Ile Ala Val Glu Trp Glu Ser Asn
            420                 425                 430

Gly Gln Pro Glu Asn Asn Tyr Lys Thr Thr Pro Pro Val Leu Asp Ser
        435                 440                 445

Asp Gly Ser Phe Phe Leu Tyr Ser Lys Leu Thr Val Asp Lys Ser Arg
    450                 455                 460

Trp Gln Gln Gly Asn Val Phe Ser Cys Ser Val Met His Glu Ala Leu
465                 470                 475                 480

His Asn His Tyr Thr Gln Lys Ser Leu Ser Leu Ser Pro Gly Lys Lys
                485                 490                 495
```

```
Asp Pro Lys Phe Trp Val Leu Val Val Gly Val Leu Ala Cys
            500                 505             510

Tyr Ser Leu Leu Val Thr Val Ala Phe Ile Ile Phe Trp Val Ala Ala
        515                 520             525

Gly Gly Pro Gly Ala Gly Ser Ala Ala Pro Val Ser Ser Thr Ser Ser
        530                 535             540

Leu Pro Leu Ala Ala Leu Asn Met Arg Val Arg Arg Leu Ser Leu
545                 550             555             560

Phe Leu Asn Val Arg Thr Gln Val Ala Ala Asp Trp Thr Ala Leu Ala
                565             570             575

Glu Glu Met Asp Phe Glu Tyr Leu Glu Ile Arg Gln Leu Glu Thr Gln
            580             585             590

Ala Asp Pro Thr Gly Arg Leu Leu Asp Ala Trp Gln Gly Arg Pro Gly
            595             600             605

Ala Ser Val Gly Arg Leu Leu Glu Leu Leu Thr Lys Leu Gly Arg Asp
        610             615             620

Asp Val Leu Leu Glu Leu Gly Pro Ser Ile Glu Glu Asp Cys Gln Lys
625             630             635             640

Tyr Ile Leu Lys Gln Gln Gln Glu Glu Ala Glu Lys Pro Leu Gln Val
                645             650             655

Ala Ala Val Asp Ser Ser Val Pro Arg Thr Ala Glu Leu Ala Gly Ile
            660             665             670

Thr Thr Leu Asp Asp Pro Leu Gly His Met Pro Glu Arg Phe Asp Ala
            675             680             685

Phe Ile Cys Tyr Cys Pro Ser Asp Ile Val Glu Lys Lys Val Ala Lys
            690             695             700

Lys Pro Thr Asn Lys Ala Pro His Pro Lys Gln Glu Pro Gln Glu Ile
705             710             715             720

Asn Phe Pro Asp Asp Leu Pro Gly Ser Asn Thr Ala Ala Pro Val Gln
                725             730             735

Glu Thr Leu His Gly Cys Gln Pro Val Thr Gln Glu Asp Gly Lys Glu
            740             745             750

Ser Arg Ile Ser Val Gln Glu Arg Gln Arg Val Lys Phe Ser Arg Ser
            755             760             765

Ala Asp Ala Pro Ala Tyr Gln Gln Gly Gln Asn Gln Leu Tyr Asn Glu
            770             775             780

Leu Asn Leu Gly Arg Arg Glu Glu Tyr Asp Val Leu Asp Lys Arg Arg
785             790             795             800

Gly Arg Asp Pro Glu Met Gly Gly Lys Pro Arg Arg Lys Asn Pro Gln
                805             810             815

Glu Gly Leu Tyr Asn Glu Leu Gln Lys Asp Lys Met Ala Glu Ala Tyr
            820             825             830

Ser Glu Ile Gly Met Lys Gly Glu Arg Arg Arg Gly Lys Gly His Asp
            835             840             845

Gly Leu Tyr Gln Gly Leu Ser Thr Ala Thr Lys Asp Thr Tyr Asp Ala
        850             855             860

Leu His Met Gln Ala Leu Pro Pro Arg
865                 870

<210> SEQ ID NO 80
<211> LENGTH: 2622
<212> TYPE: DNA
<213> ORGANISM: Artificial Sequence
<220> FEATURE:
<223> OTHER INFORMATION: Description of Artificial Sequence: Synthetic
``` polynucleotide

<400> SEQUENCE: 80

| | |
|---|---|
| atggactgga tctggcgcat cctcttcctc gtcggcgctg ctaccggcgc tcattctgag | 60 |
| gtacaactgc agcagtctgg acctgaactg aagaagcctg agagacagtc caagatctcc | 120 |
| tgcaaggcct ctgggtatcc tttcacaaac tatggaatga actgggtgaa gcaggctcca | 180 |
| ggacagggtt taaagtggat gggctggatt aacacctcca ctggagagtc aacatttgct | 240 |
| gatgacttca agggacggtt tgacttctct ttggaaacct ctgccaacac tgcctatttg | 300 |
| cagatcaaca acctcaaaag tgaagacatg gctacatatt tctgtgcaag atgggaggtt | 360 |
| taccacggct acgttcctta ctggggccaa gggaccacgg tcaccgtttc ctctggcggt | 420 |
| ggcggttctg gtggcggtgg ctccggcggt ggcggttctg acatccagct gacccagtct | 480 |
| cacaaattcc tgtccacttc agtaggagac agggtcagca tcacctgcaa ggccagtcag | 540 |
| gatgtgtata atgctgttgc ctggtatcaa cagaaaccag gacaatctcc taaacttctg | 600 |
| atttactcgg catcctcccg gtacactgga gtcccttctc gcttcactgg cagtggctct | 660 |
| gggccggatt tcactttcac catcagcagt gtgcaggctg aagacctggc agtttatttc | 720 |
| tgtcagcaac attttcgtac tccattcacg ttcggctcgg gacaaaatt ggagatcaaa | 780 |
| gctctagatc tcgagcccaa atctcctgac aaaactcaca catgcccacc gtgcccagca | 840 |
| cctcctgtgg ccgaccgtc agtcttcctc ttccccccaa acccaagga caccctcatg | 900 |
| atctcccgga cccctgaggt cacatgcgtg gtggtggacg tgagccacga agaccctgag | 960 |
| gtcaagttca actggtacgt ggacggcgtg gaggtgcata atgccaagac aaagccgcgg | 1020 |
| gaggagcagt accagagcac gtaccgtgtg gtcagcgtcc tcaccgtcct gcaccaggac | 1080 |
| tggctgaatg gcaaggagta caagtgcaag gtctccaaca agccctccc agcccccatc | 1140 |
| gagaaaacca tctccaaagc caaagggcag ccccgagaac acaggtgta caccctgccc | 1200 |
| ccatcccggg atgagctgac caagaaccag gtcagcctga cctgcctggt caaaggcttc | 1260 |
| tatcccagcg acatcgccgt ggagtgggag agcaatgggc aaccggagaa caactacaag | 1320 |
| accacgcctc ccgtgctgga ctccgacggc tccttcttcc tctacagcaa gctcaccgtg | 1380 |
| gacaagagca ggtggcagca ggggaacgtc ttctcatgct ccgtgatgca tgaggctctg | 1440 |
| cacaaccact acacgcagaa gagcctctcc ctgtctccgg gtaaaaaaga tcccaaattt | 1500 |
| tgggtgctgg tggtggttgg tggagtcctg gcttgctata gcttgctagt aacagtggcc | 1560 |
| tttattattt tctgggtggc tgctggcgga cctggcgccg atctgctgc tcctgtgtct | 1620 |
| agcacaagca gcctgcctct ggccgccctg aacatgagag tgcggagaag gctgagcctg | 1680 |
| ttcctgaacg tgcggacaca ggtggccgcc gattggacag ccctggccga ggaaatggac | 1740 |
| ttcgagtacc tggaaatccg gcagctggaa acccaggccg accctacagg cagactgctg | 1800 |
| gatgcttggc agggcagacc aggcgcttct gtgggaaggc tgctggaact gctgaccaag | 1860 |
| ctgggcaggg acgacgtgct gctggaactg ggccctagca tcgaagagga ctgccagaag | 1920 |
| tacatcctga agcagcagca ggaagaggcc gagaagcctc tgcaggtggc agccgtggat | 1980 |
| agcagcgtgc caagaacagc cgagctgcc ggcatcacca ccctggatga tcctctgggc | 2040 |
| cacatgcccg agagattcga cgccttcatc tgctactgcc ccagcgacat cgtggaaaag | 2100 |
| aaggtggcca agaagcccac caacaaggcc cccacccca agcaggaacc ccaggaaatc | 2160 |
| aacttccccg acgacctgcc cggcagcaat actgctgcac ccgtgcagga aaccctgcac | 2220 |
| ggctgtcagc ctgtgaccca ggaagatggc aaagaaagcc ggatctctgt gcaggaacgc | 2280 |

```
cagagagtga agttcagcag gagcgcagac gcccccgcgt accagcaggg ccagaaccag    2340
ctctataacg agctcaatct aggacgaaga gaggagtacg atgttttgga caagagacgt    2400
ggccgggacc ctgagatggg gggaaagccg agaaggaaga accctcagga aggcctgtac    2460
aatgaactgc agaaagataa gatggcgagg gcctacagtg agattgggat gaaaggcgag    2520
cgccggaggg gcaaggggca cgatggcctt taccagggtc tcagtacagc caccaaggac    2580
acctacgacg cccttcacat gcaggccctg ccccctcgct aa                      2622
```

<210> SEQ ID NO 81
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 81

```
Glu Arg Lys Cys Cys Val Glu Cys Pro Pro Cys Pro Gly Gln Pro Arg
1               5                   10                  15

Glu Pro Gln Val Tyr Thr Leu Pro Pro Ser Arg Glu Glu Met Thr Lys
            20                  25                  30

Asn Gln Val Ser Leu Thr Cys Leu Val Lys Gly Phe Tyr Pro Ser Asp
        35                  40                  45

Ile Ser Val Glu Trp Glu Ser Asn Gly Gln Pro Glu Asn Asn Tyr Lys
    50                  55                  60

Thr Thr Pro Pro Met Leu Asp Ser Asp Gly Ser Phe Phe Leu Tyr Ser
65                  70                  75                  80

Lys Leu Thr Val Asp Lys Ser Arg Trp Gln Gln Gly Asn Val Phe Ser
                85                  90                  95

Cys Ser Val Met His Glu Ala Leu His Asn His Tyr Thr Gln Lys Ser
            100                 105                 110

Leu Ser Leu Ser Pro Gly Lys
        115
```

<210> SEQ ID NO 82
<211> LENGTH: 357
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 82

```
gagagaaaat gttgtgtgga atgtccacca tgccccggcc aaccccggga gccgcaggtg     60
tacacactcc cccctagcag ggaggagatg acaaagaatc aggtgtccct gacgtgtctt    120 gtgaagggt tttaccccag cgacatatcg gtggaatggg agagtaacgg ccaacccgag    180
aacaactaca aaacaacccc acccatgttg gactccgatg gctctttctt tctatattct    240
aagctgaccg tggacaaatc tagatggcag caaggcaatg tcttcagttg ctccgttatg    300
catgaggccc tgcacaatca ctatacccag aagtctctct cactgtctcc cggtaag     357
```

<210> SEQ ID NO 83
<211> LENGTH: 232
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 83

```
Glu Pro Lys Ser Cys Asp Lys Thr His Thr Cys Pro Pro Cys Pro Ala
1               5                   10                  15

Pro Glu Leu Leu Gly Gly Pro Ser Val Phe Leu Phe Pro Pro Lys Pro
            20                  25                  30

Lys Asp Thr Leu Met Ile Ser Arg Thr Pro Glu Val Thr Cys Val Val
        35                  40                  45

Val Asp Val Ser His Glu Asp Pro Glu Val Lys Phe Asn Trp Tyr Val
    50                  55                  60

Asp Gly Val Glu Val His Asn Ala Lys Thr Lys Pro Arg Glu Glu Gln
65                  70                  75                  80

Tyr Asn Ser Thr Tyr Arg Val Val Ser Val Leu Thr Val Leu His Gln
                85                  90                  95

Asp Trp Leu Asn Gly Lys Glu Tyr Lys Cys Lys Val Ser Asn Lys Ala
            100                 105                 110

Leu Pro Ala Pro Ile Glu Lys Thr Ile Ser Lys Ala Lys Gly Gln Pro
        115                 120                 125

Arg Glu Pro Gln Val Tyr Thr Leu Pro Pro Ser Arg Asp Glu Leu Thr
130                 135                 140

Lys Asn Gln Val Ser Leu Thr Cys Leu Val Lys Gly Phe Tyr Pro Ser
145                 150                 155                 160

Asp Ile Ala Val Glu Trp Glu Ser Asn Gly Gln Pro Glu Asn Asn Tyr
                165                 170                 175

Lys Thr Thr Pro Pro Val Leu Asp Ser Asp Gly Ser Phe Phe Leu Tyr
            180                 185                 190

Ser Lys Leu Thr Val Asp Lys Ser Arg Trp Gln Gln Gly Asn Val Phe
        195                 200                 205

Ser Cys Ser Val Met His Glu Ala Leu His Asn His Tyr Thr Gln Lys
210                 215                 220

Ser Leu Ser Leu Ser Pro Gly Lys
225                 230
```

<210> SEQ ID NO 84
<211> LENGTH: 231
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 84

```
Glu Pro Lys Ser Pro Asp Lys Thr His Thr Cys Pro Pro Cys Pro Ala
1               5                   10                  15

Pro Pro Val Ala Gly Pro Ser Val Phe Leu Phe Pro Pro Lys Pro Lys
            20                  25                  30

Asp Thr Leu Met Ile Ser Arg Thr Pro Glu Val Thr Cys Val Val
        35                  40                  45

Asp Val Ser His Glu Asp Pro Glu Val Lys Phe Asn Trp Tyr Val Asp
    50                  55                  60

Gly Val Glu Val His Asn Ala Lys Thr Lys Pro Arg Glu Glu Gln Tyr
65                  70                  75                  80

Gln Ser Thr Tyr Arg Val Val Ser Val Leu Thr Val Leu His Gln Asp
                85                  90                  95

Trp Leu Asn Gly Lys Glu Tyr Lys Cys Lys Val Ser Asn Lys Ala Leu
            100                 105                 110
```

```
Pro Ala Pro Ile Glu Lys Thr Ile Ser Lys Ala Lys Gly Gln Pro Arg
        115                 120                 125
Glu Pro Gln Val Tyr Thr Leu Pro Pro Ser Arg Asp Glu Leu Thr Lys
    130                 135                 140
Asn Gln Val Ser Leu Thr Cys Leu Val Lys Gly Phe Tyr Pro Ser Asp
145                 150                 155                 160
Ile Ala Val Glu Trp Glu Ser Asn Gly Gln Pro Glu Asn Asn Tyr Lys
                165                 170                 175
Thr Thr Pro Pro Val Leu Asp Ser Asp Gly Ser Phe Phe Leu Tyr Ser
            180                 185                 190
Lys Leu Thr Val Asp Lys Ser Arg Trp Gln Gln Gly Asn Val Phe Ser
        195                 200                 205
Cys Ser Val Met His Glu Ala Leu His Asn His Tyr Thr Gln Lys Ser
    210                 215                 220
Leu Ser Leu Ser Pro Gly Lys
225                 230
```

<210> SEQ ID NO 85
<211> LENGTH: 693
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 85

```
gagcccaaat ctcctgacaa aactcacaca tgcccaccgt gcccagcacc tcctgtggcc    60
ggaccgtcag tcttcctctt ccccccaaaa cccaaggaca ccctcatgat ctcccggacc   120
cctgaggtca catgcgtggt ggtggacgtg agccacgaag accctgaggt caagttcaac   180
tggtacgtgg acggcgtgga ggtgcataat gccaagacaa agccgcggga ggagcagtac   240
cagagcacgt accgtgtggt cagcgtcctc accgtcctgc accaggactg gctgaatggc   300
aaggagtaca agtgcaaggt ctccaacaaa gccctcccag cccccatcga gaaaaccatc   360
tccaaagcca agggcagccc cgagaaccca caggtgtaca ccctgccccc atcccgggat   420
gagctgacca agaaccaggt cagcctgacc tgcctggtca aaggcttcta tcccagcgac   480
atcgccgtgg agtgggagag caatgggcaa ccggagaaca actacaagac cacgcctccc   540
gtgctggact ccgacggctc cttcttcctc tacagcaagc tcaccgtgga caagagcagg   600
tggcagcagg ggaacgtctt ctcatgctcc gtgatgcatg aggctctgca caaccactac   660
acgcagaaga gcctctccct gtctccgggt aaa                                693
```

<210> SEQ ID NO 86
<211> LENGTH: 15
<212> TYPE: PRT
<213> ORGANISM: Unknown
<220> FEATURE:
<223> OTHER INFORMATION: Description of Unknown: IgG1 sequence

<400> SEQUENCE: 86

```
Glu Pro Lys Ser Pro Asp Lys Thr His Thr Cys Pro Pro Cys Pro
1               5                   10                  15
```

<210> SEQ ID NO 87
<211> LENGTH: 45
<212> TYPE: DNA
<213> ORGANISM: Unknown

```
<220> FEATURE:
<223> OTHER INFORMATION: Description of Unknown:
      IgG1 sequence

<400> SEQUENCE: 87
gagcccaaat ctcctgacaa aactcacaca tgcccaccgt gccca                45

<210> SEQ ID NO 88
<211> LENGTH: 659
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 88

Met Asp Trp Ile Trp Arg Ile Leu Phe Leu Val Gly Ala Ala Thr Gly
1               5                   10                  15

Ala His Ser Glu Val Gln Leu Gln Gln Ser Gly Pro Glu Leu Lys Lys
                20                  25                  30

Pro Gly Glu Thr Val Lys Ile Ser Cys Lys Ala Ser Gly Tyr Pro Phe
            35                  40                  45

Thr Asn Tyr Gly Met Asn Trp Val Lys Gln Ala Pro Gly Gln Gly Leu
        50                  55                  60

Lys Trp Met Gly Trp Ile Asn Thr Ser Thr Gly Glu Ser Thr Phe Ala
65                  70                  75                  80

Asp Asp Phe Lys Gly Arg Phe Asp Phe Ser Leu Glu Thr Ser Ala Asn
                85                  90                  95

Thr Ala Tyr Leu Gln Ile Asn Asn Leu Lys Ser Glu Asp Met Ala Thr
            100                 105                 110

Tyr Phe Cys Ala Arg Trp Glu Val Tyr His Gly Tyr Val Pro Tyr Trp
        115                 120                 125

Gly Gln Gly Thr Thr Val Thr Val Ser Ser Gly Gly Gly Gly Ser Gly
    130                 135                 140

Gly Gly Gly Ser Gly Gly Gly Gly Ser Asp Ile Gln Leu Thr Gln Ser
145                 150                 155                 160

His Lys Phe Leu Ser Thr Ser Val Gly Asp Arg Val Ser Ile Thr Cys
                165                 170                 175

Lys Ala Ser Gln Asp Val Tyr Asn Ala Val Ala Trp Tyr Gln Gln Lys
            180                 185                 190

Pro Gly Gln Ser Pro Lys Leu Leu Ile Tyr Ser Ala Ser Ser Arg Tyr
        195                 200                 205

Thr Gly Val Pro Ser Arg Phe Thr Gly Ser Gly Ser Gly Pro Asp Phe
    210                 215                 220

Thr Phe Thr Ile Ser Ser Val Gln Ala Glu Asp Leu Ala Val Tyr Phe
225                 230                 235                 240

Cys Gln Gln His Phe Arg Thr Pro Phe Thr Phe Gly Ser Gly Thr Lys
                245                 250                 255

Leu Glu Ile Lys Ala Leu Asp Leu Glu Pro Lys Ser Cys Asp Lys Thr
            260                 265                 270

His Thr Cys Pro Pro Cys Pro Asp Pro Lys Cys Asp Ile Tyr Ile Trp
        275                 280                 285

Ala Pro Leu Ala Gly Thr Cys Gly Val Leu Leu Leu Ser Leu Val Ile
    290                 295                 300

Thr Leu Tyr Cys Asn His Arg Asn Ala Ala Gly Gly Pro Gly Ala Gly
305                 310                 315                 320
```

```
Ser Ala Ala Pro Val Ser Ser Thr Ser Ser Leu Pro Leu Ala Ala Leu
                325                 330                 335

Asn Met Arg Val Arg Arg Arg Leu Ser Leu Phe Leu Asn Val Arg Thr
            340                 345                 350

Gln Val Ala Ala Asp Trp Thr Ala Leu Ala Glu Glu Met Asp Phe Glu
        355                 360                 365

Tyr Leu Glu Ile Arg Gln Leu Glu Thr Gln Ala Asp Pro Thr Gly Arg
    370                 375                 380

Leu Leu Asp Ala Trp Gln Gly Arg Pro Gly Ala Ser Val Gly Arg Leu
385                 390                 395                 400

Leu Glu Leu Leu Thr Lys Leu Gly Arg Asp Asp Val Leu Leu Glu Leu
                405                 410                 415

Gly Pro Ser Ile Glu Glu Asp Cys Gln Lys Tyr Ile Leu Lys Gln Gln
            420                 425                 430

Gln Glu Glu Ala Glu Lys Pro Leu Gln Val Ala Ala Val Asp Ser Ser
        435                 440                 445

Val Pro Arg Thr Ala Glu Leu Ala Gly Ile Thr Thr Leu Asp Asp Pro
    450                 455                 460

Leu Gly His Met Pro Glu Arg Phe Asp Ala Phe Ile Cys Tyr Cys Pro
465                 470                 475                 480

Ser Asp Ile Val Glu Lys Lys Val Ala Lys Lys Pro Thr Asn Lys Ala
                485                 490                 495

Pro His Pro Lys Gln Glu Pro Gln Glu Ile Asn Phe Pro Asp Asp Leu
            500                 505                 510

Pro Gly Ser Asn Thr Ala Ala Pro Val Gln Glu Thr Leu His Gly Cys
        515                 520                 525

Gln Pro Val Thr Gln Glu Asp Gly Lys Glu Ser Arg Ile Ser Val Gln
    530                 535                 540

Glu Arg Gln Arg Val Lys Phe Ser Arg Ser Ala Asp Ala Pro Ala Tyr
545                 550                 555                 560

Gln Gln Gly Gln Asn Gln Leu Tyr Asn Glu Leu Asn Leu Gly Arg Arg
                565                 570                 575

Glu Glu Tyr Asp Val Leu Asp Lys Arg Arg Gly Arg Asp Pro Glu Met
            580                 585                 590

Gly Gly Lys Pro Arg Arg Lys Asn Pro Gln Glu Gly Leu Tyr Asn Glu
        595                 600                 605

Leu Gln Lys Asp Lys Met Ala Glu Ala Tyr Ser Glu Ile Gly Met Lys
    610                 615                 620

Gly Glu Arg Arg Arg Gly Lys Gly His Asp Gly Leu Tyr Gln Gly Leu
625                 630                 635                 640

Ser Thr Ala Thr Lys Asp Thr Tyr Asp Ala Leu His Met Gln Ala Leu
                645                 650                 655

Pro Pro Arg

<210> SEQ ID NO 89
<211> LENGTH: 1980
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 89
atggactgga tctggcgcat cctcttcctc gtcggcgctg ctaccggcgc tcattctgag      60
gtacaactgc agcagtctgg acctgaactg aagaagcctg gagagacagt caagatctcc     120
```

```
tgcaaggcct ctgggtatcc tttcacaaac tatggaatga actgggtgaa gcaggctcca    180
ggacagggtt taaagtggat gggctggatt aacacctcca ctggagagtc aacatttgct    240
gatgacttca agggacggtt tgacttctct ttggaaacct ctgccaacac tgcctatttg    300
cagatcaaca acctcaaaag tgaagacatg gctacatatt tctgtgcaag atgggaggtt    360
taccacggct acgttcctta ctggggccaa gggaccacgg tcaccgtttc ctctggcggt    420
ggcggttctg gtggcggtgg ctccggcggt ggcggttctg acatccagct gacccagtct    480
cacaaattcc tgtccacttc agtaggagac agggtcagca tcacctgcaa ggccagtcag    540
gatgtgtata atgctgttgc ctggtatcaa cagaaaccag gacaatctcc taaacttctg    600
atttactcgg catcctcccg gtacactgga gtccttctc gcttcactgg cagtggctct    660
gggccggatt tcactttcac catcagcagt gtgcaggctg aagacctggc agtttatttc    720
tgtcagcaac atttcgtac tccattcacg ttcggctcgg gacaaaatt ggagatcaaa    780
gctctagatc tcgagcccaa atcttgtgac aaaactcaca catgcccacc gtgcccggat    840
cccaagtgcg acatctacat ctgggcccct ctggccggca catgtggcgt gctgctgctg    900
agcctcgtga tcaccctgta ctgcaaccac cggaacgctg ctgcggacc tggcgccgga    960
tctgctgctc ctgtgtctag cacaagcagc ctgcctctgg ccgccctgaa catgagagtg    1020
cggagaaggc tgagcctgtt cctgaacgtg cggacacagg tggccgccga ttggacagcc    1080
ctggccgagg aaatggactt cgagtacctg gaaatccggc agctggaaac ccaggccgac    1140
cctacaggca gactgctgga tgcttggcag ggcagaccag cgcttctgt gggaaggctg    1200
ctggaactgc tgaccaagct gggcagggac gacgtgctgc tggaactggg ccctagcatc    1260
gaagaggact gccagaagta catcctgaag cagcagcagg aagaggccga gaagcctctg    1320
caggtggcag ccgtggatag cagcgtgcca agaacagccg agctggccgg catcaccacc    1380
ctggatgatc ctctgggcca catgcccgag agattcgacg ccttcatctg ctactgcccc    1440
agcgacatcg tggaaaagaa ggtggccaag aagcccacca caaggcccc ccaccccaag    1500
caggaacccc aggaaatcaa cttcccccga gacctgcccg gcagcaatac tgctgcaccc    1560
gtgcaggaaa ccctgcacgg ctgtcagcct gtgacccagg aagatggcaa agaaagccgg    1620
atctctgtgc aggaacgcca gagagtgaag ttcagcagga gcgcagacgc ccccgcgtac    1680
cagcagggcc agaaccagct ctataacgag ctcaatctag gacgaagaga ggagtacgat    1740
gttttggaca gagacgtggc ccgggaccct gagatggggg gaaagccgag aaggaagaac    1800
cctcaggaag gcctgtacaa tgaactgcag aaagataaga tggcggaggc ctacagtgag    1860
attgggatga aggcgagcg ccggaggggc aaggggcacg atggcctta ccagggtctc    1920
agtacagcca ccaaggacac ctacgacgcc cttcacatgc aggccctgcc ccctcgctaa    1980
```

<210> SEQ ID NO 90
<211> LENGTH: 686
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 90

Met Asp Trp Ile Trp Arg Ile Leu Phe Leu Val Gly Ala Ala Thr Gly
1               5                   10                  15

Ala His Ser Glu Val Gln Leu Gln Gln Ser Gly Pro Glu Leu Lys Lys
            20                  25                  30

```
Pro Gly Glu Thr Val Lys Ile Ser Cys Lys Ala Ser Gly Tyr Pro Phe
        35                  40                  45

Thr Asn Tyr Gly Met Asn Trp Val Lys Gln Ala Pro Gly Gln Gly Leu
    50                  55                  60

Lys Trp Met Gly Trp Ile Asn Thr Ser Thr Gly Glu Ser Thr Phe Ala
65                  70                  75                  80

Asp Asp Phe Lys Gly Arg Phe Asp Phe Ser Leu Glu Thr Ser Ala Asn
                85                  90                  95

Thr Ala Tyr Leu Gln Ile Asn Asn Leu Lys Ser Glu Asp Met Ala Thr
                100                 105                 110

Tyr Phe Cys Ala Arg Trp Glu Val Tyr His Gly Tyr Val Pro Tyr Trp
                115                 120                 125

Gly Gln Gly Thr Thr Val Thr Val Ser Ser Gly Gly Gly Gly Ser Gly
                130                 135                 140

Gly Gly Gly Ser Gly Gly Gly Ser Asp Ile Gln Leu Thr Gln Ser
145                 150                 155                 160

His Lys Phe Leu Ser Thr Ser Val Gly Asp Arg Val Ser Ile Thr Cys
                165                 170                 175

Lys Ala Ser Gln Asp Val Tyr Asn Ala Val Ala Trp Tyr Gln Gln Lys
                180                 185                 190

Pro Gly Gln Ser Pro Lys Leu Leu Ile Tyr Ser Ala Ser Ser Arg Tyr
                195                 200                 205

Thr Gly Val Pro Ser Arg Phe Thr Gly Ser Gly Ser Gly Pro Asp Phe
                210                 215                 220

Thr Phe Thr Ile Ser Ser Val Gln Ala Glu Asp Leu Ala Val Tyr Phe
225                 230                 235                 240

Cys Gln Gln His Phe Arg Thr Pro Phe Thr Phe Gly Ser Gly Thr Lys
                245                 250                 255

Leu Glu Ile Lys Ala Leu Pro Ala Lys Pro Thr Thr Thr Pro Ala Pro
                260                 265                 270

Arg Pro Pro Thr Pro Ala Pro Thr Ile Ala Ser Gln Pro Leu Ser Leu
                275                 280                 285

Arg Pro Glu Ala Cys Arg Pro Ala Ala Gly Gly Ala Val His Thr Arg
                290                 295                 300

Gly Leu Asp Phe Ala Cys Asp Ile Tyr Ile Trp Ala Pro Leu Ala Gly
305                 310                 315                 320

Thr Cys Gly Val Leu Leu Leu Ser Leu Val Ile Thr Leu Tyr Cys Asn
                325                 330                 335

His Arg Asn Ala Ala Gly Gly Pro Gly Ala Gly Ser Ala Ala Pro Val
                340                 345                 350

Ser Ser Thr Ser Ser Leu Pro Leu Ala Ala Leu Asn Met Arg Val Arg
                355                 360                 365

Arg Arg Leu Ser Leu Phe Leu Asn Val Arg Thr Gln Val Ala Ala Asp
                370                 375                 380

Trp Thr Ala Leu Ala Glu Met Asp Phe Glu Tyr Leu Glu Ile Arg
385                 390                 395                 400

Gln Leu Glu Thr Gln Ala Asp Pro Thr Gly Arg Leu Leu Asp Ala Trp
                405                 410                 415

Gln Gly Arg Pro Gly Ala Ser Val Gly Arg Leu Leu Glu Leu Leu Thr
                420                 425                 430

Lys Leu Gly Arg Asp Asp Val Leu Leu Glu Leu Gly Pro Ser Ile Glu
                435                 440                 445
```

Glu Asp Cys Gln Lys Tyr Ile Leu Lys Gln Gln Glu Glu Ala Glu
                450                 455                 460

Lys Pro Leu Gln Val Ala Ala Val Asp Ser Ser Val Pro Arg Thr Ala
465                 470                 475                 480

Glu Leu Ala Gly Ile Thr Thr Leu Asp Asp Pro Leu Gly His Met Pro
                485                 490                 495

Glu Arg Phe Asp Ala Phe Ile Cys Tyr Cys Pro Ser Asp Ile Val Glu
            500                 505                 510

Lys Lys Val Ala Lys Lys Pro Thr Asn Lys Ala Pro His Pro Lys Gln
            515                 520                 525

Glu Pro Gln Glu Ile Asn Phe Pro Asp Leu Pro Gly Ser Asn Thr
530                 535                 540

Ala Ala Pro Val Gln Glu Thr Leu His Gly Cys Gln Pro Val Thr Gln
545                 550                 555                 560

Glu Asp Gly Lys Glu Ser Arg Ile Ser Val Gln Arg Gln Arg Val
                565                 570                 575

Lys Phe Ser Arg Ser Ala Asp Ala Pro Ala Tyr Gln Gln Gly Gln Asn
            580                 585                 590

Gln Leu Tyr Asn Glu Leu Asn Leu Gly Arg Arg Glu Glu Tyr Asp Val
        595                 600                 605

Leu Asp Lys Arg Arg Gly Arg Asp Pro Glu Met Gly Gly Lys Pro Arg
610                 615                 620

Arg Lys Asn Pro Gln Glu Gly Leu Tyr Asn Glu Leu Gln Lys Asp Lys
625                 630                 635                 640

Met Ala Glu Ala Tyr Ser Glu Ile Gly Met Lys Gly Glu Arg Arg Arg
                645                 650                 655

Gly Lys Gly His Asp Gly Leu Tyr Gln Gly Leu Ser Thr Ala Thr Lys
            660                 665                 670

Asp Thr Tyr Asp Ala Leu His Met Gln Ala Leu Pro Pro Arg
        675                 680                 685

<210> SEQ ID NO 91
<211> LENGTH: 2061
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 91
atggactgga tctggcgcat cctcttcctc gtcggcgctg ctaccggcgc tcattctgag     60
gtacaactgc agcagtctgg acctgaactg aagaagcctg agagacagt caagatctcc    120 tgcaaggcct ctgggtatcc tttcacaaac tatggaatga actgggtgaa gcaggctcca    180
ggacagggtt taaagtggat gggctggatt aacacctcca ctggagagtc aacatttgct    240
gatgacttca aggacggtt tgacttctct ttggaaacct ctgccaacac tgcctatttg    300
cagatcaaca acctcaaaag tgaagacatg gctacatatt tctgtgcaag atgggaggtt    360
taccacggct acgttcctta ctggggccaa gggaccacgg tcaccgtttc ctctggcggt    420
ggcggttctg gtggcggtgg ctccggcggt ggcggttctg acatccagct gacccagtct    480
cacaaattcc tgtccacttc agtaggagac agggtcagca tcacctgcaa ggccagtcag    540
gatgtgtata atgctgttgc ctggtatcaa cagaaaccag acaatctccc taaacttctg    600
atttactcgg catcctcccg gtacactgga gtcccttctc gcttcactgg cagtggctct    660
gggccggatt tcactttcac catcagcagt gtgcaggctg aagacctggc agtttatttc    720

```
tgtcagcaac attttcgtac tccattcacg ttcggctcgg ggacaaaatt ggagatcaaa    780
gctctaccag ccaagcccac cacaacccct gctcctagac ctcctacccc agcccctacc    840
attgcctccc agccactgtc tctgaggccc gaggcttgta gacctgctgc aggcggagcc    900
gtgcacacca gaggactgga tttcgcctgc gacatctata tctgggcccc tctggccggc    960
acctgtggcg tgctgctgct gtcactcgtg atcaccctgt actgcaacca ccggaacgct   1020
gctggcggac ctggcgccgg atctgctgct cctgtgtcta gcacaagcag cctgcctctg   1080
gccgccctga acatgagagt gcggagaagg ctgagcctgt cctgaacgt gcggacacag    1140
```

-continued

```
Tyr Phe Cys Ala Arg Trp Glu Val Tyr His Gly Tyr Pro Tyr Trp
            115                 120                 125

Gly Gln Gly Thr Thr Val Thr Val Ser Ser Gly Gly Gly Ser Gly
            130                 135                 140

Gly Gly Gly Ser Gly Gly Gly Ser Asp Ile Gln Leu Thr Gln Ser
145                 150                 155                 160

His Lys Phe Leu Ser Thr Ser Val Gly Asp Arg Val Ser Ile Thr Cys
            165                 170                 175

Lys Ala Ser Gln Asp Val Tyr Asn Ala Val Ala Trp Tyr Gln Gln Lys
            180                 185                 190

Pro Gly Gln Ser Pro Lys Leu Leu Ile Tyr Ser Ala Ser Ser Arg Tyr
            195                 200                 205

Thr Gly Val Pro Ser Arg Phe Thr Gly Ser Gly Ser Gly Pro Asp Phe
            210                 215                 220

Thr Phe Thr Ile Ser Ser Val Gln Ala Glu Asp Leu Ala Val Tyr Phe
225                 230                 235                 240

Cys Gln Gln His Phe Arg Thr Pro Phe Thr Phe Gly Ser Gly Thr Lys
            245                 250                 255

Leu Glu Ile Lys Ala Leu Pro Ala Lys Pro Thr Thr Thr Pro Ala Pro
            260                 265                 270

Arg Pro Pro Thr Pro Ala Pro Thr Ile Ala Ser Gln Pro Leu Ser Leu
            275                 280                 285

Arg Pro Glu Ala Cys Arg Pro Ala Ala Gly Gly Ala Val His Thr Arg
            290                 295                 300

Gly Leu Asp Phe Ala Cys Asp Ile Tyr Ile Trp Ala Pro Leu Ala Gly
305                 310                 315                 320

Thr Cys Gly Val Leu Leu Leu Ser Leu Val Ile Thr Leu Tyr Cys Asn
            325                 330                 335

His Arg Asn Arg Arg Val Cys Lys Cys Pro Arg Pro Val Val Ala
            340                 345                 350

Ala Gly Gly Pro Gly Ala Gly Ser Ala Ala Pro Val Ser Ser Thr Ser
            355                 360                 365

Ser Leu Pro Leu Ala Ala Leu Asn Met Arg Val Arg Arg Leu Ser
370                 375                 380

Leu Phe Leu Asn Val Arg Thr Gln Val Ala Ala Asp Trp Thr Ala Leu
385                 390                 395                 400

Ala Glu Glu Met Asp Phe Glu Tyr Leu Glu Ile Arg Gln Leu Glu Thr
            405                 410                 415

Gln Ala Asp Pro Thr Gly Arg Leu Leu Asp Ala Trp Gln Gly Arg Pro
            420                 425                 430

Gly Ala Ser Val Gly Arg Leu Leu Glu Leu Leu Thr Lys Leu Gly Arg
            435                 440                 445

Asp Asp Val Leu Leu Glu Leu Gly Pro Ser Ile Glu Glu Asp Cys Gln
450                 455                 460

Lys Tyr Ile Leu Lys Gln Gln Gln Glu Ala Glu Lys Pro Leu Gln
465                 470                 475                 480

Val Ala Ala Val Asp Ser Ser Val Pro Arg Thr Ala Glu Leu Ala Gly
            485                 490                 495

Ile Thr Thr Leu Asp Asp Pro Leu Gly His Met Pro Glu Arg Phe Asp
            500                 505                 510

Ala Phe Ile Cys Tyr Cys Pro Ser Asp Ile Val Glu Lys Lys Val Ala
            515                 520                 525

Lys Lys Pro Thr Asn Lys Ala Pro His Pro Lys Gln Glu Pro Gln Glu
```

```
                530             535             540
Ile Asn Phe Pro Asp Asp Leu Pro Gly Ser Asn Thr Ala Ala Pro Val
545                 550                 555                 560

Gln Glu Thr Leu His Gly Cys Gln Pro Val Thr Gln Glu Asp Gly Lys
                565                 570                 575

Glu Ser Arg Ile Ser Val Gln Glu Arg Gln Arg Val Lys Phe Ser Arg
                580                 585                 590

Ser Ala Asp Ala Pro Ala Tyr Gln Gln Gly Gln Asn Gln Leu Tyr Asn
                595                 600                 605

Glu Leu Asn Leu Gly Arg Arg Glu Glu Tyr Asp Val Leu Asp Lys Arg
610                 615                 620

Arg Gly Arg Asp Pro Glu Met Gly Gly Lys Pro Arg Arg Lys Asn Pro
625                 630                 635                 640

Gln Glu Gly Leu Tyr Asn Glu Leu Gln Lys Asp Lys Met Ala Glu Ala
                645                 650                 655

Tyr Ser Glu Ile Gly Met Lys Gly Glu Arg Arg Arg Gly Lys Gly His
                660                 665                 670

Asp Gly Leu Tyr Gln Gly Leu Ser Thr Ala Thr Lys Asp Thr Tyr Asp
                675                 680                 685

Ala Leu His Met Gln Ala Leu Pro Pro Arg
                690                 695
```

<210> SEQ ID NO 93
<211> LENGTH: 2097
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 93

```
atggactgga tctggcgcat cctcttcctc gtcggcgctg ctaccggcgc tcattctgag    60
gtacaactgc agcagtctgg acctgaactg aagaagcctg gagagacagt caagatctcc   120
tgcaaggcct ctgggtatcc tttcacaaac tatggaatga actgggtgaa gcaggctcca   180
ggacagggtt taaagtggat gggctggatt aacacctcca ctggagagtc aacatttgct   240
gatgacttca agggacggtt tgacttctct ttggaaacct gccaacac tgcctatttg      300 cagatcaaca acctcaaaag tgaagacatg gctacatatt tctgtgcaag atgggaggtt   360
taccacggct acgttcctta ctggggccaa gggaccacgg tcaccgtttc ctctggcggt   420
ggcggttctg gtggcggtgg ctccggcggt ggcggttctg acatccagct gacccagtct   480
cacaaattcc tgtccacttc agtaggagac agggtcagca tcacctgcaa ggccagtcag   540
gatgtgtata atgctgttgc ctggtatcaa cagaaaccag acaatctccc taaacttctg   600
atttactcgg catcctcccg gtacactgga gtcccttctc gcttcactgg cagtggctct   660
gggccggatt tcacttttcac catcagcagt gtgcaggctg aagacctggc agtttatttc   720
tgtcagcaac atttttcgtac tccattcacg ttcggctcgg gacaaaatt ggagatcaaa    780 gctctaccag ccaagcccac cacaaccct gctcctagac tcctaccccc agccccttacc   840 attgcctccc agccactgtc tctgaggccc gaggcttgta gacctgctgc aggcggagcc   900
gtgcacacca gaggactgga tttcgcctgc gacatctata tctgggcccc tctggccggc   960
acctgtggcg tgctgctgct gtcactcgtg atccctgt actgcaacca ccggaaccgg   1020
cggagagtgt gcaagtgccc tagacccgtc gtggctgctg gcggacctgg cgccggatct   1080
```

```
gctgctcctg tgtctagcac aagcagcctg cctctggccg ccctgaacat gagagtgcgg    1140
agaaggctga gcctgttcct gaacgtgcgg acacaggtgg ccgccgattg acagccctg     1200 gccgaggaaa tggacttcga gtacctggaa atccggcagc tggaaaccca ggccgaccct    1260
acaggcagac tgctggatgc cttggcaggg agaccaggcg cttctgtggg aaggctgctg    1320
gaactgctga ccaagctggg cagggacgac gtgctgctgg aactgggccc tagcatcgaa    1380
gaggactgcc agaagtacat cctgaagcag cagcaggaaa aggccgagaa gcctctgcag    1440
gtggcagccg tggatagcag cgtgccaaga acagccgagc tggccggcat caccaccctg    1500
gatgatcctc tgggccacat gcccgagaga ttcgacgcct tcatctgcta ctgccccagc    1560
gacatcgtgg aaaagaaggt ggccaagaag cccaccaaca aggcccccca ccccaagcag    1620 gaacccccagg aaatcaactt ccccgacgac ctgcccggca gcaatactgc tgcacccgtg    1680
caggaaaccc tgcacggctg tcagcctgtg acccaggaag atggcaaaga aagccggatc    1740
tctgtgcagg aacgccagag agtgaagttc agcaggagcg cagacgcccc cgcgtaccag    1800
cagggccaga accagctcta taacgagctc aatctaggac gaagagagga gtacgatgtt    1860
ttggacaaga acgtggccg ggaccctgag atggggggaa agccgagaag gaagaaccct    1920
caggaaggcc tgtacaatga actgcagaaa gataagatgg cggaggccta cagtgagatt    1980
gggatgaaag cgagcgccg gaggggcaag gggcacgatg gcctttacca gggtctcagt    2040
acagccacca aggacaccta cgacgccctt cacatgcagg ccctgccccc tcgctaa       2097
```

<210> SEQ ID NO 94
<211> LENGTH: 77
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 94

```
Pro Ala Lys Pro Thr Thr Thr Pro Ala Pro Arg Pro Pro Thr Pro Ala
1               5                   10                  15

Pro Thr Ile Ala Ser Gln Pro Leu Ser Leu Arg Pro Glu Ala Cys Arg
            20                  25                  30

Pro Ala Ala Gly Gly Ala Val His Thr Arg Gly Leu Asp Phe Ala Cys
        35                  40                  45

Asp Ile Tyr Ile Trp Ala Pro Leu Ala Gly Thr Cys Gly Val Leu Leu
    50                  55                  60

Leu Ser Leu Val Ile Thr Leu Tyr Cys Asn His Arg Asn
65                  70                  75
```

<210> SEQ ID NO 95
<211> LENGTH: 231
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 95

```
ccagccaagc ccaccacaac ccctgctcct agacctccta ccccagcccc taccattgcc     60
tcccagccac tgtctctgag gcccgaggct tgtagacctg ctgcaggcgg agccgtgcac    120
accagaggac tggatttcgc ctgcgacatc tatatctggg cccctctggc cggcacctgt    180
ggcgtgctgc tgctgtcact cgtgatcacc ctgtactgca accaccggaa c             231
```

```
<210> SEQ ID NO 96
<211> LENGTH: 89
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 96

Pro Ala Lys Pro Thr Thr Thr Pro Ala Pro Arg Pro Pro Thr Pro Ala
1               5                   10                  15

Pro Thr Ile Ala Ser Gln Pro Leu Ser Leu Arg Pro Glu Ala Cys Arg
            20                  25                  30

Pro Ala Ala Gly Gly Ala Val His Thr Arg Gly Leu Asp Phe Ala Cys
        35                  40                  45

Asp Ile Tyr Ile Trp Ala Pro Leu Ala Gly Thr Cys Gly Val Leu Leu
    50                  55                  60

Leu Ser Leu Val Ile Thr Leu Tyr Cys Asn His Arg Asn Arg Arg Arg
65                  70                  75                  80

Val Cys Lys Cys Pro Arg Pro Val Val
                85

<210> SEQ ID NO 97
<211> LENGTH: 267
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 97
ccagccaagc ccaccacaac ccctgctcct agacctccta ccccagcccc taccattgcc      60
tcccagccac tgtctctgag gcccgaggct tgtagacctg ctgcaggcgg agccgtgcac     120
accagaggac tggatttcgc ctgcgacatc tatatctggg cccctctggc cggcacctgt     180
ggcgtgctgc tgctgtcact cgtgatcacc ctgtactgca accaccggaa ccggcggaga     240
gtgtgcaagt gccctagacc cgtcgtg                                         267

<210> SEQ ID NO 98
<211> LENGTH: 19
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 98
cagggttctg gatatctgt                                                  19
```

CHIMERIC ANTIGEN RECEPTORS WITH MYD88 AND CD40 COSTIMULATORY DOMAINS

CROSS-REFERENCE TO RELATED APPLICATIONS

This application is a U.S. National Phase of International Patent Application No. PCT/US2019/032786, filed on May 17, 2019, which published as WO 2019/222579 A1 on Nov. 21, 2019, and claims priority to U.S. Provisional Application Ser. No. 62/672,819, filed on May 17, 2018, the contents of which are incorporated herein by reference in its entirety.

STATEMENT REGARDING FEDERALLY SPONSORED RESEARCH

This invention was made with government support under grant number CA173750 awarded by the National Institutes of Health. The government has certain rights in the invention.

SEQUENCE LISTING

The instant application contains a Sequence Listing which has been submitted electronically in ASCII format and is hereby incorporated by reference in its entirety. Said ASCII copy, created on May 16, 2019, is named 243734_000120_SL.txt and is 231,265 bytes in size.

FIELD

The application relates to chimeric antigen receptors (CARs), particularly CARs with MyD88 and CD40 costimulatory domains. The application further relates to methods for activating T cells and other lymphocytes resulting in an immune response against a target antigen. The application further relates to therapeutic cells that express said CARs and methods for treating patients using the modified therapeutic cells.

BACKGROUND

Chimeric antigen receptors (CARs) co-express a ligand recognition domain specific for a disease (e.g., tumor) antigen with signaling components that trigger T cell activation and killing of the target cell. Initially, CARs incorporated an anti-tumor specific single chain variable fragment (scFv) linked to the CD3ζ endodomain, and showed limited in vivo longevity and anti-tumor efficacy. CARs, incorporating cytoplasmic signaling domains from T cell co-stimulatory molecules such as CD28 and 4-1BB, to improve the longevity and tumoricidal activity in preclinical models and clinical trials. Despite this improvement, the adoptive transfer of CAR T cells still have limited antitumor activity to treat, for example, solid tumors, thus leading unfortunately to limited clinical success (Park et. al., *Blood,* 2016; 127: 3312-20; Beatty et al., *Pharmacol. Ther.* 2016; 166:30-39). This lack of efficacy is most likely due to several factors, including suboptimal CAR signaling, which may result in limited T cell activation in the solid tumor microenvironment. The majority of CARs encode an endodomain that consists of zeta (ζ) signaling domain and a canonical CD28 and/or 4-1BB co-stimulatory signaling domain.

The Eph receptor tyrosine kinases have been studied extensively for their roles in developmental processes. In humans, nine EphA (EphA1-8 and EphA10) and five EphB (EphB1-4 and EphB6) receptors have been identified. See Pitulescu and Adams, *Genes Dev.* 2010, 24 (22): 2480-2492, incorporated by reference herein in its entirety of all purposes. In recent years, Eph receptors have been found to play a widespread role in normal physiology and disease pathogenesis and to be integral players in cancer formation and progression. See Pasquale *Nat. Rev. Cancer* (2010) 10 (3): 165-180 and Xi et al., *J. Cell Mol. Med.* (2012) 16 (12): 2894-2909, each incorporated by reference herein in its entirety of all purposes. In fact, multiple Eph receptors and/or ephrins are expressed in cancer cells and the tumor microenvironment, wherein they influence tumor properties and promote aberrant cell to cell communication within the tumor and beyond. Id. As an example, EphA2 is involved in the development and maintenance of many different types of solid tumors. See, Wykosky et al., *Mol. Cancer Res.* 2008 6 (12): 1795-1806, which is incorporated herein by reference in its entirety for all purposes. In particular, EphA2 is overexpressed in at least breast, prostate, urinary bladder, skin, lung, ovary, sarcoma and brain cancers. See, Tandon et al., *Expert Opin. Ther. Targets* 2011 15 (1): 31-51, which is incorporated herein by reference in its entirety for all purposes. In preclinical models of breast cancer, EphA2 expression leads to increased tumor formation, progression, angiogenesis, and therapeutic resistance. See, Amato et al., *Cancer Discov.* 2014 4 (6): OF14, which is incorporated herein by reference in its entirety for all purposes. Notably, EphA2 is commonly overexpressed in numerous cancers, including non-small cell lung cancer (NSCLC), in which EphA2 overexpression is associated with relapse and poor patient survival. As such, EphA2 cancers are associated with increased malignancy and high mortality rates. See Pasquale *Nat. Rev. Cancer* (2010) 10 (3): 165-180.

Thus, there exists a need to for effective therapy against solid tumors (e.g., those expressing Eph receptors). This need can be met with a CAR with enhanced ability to activate T cells as disclosed herein.

SUMMARY OF THE INVENTION

As specified in the Background section above, there is a great need in the art for CARs with enhanced ability to activate lymphocytes (e.g., induce greater and/or longer T cell activity) to allow for, for example, increased tumoricidal activity. The present application addresses these and other needs.

In one aspect, the invention provides a polynucleotide encoding a chimeric antigen receptor (CAR) comprising (a) an extracellular target-binding domain comprising an Eph receptor-binding moiety, (b) a transmembrane domain, and (c) a cytoplasmic domain comprising a lymphocyte activation domain, a MyD88 polypeptide or a functional fragment thereof, and a CD40 cytoplasmic polypeptide region or a functional fragment thereof. In some embodiments, the MyD88 polypeptide comprises amino acid sequence SEQ ID NO:25, SEQ ID NO:30, SEQ ID NO: 31, or SEQ ID NO:33, or an amino acid sequence that has at least 50% sequence identity to SEQ ID NO: 25, SEQ ID NO: 30, SEQ ID NO: 31, or SEQ ID NO: 33. In some embodiments, the MyD88 functional fragment comprises a MyD88 polypeptide lacking the Toll/Il-1 receptor domain. In some embodiments, the MyD88 functional fragment comprises amino acid sequence SEQ ID NO:15, SEQ ID NO:28, or SEQ ID NO: 60 or an amino acid sequence that has at least 50% sequence identity to SEQ ID NO: 15, SEQ ID NO:28, or SEQ ID NO:60. In some embodiments, the nucleotide sequence encoding the MyD88 functional fragment comprises SEQ ID NO:16, SEQ ID NO:29, or SEQ ID NO: 61 or a nucleotide sequence that has at least 50% sequence identity to SEQ ID NO: 16, SEQ ID NO:29, or SEQ ID NO:61. In some embodiments, the CD40 cytoplasmic polypeptide region or functional fragment thereof is derived from a CD40 polypeptide comprising the amino acid sequence SEQ ID NO:32 or an amino acid sequence that has at least 50% sequence identity to SEQ ID NO:32. In some embodiments, the CD40 cytoplasmic polypeptide region comprises the amino acid sequence SEQ ID NO:17 or an amino acid sequence that has at least 50% sequence identity to SEQ ID NO:17. In some embodiments, the nucleotide sequence encoding the CD40 cytoplasmic polypeptide region comprises SEQ ID NO: 18 or a nucleotide sequence that has at least 50% sequence identity to SEQ ID NO:18. In some embodiments, the transmembrane domain is derived from CD8, CD8α, CD4, CD3ζ, CD28, CD40, CD134 (OX-40), or CD7. In some embodiments, the CAR lacks the CD40 transmembrane domain, CD40 extracellular domain, or both the CD40 transmembrane domain and the CD40 extracellular domain. In some embodiments, the transmembrane domain is derived from CD28 or CD8α. In some embodiments, the transmembrane domain derived from CD28 comprises the amino acid sequence SEQ ID NO:13 or an amino acid sequence that has at least 50% sequence identity to SEQ ID NO:13. In some embodiments, the nucleotide sequence encoding the transmembrane domain derived from CD28 comprises SEQ ID NO:14 or a nucleotide sequence that has at least 50% sequence identity to SEQ ID NO: 14. In some embodiments, the transmembrane domain derived from CD8a comprises the amino acid sequence SEQ ID NO:48, 94, or 96 or an amino acid sequence that has at least 50% sequence identity to SEQ ID NO: 48, 94, or 96. In some embodiments, the nucleotide sequence encoding the transmembrane domain derived from CD8a comprises SEQ ID NO: 49, 95, or 97 or a nucleotide sequence that has at least 50% sequence identity to SEQ ID NO: 49, 95, or 97. In some embodiments, the lymphocyte activation domain is a natural killer (NK) cell activation domain. In some embodiments, the lymphocyte activation domain is a T cell activation domain. In some embodiments, the lymphocyte activation domain is derived from DAP10, DAP12, Fc epsilon receptor I γ chain (FCERIG), CD3δ, CD3ε, CD3γ, CD3ζ, CD226, or CD79A. In some embodiments, the lymphocyte activation domain is derived from CD3ζ. In some embodiments, the lymphocyte activation domain derived from CD3} comprises the amino acid sequence SEQ ID NO:19 or an amino acid sequence that has at least 50% sequence identity to SEQ ID NO:19. In some embodiments, the nucleotide sequence encoding the lymphocyte activation domain derived from CD3 comprises SEQ ID NO: 20 or a nucleotide sequence that has at least 50% sequence identity to SEQ ID NO:20. In some embodiments, wherein the extracellular target binding domain further comprises a linker domain between the Eph receptor-binding moiety and the transmembrane domain. In some embodiments, the linker domain comprises an immunoglobulin IgG hinge or functional fragment thereof, or a linker domain derived from CD8, CD8α, or CD28. In some embodiments, the linker domain comprises an immunoglobulin IgG hinge or functional fragment thereof. In some embodiments, the immunoglobulin IgG hinge is an IgG1 core hinge region comprising the amino acid sequence SEQ ID NO:11 or an amino acid sequence that has at least 50% sequence identity to SEQ ID NO:11. In some embodiments, the nucleotide sequence encoding the IgG1 core hinge region comprises SEQ ID NO:12 or a nucleotide sequence that has at least 50% sequence identity to SEQ ID NO:12. In some embodiments, the linker comprises the amino acid sequence SEQ ID NO: 11, 35, 81, 83, 84, or 86 or an amino acid sequence that has at least 50% sequence identity to SEQ ID NO: 11, 35, 81, 83, 84, or 86. In some embodiments, the nucleotide sequence encoding the linker comprises SEQ ID NO: 12, 82, 85, or 87 or a nucleotide sequence that has at least 50% sequence identity to SEQ ID NO: 12, 82, 85, or 87. In some embodiments, the Eph receptor-binding moiety comprises an Eph receptor-binding polypeptide or a ligand for the Eph receptor. In some embodiments, the Eph receptor-binding moiety is an Eph receptor-binding polypeptide. In some embodiments, the Eph receptor-binding polypeptide is an antibody or an antibody fragment. In some embodiments, the Eph receptor-binding polypeptide is a murine antibody, rabbit antibody, human antibody, humanized antibody, fully humanized antibody, single chain variable fragment (scFv), camelid antibody variable domain and humanized versions, shark antibody variable domain and humanized versions, single domain antibody variable domain, nanobody (VHH), or camelized antibody variable domain. In some embodiments, the antigen-binding polypeptide is a single chain variable fragments (scFv). In some embodiments, the Eph receptor is an EphA1, EphA2, EphA3, EphA4, EphA5, EphA6, EphA7, EphA8, EphA10, EphB1, EphB2, EphB3, EphB4, EphB6 receptor or a variant thereof. In some embodiments, the Eph receptor is an EphA2 receptor or variant thereof. In some embodiments, the Eph receptor-binding moiety comprises anti-EphA2 scFv 4H5. In some embodiments, the anti-EphA2 scFv 4H5 comprises the amino acid sequence SEQ ID NO:9 or an amino acid sequence that has at least 50% sequence identity to SEQ ID NO: 9. In some embodiments, the nucleotide sequence encoding the anti-EphA2 scFv 4H5 comprises SEQ ID NO:10 or a nucleotide sequence that has at least 50% sequence identity to SEQ ID NO:10. In some embodiments, the ligand for EphA2 is Ephrin-A1, Ephrin-A2, Ephrin-A3, Ephrin-A4, Ephrin-A5 or Ephrin-A6. In some embodiments, the extracellular target-binding domain further comprises a leader sequence. In some embodiments, the leader sequence comprises the amino acid sequence of SEQ ID NO:7 or an amino acid sequence that has at least 50% sequence identity to SEQ ID NO:7. In some embodiments, the nucleotide sequence encoding the leader sequence comprises SEQ ID NO:8 or a nucleotide sequence that has at least 50% sequence identity to SEQ ID NO:8. In some embodiments, the polynucleotide comprises at least one additional polypeptide sequence. In some embodiments, the at least one polynucleotide sequence encodes a transduced host cell selection marker, an in vivo tracking marker, a cytokine, or a suicide gene. In some embodiments, the transduced host cell selection marker is a truncated CD19 (tCD19) polypeptide. In some embodiments, the tCD19 comprises the amino acid sequence SEQ ID NO: 23 or an amino acid sequence having at least 50% sequence identity to SEQ ID NO:23. In some embodiments, the nucleotide sequence encoding the tCD19 comprises SEQ ID NO: 24 or a nucleotide sequence having at least 50% sequence identity to SEQ ID NO:24. In some embodiments, the CAR comprises the amino acid sequence SEQ ID NO:1, 26, 50, 52, 54, 56, or 58 or an amino acid sequence that has at least 50% sequence identity to SEQ ID NO: 1, 26, 50, 52, 54, 56, or 58. In some embodiments, the CAR is encoded by the nucleotide sequence SEQ ID NO:2, 27, 51, 53, 55, 57, or 59 or a nucleotide sequence that has at least 50% sequence identity to SEQ ID NO:2, 27, 51, 53, 55, 57, or 59. In some embodiments, the polynucleotide is operatively linked to at least one regulatory element for expression of the CAR. In some embodiments, the at least one regulatory element is a promoter (e.g., a T lymphocyte-specific promoter or an NK cell-specific promoter). In certain embodiments, the polynucleotide is a DNA molecule. In certain embodiments, the polynucleotide is an RNA molecule or derivative thereof.

In one aspect, the invention provides a recombinant vector comprising the polynucleotide as described herein, wherein the polynucleotide is operatively linked to at least one regulatory element for expression of the CAR.

In one aspect, the invention provides a recombinant vector comprising a polynucleotide encoding a CAR comprising (a) an extracellular target-binding domain comprising an Eph receptor-binding moiety, (b) a transmembrane domain, and (c) a cytoplasmic domain comprising a lymphocyte activation domain, a MyD88 polypeptide or a functional fragment thereof, and a CD40 cytoplasmic polypeptide region or a functional fragment thereof, wherein the polynucleotide is operatively linked to at least one regulatory element for expression of the CAR. In some embodiments, the vector is a viral vector. In some embodiments, the viral vector is a retroviral vector, a lentiviral vector, an adenoviral vector, an adeno-associated virus vector, an alphaviral vector, a herpes virus vector, or a vaccinia virus vector. In some embodiments, the vector is a non-viral vector.

In one aspect, the invention provides a CAR encoded by any of the polynucleotides disclosed herein.

In one aspect, the invention provides a CAR comprising (a) an extracellular target-binding domain comprising an Eph receptor-binding moiety, (b) a transmembrane domain, and (c) a cytoplasmic domain comprising a lymphocyte activation domain, a MyD88 polypeptide or functional fragment thereof, and a CD40 cytoplasmic polypeptide region or a functional fragment thereof. In some embodiments, the MyD88 polypeptide comprises amino acid sequence SEQ ID NO:25, 30, 31, or 33 or an amino acid sequence that has at least 50% sequence identity to SEQ ID NO: 25, 30, 31, or 33. In some embodiments, the MyD88 functional fragment comprises the amino acid sequence SEQ ID NO:15, 28, or 60, or an amino acid sequence that has at least 50% sequence identity to SEQ ID NO:15, 28, or 60. In some embodiments, the CD40 polypeptide comprises the amino acid sequence SEQ ID NO: 32 or an amino acid sequence that has at least 50% sequence identity to SEQ ID NO:32. In some embodiments, the CD40 cytoplasmic polypeptide region comprises the amino acid sequence SEQ ID NO:17 or an amino acid sequence that has at least 50% sequence identity to SEQ ID NO:17. In some embodiments, the transmembrane domain is derived from CD8, CD8α, CD4, CD3ζ, CD28, CD40, CD134 (OX-40), or CD7. In some embodiments, the CAR lacks the CD40 transmembrane domain, CD40 extracellular domain, or both CD40 transmembrane and CD40 extracellular domain. In some embodiments, the transmembrane domain is derived from CD28 or CD8α. In some embodiments, the transmembrane domain derived from CD28 comprises the amino acid sequence SEQ ID NO:13 or an amino acid sequence that has at least 50% sequence identity to SEQ ID NO:13. In some embodiments, the transmembrane domain derived from CD8a comprises the amino acid sequence SEQ ID NO: 48, 94, or 96 or an amino acid sequence that has at least 50% sequence identity to SEQ ID NO: 48, 94, or 96. In some embodiments, the lymphocyte activation domain is a T cell activation domain. In some embodiments, the lymphocyte activation domain is a natural killer cell activation domain. In some embodiments, the lymphocyte activation domain is derived from DAP10, DAP12, Fc epsilon receptor I γ chain (FCER1G), CD3δ, CD3ε, CD3γ, CD3ζ, CD226, or CD79A. In some embodiments, the lymphocyte activation domain is derived from CD3ζ. In some embodiments, the lymphocyte activation domain derived from CD3ζ comprises the amino acid sequence SEQ ID NO:19 or an amino acid sequence that has at least 50% sequence identity to SEQ ID NO:19. In some embodiments, the CAR comprises a linker domain between the extracellular target-binding domain and the transmembrane domain. In some embodiments, the linker domain comprises an immunoglobulin IgG hinge, or functional fragment thereof, or a linker domain derived from CD8, CD8α, or CD28. In some embodiments, the linker domain comprises an immunoglobulin IgG hinge or functional fragment thereof. In some embodiments, the immunoglobulin IgG hinge comprises an IgG1 core hinge region comprising the amino acid sequence SEQ ID NO:11 or an amino acid sequence that has at least 50% sequence identity to SEQ ID NO:11. In some embodiments, the linker comprises the amino acid sequence SEQ ID NO:11, 35, 81, 83, 84, or 86 or an amino acid sequence that has at least 50% sequence identity to SEQ ID NO: 11, 35, 81, 83, 84, or 86. In some embodiments, the Eph receptor-binding moiety comprises an Eph receptor-binding polypeptide or a ligand for the Eph receptor. In some embodiments, the Eph receptor-binding moiety is an Eph receptor-binding polypeptide. In some embodiments, the Eph receptor-binding polypeptide is an antibody or an antibody fragment. In some embodiments, the Eph receptor-binding polypeptide is a murine antibody, rabbit antibody, human antibody, humanized antibody, fully humanized antibody, single chain variable fragment (scFv), camelid antibody variable domain and humanized versions, shark antibody variable domain and humanized versions, single domain antibody variable domain, nanobody (VHH), or camelized antibody variable domain. In some embodiments, wherein the antigen-binding polypeptide is a single chain variable fragments (scFv). In some embodiments, the Eph receptor is a EphA1, EphA2, EphA3, EphA4, EphA5, EphA6, EphA7, EphA8, EphA10, EphB1, EphB2, EphB3, EphB4, EphB6 receptor or a variant thereof. In some embodiments, the Eph receptor is a EphA2 receptor or variant thereof. In some embodiments, the Eph receptor-binding moiety comprises anti-EphA2 scFv 4H5. In some embodiments, the anti-EphA2 scFv 4H5 comprises the amino acid sequence SEQ ID NO:9 or an amino acid sequence that has at least 50% sequence identity to SEQ ID NO:9. In some embodiments, the ligand for EphA2 is Ephrin-A1, Ephrin-A2, Ephrin-A3, Ephrin-A4, Ephrin-A5 or Ephrin-A6. In some embodiments, the CAR comprises at least one additional polypeptide sequence (e.g., at least one of a transduced host cell selection marker, an in vivo tracking marker, a cytokine, or a suicide protein, co-stimulatory endodomains, signal sequences, epitope tags, or polypeptides that produce a detectable signal). In some embodiments, the CAR comprises amino acid sequence SEQ ID NO:126, 50, 52, 54, 56, or 58 or an amino acid sequence that has at least 50% sequence identity to SEQ ID NO: SEQ ID NO:1, 26, 50, 52, 54, 56, or 58.

In one aspect, the invention provides an isolated host cell comprising any one of the CARs as disclosed herein. In some embodiments, the host cell further comprising a co-stimulatory fusion protein. In some embodiments, the host cell comprises any of the polynucleotides as disclosed herein. In some embodiments, the polynucleotide is operatively linked to at least one regulatory element which is capable of mediating expression of the chimeric antigen receptor in the host cell. In some embodiments, the host cell comprises any of the vectors disclosed herein. In some embodiments, the host cell is a mammalian cell. In some embodiments, the host cell is a cytotoxic cell, a T cell, a stem cell, a progenitor cell, or a cell derived from a stem cell or a progenitor cell. In some embodiments, wherein the T cell is at least one of T-helper cells, cytotoxic T-cells, T-regulatory cells (Treg), invariant natural killer T (NKT) cells, or gamma-delta T cells. In some embodiments, the cytotoxic cell is a cytotoxic T cell or a natural killer (NK) cell. In some embodiments, the host cell has been activated and/or expanded ex vivo. In some embodiments, the host cell is an allogeneic cell. In some embodiments, the host cell is an autologous cell. In some embodiments, the host cell is isolated from a subject having a disease, wherein EphA2 is expressed. In some embodiments, the cancer is a solid tumor. In some embodiments, the disease is a cancer that expresses EphA2. In some embodiments, the cancer is breast, prostate, urinary bladder, skin, lung, ovary, sarcoma, or brain cancer. In some embodiments, the skin cancer is melanoma. In some embodiments, the lung cancer is non-small cell lung cancer (NSCLC). In some embodiments, the sarcoma is osteosarcoma or rhabdomyosarcoma. In some embodiments, the brain cancer is a high grade glioma, diffuse pontine glioma, medulloblastoma, or ependymoma. In some embodiments, the host cell is derived from a blood, marrow, tissue, or a tumor sample. In some embodiments, the cell surface expression of the endogenous TCR of the cell has been decreased or eliminated. In some embodiments, the host cell is an allogeneic cell.

In one aspect, the invention provides a pharmaceutical composition comprising any one of the host cells described herein and a pharmaceutically acceptable carrier and/or excipient.

In one aspect, the invention provides a method of enhancing activity of a T lymphocyte or a natural killer (NK) cell towards cells expressing EphA2 in a subject in need thereof comprising administering to the subject an effective amount of any one of the polynucleotides disclosed herein, any one of vectors disclosed herein, any one of host cells disclosed herein, and/or any one of pharmaceutical compositions disclosed herein. In another aspect, the invention provides a method of treating a disease in a subject in need thereof comprising administering to the subject an effective amount of any one of the polynucleotides disclosed herein, any one of vectors disclosed herein, any one of host cells disclosed herein, and/or any one of pharmaceutical compositions disclosed herein. In some embodiments, the host cell is an autologous cell. In some embodiments, the subject has a disease, wherein EphA2 is expressed. In some embodiments, the cancer is a solid tumor. In some embodiments, the disease is a cancer that expresses EphA2. In some embodiments, the cancer is breast, prostate, urinary bladder, skin, lung, ovary, sarcoma, or brain cancer. In some embodiments, the skin cancer is melanoma. In some embodiments, the lung cancer is non-small cell lung cancer (NSCLC). In some embodiments, the sarcoma is osteosarcoma or rhabdomyosarcoma. In some embodiments, the brain cancer is a high grade glioma, diffuse pontine glioma, medulloblastoma, or ependymoma.

In one aspect, the invention provides a method for producing any of the host cells disclosed herein, comprising genetically modifying the host cells with any of the polynucleotides disclosed herein or any of the vectors disclosed herein. In some embodiments, the genetic modifying step is conducted via viral gene delivery. In some embodiments, the genetic modifying step is conducted via non-viral gene delivery. In some embodiments, the genetic modifying step is conducted ex vivo. In some embodiments, the method further comprises activation and/or expansion of the cell ex vivo.

In one aspect, the invention provides a method for stimulating elimination of a cell comprising an EphA2 antigen in a subject in need thereof, said method comprising administering to the subject an effective amount of cytotoxic T cells or natural killer (NK) cells comprising any of the CARs disclosed herein.

In one aspect, the invention provides a method for treating a cancer in a subject in need thereof, wherein cancer cells express EphA2, said method comprising administering to the subject a therapeutically effective amount of a cytotoxic T cells or natural killer (NK) cells comprising any one of the CARs disclosed herein. In some embodiments, the cancer is a solid tumor. In some embodiments, the disease is a cancer that expresses EphA2. In some embodiments, the cancer is breast, prostate, urinary bladder, skin, lung, ovary, sarcoma, or brain cancer. In some embodiments, the skin cancer is melanoma. In some embodiments, the lung cancer is non-small cell lung cancer (NSCLC). In some embodiments, the sarcoma is osteosarcoma or rhabdomyosarcoma. In some embodiments, the brain cancer is a high grade glioma, diffuse pontine glioma, medulloblastoma, or ependymoma.

In certain embodiments, any of the methods include a) isolating T cells or NK cells from the subject; b) genetically modifying said T cells or NK cells ex vivo with any of the polynucleotides disclosed herein or any one of the vectors disclosed herein; c) optionally, expanding and/or activating said T cells or NK cells before, after or during step (b); and d) introducing the genetically modified T cells or NK cells into the subject.

In certain embodiments, the cell surface expression of the endogenous TCR has been decreased or eliminated in the administered cells.

These and other aspects of the present invention will be apparent to those of ordinary skill in the art in the following description, claims and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

(FIG. 1A) Schematic of EphA2-targeting CD28.ζ.CAR (SEQ ID NOs: 3-4), 4-1BB.ζ.CAR (SEQ ID NOs: 5-6), and Myd88.CD40.ζ.CAR (SEQ ID NOs: 1-2) constructs. Each consists of the same humanized EphA2-recognizing scFv (single chain variable fragment) 4H5, an IgG core hinge, a transmembrane domain, a costimulatory domain, CD3ζ, and a truncated CD19 tag for detection separated from the CAR by a 2A sequence. (FIG. 1B) Transduction efficiency of EphA2-CAR T cells. Flow cytometry was used to determine the expression of the truncated CD19 tag one week after transduction. Non-transduced (NT) T cells served as controls. There was no significant difference between the transduction efficiency of MyD88.C40.ζ.CAR- and 4-1BB.ζ.CAR-encoding retroviral vectors. However, the transduction efficiency of the CD28.5. CAR-encoding retroviral vector was significantly higher (** $p<0.01$). (FIG. 1C) CAR expression does not significantly change T-cell phenotype. Phenotype was determined 7-12 days after transduction using flow cytometry. N: Naïve, CCR7+, CD45RA+; CM: Central Memory, CCR7+, CD45RA−; EM: Effector Memory, CCR7−, CD45RA−; TE: Terminal Effector, CCR7−, CD45RA+. Anti-human CCR7−AF488 (BioLegend; clone G043H7). Anti-human CD45RA−APC-H7 (BD Pharmigen; clone HI100).

(FIGS. 2A-2B) CAR T cells were cocultured with EphA2+ U373 cells or U373 cells in which EphA2 had been knocked out (k/o U373). After 24 hours media was collected and the concentration of IFNγ and IL2 was determined. Myd88.CD40.ζ.CAR T cells produced significant amount of IFNγ (*p<0.05) and IL2 (*p<0.01) only in the presence of EphA2+U373 cells. While there were no significant differences in IFNγ production between different CAR T-cell populations, CD28.ζ.CAR T cells produced significantly higher (** p<0.01) and 4-1BB.ζ.CAR T cells significantly lower (*p<0.05) levels of IL2. (FIG. 2C) T cells were co-cultured with tumor cells at multiple effector: target ratios with U373 or k/o U373 cells. After 24 hours, viable tumor cells were quantified with a MTS assay. NT cells had no antitumor activity. CD28.CAR, 4-1BB.CAR, and Myd88.CD40.ζ.CAR T cells killed EphA2+ positive target cells (*p<0.05; *** p<0.001). While CD28.ζ.CAR and 4-1BB.ζ.CAR T cells exhibited background killing of k/o U373 cells, Myd88.CD40.ζ.CAR T cells did not.

(FIG. 3A) Experimental setup for repeat stimulation assay. $10^6$ T cells were stimulated against $5\times10^5$ U373 or k/o U373 cells. 7 days later, T cells were counted and $10^6$ were re-stimulated against $5\times10^5$ fresh tumor cells. T cells were re-stimulated weekly until they no longer killed tumor cells. (FIG. 3B) MyD88.CD40.ζ.CAR T cells (n=8) expanded more after restimulation with U373 cells than CD28.2.CAR (p<0.05; n=8) or 4-1BB.ζ.CAR (p<0.05; n=4) T cells. In addition, MyD88.CD40.2.CAR T cells were able to kill U372 cells at least 6 times, whereas the effector function of CD28.ζ.CAR or 4-1BB.ζ.CAR T cells rapidly eroded being able to kill U373 cells no more than 5 times (p<0.005). No expansion was observed in the presence of k/o U373 cells, confirming antigen specificity. (FIG. 3C) Phenotype of CAR T cells 7 days after co-culture with U373. MyD88.ζ.CD40 CAR T cells had a significantly larger proportion of naïve (CCR7+, CD45RA+) cells than the CD28 and 4-1BB CAR T cells (n=4; Naïve MyD88.ζ.CD40 vs. CD28 or 4-1BB: p<0.001).

(FIG. 4A) 8-week old female NSG mice were injected intraperitoneally (i.p.) with $10^6$ LM7 tumor cells, which were genetically modified to express firefly luciferase (ffluc) to enable non-invasive bioluminescence imaging to track tumor cells. On day +7, mice received a single i.p. injection of $10^5$ or $10^4$ CAR T cells. Tumor burden was monitored by bioluminescence imaging. (FIG. 4B) IVIS images of individual mice. (FIG. 4C) Quantitative bioluminescence imaging and survival curve for $10^5$ CAR T cells. After injection of 4-1BB.ζ.CAR or MyD88.CD40.ζ.CAR T cells there was a rapid reduction in tumor size as judged by bioluminescence imaging. While tumors after 4-1BB.ζ.CAR T-cell therapy recurred earlier, there was no significant difference in overall survival between both mice during the first 83 days post T-cell infection. (FIG. 4D) Quantitative bioluminescence imaging and survival curve for $10^4$ CAR T cells. After injection of 4-1BB.ζ.CAR or MyD88.CD40.ζ.CAR T cells only MyD88.CD40 . . . . CAR T-cell treated mice exhibited prolonged antitumor responses, which translated in a significant (p<0.05) survival advantage.

(FIG. 5A) 8-week old female NSG mice were injected i.p. with $10^6$ LM7 tumor cells on day-7. On day 0, mice received a single i.p. injection of CAR T cells that were also genetically-modified to express fflluc. CAR T cells expressing a nonfunctional CAR (Δ.CAR) served as controls. In vivo T-cell expansion was monitored by bioluminescence imaging. (FIG. 5B) IVIS images of individual mice. (FIG. 5C) Quantitative bioluminescence imaging. (FIG. 5D) To quantitate T-cell expansion, area under the curve (AUC) was plotted. MyD88.CD40.ζ.CAR T cells expanded significantly more than Δ.CAR, CD28.ζ.CAR, or 4-1BB.ζ.CAR T cells.

FIGS. 6A-6F depict the amino acid and nucleic acid sequences of representative EphA2-targeting CAR constructs, including scFv4H5. CD28.ζ.CAR (SEQ ID NOs: 3-4) (FIGS. 6A-6B), scFv4H5.4-1BB.ζ.CAR (SEQ ID NOs: 5-6) (FIGS. 6C-6D), and scFv4H5.Myd88.CD40.ζ.CAR (SEQ ID NOs: 1-2) (FIGS. 6E-6F) constructs.

FIGS. 7A-7G show the IL13Rα2-specific CAR constructs evaluated. (FIG. 7A) Schematic of IL13Rα2-specific CD28.CAR, MyD88.CD40.CAR, and MyD88.CAR constructs, including m47.MyD88.CD40.ζ (SEQ ID NOs: 63-64) (FIG. 7B), m47.MyD88.5 (SEQ ID NOs: 65-66) (FIG. 7C), and m47.CD28.ζ (SEQ ID NOs: 67-68) (FIG. 7D). (FIG. 7E) Transduction efficiency of IL13Rα2-CAR T cells. Flow cytometry was used to determine the expression of CARs 7 to 10 days after transduction. (FIG. 7F) Western blot analysis of CAR T cells revealed equal expression of all three CARs, indicating that MyD88.CAR and MyD88.CD40.CARs are inefficiently transported to the cell surface and/or are rapidly internalized once they reach the cell surface. (FIG. 7G) CAR T cells were incubated with IL13Rα2+U373 cells and their ability to kill tumor cells was scored by microscopic examination after 48 to 72 hours.

FIGS. 8A-8I show the HER2-specific CAR constructs evaluated. (FIG. 8A) Schematic of HER2-specific CD28.CAR, MyD88.CD40.CAR, MyD88.CAR, and CD40.CAR constructs, FRP5.MyD88.CD40.ζ (SEQ ID NOs: 69-70) (FIGS. 8B-8C), FRP5.MyD88.ζ (SEQ ID NOs: 71-72) (FIG. 8D), FRP5.CD40.3 (SEQ ID NOs: 73-74) (FIG. 8E), and FRP5.CD28.ζ (SEQ ID NOs: 75-76) (FIG. 8F). (FIG. 8G, FIG. 8H) Flow cytometry was used to determine the expression of CARs 7 to 10 days after transduction. (FIG. 8G) Individual FACS plot; (FIG. 8H) Summary data. (FIG. 8I) CAR T cells were incubated with HER2+ U373 cells and their ability to kill tumor cells was scored by microscopic examination after 48 to 72 hours.

FIGS. 9A-9H show the HER2-specific CAR constructs evaluated. (FIG. 9A) Schematic of HER2-specific MyD88.CD40.CARs, including FRP5.MyD88.CD40.CAR (SH.TMCD28) (SEQ ID NOs: 69-70), FRP5.MyD88.CD40.CAR (SH.CH3.TMCD28) (SEQ ID NOs: 77-78) (FIGS. 9B-9C), and FRP5.MyD88.CD40.CAR (SH.CH2.CH3.TMCD28) (SEQ ID NOs: 79-80) (FIGS. 9D-9E). (FIG. 9F, FIG. 9G) Transduction efficiency of HER2-CAR T cells. Flow cytometry was used to determine the expression of CARs 7 to 10 days after transduction. (FIG. 9F) Individual FACS plot; (FIG. 9G) Summary data. (FIG. 9H) CAR T cells were incubated with HER2+U373 cells and their ability to kill tumor cells was scored by microscopic examination after 48 to 72 hours.

FIGS. 10A-10G show the HER2-specific CAR constructs evaluated. (FIG. 10A) Schematic of HER2-specific MyD88.CD40.CARs, including FRP5.MyD88.CD40.CAR (SH.TMCD28) (SEQ ID NOs: 69-70), FRP5.MyD88.CD40.CAR (SH.TMCD8α) (SEQ ID NOs: 88-89) (FIG. 10B), FRP5.MyD88.CD40.CAR (8a.TMCD8α) (SEQ ID NOs: 90-91) (FIG. 10C), and FRP5.MyD88.CD40.CAR (8a.TMCD8α+8aa) (SEQ ID NOs: 92-93) (FIG. 10D). (FIG. 10E, FIG. 10F) Transduction efficiency of HER2-CAR T cells. Flow cytometry was used to determine the expression of CARs 7 to 10 days after transduction. (FIG. 10E) Individual FACS plot; (FIG. 10F) Summary data. (FIG. 10G) CAR T cells were incubated with HER2+ U373 cells and their ability to kill tumor cells was scored by microscopic examination after 48 to 72 hours.

FIG. 11 shows examples of co-stimulatory fusion proteins.

(FIG. 12A) 8-week old female NSG mice were injected intraperitoneally (i.p.) with $10^6$ LM7 tumor cells, which were genetically modified to express firefly luciferase (ffluc) to enable non-invasive bioluminescence imaging to track tumor cells. On day +7, mice received a single i.p. injection of $10^5$ (FIGS. 12A-12C) or $10^4$ (FIGS. 12D-12F) CAR T cells. Tumor burden was monitored by bioluminescence imaging. (FIG. 12A, FIG. 12D) IVIS images of individual mice. (FIG. 12B, FIG. 12C) Quantitative bioluminescence imaging and survival curve for $10^5$ CAR T cells. After injection of CD28.CAR, 41BB.CAR or MyD88.CD40.CAR (MC-CAR) T cells there was a rapid reduction in tumor size as judged by bioluminescence imaging. While tumors after CD28.CAR and 41BB.CAR T-cell therapy recurred earlier, there was no significant difference in overall survival between both mice during the first 83 days post T-cell infection. However, long term follow-up revealed a significant survival advantage ($p<0.05$). (FIG. 12E, FIG. 12F) Quantitative bioluminescence imaging and survival curve for $10^4$ CAR T cells. After injection of CD28.CAR, 41BB.CAR or MyD88.CD40.CAR T cells only MyD88.CD40.CAR T-cell treated mice exhibited prolonged antitumor responses, which translated in a significant ($p<0.05$) survival advantage.

(FIG. 13A) MyD88.CD40-CAR (MC-CAR) T cells were generated in which the TRAC locus was knocked out (MC TRAC KO-CAR) resulting in the absence of cell surface expression of αβ TCRs. (FIG. 13B) In a cytotoxicity assay, MC-CAR T cells and MC TRAC KO-CAR T cells killed EphA2+ tumor cells (U373, LM7). In contrast non-transduced T cells (NT) did not kill target cells. In addition, T cells were generated by expressing a non-functional MyD88.CD40 CAR in which the immunoreceptor tyrosine-based activation motif (ITAM) was mutated (MC-CAR.mulTAM). MC-CAR.mulTAM T cells also did not kill tumor cells indicating that killing depends on an active CAR. (FIG. 13C) The antitumor activity of CAR T cells was evaluated in the intraperitoneal LM7 xenograft model described in FIG. 4 with a T cell dose of $10^5$. MC-CAR T cells and MC TRAC KO-CAR T cells had similar antitumor activity whereas T cells expressing the non-functional CAR had no antitumor activity.

(FIG. 14A) IVIS images of individual mice. (FIG. 14B) Quantitative bioluminescence imaging.

DETAILED DESCRIPTION

Figure 1A:
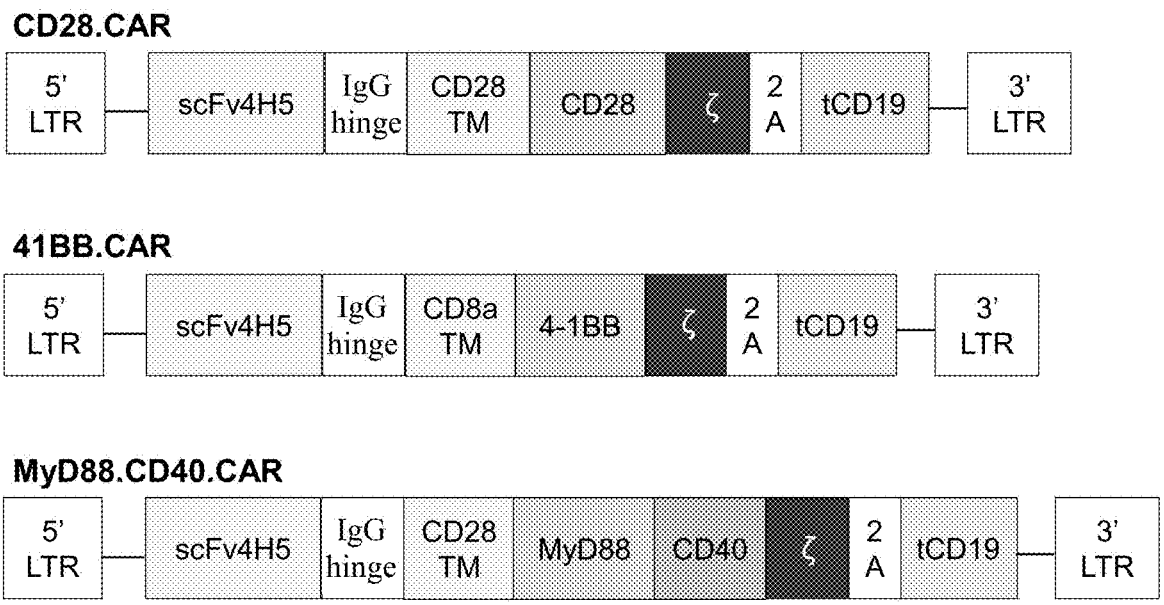
FIGS. 1A-1C show the EphA2-targeting constructs evaluated.

The present invention provides chimeric antigen receptors (CARs), particularly CARs with enhanced ability to activate lymphocytes (e.g., T cells or natural killer (NK) cells) to allow for, for example, increased tumoricidal activity.

CARs are primarily comprised of 1) an antigen-binding moiety, such as a single-chain variable fragment (scFv) derived from an antigen-specific monoclonal antibody, and 2) a lymphocyte activation domain, such as the ζ-chain from the T cell receptor CD3. These two regions are fused together via a transmembrane domain. Upon transduction, the lymphocyte expresses the CAR on its surface, and upon contact and ligation with the target antigen, it signals through the lymphocyte activation domain (e.g., CD3} chain) inducing cytotoxicity and cellular activation.

Constructs with only the antigen-specific binding region together with the lymphocyte activation domain are termed first-generation CARs. While activation of lymphocytes through a lymphocyte activation domain such as CD3 is sufficient to induce tumor-specific killing, such CARs fail to optimally induce T cell proliferation and survival in vivo. The second-generation CARs added co-stimulatory polypeptides to boost the CAR-induced immune response. For example, the co-stimulating polypeptide CD28 signaling domain was added to the CAR construct. This region generally contains the transmembrane region of the co-stimulatory peptide (in place of the CD3ζ transmembrane domain) with motifs for binding other molecules such as PI3K and Lck. T cells expressing CARs with only CD35 vs CARs with both CD3 and a co-stimulatory domain (e.g., CD28) demonstrated the CARs expressing both domains achieve greater activity. The most commonly used co-stimulating molecules include CD28 and 4-1BB, which promotes both T cell proliferation and cell survival. The third-generation CAR includes three signaling domains (e.g., CD3ζ, CD28, and 4-1BB), which further improves lymphocyte cell survival and efficacy. Examples of third-generation CARs include CD19 CARs, most notably for the treatment of chronic lymphocytic leukemia (Milone, M. C., et al., (2009) Mol. Ther. 17:1453-1464; Kalos, M., et al., Sci. Transl. Med. (2011) 3: 95ra73; Porter, D., et al., (2011) N. Engl. J. Med. 365:725-533; each of which is incorporated herein by reference in its entirety for all purposes). Studies in three patients showed impressive function, expanding more than a 1000-fold in vivo, and resulted in sustained remission in all three patients.

Investigators then turned to the use of auxiliary molecules to further enhance lymphocyte cell survival and efficacy. Such an example includes the use of a signaling molecule that includes a multimerization region that binds to a chemical inducer of dimerization (CID). CIDs can be small or large molecules that can bind together two separate CAR monomers, resulting in a dimer that can induce activation. For example, lymphocytes were engineered to express the CD35 chain linked to 1, 2, or 3 FKBP fragments. Lymphocytes expressing these CARs demonstrated CID-dependent T cell activation (Spencer, D. M., et al., *Science*, 1993. 262: p. 1019-1024, which is incorporated herein by reference in its entirety for all purposes).

Another example of an auxiliary molecule approach is the use of an inducible MyD88/CD40 molecule for the activation of CAR-modified lymphocytes, in which the CARs were co-expressed with the inducible MyD88/CD40 molecule. AP1930 (rimiducid) results in the dimerization of certain inducible MyD88/CD40 molecules, thus, leading to a powerful co-stimulation that increases lymphocyte survival, proliferation, activation and cancer cell death. An example of this system includes the HER22-CAR MyD88/CD40 system in which T cells expressing both constructs had superior T cell proliferation, cytokine production, and the ability to kill target expressing cells when CID was present. Repeated injections of CID was able to further enhance the tumor clearance. See Mata et al., Cancer Discovery November 2017, OF1-OF14, which his incorporated herein by reference in its entirety for all purposes. The drawback of this system is that not only do you need to co-express the CAR and the inducible molecules, a CID must also be administered to enhance lymphocyte activity.

Here, a MyD88/CD40 molecule was assayed to determine whether it could also be used to physically replace CD28 and/or 4-1BB co-stimulation in CAR constructs. It was surprisingly and unexpectedly found that not only could MyD88/CD40 physically replace the common co-stimulatory domains in an EphA2-CAR, but it could also do so without the use of a separate dimerization agent. It is particularly surprising that such a construct is functional because numerous other MyD88/CD40-CAR constructs were not functional. See for example Example 4, which demonstrates that the inclusion of MyD88/CD40 within certain CAR constructs results in non-functioning CARs.

Definitions

The term "chimeric antigen receptor" or "CAR" as used herein is defined as a cell-surface receptor comprising an extracellular target-binding domain, a transmembrane domain and a cytoplasmic domain, comprising a lymphocyte activation domain and optionally at least one co-stimulatory signaling domain, all in a combination that is not naturally found together on a single protein. This particularly includes receptors wherein the extracellular domain and the cytoplasmic domain are not naturally found together on a single receptor protein. The chimeric antigen receptors of the present invention are intended primarily for use with lymphocyte such as T cells and natural killer (NK) cells.

The terms "T cell" and "T lymphocyte" are interchangeable and used synonymously herein. As used herein, T cell includes thymocytes, naive T lymphocytes, immature T lymphocytes, mature T lymphocytes, resting T lymphocytes, or activated T lymphocytes. A T cell can be a T helper (Th) cell, for example a T helper 1 (Th1) or a T helper 2 (Th2) cell. The T cell can be a helper T cell (HTL; CD4+ T cell) CD4+ T cell, a cytotoxic T cell (CTL; CD8+ T cell), a tumor infiltrating cytotoxic T cell (TIL; CD8+ T cell), CD4+CD8+ T cell, or any other subset of T cells. Other illustrative populations of T cells suitable for use in particular embodiments include naive T cells and memory T cells. Also included are "NKT cells", which refer to a specialized population of T cells that express a semi-invariant αβ T-cell receptor, but also express a variety of molecular markers that are typically associated with NK cells, such as NK1.1. NKT cells include NK1.1+ and NK1.1−, as well as CD4+, CD4−, CD8+ and CD8− cells. The TCR on NKT cells is unique in that it recognizes glycolipid antigens presented by the MHC I-like molecule CD1d. NKT cells can have either protective or deleterious effects due to their abilities to produce cytokines that promote either inflammation or immune tolerance. Also included are "gamma-delta T cells (γδ T cells)," which refer to a specialized population that to a small subset of T cells possessing a distinct TCR on their surface, and unlike the majority of T cells in which the TCR is composed of two glycoprotein chains designated α- and β-TCR chains, the TCR in γδ T cells is made up of a γ-chain and a δ-chain. γδ T cells can play a role in immunosurveillance and immunoregulation, and were found to be an important source of IL-17 and to induce robust CD8+ cytotoxic T cell response. Also included are "regulatory T cells" or "Tregs" refers to T cells that suppress an abnormal or excessive immune response and play a role in immune tolerance. Tregs cells are typically transcription factor Foxp3-positive CD4+ T cells and can also include transcription factor Foxp3-negative regulatory T cells that are IL-10-producing CD4+ T cells.

The terms "natural killer cell" and "NK cell" are used interchangeable and used synonymously herein. As used herein, NK cell refers to a differentiated lymphocyte with a CD 16+CD56+ and/or CD57+ TCR− phenotype. NKs are characterized by their ability to bind to and kill cells that fail to express "self" MHC/HLA antigens by the activation of specific cytolytic enzymes, the ability to kill tumor cells or other diseased cells that express a ligand for NK activating receptors, and the ability to release protein molecules called cytokines that stimulate or inhibit the immune response.

As used herein, the term "antigen" refers to any agent (e.g., protein, peptide, polysaccharide, glycoprotein, glycolipid, nucleic acid, portions thereof, or combinations thereof) molecule capable of being bound by a T-cell receptor. An antigen is also able to provoke an immune response. An example of an immune response may involve, without limitation, antibody production, or the activation of specific immunologically competent cells, or both. A skilled artisan will understand that an antigen need not be encoded by a "gene" at all. It is readily apparent that an antigen can be generated synthesized or can be derived from a biological sample, or might be macromolecule besides a polypeptide. Such a biological sample can include, but is not limited to a tissue sample, a tumor sample, a cell or a fluid with other biological components, organisms, subunits of proteins/antigens, killed or inactivated whole cells or lysates.

The term "antigen-binding moiety" refers to a target-specific binding element that may be any ligand that binds to the antigen of interest or a polypeptide or fragment thereof, wherein the ligand is either naturally derived or synthetic. Examples of antigen-binding moieties include, but are not limited to, antibodies; polypeptides derived from antibodies, such as, for example, single chain variable fragments (scFv), Fab, Fab', F(ab')2, and Fv fragments; polypeptides derived from T Cell receptors, such as, for example, TCR variable domains; secreted factors (e.g., cytokines, growth factors) that can be artificially fused to signaling domains (e.g., "zytokines"); and any ligand or receptor fragment (e.g., CD27, NKG2D) that binds to the antigen of interest. Combinatorial libraries could also be used to identify peptides binding with high affinity to the therapeutic target.

Terms "antibody" and "antibodies" refer to monoclonal antibodies, multispecific antibodies, human antibodies, humanized antibodies, chimeric antibodies, single-chain Fvs (scFv), single chain antibodies, Fab fragments, F(ab') fragments, disulfide-linked Fvs (sdFv), intrabodies, minibodies, diabodies and anti-idiotypic (anti-Id) antibodies (including, e.g., anti-Id antibodies to antigen-specific TCR), and epitope-binding fragments of any of the above. The terms "antibody" and "antibodies" also refer to covalent diabodies such as those disclosed in U.S. Pat. Appl. Pub. 2007/0004909 and Ig-DARTS such as those disclosed in U.S. Pat. Appl. Pub. 2009/0060910. Antibodies useful as a TCR-binding molecule include immunoglobulin molecules and immunologically active fragments of immunoglobulin molecules, i.e., molecules that contain an antigen-binding site. Immunoglobulin molecules can be of any type (e.g., IgG, IgE, IgM, IgD, IgA and IgY), class (e.g., IgG1, IgG2, IgG3, IgG4, IgM1, IgM2, IgA1 and IgA2) or subclass.

The term "host cell" means any cell that contains a heterologous nucleic acid. The heterologous nucleic acid can be a vector (e.g., an expression vector). For example, a host cell can be a cell from any organism that is selected, modified, transformed, grown, used or manipulated in any way, for the production of a substance by the cell, for example the expression by the cell of a gene, a DNA or RNA sequence, a protein or an enzyme. An appropriate host may be determined. For example, the host cell may be selected based on the vector backbone and the desired result. By way of example, a plasmid or cosmid can be introduced into a prokaryote host cell for replication of several types of vectors. Bacterial cells such as, but not limited to DH5a, JM109, and KCB, SURE® Competent Cells, and SOLO-PACK Gold Cells, can be used as host cells for vector replication and/or expression. Additionally, bacterial cells such as E. coli LE392 could be used as host cells for phage viruses. Eukaryotic cells that can be used as host cells include, but are not limited to yeast (e.g., YPH499, YPH500 and YPH501), insects and mammals. Examples of mammalian eukaryotic host cells for replication and/or expression of a vector include, but are not limited to, HeLa, NIH3T3, Jurkat, 293, COS, CHO, Saos, and PC12.

Host cells of the present invention include T cells and natural killer cells that contain the DNA or RNA sequences encoding the CAR and express the CAR on the cell surface. Host cells may be used for enhancing T cell activity, natural killer cell activity, treatment of cancer, and treatment of autoimmune disease.

The terms "activation" or "stimulation" means to induce a change in their biologic state by which the cells (e.g., T cells and NK cells) express activation markers, produce cytokines, proliferate and/or become cytotoxic to target cells. All these changes can be produced by primary stimulatory signals. Co-stimulatory signals can amplify the magnitude of the primary signals and suppress cell death following initial stimulation resulting in a more durable activation state and thus a higher cytotoxic capacity. A "co-stimulatory signal" refers to a signal, which in combination with a primary signal, such as TCR/CD3 ligation, leads to T cell and/or NK cell proliferation and/or upregulation or downregulation of key molecules.

The term "proliferation" refers to an increase in cell division, either symmetric or asymmetric division of cells. The term "expansion" refers to the outcome of cell division and cell death.

The term "differentiation" refers to a method of decreasing the potency or proliferation of a cell or moving the cell to a more developmentally restricted state.

The terms "express" and "expression" mean allowing or causing the information in a gene or DNA sequence to become produced, for example producing a protein by activating the cellular functions involved in transcription and translation of a corresponding gene or DNA sequence. A DNA sequence is expressed in or by a cell to form an "expression product" such as a protein. The expression product itself, e.g., the resulting protein, may also be said to be "expressed" by the cell. An expression product can be characterized as intracellular, extracellular or transmembrane.

The term "transfection" means the introduction of a "foreign" (i.e., extrinsic or extracellular) nucleic acid into a cell using recombinant DNA technology. The term "genetic modification" means the introduction of a "foreign" (i.e., extrinsic or extracellular) gene, DNA or RNA sequence to a host cell, so that the host cell will express the introduced gene or sequence to produce a desired substance, typically a protein or enzyme coded by the introduced gene or sequence. The introduced gene or sequence may also be called a "cloned" or "foreign" gene or sequence, may include regulatory or control sequences operably linked to polynucleotide encoding the chimeric antigen receptor, such as start, stop, promoter, signal, secretion, or other sequences used by a cell's genetic machinery. The gene or sequence may include nonfunctional sequences or sequences with no known function. A host cell that receives and expresses introduced DNA or RNA has been "genetically engineered." The DNA or RNA introduced to a host cell can come from any source, including cells of the same genus or species as the host cell, or from a different genus or species.

The term "transduction" means the introduction of a foreign nucleic acid into a cell using a viral vector.

The terms "genetically modified" or "genetically engineered" refers to the addition of extra genetic material in the form of DNA or RNA into a cell.

As used herein, the term "derivative" in the context of proteins or polypeptides (e.g., CAR constructs or domains thereof) refer to: (a) a polypeptide that has at least 40%, 45%, 50%, 55%, 60%, 65%, 70%, 75%, 80%, 85%, 90%, 95%, 98% or 99% sequence identity to the polypeptide it is a derivative of; (b) a polypeptide encoded by a nucleotide sequence that has at least 40%, 45%, 50%, 55%, 60%, 65%, 70%, 75%, 80%, 85%, 90%, 95%, 98% or 99% sequence identity to a nucleotide sequence encoding the polypeptide it is a derivative of; (c) a polypeptide that contains 1, 2, 3, 4, 5, 6, 7, 8, 9, 10, 11, 12, 13, 14, 15, 16, 17, 18, 19, 20 or more amino acid mutations (i.e., additions, deletions and/or substitutions) relative to the polypeptide it is a derivative of; (d) a polypeptide encoded by nucleic acids can hybridize under high, moderate or typical stringency hybridization conditions to nucleic acids encoding the polypeptide it is a derivative of; (e) a polypeptide encoded by a nucleotide sequence that can hybridize under high, moderate or typical stringency hybridization conditions to a nucleotide sequence encoding a fragment of the polypeptide, it is a derivative of, of at least 20 contiguous amino acids, at least 30 contiguous amino acids, at least 40 contiguous amino acids, at least 50 contiguous amino acids, at least 75 contiguous amino acids, at least 100 contiguous amino acids, at least 125 contiguous amino acids, or at least 150 contiguous amino acids; or (f) a fragment of the polypeptide it is a derivative of.

Percent sequence identity can be determined using any method known to one of skill in the art. In a specific embodiment, the percent identity is determined using the "Best Fit" or "Gap" program of the Sequence Analysis Software Package (Version 10; Genetics Computer Group, Inc., University of Wisconsin Biotechnology Center, Madison, Wisconsin). Information regarding hybridization conditions (e.g., high, moderate, and typical stringency conditions) have been described, see, e.g., U.S. Patent Application Publication No. US 2005/0048549 (e.g., paragraphs 72-73).

The terms "vector", "cloning vector" and "expression vector" mean the vehicle by which a DNA or RNA sequence (e.g., a foreign gene) can be introduced into a host cell, so as to genetically modify the host and promote expression (e.g., transcription and translation) of the introduced sequence. Vectors include plasmids, synthesized RNA and DNA molecules, phages, viruses, etc. In certain embodiments, the vector is a viral vector such as, but not limited to, viral vector is an adenoviral, adeno-associated, alphaviral, herpes, lentiviral, retroviral, or vaccinia vector.

The term "regulatory element" refers to any cis-acting genetic element that controls some aspect of the expression of nucleic acid sequences. In some embodiments, the term "promoter" comprises essentially the minimal sequences required to initiate transcription. In some embodiments, the term "promoter" includes the sequences to start transcription, and in addition, also include sequences that can upregulate or downregulate transcription, commonly termed "enhancer elements" and "repressor elements", respectively.

As used herein, the term "operatively linked," and similar phrases, when used in reference to nucleic acids or amino acids, refer to the operational linkage of nucleic acid sequences or amino acid sequence, respectively, placed in functional relationships with each other. For example, an operatively linked promoter, enhancer elements, open reading frame, 5' and 3' UTR, and terminator sequences result in the accurate production of a nucleic acid molecule (e.g., RNA). In some embodiments, operatively linked nucleic acid elements result in the transcription of an open reading frame and ultimately the production of a polypeptide (i.e., expression of the open reading frame). As another example, an operatively linked peptide is one in which the functional domains are placed with appropriate distance from each other to impart the intended function of each domain.

By "enhance" or "promote," or "increase" or "expand" or "improve" refers generally to the ability of a composition contemplated herein to produce, elicit, or cause a greater physiological response (i.e., downstream effects) compared to the response caused by either vehicle or a control molecule/composition. A measurable physiological response may include an increase in T cell expansion, activation, effector function, persistence, and/or an increase in cancer cell death killing ability, among others apparent from the understanding in the art and the description herein. In certain embodiments, an "increased" or "enhanced" amount can be a "statistically significant" amount, and may include an increase that is 1.1, 1.2, 1.5, 2, 3, 4, 5, 6, 7, 8, 9, 10, 15, 20, 30 or more times (e.g., 500, 1000 times) (including all integers and decimal points in between and above 1, e.g., 1.5, 1.6, 1.7. 1.8, etc.) the response produced by vehicle or a control composition.

By "decrease" or "lower," or "lessen," or "reduce," or "abate" refers generally to the ability of composition contemplated herein to produce, elicit, or cause a lesser physiological response (i.e., downstream effects) compared to the response caused by either vehicle or a control molecule/composition. In certain embodiments, a "decrease" or "reduced" amount can be a "statistically significant" amount, and may include a decrease that is 1.1, 1.2, 1.5, 2, 3, 4, 5, 6, 7, 8, 9, 10, 15, 20, 30 or more times (e.g., 500, 1000 times) (including all integers and decimal points in between and above 1, e.g., 1.5, 1.6, 1.7. 1.8, etc.) the response (reference response) produced by vehicle, a control composition, or the response in a particular cell lineage.

The terms "treat" or "treatment" of a state, disorder or condition include: (1) preventing, delaying, or reducing the incidence and/or likelihood of the appearance of at least one clinical or sub-clinical symptom of the state, disorder or condition developing in a subject that may be afflicted with or predisposed to the state, disorder or condition, but does not yet experience or display clinical or subclinical symptoms of the state, disorder or condition; or (2) inhibiting the state, disorder or condition, i.e., arresting, reducing or delaying the development of the disease or a relapse thereof or at least one clinical or sub-clinical symptom thereof; or (3) relieving the disease, i.e., causing regression of the state, disorder or condition or at least one of its clinical or sub-clinical symptoms. The benefit to a subject to be treated is either statistically significant or at least perceptible to the patient or to the physician.

The term "effective" applied to dose or amount refers to that quantity of a compound or pharmaceutical composition that is sufficient to result in a desired activity upon administration to a subject in need thereof. Note that when a combination of active ingredients is administered, the effective amount of the combination may or may not include amounts of each ingredient that would have been effective if administered individually. The exact amount required will vary from subject to subject, depending on the species, age, and general condition of the subject, the severity of the condition being treated, the particular drug or drugs employed, the mode of administration, and the like.

The phrase "pharmaceutically acceptable", as used in connection with compositions described herein, refers to molecular entities and other ingredients of such compositions that are physiologically tolerable and do not typically produce untoward reactions when administered to a mammal (e.g., a human). Preferably, the term "pharmaceutically acceptable" means approved by a regulatory agency of the Federal or a state government or listed in the U.S. Pharmacopeia or other generally recognized pharmacopeia for use in mammals, and more particularly in humans.

The term "protein" is used herein encompasses all kinds of naturally occurring and synthetic proteins, including protein fragments of all lengths, fusion proteins and modified proteins, including without limitation, glycoproteins, as well as all other types of modified proteins (e.g., proteins resulting from phosphorylation, acetylation, myristoylation, palmitoylation, glycosylation, oxidation, formylation, amidation, polyglutamylation, ADP-ribosylation, pegylation, biotinylation, etc.).

The terms "nucleic acid", "nucleotide", and "polynucleotide" encompass both DNA and RNA unless specified otherwise. By a "nucleic acid sequence" or "nucleotide sequence" is meant the nucleic acid sequence encoding an amino acid, the term may also refer to the nucleic acid sequence including the portion coding for any amino acids added as an artifact of cloning, including any amino acids coded for by linkers The terms "patient", "individual", "subject", and "animal" are used interchangeably herein and refer to mammals, including, without limitation, human and veterinary animals (e.g., cats, dogs, cows, horses, sheep, pigs, etc.) and experimental animal models. In a preferred embodiment, the subject is a human.

The term "carrier" refers to a diluent, adjuvant, excipient, or vehicle with which the compound is administered. Such pharmaceutical carriers can be sterile liquids, such as water and oils, including those of petroleum, animal, vegetable or synthetic origin, such as peanut oil, soybean oil, mineral oil, sesame oil and the like. Water or aqueous solution saline solutions and aqueous dextrose and glycerol solutions are preferably employed as carriers, particularly for injectable solutions. Alternatively, the carrier can be a solid dosage form carrier, including but not limited to one or more of a binder (for compressed pills), a glidant, an encapsulating agent, a flavorant, and a colorant. Suitable pharmaceutical carriers are described in "Remington's Pharmaceutical Sciences" by E. W. Martin.

Singular forms "a", "an", and "the" include plural references unless the context clearly dictates otherwise. Thus, for example, a reference to "a method" includes one or more methods, and/or steps of the type described herein and/or which will become apparent to those persons skilled in the art upon reading this disclosure.

The term "about" or "approximately" includes being within a statistically meaningful range of a value. Such a range can be within an order of magnitude, preferably within 50%, more preferably within 20%, still more preferably within 10%, and even more preferably within 5% of a given value or range. The allowable variation encompassed by the term "about" or "approximately" depends on the particular system under study, and can be readily appreciated by one of ordinary skill in the art.

The practice of the present invention employs, unless otherwise indicated, conventional techniques of statistical analysis, molecular biology (including recombinant techniques), microbiology, cell biology, and biochemistry, which are within the skill of the art. Such tools and techniques are described in detail in e.g., Sambrook et al. (2001) Molecular Cloning: A Laboratory Manual. 3rd ed. Cold Spring Harbor Laboratory Press: Cold Spring Harbor, New York; Ausubel et al. eds. (2005) Current Protocols in Molecular Biology. John Wiley and Sons, Inc.: Hoboken, NJ; Bonifacino et al. eds. (2005) Current Protocols in Cell Biology. John Wiley and Sons, Inc.: Hoboken, NJ; Coligan et al. eds. (2005) Current Protocols in Immunology, John Wiley and Sons, Inc.: Hoboken, NJ; Coico et al. eds. (2005) Current Protocols in Microbiology, John Wiley and Sons, Inc.: Hoboken, NJ; Coligan et al. eds. (2005) Current Protocols in Protein Science, John Wiley and Sons, Inc.: Hoboken, NJ; and Enna et al. eds. (2005) Current Protocols in Pharmacology, John Wiley and Sons, Inc.: Hoboken, NJ. Additional techniques are explained, e.g., in U.S. Pat. No. 7,912,698 and U.S. Patent Appl. Pub. Nos. 2011/0202322 and 2011/0307437.

The technology illustratively described herein suitably may be practiced in the absence of any element(s) not specifically disclosed herein.

The terms and expressions which have been employed are used as terms of description and not of limitation, and use of such terms and expressions do not exclude any equivalents of the features shown and described or portions thereof, and various modifications are possible within the scope of the technology claimed.

Chimeric Antigen Receptors of the Invention

In one aspect, the invention provides a CAR with enhanced ability to activate, for example, lymphocytes (e.g., T cells or natural killer (NK) cells), to allow for increased tumoricidal activity (e.g., greater and/or longer activity). In particular, the CARs comprise both MyD88 and CD40 co-stimulatory domains.

The CARs of the present invention comprise an extracellular target-binding domain, a transmembrane domain and a cytoplasmic domain, wherein the cytoplasmic domain comprises a lymphocyte activation domain, a MyD88 polypeptide or functional fragment thereof, and a CD40 cytoplasmic polypeptide region or a functional fragment thereof. In certain embodiments, the CAR lacks the transmembrane and/or extracellular domains naturally associated with lymphocyte activation domain. In certain embodiments, the CD40 cytoplasmic polypeptide region or functional fragment thereof lacks the transmembrane and/or extracellular domains. In certain embodiments, the CAR includes the CD40 transmembrane domain. In certain embodiments, the CAR includes the CD40 transmembrane domain and a portion of the CD40 extracellular domain, wherein the CD40 extracellular domain does not interact with natural or synthetic ligands of CD40. Each domain is fused in frame.

Extracellular Target-Binding Domain

In certain aspects, the CARs of the present invention comprise an extracellular target-binding domain, wherein the extracellular target-binding domain comprises an antigen-binding moiety. In certain embodiments, the extracellular target-binding domain further comprises a linker between the antigen-binding moiety and the transmembrane domain.

The choice of antigen-binding moiety depends upon the type and number of antigens that define the surface of a target cell. For example, the antigen-binding moiety may be chosen to recognize an antigen that acts as a cell surface marker on target cells associated with a particular disease state. In certain embodiments, the CARs of the present invention can be genetically modified to target a tumor antigen of interest by way of engineering a desired antigen-binding moiety that specifically binds to an antigen (e.g., on a cancer cell). Non-limiting examples of cell surface markers that may act as targets for the antigen-binding moiety in the CAR of the invention include those associated with viral, bacterial and parasitic infections, autoimmune disease, and cancer cells.

Examples of antigens that may be targeted by the extracellular target-binding domains include, but are not limited to, carbonic anhydrase EX, alpha-fetoprotein, A3, antigen specific for A33 antibody, Ba 733, BrE3-antigen, CA125, CDl, CD1a, CD3, CD5, CD15, CD16, CD19, CD20, CD21, CD22, CD23, CD25, CD30, CD33, CD38, CD45, CD74, CD79a, CD80, CD 138, colon-specific antigen-p (CSAp), CEA (CEACAM5), CEACAM6, CSAp, EGFR, EGP-I, EGP-2, Ep-CAM, EphA1, EphA2, EphA3, EphA4, EphA5, EphA6, EphA7, EphA8, EphA10, EphB1, EphB2, EphB3, EphB4, EphB6, Flt-I, Flt-3, folate receptor, HLA-DR, human chorionic gonadotropin (HCG) and its subunits, HER2/neu, hypoxia inducible factor (HIF-I), Ia, IL-2, IL-6, IL-8, insulin growth factor-1 (IGF-I), KC4-antigen, KS-1-antigen, KS1-4, Le-Y, macrophage inhibition factor (MIF), MAGE, MUCl, MUC2, MUC3, MUC4, NCA66, NCA95, NCA90, antigen specific for PAM-4 antibody, placental growth factor, p53, prostatic acid phosphatase, PSA, PSMA, RS5, S100, TAC, TAG-72, tenascin, TRAIL receptors, Tn antigen, Thomson-Friedenreich antigens, tumor necrosis antigens, VEGF, ED-B fibronectin, 17-1A-antigen, an angiogenesis marker, an oncogene marker or an oncogene product.

In a preferred embodiment, the antigen that is targeted by the extracellular target-binding domain is EphA1, EphA2, EphA3, EphA4, EphA5, EphA6, EphA7, EphA8, EphA10, EphB1, EphB2, EphB3, EphB4, EphB6, or a variant of any of these Eph receptors. In another preferred embodiment, the antigen that is targeted by the extracellular target-binding domain is EphA2 or a variant thereof.

In certain embodiments, the extracellular target-binding domain comprises an antigen-binding moiety that can include an antigen-binding polypeptide or a ligand that binds the target antigen (e.g., EphA2 or a variant thereof). In certain embodiments, the antigen-binding domain is specific for an antigen (e.g., EphA2 or a variant thereof) or can non-specifically bind to related family members (e.g., EphA1, EphA2, EphA3, EphA4, EphA5, EphA6, EphA7, EphA8, EphA10, EphB1, EphB2, EphB3, EphB4, EphB6, or a variant of any of these Eph receptors).

In certain embodiments, the antigen-binding polypeptide can be monomeric or multimeric (e.g., homodimeric or heterodimeric), or associated with multiple proteins in a non-covalent complex. In certain embodiments, the extracellular target-binding domain may consist of an Ig heavy chain. In certain embodiments, the Ig heavy chain can be covalently associated with Ig light chain (e.g., via the hinge and optionally the CH1 region). In certain embodiments, the Ig heavy chain may become covalently associated with other Ig heavy/light chain complexes (e.g., by the presence of hinge, CH2, and/or CH3 domains). In the latter case, the heavy/light chain complex that becomes joined to the chimeric construct may constitute an antibody with a specificity distinct from the antibody specificity of the chimeric construct. In certain embodiments, the entire chain may be used. In certain embodiments, a truncated chain may be used, where all or a part of the CH1, CH2, or CH3 domains may be removed or all or part of the hinge region may be removed. Non-limiting examples of antigen-binding polypeptides include antibodies and antibody fragments such as e.g., murine antibodies, rabbit antibodies, human antibodies, fully humanized antibodies, single chain variable fragments (scFv), camelid antibody variable domains and humanized versions, shark antibody variable domains and humanized versions, single domain antibody variable domains, nanobodies (VHHs), and camelized antibody variable domains.

In certain embodiments, the antigen-binding moiety comprises an antigen-binding polypeptide or functional variant thereof, as described above, that binds to the antigen. In certain embodiments, the antigen-binding polypeptide is an antibody or an antibody fragment, as described above, that binds to the antigen.

In certain embodiments, the antigen-binding moiety comprises an Eph receptor-binding polypeptide or functional variant thereof. In certain embodiments, the antigen-binding polypeptide is an antibody or an antibody fragment that binds to an Eph receptor. In certain embodiments, the Eph receptor is EphA1, EphA2, EphA3, EphA4, EphA5, EphA6, EphA7, EphA8, EphA10, EphB1, EphB2, EphB3, EphB4, EphB6, and/or a variant of any of these Eph receptors. In certain embodiments, the Eph receptor is an EphA2 or a variant thereof.

In certain embodiments, the Eph receptor-binding moiety is an anti-Eph receptor scFv. In certain embodiments, the Eph receptor-binding moiety is an anti-EphA2 scFv. In certain embodiments, the Eph receptor-binding moiety is an anti-EphA2 scFv comprising or consisting essentially of the amino acid sequence set forth in SEQ ID NO: 9 or a variant thereof having at least 50, at least 55, at least 60, at least 65, at least 70, at least 75, at least 80, at least 85, at least 90, at least 95, at least 98 or at least 99%, sequence identity with SEQ ID NO: 9. In certain embodiments, the nucleotide sequence encoding the anti-EphA2 scFV comprises or consists essentially of the nucleotide sequence that encodes the amino acid sequence of SEQ ID NO: 9, or a variant thereof having at least 50, at least 55, at least 60, at least 65, at least 70, at least 75, at least 80, at least 85, at least 90, at least 95, at least 98 or at least 99%, sequence identity with SEQ ID NO:9. In certain embodiments, the nucleotide sequence encoding the anti-EphA2 scFV comprises or consists essentially of the sequence set forth in SEQ ID: 10, or a nucleotide sequence having at least 50, at least 55, at least 60, at least 65, at least 70, at least 75, at least 80, at least 85, at least 90, at least 95, at least 98 or at least 99%, sequence identity with SEQ ID NO:10. In certain embodiments, the anti-EphA2 scFV comprises or consists essentially of the amino acid sequence of SEQ ID NO: 9. In certain embodiments, the nucleotide sequence encoding the anti-EphA2 scFV comprises or consists essentially of the nucleotide sequence set forth in SEQ ID: 10. In certain embodiments, the extracellular target-binding domain of the CAR is a ligand for a target cell antigen or receptor. In certain embodiments, the ligand is a natural ligand of the antigen or receptor.

In certain embodiments, the Eph receptor-binding moiety comprises an Eph receptor ligand. In certain embodiments, the Eph receptor-binding moiety comprises a natural Eph receptor ligand. In certain embodiments, the Eph receptor is EphA1, EphA2, EphA3, EphA4, EphA5, EphA6, EphA7, EphA8, EphA10, EphB1, EphB2, EphB3, EphB4, EphB6, and/or a variant of any of these Eph receptors. In certain embodiments, the Eph receptor is an EphA2 or a variant thereof.

In certain embodiments, the Eph receptor-binding moiety is an EphA2-binding moiety. In certain embodiments, the EphA2-binding moiety comprises an EphA2 ligand. In certain embodiments, the EphA2-binding moiety comprises a natural EphA2 ligand. In certain embodiments, the natural ligand for a target cell antigen or receptor is a natural ligand for EphA2 such as, but not limited to, Ephrin-A1, Ephrin-A2, Ephrin-A3, Ephrin-A4, Ephrin-A5 or Ephrin-A6.

Additional examples of EphA2-binding moieties can be found in US20040028685, US20050049176, US20050147593, US20050153923, US20050152899, US20080044413, US20100183618, US20150343081, US20170267768, US20170306032, US20170349663, US20180021294, U.S. Pat. Nos. 7,101,976, 7,326,552 (includes crystals relating to EphA2), WO2001012840, WO2005051307, WO2005056766, WO2006084226, WO2007075706, WO2008010101, WO2011039724, WO2012008397, WO2017161069, WO2017161071, WO2018034332, and WO2018053649, each of which is incorporated herein by reference in its entirety for all purposes.

In certain embodiments, the extracellular target-binding domain comprises an optional leader sequence at the amino-terminus of the extracellular target-binding domain. In certain embodiments, the extracellular target-binding domain comprises a leader sequence at the amino-terminus of antigen-binding moiety, wherein the leader sequence is optionally cleaved from the antigen-binding moiety during cellular processing and localization of the CAR to the cellular membrane.

In certain embodiments, the leader sequence comprises or consists essentially of the amino acid sequence set forth in SEQ ID NO:7 or a variant thereof having at least 50, at least 55, at least 60, at least 65, at least 70, at least 75, at least 80, at least 85, at least 90, at least 95, at least 98 or at least 99%, sequence identity with SEQ ID NO:7. In certain embodiments, the nucleotide sequence encoding the leader sequence comprises or consists essentially of the nucleotide sequence that encodes the amino acid sequence of SEQ ID NO: 7, or a variant thereof having at least 50, at least 55, at least 60, at least 65, at least 70, at least 75, at least 80, at least 85, at least 90, at least 95, at least 98 or at least 99%, sequence identity with SEQ ID NO:7. In certain embodiments, the nucleotide sequence encoding the leader sequence comprises or consists essentially of the sequence set forth in SEQ ID: 8, or a nucleotide sequence having at least 50, at least 55, at least 60, at least 65, at least 70, at least 75, at least 80, at least 85, at least 90, at least 95, at least 98 or at least 99%, sequence identity with SEQ ID NO:8. In certain embodiments, the leader sequence comprises or consists essentially of the amino acid sequence of SEQ ID NO:7. In certain embodiments, the nucleotide sequence encoding the leader sequence comprises or consists essentially of the nucleotide sequence set forth in SEQ ID: 8.

In certain embodiments, the extracellular target-binding domain further comprises a linker domain between the antigen-binding moiety and the transmembrane domain, wherein the antigen-binding moiety, linker, and the transmembrane domain are in frame with each other.

The term "linker domain" as used herein generally means any oligo- or polypeptide that functions to link the antigen-binding moiety to the transmembrane domain. A linker domain can be used to provide more flexibility and accessibility for the antigen-binding moiety. A linker domain may comprise up to 300 amino acids, preferably 10 to 100 amino acids and most preferably 25 to 50 amino acids. A linker domain may be derived from all or part of naturally occurring molecules, such as from all or part of the extracellular region of CD8, CD4 or CD28, or from all or part of an antibody constant region. Alternatively, the linker domain may be a synthetic sequence that corresponds to a naturally occurring linker domain sequence, or may be an entirely synthetic linker domain sequence. Non-limiting examples of linker domains which may be used in accordance to the invention include a part of human CD8 a chain, partial extracellular domain of CD28, FcγRIIIa receptor, IgG, IgM, IgA, IgD, IgE, an Ig hinge, or functional fragment thereof. In certain embodiments, additional linking amino acids are added to the linker domain to ensure that the antigen-binding moiety is an optimal distance from the transmembrane domain. In certain embodiments, when the linker is derived from an Ig, the linker may be mutated to prevent Fc receptor binding.

In certain embodiments, the linker domain comprises an immunoglobulin IgG hinge or functional fragment thereof. In certain embodiments, the IgG hinge is from IgG1, IgG2, IgG3, IgG4, IgM1, IgM2, IgA1, IgA2, IgD, IgE, or a chimera thereof. In certain embodiments, the linker domain comprises the CH1, CH2, CH3 and/or hinge region of the immunoglobulin. In certain embodiments, the linker domain comprises the core hinge region of the immunoglobulin. The term "core hinge" can be used interchangeably with the term "short hinge" (a.k.a "SH"). Non-limiting examples of suitable linker domains are the core immunoglobulin hinge regions listed in Table 1 (see also Wypych et al., JBC 2008 283 (23): 16194-16205, which is incorporated herein by reference in its entirety for all purposes). In certain embodiments, the linker domain is a fragment of the immunoglobulin hinge.

TABLE 1

Amino Acid Sequence of Core Hinge Regions of IgG Immunoglobulins

| IgG Subtype | Core Hinge Sequence | SEQ ID NO |
|---|---|---|
| IgG1 | EPKSCDKTHTCPPCP | SEQ ID NO: 11 |
| IgG2 | ERKCCVECPPCP | SEQ ID NO: 35 |
| IgG3 | ELKTPLGDTTHTCPRCP (EPKSCDTPPPCPRCP)$_3$ | SEQ ID NO: 36 |
| IgG4 | ESKYGPPCPSCP | SEQ ID NO: 37 |

In certain embodiments, the linker domain comprises an IgG1 hinge, or a variant thereof. In certain embodiments, the linker domain comprises the core hinge structure of IgG1 or a variant thereof. In certain embodiments, linker domain comprises an IgG1 core hinge region and comprises or consists essentially of the amino acid sequence set forth in SEQ ID NO: 11, 83, 84, or 86, or a variant thereof having at least 50, at least 55, at least 60, at least 65, at least 70, at least 75, at least 80, at least 85, at least 90, at least 95, at least 98 or at least 99%, sequence identity with SEQ ID NO:11, 83, 84, or 86. In certain embodiments, the nucleotide sequence encoding the linker comprising the IgG1 core hinge region comprises or consists essentially of the nucleotide sequence that encodes the amino acid sequence of SEQ ID NO: 11, 83, 84, or 86, or a variant thereof having at least 50, at least 55, at least 60, at least 65, at least 70, at least 75, at least 80, at least 85, at least 90, at least 95, at least 98 or at least 99%, sequence identity with SEQ ID NO:11, 83, 84, or 86. In certain embodiments, the nucleotide sequence encoding the linker comprising the IgG1 core hinge region comprises or consists essentially of the nucleotide sequence of SEQ ID: 12, 85, or 87, or a nucleotide sequence having at least 50, at least 55, at least 60, at least 65, at least 70, at least 75, at least 80, at least 85, at least 90, at least 95, at least 98 or at least 99%, sequence identity with SEQ ID NO: 12, 85, or 87. In certain embodiments, linker domain comprises an IgG1 core hinge region and comprises or consists essentially of the amino acid sequence set forth in SEQ ID NO: 11, 83, 84, or 86. In certain embodiments, the nucleotide sequence encoding the linker comprising the IgG1 core hinge region comprises or consists essentially of the nucleotide sequence of SEQ ID: 12, 85, or 87. In certain embodiments, linker domain is an IgG1 core hinge region comprising or consisting essentially of the amino acid sequence set forth in SEQ ID NO: 11 or a variant thereof. In certain embodiments, the nucleotide sequence encoding the IgG1 core hinge region comprises or consists essentially of the nucleotide sequence of SEQ ID: 12 or a variant thereof.

In certain embodiments, the linker domain comprises an IgG2 hinge, or a variant thereof. In certain embodiments, the linker domain comprises the core hinge structure of IgG2 or a variant thereof. In certain embodiments, linker domain comprises an IgG2 core hinge region and comprises or consists essentially of the amino acid sequence set forth in SEQ ID NO: 35 or 81, or a variant thereof having at least 50, at least 55, at least 60, at least 65, at least 70, at least 75, at least 80, at least 85, at least 90, at least 95, at least 98 or at least 99%, sequence identity with SEQ ID NO: 35 or 81. In certain embodiments, the nucleotide sequence encoding the linker comprising the IgG2 core hinge region comprises or consists essentially of the nucleotide sequence that encodes the amino acid sequence of SEQ ID NO: 35 or 81, or a variant thereof having at least 50, at least 55, at least 60, at least 65, at least 70, at least 75, at least 80, at least 85, at least 90, at least 95, at least 98 or at least 99%, sequence identity with SEQ ID NO: 35 or 81. In certain embodiments, the nucleotide sequence encoding the linker comprising the IgG2 core hinge region comprises or consists essentially of the nucleotide sequence of SEQ ID: 82, or a nucleotide sequence having at least 50, at least 55, at least 60, at least 65, at least 70, at least 75, at least 80, at least 85, at least 90, at least 95, at least 98 or at least 99%, sequence identity with SEQ ID NO:82. In certain embodiments, linker domain comprises an IgG2 core hinge region and comprises or consists essentially of the amino acid sequence set forth in SEQ ID NO: 35 or 81. In certain embodiments, the nucleotide sequence encoding the linker comprising the IgG2 core hinge region comprises or consists essentially of the nucleotide sequence of SEQ ID: 82.

Transmembrane Domain

In certain aspects, the CARs of the present invention comprise a transmembrane domain, fused in frame between the extracellular target-binding domain and the cytoplasmic domain.

The transmembrane domain may be derived from the protein contributing to the extracellular target-binding domain, the protein contributing the signaling or co-signaling domain, or by a totally different protein. In some instances, the transmembrane domain can be selected or modified by amino acid substitution, deletions, or insertions to minimize interactions with other members of the CAR complex. In some instances, the transmembrane domain can be selected or modified by amino acid substitution, deletions, or insertions to avoid-binding of proteins naturally associated with the transmembrane domain. In certain embodiments, the transmembrane domain includes additional amino acids to allow for flexibility and/or optimal distance between the domains connected to the transmembrane domain.

The transmembrane domain may be derived either from a natural or from a synthetic source. Where the source is natural, the domain may be derived from any membrane-bound or transmembrane protein. Non-limiting examples of transmembrane domains of particular use in this invention may be derived from (i.e. comprise at least the transmembrane region(s) of) the a, B or ζ chain of the T-cell receptor, CD28, CD3 epsilon, CD45, CD4, CD5, CD8, CD9, CD16, CD22, CD33, CD37, CD40, CD64, CD80, CD86, CD134, CD137, CD154. Alternatively, the transmembrane domain may be synthetic, in which case it will comprise predominantly hydrophobic residues such as leucine and valine. For example, a triplet of phenylalanine, tryptophan and/or valine can be found at each end of a synthetic transmembrane domain.

In certain embodiments, it will be desirable to utilize the transmembrane domain of the ζ, η or FcεR1γ chains which contain a cysteine residue capable of disulfide bonding, so that the resulting chimeric protein will be able to form disulfide linked dimers with itself, or with unmodified versions of the ζ, η or FcεR1γ chains or related proteins. In some instances, the transmembrane domain will be selected or modified by amino acid substitution to avoid-binding of such domains to the transmembrane domains of the same or different surface membrane proteins to minimize interactions with other members of the receptor complex. In other cases, it will be desirable to employ the transmembrane domain of ζ, η or FcεR1γ and –β, MB1 (Igα.), B29 or CD3-γ, ζ, or η, in order to retain physical association with other members of the receptor complex.

In certain embodiments, the transmembrane domain in the CAR of the invention is derived from the CD28 transmembrane domain. In certain embodiments, the CD28 transmembrane domain comprises or consists essentially of the amino acid sequence set forth in SEQ ID NO: 13, or a variant thereof having at least 50, at least 55, at least 60, at least 65, at least 70, at least 75, at least 80, at least 85, at least 90, at least 95, at least 98 or at least 99%, sequence identity with SEQ ID NO:13. In certain embodiments, the nucleotide sequence that encodes the CD28 transmembrane domain comprises or consists essentially of the nucleotide sequence that encodes the amino acid sequence of SEQ ID NO: 13, or a variant thereof having at least 50, at least 55, at least 60, at least 65, at least 70, at least 75, at least 80, at least 85, at least 90, at least 95, at least 98 or at least 99%, sequence identity with SEQ ID NO:13. In certain embodiments, the CD28 transmembrane domain comprises or consists essentially of the nucleotide sequence set forth in SEQ ID: 14, or a nucleotide sequence having at least 50, at least 55, at least 60, at least 65, at least 70, at least 75, at least 80, at least 85, at least 90, at least 95, at least 98 or at least 99%, sequence identity with SEQ ID NO:14. In certain embodiments, the CD28 transmembrane domain comprises or consists essentially of the amino acid sequence set forth in SEQ ID NO: 13. In certain embodiments, the nucleotide sequence that encodes the CD28 transmembrane domain comprises or consists essentially of the nucleotide sequence set forth in SEQ ID: 14.

In certain embodiments, the transmembrane domain in the CAR of the invention is derived from the CD8a transmembrane domain. In certain embodiments, the CD8a transmembrane domain comprises or consists essentially of the amino acid sequence set forth in SEQ ID NO: 48, 94, or 96, or a variant thereof having at least 50, at least 55, at least 60, at least 65, at least 70, at least 75, at least 80, at least 85, at least 90, at least 95, at least 98 or at least 99%, sequence identity with SEQ ID NO: 48, 94, or 96. In certain embodiments, the nucleotide sequence that encodes the CD8a transmembrane domain comprises or consists essentially of the nucleotide sequence that encodes the amino acid sequence of SEQ ID NO: 48, 94, or 96, or a variant thereof having at least 50, at least 55, at least 60, at least 65, at least 70, at least 75, at least 80, at least 85, at least 90, at least 95, at least 98 or at least 99%, sequence identity with SEQ ID NO: 48, 94, or 96. In certain embodiments, the nucleotide sequence that encodes the CD8a transmembrane domain comprises or consists essentially of the nucleotide sequence set forth in SEQ ID: 49, 95, or 97, or a nucleotide sequence having at least 50, at least 55, at least 60, at least 65, at least 70, at least 75, at least 80, at least 85, at least 90, at least 95, at least 98 or at least 99%, sequence identity with SEQ ID NO: 49, 95, or 97. In certain embodiments, the CD8a transmembrane domain comprises or consists essentially of the amino acid sequence set forth in SEQ ID NO: 48, 94, or 96. In certain embodiments, the nucleotide sequence that encodes the CD8a transmembrane domain comprises or consists essentially of the nucleotide sequence set forth in SEQ ID: 49, 95, or 97. In certain embodiments, the CD8a transmembrane domain comprises or consists essentially of the amino acid sequence set forth in SEQ ID NO: 48 or variant thereof. In certain embodiments, the nucleotide sequence that encodes the CD8a transmembrane domain comprises or consists essentially of the nucleotide sequence set forth in SEQ ID: 49 or variant thereof.

Cytoplasmic Domain

In certain aspects, the CARs of the present invention comprise a cytoplasmic domain, which comprises a lymphocyte activation domain, a MyD88 polypeptide or functional fragment thereof, and a CD40 cytoplasmic polypeptide region or a functional fragment thereof. In certain embodiments, the CAR lacks the CD40 transmembrane and/or CD40 extracellular domains. In certain embodiments, the CAR includes the CD40 transmembrane domain. In certain embodiments, the CAR includes the CD40 transmembrane domain and a portion of the CD40 extracellular domain, wherein the CD40 extracellular domain does not interact with natural or synthetic ligands of CD40.

In certain embodiments, the lymphocyte activation domain is separated from the MyD88 polypeptide or functional fragment thereof and/or the CD40 cytoplasmic polypeptide region or a functional fragment thereof. In certain embodiments, the lymphocyte activation domain is separated from the MyD88 polypeptide or functional fragment thereof and/or the CD40 cytoplasmic polypeptide region or a functional fragment thereof by at least 1, 2, 3, 4, 5, 6, 7, 8, 9, 10, 11, 12, 13, 14, or 15 amino acids.

In certain embodiments, the lymphocyte activation domain and co-stimulatory domains can be in any order. The MyD88 polypeptide or functional fragment thereof and/or the CD40 cytoplasmic polypeptide region or a functional fragment thereof can be in any order. In certain embodiments, the MyD88 polypeptide or functional fragment thereof is upstream of the CD40 cytoplasmic polypeptide region or a functional fragment thereof. In certain embodiments, the MyD88 polypeptide or functional fragment thereof is downstream from the CD40 cytoplasmic polypeptide region or a functional fragment thereof. In certain embodiments, the MyD88 polypeptide or functional fragment thereof and/or the CD40 cytoplasmic polypeptide region or a functional fragment thereof are next to each other. In certain embodiments, the lymphocyte activation domain is upstream of the co-stimulatory genes. In certain embodiments, the lymphocyte activation domain is downstream from the co-stimulatory genes.

The cytoplasmic domain, which comprises the lymphocyte activation domain of the CAR of the invention, is responsible for activation of at least one of the normal effector functions of the lymphocyte in which the CAR has been placed in. The term "effector function" refers to a specialized function of a cell. Effector function of a T cell, for example, may be cytolytic activity or helper activity including the secretion of cytokines. Thus, the term "lymphocyte activation domain" refers to the portion of a protein which transduces the effector function signal and directs the cell to perform a specialized function. While usually the entire lymphocyte activation domain is present, in many cases it is not necessary to use the entire chain. To the extent that a truncated portion of the intracellular signaling domain is used, such truncated portion may be used in place of the intact chain as long as it transduces the effector function signal. The term intracellular signaling domain is thus meant to include any truncated portion of the lymphocyte activation domain sufficient to transduce the effector function signal.

Non-limiting examples of lymphocyte activation domains which can be used in the CARs of the invention include, e.g., lymphocyte activation domains derived from DAP10, DAP12, Fc epsilon receptor I gamma chain (FCER1G), FcR β, CD3δ, CD3ε, CD3γ, CD3}, CD5, CD22, CD226, CD66d, CD79A, and CD79B.

In certain embodiments, the lymphocyte activation domain in the CAR of the invention is designed to comprise the signaling domain of CD3ζ. In certain embodiments, the CD3ζ signaling domain comprises or consists essentially of the amino acid sequence set forth in SEQ ID NO: 19 or a variant thereof having at least 50, at least 55, at least 60, at least 65, at least 70, at least 75, at least 80, at least 85, at least 90, at least 95, at least 98 or at least 99%, sequence identity with SEQ ID NO:19. In certain embodiments, the nucleotide sequence that encodes the CD3 signaling domain comprises or consists essentially of the nucleotide sequence that encodes the amino acid sequence of SEQ ID NO: 19, or a variant thereof having at least 50, at least 55, at least 60, at least 65, at least 70, at least 75, at least 80, at least 85, at least 90, at least 95, at least 98 or at least 99%, sequence identity with SEQ ID NO: 19. In certain embodiments, the nucleotide sequence that encodes the CD3ζ signaling domain comprises or consists essentially of the nucleotide sequence set forth in SEQ ID: 20, or a nucleotide sequence having at least 50, at least 55, at least 60, at least 65, at least 70, at least 75, at least 80, at least 85, at least 90, at least 95, at least 98 or at least 99%, sequence identity with SEQ ID NO:20. In certain embodiments, the CD3ζ signaling domain comprises or consists essentially of the amino acid sequence set forth in SEQ ID NO: 19. In certain embodiments, the nucleotide sequence that encodes the CD3ζ signaling domain comprises or consists essentially of the nucleotide sequence set forth in SEQ ID: 20.

It is known that signals generated through the TCR alone are insufficient for full activation of lymphocytes and that a secondary or co-stimulatory signal is also required. Thus, lymphocyte activation can be said to be mediated by two distinct classes of cytoplasmic signaling sequence: those that initiate antigen-dependent primary activation through the TCR (primary lymphocyte activation sequences (as discussed above)) and those that act in an antigen-independent manner to provide a secondary or co-stimulatory signal (secondary cytoplasmic signaling sequences).

In certain aspects, the cytoplasmic domain comprises a MyD88 polypeptide or functional fragment thereof and a CD40 cytoplasmic polypeptide region or a functional fragment thereof.

Myeloid differentiation primary response gene 88 (MyD88) plays a central role in the innate and adaptive immune response. It functions as an essential signal transducer in the interleukin-1 and Toll-like receptor signaling pathways, which regulate that activation of numerous proinflammatory genes. See e.g., Deguine and Barton *F1000Prime Reports* 2014, 6:97; Xie *Journal of Molecular Signaling* 2013, 8:7; Ngo et al., Nature 2011, 470:115-119 each of which are incorporated by reference herein in their entirety for all purposes. The encoded protein consists of an N-terminal death domain and a C-terminal Toll-interleukin1 receptor domain. By MyD88 polypeptide or functional fragment thereof is meant the polypeptide product of MyD88. An example of a MyD88 polypeptide, includes, but not limited to the human MyD88 (NCBI Gene ID 4615; U84408.1; or NP_00245932). Non-limiting examples of a MyD88 polypeptide is presented as SEQ ID NO: 25, 30, 31, or 33 or an amino acid sequence having at least 50, at least 55, at least 60, at least 65, at least 70, at least 75, at least 80, at least 85, at least 90, at least 95, at least 98 or at least 99%, sequence identity thereto. Non-limiting example of a MyD88 functional fragment includes a MyD88 polypeptide that is capable of amplifying the lymphocyte-mediated immune response. In certain embodiments, the MyD88 is a functional fragment (i.e., the protein is not full length and may lack, for example, a domain, but still functions as a co-stimulatory domain). For example, a MyD88 functional fragment may be missing the Toll/Il-1 receptor domain (TIR) domain. In certain embodiments, a MyD88 functional fragment may be missing a portion of the TIR domain. In certain embodiments, the MyD88 polypeptide or functional fragment thereof comprises at least a portion of the TIR domain. In certain embodiments, the MyD88 polypeptide or functional fragment thereof comprises a gain of function mutation such as L to P mutation (e.g., corresponding to L265 of SEQ ID NO: 31). In certain embodiments, the MyD88 polypeptide or functional fragment thereof comprises a gain of function mutation such as R to C mutation (e.g., corresponding to R193 of SEQ ID NO: 31). In certain embodiments, the MyD88 functional fragment comprises the death domain. In certain embodiments, the MyD88 functional fragment comprises the death domain and the intermediate domain. In certain embodiments, the MyD88 interacts with IRAK-1 and/or IRAK-4. In certain embodiments, the MyD88 polypeptide or functional fragment thereof brings IRAK-1 and IRAK-4 signaling molecules together. An example of a MyD88 functional fragment is presented as SEQ ID NOS: 15, 28, or 60 (amino acid sequence) and 16 or 29 (nucleic acid sequence). By a nucleotide sequence coding for a MyD88 functional fragment is meant the nucleotide sequence coding for the MyD88 functional fragment peptide, the term may also refer to the nucleotide sequence including the portion coding for any amino acids added as an artifact of cloning, including any amino acids coded for by the linkers. It is understood that where a method or construct refers to a MyD88 functional fragment polypeptide, the method may also be used, or the construct designed to refer to another MyD88 polypeptide, such as a full length MyD88 polypeptide. Where a method or construct refers to a full length MyD88 polypeptide, the method may also be used, or the construct designed to refer to a MyD88 functional fragment polypeptide.

In certain embodiments, the MyD88 polypeptide or functional fragment thereof in the CAR of the invention is designed to comprise the co-stimulatory domain of MyD88, or variant thereof. In certain embodiments, the MyD88 functional fragment comprises or consists essentially of the amino acid sequence set forth in SEQ ID NO: 15, 28, or 60, or a variant thereof having at least 50, at least 55, at least 60, at least 65, at least 70, at least 75, at least 80, at least 85, at least 90, at least 95, at least 98 or at least 99%, sequence identity with SEQ ID NO: 15, 28, or 60. In certain embodiments, the nucleotide sequence encoding the MyD88 functional fragment comprises or consists essentially of the nucleotide sequence that encodes the amino acid sequence of SEQ ID NO: 15, 28, or 60, or a variant thereof having at least 50, at least 55, at least 60, at least 65, at least 70, at least 75, at least 80, at least 85, at least 90, at least 95, at least 98 or at least 99%, sequence identity with SEQ ID NO: 15, 28, or 60. In certain embodiments, the nucleotide sequence encoding the MyD88 functional fragment comprises or consists essentially of the nucleotide sequence set forth in SEQ ID: 16, 29, or 61, or a nucleotide sequence having at least 50, at least 55, at least 60, at least 65, at least 70, at least 75, at least 80, at least 85, at least 90, at least 95, at least 98 or at least 99%, sequence identity with SEQ ID NO: 16, 29, or 61. In certain embodiments, the MyD88 functional fragment comprises or consists essentially of the amino acid sequence set forth in SEQ ID NO: 15, 28, or 60. In certain embodiments, the nucleotide sequence that encodes the MyD88 functional fragment comprises or consists essentially of the nucleotide sequence set forth in SEQ ID: 16, 29, or 61.

Cluster of differentiation 40 (CD40) is a co-stimulatory protein found on antigen presenting cells. The protein receptor encoded by the CD40 gene is a member of the TNF-receptor superfamily and is found to be essential in mediating a broad variety of immune and inflammatory responses including T cell-dependent immunoglobulin class switching, memory B cell development, and germinal center formation. See e.g., Grewal, I S; Flavell, R A (1998). *Annual Review of Immunology.* 16:111-35; An et al., JBC 2011 286 (13): 11226-11235; and Chen et. al., *Cellular & Molecular Immunology,* 2006 3 (3): 163-169, each of which are incorporated by reference herein in their entirety for all purposes. By CD40 polypeptide or functional fragment thereof is meant the polypeptide product of CD40. An example of CD40 polypeptide, includes, but not limited to the human CD40 (e.g., NCBI Gene ID 958; X60592.1). A non-limiting example of a CD40 polypeptide is presented as SEQ ID NO: 32. A functional fragment of CD40, refers to a CD40 nucleic acid fragment, variant, or analog, refers to a nucleic acid that codes for a CD40 polypeptide, or a CD40 polypeptide, that stimulates an immune response. A non-limiting example of a CD40 functional fragment includes a CD40 polypeptide that is lacking the extracellular domain, but is capable of amplifying the lymphocyte immune response. In certain embodiments, the CD40 is a functional fragment (i.e., the protein is not full length and may lack, for example, a domain, but still functions as a co-stimulatory domain). For example, a CD40 functional fragment may lack its transmembrane and/or extracellular domain but is capable of amplifying the lymphocyte immune response. In certain embodiments, the CD40 functional fragment includes the transmembrane domain. In certain embodiments, the CD40 functional fragment includes the transmembrane domain and a portion of the extracellular domain, wherein the extracellular domain does not interact with natural or synthetic ligands of CD40. In certain embodiments, the CD40 functional fragment interacts with Jak3, TRAF2, TRAF3, and/or TRAF6. By a nucleotide sequence coding for a CD40 functional fragment is meant the nucleotide sequence coding for the CD40 functional fragment peptide, the term may also refer to the nucleic acid sequence including the portion coding for any amino acids added as an artifact of cloning, including any amino acids coded for by the linkers. It is understood that where a method or construct refers to a CD40 functional fragment polypeptide, the method may also be used, or the construct designed to refer to another CD40 polypeptide, such as a full length CD40 polypeptide. Where a method or construct refers to a full length CD40 polypeptide, the method may also be used, or the construct designed to refer to a CD40 functional fragment polypeptide.

In certain embodiments, the CD40 polypeptide or functional fragment thereof in the CAR of the invention is designed to comprise the CD40 cytoplasmic polypeptide region. In certain embodiments, the CD40 cytoplasmic polypeptide region comprises or consists essentially of the amino acid sequence set forth in SEQ ID NO: 17 or a variant thereof having at least 50, at least 55, at least 60, at least 65, at least 70, at least 75, at least 80, at least 85, at least 90, at least 95, at least 98 or at least 99%, sequence identity with SEQ ID NO: 17. In certain embodiments, the nucleotide sequence encoding the CD40 cytoplasmic polypeptide region comprises or consists essentially of the nucleotide sequence that encodes the amino acid sequence of SEQ ID NO: 17, or a variant thereof having at least 50, at least 55, at least 60, at least 65, at least 70, at least 75, at least 80, at least 85, at least 90, at least 95, at least 98 or at least 99%, sequence identity with SEQ ID NO: 17. In certain embodiments, the nucleotide sequence encoding the CD40 cytoplasmic polypeptide region comprises or consists essentially of the nucleotide sequence set forth in SEQ ID: 18, or a nucleotide sequence having at least 50, at least 55, at least 60, at least 65, at least 70, at least 75, at least 80, at least 85, at least 90, at least 95, at least 98 or at least 99%, sequence identity with SEQ ID NO: 18. In certain embodiments, the CD40 cytoplasmic polypeptide region comprises or consists essentially of the amino acid sequence of SEQ ID NO: 17. In certain embodiments, the nucleotide sequence encoding the CD40 cytoplasmic polypeptide region comprises or consists essentially of the nucleotide sequence set forth in SEQ ID: 18.

In certain embodiments, the CARs of the invention can include additional co-stimulatory domains. Non-limiting co-stimulatory domains include, but are not limited to, 4-1BB (CD137), CD28, ICOS, CD134 (OX-40), BTLA, CD27, CD30, GITR, CD226, and HVEM.

Accessory Genes

In addition to the CAR construct, the CAR may further comprise an accessory gene that encodes an accessory peptide. Examples of accessory genes can include a transduced host cell selection marker, an in vivo tracking marker, a cytokine, a suicide gene, or some other functional gene. For example, the constructs depicted in FIG. 1A comprise the EphA2-CAR, a 2A sequence, and the accessory gene for truncated CD19 (tCD19). In certain embodiments, the tCD19 can be used as a tag. For example, expression of tCD19 can help determine transduction efficiency. In certain embodiments, the CAR comprises the tCD19 construct. In certain embodiments, the CAR does not include the tCD19 construct. In certain embodiments, the tCD19 can be replaced with a functional accessory gene to enhance the effector function of the CAR (e.g., EphA2-CAR) containing host cells. In certain embodiments, the functional accessory gene can increase the safety of the CAR. In certain embodiments, the CAR comprises at least one accessory gene. In certain embodiments, the CAR comprises one accessory gene. In other embodiments, the CAR comprises two accessory genes. In yet another embodiment, the CAR comprises three accessory genes.

Non-limiting examples of classes of accessory genes that can be used to increase the effector function of CAR containing host cells, include i) sectretable cytokines (e.g., but not limited to, IL-7, IL-12, IL-15, IL-18), ii) membrane bound cytokines (e.g., but not limited to, IL-15), iii) chimeric cytokine receptors (e.g., but not limited to, IL-2/IL-7, IL-4/IL-7), iv) constitutive active cytokine receptors (e.g., but not limited to, C7R), v) dominant negative receptors (DNR; e.g., but not limited to TGFRII DNR), vi) ligands of costimulatory molecules (e.g., but not limited to, CD80, 4-1BBL), vii) antibodies, including fragments thereof and bispecific antibodies (e.g., but not limited to, bispecific T-cell engagers (BiTEs)), or vii) a second CAR.

In certain embodiments, the functional accessory gene can be a suicide gene. A suicide gene is a recombinant gene that will cause the host cell that the gene is expressed in to undergo programmed cell death or antibody mediated clearance at a desired time. Suicide genes can function to increase the safety of the CAR. In another embodiment, the accessory gene is an inducible suicide gene. Non-limiting examples of suicide genes include i) molecules that are expressed on the cell surface and can be targeted with a clinical grade monoclonal antibody including CD20, EGFR or a fragment thereof, HER2 or a fragment thereof, and ii) inducible suicide genes (e.g., but not limited to inducible caspase 9 (see Straathof et al. (2005) *Blood.* 105 (11): 4247-4254; US Publ. No. 2011/0286980, each of which are incorporated herein by reference in their entirety for all purposes)).

tCD19 could also be replaced with two accessory genes separated by a separation sequence (e.g., a 2A sequence) using a combination of the classes of molecules listed above (e.g., CAR-2A-CD20-2A-IL15). In addition, the use of two separation sequences (e.g., 2A sequences) would allow the expression of TCR (e.g., CAR-2A-TCRα-2A-TCRβ). In the constructs with a CAR and two or three accessory genes, the order of the CAR and the 2nd or 3rd transgene could be switched.

A "separation sequence" refers to a peptide sequence that causes a ribosome to release the growing polypeptide chain that it is being synthesizes without dissociation from the mRNA. In this respect, the ribosome continues translating and therefore produces a second polypeptide. Non-limiting examples of separation sequences includes T2A (EGRGSLLTCGDVEENPGP, SEQ ID NO: 21 or GSGEGRGSLLTCGDVEENPGP, SEQ ID NO: 38) the foot and mouth disease virus (FMDV) 2A sequence (GSGSRVTELLYRMKRAETYCPRPLLAIHPTEARHKQKIVAPVKQLLNFDLLKLAGDVESNPGP, SEQ ID NO: 39); Sponge (*Amphimedon queenslandica*) 2A sequence (LLCFLLLLLSGDVELNPGP, SEQ ID NO: 40; or HHFMFLLLLLAGDIELNPGP, SEQ ID NO: 41); acorn worm (*Saccoglossus kowalevskii*) 2A sequence (WFLVLLSFILSGDIEVNPGP, SEQ ID NO: 42); amphioxus (*Branchiostoma floridae*) 2A sequence (KNCAMYMLLLSGDVETNPGP, SEQ ID NO: 43; or MVISQLMLKLAGDVEENPGP, SEQ ID NO: 44); porcine teschovirus-1 2A sequence (GSGATNFSLLKQAGDVEENPGP, SEQ ID NO: 45); and equine rhinitis A virus 2A sequence (GSGQCTNYALLKLAGDVESNPGP, SEQ ID NO: 46). In some embodiments, the separation sequence is a naturally occurring or synthetic sequence. In certain embodiments, the separation sequence includes the 2A consensus sequence D-X-E-X-NPGP (SEQ ID NO: 47), in which X is any amino acid residue.

Non-Limited Examples of CARs of the Invention

In certain embodiments, the CAR can be encoded by one polypeptide chain. In certain embodiments, the CAR of the invention is encoded by a nucleotide sequence comprising the nucleotides sequence of SEQ ID NO: 2, 27, 51, 53, 55, 57, or 59, or a variant thereof having at least 50, at least 55, at least 60, at least 65, at least 70, at least 75, at least 80, at least 85, at least 90, at least 95, at least 98 or at least 99%, sequence identity with SEQ ID NO: 2, 27, 51, 53, 55, 57, or 59. In certain embodiments, the CAR is encoded by the nucleotide sequence that encodes the amino acid sequence of SEQ ID NO: 1, 26, 50, 52, 54, 56, or 58. In another embodiment, the CAR comprises the amino acid sequence of SEQ ID NO: 1, 26, 50, 52, 54, 56, or 58, or a variant thereof having at least 50, at least 55, at least 60, at least 65, at least 70, at least 75, at least 80, at least 85, at least 90, at least 95, at least 98 or at least 99%, sequence identity with SEQ ID NO: 1, 26, 50, 52, 54, 56, or 58. In another embodiment, the CAR comprises the amino acid sequence of SEQ ID NO: 1, 26, 50, 52, 54, 56, or 58.

In certain embodiments, the CAR can be encoded by two polypeptide chains. For example, the first polypeptide chain can encode an extracellular target-binding domain comprising an Eph receptor-binding moiety, a transmembrane domain, and a short cytoplasmic tail, and the second polypeptide chain can encode a short extracellular domain, a transmembrane domain, and a cytoplasmic domain comprising a lymphocyte activation domain, a MyD88 polypeptide or functional fragment thereof, and a CD40 cytoplasmic polypeptide region or a functional fragment thereof. Each domain is described in greater detail above. In certain embodiments, both polypeptides can interact via their respective transmembrane domain.

Co-stimulatory Fusion Proteins

In certain embodiments, the host cells can be genetically modified to express not only CARs as disclosed herein but to also express a co-stimulatory fusion protein. These co-stimulatory fusion proteins can improve host cell activation and responsiveness. In certain embodiments, the co-stimulatory fusion protein can enhance the host cell's response to the target antigen. In certain embodiments, the co-stimulatory fusion protein can impart resistance to suppression signals.

The co-stimulatory fusion proteins can comprise portions of CD4, CD8α, CD28, portions of a T cell receptor, or an antigen-binding moiety (e.g., scFv) linked to a MyD88, CD40, and/or other signaling molecules.

In certain embodiments, the co-stimulatory fusion protein comprises an extracellular target-binding domain (as disclosed above), a transmembrane domain (as described above) and a cytoplasmic domain, wherein the cytoplasmic domain comprises at least one co-stimulatory protein (as described above). In certain embodiments, the co-stimulatory fusion protein does not comprise a lymphocyte activation domain (e.g., Cd3ζ). In certain embodiments, the at least one co-stimulatory protein can be a MyD88 polypeptide or functional fragment thereof (as described above), and/or a CD40 cytoplasmic polypeptide region or a functional fragment thereof (as described above).

In certain embodiments, the co-stimulatory fusion protein comprises an extracellular domain (such as, but not limited to CD19, CD34), a transmembrane domain (as described above) and a cytoplasmic domain, wherein the cytoplasmic domain comprises at least one co-stimulatory protein (as described above). In certain embodiments, the co-stimulatory fusion protein does not comprise a lymphocyte activation domain (e.g., Cd3ζ). In certain embodiments, the at least one co-stimulatory protein can be a MyD88 polypeptide or functional fragment thereof (as described above), and/or a CD40 cytoplasmic polypeptide region or a functional fragment thereof (as described above).

Non-limiting examples of such co-stimulatory fusion proteins include, but are not limited to, the constructs in FIG. 11. See also WO2016073875, which is incorporated herein by reference in its entirety for all purposes.

In certain embodiments, the co-stimulatory fusion proteins are introduced into the host cell on a separate vector from the CAR. In certain embodiments, the co-stimulatory fusion proteins are introduced into the host cell on the same vector as the CAR. In certain embodiments, the co-stimulatory fusion proteins are introduced into the host cell on the same vector as the CAR but separated by a separation sequence such as 2A.

Vectors

The present invention provides recombinant vectors comprising a polynucleotide encoding a CAR comprising polynucleotides encoding the proteins disclosed above. In certain embodiments, the polynucleotide is operatively linked to at least one regulatory element for expression of the chimeric antigen receptor.

In certain embodiments, the recombinant vector comprises a polynucleotide encoding a CAR comprising (a) an extracellular target-binding domain, (b) a transmembrane domain, and (c) a cytoplasmic domain comprising a lymphocyte activation domain, a MyD88 polypeptide or functional fragment thereof, and a CD40 cytoplasmic polypeptide region or a functional fragment thereof (all as described above), wherein the polynucleotide is operatively linked to at least one regulatory element for expression of the chimeric antigen receptor.

In certain embodiments, the recombinant vector comprises a polynucleotide encoding a CAR comprising (a) an extracellular target-binding domain comprising an Eph receptor-binding moiety, (b) a transmembrane domain, and (c) a cytoplasmic domain comprising a lymphocyte activation domain, a MyD88 polypeptide or functional fragment thereof, and a CD40 cytoplasmic polypeptide region or a functional fragment thereof (all as described above), wherein the polynucleotide is operatively linked to at least one regulatory element for expression of the chimeric antigen receptor In certain embodiments, the recombinant vector of the invention comprises the nucleotide sequence of SEQ ID NO: 2, 27, 51, 53, 55, 57, or 59, or a variant thereof having at least 50, at least 55, at least 60, at least 65, at least 70, at least 75, at least 80, at least 85, at least 90, at least 95, at least 98 or at least 99%, sequence identity with SEQ ID NO: 2, 27, 51, 53, 55, 57, or 59. In certain embodiments, the recombinant vector comprises the nucleotide sequence that encodes the amino acid sequence of SEQ ID NO: 1, 26, 50, 52, 54, 56, or 58, or a variant thereof having at least 50, at least 55, at least 60, at least 65, at least 70, at least 75, at least 80, at least 85, at least 90, at least 95, at least 98 or at least 99%, sequence identity with SEQ ID NO: 1, 26, 50, 52, 54, 56, or 58.

In certain embodiments, the vector is a viral vector. In certain embodiments, the viral vector can be, but is not limited to, adenoviral vector, an adeno-associated virus vector, an alphaviral vector, a herpes virus vector, a lentiviral vector, a retroviral vector, and vaccinia virus vector. In certain embodiments, the viral vector is a retroviral vector.

In certain embodiments, the polynucleotide encoding the CAR is operably linked to at least a regulatory element. The regulatory element can be capable of mediating expression of the CAR in the host cell. Regulatory elements include, but are not limited to, promoters, enhancers, initiation sites, polyadenylation (polyA) tails, IRES elements, response elements, and termination signals. In certain embodiments, the regulatory element regulates CAR expression. In certain embodiments, the regulatory element increased the expression of the CAR. In certain embodiments, the regulatory element increased the expression of the CAR once the host cell is activated. In certain embodiments, the regulatory element decreases expression of the CAR. In certain embodiments, the regulatory element decreases expression of the CAR once the host cell is activated.

Methods for Producing CAR-Modified Host Cells

In certain embodiments, the host cells can be T cells. T cells include, but are not limited to, thymocytes, naive T lymphocytes, immature T lymphocytes, mature T lymphocytes, resting T lymphocytes, or activated T lymphocytes. A T cell can be a T helper (Th) cell, for example a T helper 1 (Th1) or a T helper 2 (Th2) cell. The T cell can be a helper T cell (HTL; CD4+ T cell) CD4+ T cell, a cytotoxic T cell (CTL; CD8+ T cell), a tumor infiltrating cytotoxic T cell (TIL; CD8+ T cell), CD4+CD8+ T cell, or any other subset of T cells. Other illustrative populations of T cells suitable for use in particular embodiments include naive T cells memory T cells, and NKT cells.

In certain embodiments, the host cells can be NK cells. NK cell refers to a differentiated lymphocyte with a CD3− CD16+, CD3− CD56+, CD16+ CD56+ and/or CD57+ TCR− phenotype.

CAR-modified host cells can be expanded ex vivo for use in adoptive cellular immunotherapy in which infusions of such cells have been shown to have anti-disease reactivity in a disease-bearing host. The compositions and methods of this invention can be used to generate a population of host cells (e.g., T lymphocyte or natural killer cells) that deliver both primary and co-stimulatory signals for use in immunotherapy in the treatment of the disease. In certain embodiments, the disease is cancer. In certain embodiments, the disease is a cancer that expresses EphA2. In certain embodiments, the cancer is a solid tumor (e.g., a solid tumor expressing EphA2).

Isolation/Enrichment

The host cells may be autologous/autogeneic ("self") or non-autologous ("non-self," e.g., allogeneic, syngeneic or xenogeneic). In certain embodiments, the host cells are obtained from a mammalian subject. In other embodiments, the host cells are obtained from a primate subject. In certain embodiments, the host cells are obtained from a human subject.

Lymphocytes can be obtained from sources such as, but not limited to, peripheral blood mononuclear cells, bone marrow, lymph nodes tissue, cord blood, thymus issue, tissue from a site of infection, ascites, pleural effusion, spleen tissue, and tumors. Lymphocytes may also be generated by differentiation of stem cells. In certain embodiments, lymphocytes can be obtained from blood collected from a subject using techniques generally known to the skilled person, such as sedimentation, e.g., FICOLL™ separation.

In certain embodiments, cells from the circulating blood of a subject are obtained by apheresis. An apheresis device typically contains lymphocytes, including T cells, monocytes, granulocytes, B cells, other nucleated white blood cells, red blood cells, and platelets. In certain embodiments, the cells collected by apheresis may be washed to remove the plasma fraction and to place the cells in an appropriate buffer or media for subsequent processing. The cells can be washed with PBS or with another suitable solution that lacks calcium, magnesium, and most, if not all other, divalent cations. A washing step may be accomplished by methods known to those in the art, such as, but not limited to, using a semiautomated flowthrough centrifuge (e.g., Cobe 2991 cell processor, or the Baxter CytoMate). After washing, the cells may be resuspended in a variety of biocompatible buffers, cell culture medias, or other saline solution with or without buffer.

In certain embodiments, host cells can be isolated from peripheral blood mononuclear cells (PBMCs) by lysing the red blood cells and depleting the monocytes. As an example, the cells can be sorted by centrifugation through a PERCOLL™ gradient. In certain embodiments, after isolation of PBMC, both cytotoxic and helper T lymphocytes can be sorted into naive, memory, and effector T cell subpopulations either before or after activation, expansion, and/or genetic modification.

In certain embodiments, T lymphocytes can be enriched. For example, a specific subpopulation of T lymphocytes, expressing one or more markers such as, but not limited to, CD3, CD4, CD8, CD14, CD15, CD16, CD19, CD27, CD28, CD34, CD36, CD45RA, CD45RO, CD56, CD62, CD62L, CD122, CD123, CD127, CD235a, CCR7, HLA-DR or a combination thereof using either positive or negative selection techniques. In certain embodiments, the T lymphocytes for use in the compositions of the invention do not express or do not substantially express one or more of the following markers: CD57, CD244, CD160, PD-1, CTLA4, TIM3, and LAG3.

In certain embodiments, NK cells can be enriched. For example, a specific subpopulation of T lymphocytes, expressing one or more markers such as, but not limited to, CD2, CD16, CD56, CD57, CD94, CD122 or a combination thereof using either positive or negative selection techniques.

Stimulation/Activation

In order to reach sufficient therapeutic doses of host cell compositions, host cells are often subjected to one or more rounds of stimulation/activation. In certain embodiments, a method of producing host cells for administration to a subject comprises stimulating the host cells to become activated in the presence of one or more stimulatory signals or agents (e.g., compound, small molecule, e.g., small organic molecule, nucleic acid, polypeptide, or a fragment, isoform, variant, analog, or derivative thereof). In certain embodiments, a method of producing host cells for administration to a subject comprises stimulating the host cells to become activated and to proliferate in the presence of one or more stimulatory signals or agents.

Host cells (e.g., T lymphocytes and NK cells) can be activated by inducing a change in their biologic state by which the cells express activation markers, produce cytokines, proliferate and/or become cytotoxic to target cells. All these changes can be produced by primary stimulatory signals. Co-stimulatory signals amplify the magnitude of the primary signals and suppress cell death following initial stimulation resulting in a more durable activation state and thus a higher cytotoxic capacity.

T cells can be activated generally using methods as described, for example, in U.S. Pat. Nos. 6,352,694; 6,534,055; 6,905,680; 6,692,964; 5,858,358; 6,887,466; 6,905,681; 7,144,575; 7,067,318; 7,172,869; 7,232,566; 7,175,843; 5,883,223; 6,905,874; 6,797,514; and 6,867,041, each of which is incorporated herein by reference in its entirety.

In certain embodiments, the T cell based host cells can be activated by binding to an agent that activates CD35.

In other embodiments, a CD2-binding agent may be used to provide a primary stimulation signal to the T cells. For example, and not by limitation, CD2 agents include, but are not limited to, CD2 ligands and anti-CD2 antibodies, e.g., the Tl 1.3 antibody in combination with the Tl 1.1 or Tl 1.2 antibody (Meuer, S. C. et al. (1984) Cell 36:897-906) and the 9.6 antibody (which recognizes the same epitope as TI 1.1) in combination with the 9-1 antibody (Yang, S. Y. et al. (1986) J. Immunol. 137:1097-1100). Other antibodies which bind to the same epitopes as any of the above described antibodies can also be used.

In certain embodiments, the host cells are activated by administering phorbol myristate acetate (PMA) and ionomycine. In certain embodiments, the host cells are activated by administering an appropriate antigen that induces activation and then expansion. In certain embodiments, PMA, ionomycin, and/or appropriate antigen are administered with CD3 induce activation and/or expansion.

In general, the activating agents used in the present invention includes, but is not limited to, an antibody, a fragment thereof and a proteinaceous binding molecule with antibody-like functions. Examples of (recombinant) antibody fragments are Fab fragments, Fv fragments, single-chain Fv fragments (scFv), a divalent antibody fragment such as an (Fab)2'-fragment, diabodies, triabodies (Iliades, P., et al., FEBS Lett (1997) 409, 437-441), decabodies (Stone, E., et al., Journal of Immunological Methods (2007) 318, 88-94) and other domain antibodies (Holt, L. J., et al., Trends Biotechnol. (2003), 21, 11, 484-490). The divalent antibody fragment may be an (Fab) 2'-fragment, or a divalent single-chain Fv fragment while the monovalent antibody fragment may be selected from the group consisting of a Fab fragment, a Fv fragment, and a single-chain Fv fragment (scFv).

In certain embodiments, one or more binding sites of the CD3ζ agents may be a bivalent proteinaceous artificial binding molecule such as a dimeric lipocalin mutein (i.e., duocalin). In certain embodiments the receptor binding reagent may have a single second binding site, (i.e., monovalent). Examples of monovalent agents include, but are not limited to, a monovalent antibody fragment, a proteinaceous binding molecule with antibody-like binding properties or an MHC molecule. Examples of monovalent antibody fragments include, but are not limited to a Fab fragment, a Fv fragment, and a single-chain Fv fragment (scFv), including a divalent single-chain Fv fragment.

The agent that specifically binds CD3 includes, but is not limited to, an anti-CD3-antibody, a divalent antibody fragment of an anti-CD3 antibody, a monovalent antibody fragment of an anti-CD3-antibody, and a proteinaceous CD3-binding molecule with antibody-like binding properties. A proteinaceous CD3-binding molecule with antibody-like binding properties can be an aptamer, a mutein based on a polypeptide of the lipocalin family, a glubody, a protein based on the ankyrin scaffold, a protein based on the crystalline scaffold, an adnectin, and an avimer. It also can be coupled to a bead.

In certain embodiments, the activating agent (e.g., CD3-binding agents) can be present in a concentration of about 0.1 to about 10 µg/ml. In certain embodiments, the activating agent (e.g., CD3-binding agents) can be present in a concentration of about 0.2 µg/ml to about 9 µg/ml, about 0.3 µg/ml to about 8 µg/ml, about 0.4 µg/ml to about 7 µg/ml, about 0.5 µg/ml to about 6 µg/ml, about 0.6 µg/ml to about 5 µg/ml, about 0.7 µg/ml to about 4 µg/ml, about 0.8 µg/ml to about 3 µg/ml, or about 0.9 µg/ml to about 2 µg/ml. In certain embodiments, the activating agent (e.g., CD3-binding agents) is administered at a concentration of about 0.1 µg/ml, about 0.2 µg/ml, about 0.3 µg/ml, about 0.4 µg/ml, about 0.5 µg/ml, about 0.6 µg/ml, about 0.7 µg/ml, about 0.8 µM, about 0.9 µg/ml, about 1 µg/ml, about 2 µg/ml, about 3 µg/ml, about 4 µM, about 5 µg/ml, about 6 µg/ml, about 7 µg/ml, about 8 µg/ml, about 9 µg/ml, or about 10 µg/ml. In certain embodiments, the CD3-binding agents can be present in a concentration of 1 µg/ml.

NK cells can be activated generally using methods as described, for example, in U.S. Pat. Nos. 7,803,376, 6,949,520, 6,693,086, 8,834,900, 9,404,083, 9,464,274, 7,435,596, 8,026,097, 8,877,182; U.S. Patent Applications US2004/0058445, US2007/0160578, US2013/0011376, US2015/0118207, US2015/0037887; and PCT Patent Application WO2016/122147, each of which is incorporated herein by reference in its entirety.

In certain embodiments, the NK based host cells can be activated by, for example and not limitation, inhibition of inhibitory receptors on NK cells (e.g., KIR2DL1, KIR2DL2/3, KIR2DL4, KIR2DL5A, KIR2DL5B, KIR3DL1, KIR3DL2, KIR3DL3, LILRB1, NKG2A, NKG2C, NKG2E or LILRB5 receptor).

In certain embodiments, the NK based host cells can be activated by, for example and not limitation, feeder cells (e.g., native K562 cells or K562 cells that are genetically modified to express 4-1BBL and cytokines such as IL15 or IL21).

In other embodiments, interferons or macrophage-derived cytokines can be used to activate NK cells. For example and not limitation, such interferons include but are not limited to interferon alpha and interferon gamma, and such cytokines include but are not limited to IL-15, IL-2, IL-21.

In certain embodiments, the NK activating agent can be present in a concentration of about 0.1 to about 10 µg/ml. In certain embodiments, the NK activating agent can be present in a concentration of about 0.2 µg/ml to about 9 µg/ml, about 0.3 µg/ml to about 8 µg/ml, about 0.4 µg/ml to about 7 µg/ml, about 0.5 µg/ml to about 6 µg/ml, about 0.6 µg/ml to about 5 µg/ml, about 0.7 µg/ml to about 4 µg/ml, about 0.8 µg/ml to about 3 µg/ml, or about 0.9 µg/ml to about 2 µg/ml. In certain embodiments, the NK activating agent is administered at a concentration of about 0.1 µg/ml, about 0.2 µg/ml, about 0.3 µg/ml, about 0.4 µg/ml, about 0.5 µg/ml, about 0.6 µg/ml, about 0.7 µg/ml, about 0.8 µM, about 0.9 µg/ml, about 1 µg/ml, about 2 µg/ml, about 3 µg/ml, about 4 µM, about 5 µg/ml, about 6 µg/ml, about 7 µg/ml, about 8 µg/ml, about 9 µg/ml, or about 10 µg/ml. In certain embodiments, the NK activating agent can be present in a concentration of 1 µg/ml.

In certain embodiments, the activating agent is attached to a solid support such as, but not limited to, a bead, an absorbent polymer present in culture plate or well or other matrices such as, but not limited to, Sepharose or glass; may be expressed (such as in native or recombinant forms) on cell surface of natural or recombinant cell line by means known to those skilled in the art.

Polynucleotide Transfer

In certain embodiments, the host cells are genetically modified to express a CAR. The host cells can be genetically modified after stimulation/activation. In certain embodiments, the CAR is that described above. In certain embodiments, the host cells are modified within 12 hours, 16 hours, 24 hours, 36 hours, or 48 hours of stimulation/activation. In certain embodiments, the cells are modified within 16 to 24 hours after stimulation/activation. In certain embodiments, the host cells are modified within 24 hours.

In order to genetically modify the host cell to express the CAR, the CAR polynucleotide construct must be transferred into the host cell. Polynucleotide transfer may be via viral or non-viral gene methods. Suitable methods for polynucleotide delivery for use with the current methods include any method known by those of skill in the art, by which a polynucleotide can be introduced into an organelle, cell, tissue or organism.

Nucleic acid vaccines can be used to transfer CAR polynucleotides into the host cells. Such vaccines include, but are not limited to non-viral polynucleotide vectors, "naked" DNA and RNA, and viral vectors. Methods of genetically modifying cells with these vaccines, and for optimizing the expression of genes included in these vaccines are known to those of skill in the art.

In certain embodiments, the host cells can be genetically modified by methods ordinarily used by one of skill in the art. In certain embodiments, the host cells can be transduced via retroviral transduction. References describing retroviral transduction of genes are Anderson et al., U.S. Pat. No. 5,399,346; Mann et al., Cell 33:153 (1983); Temin et al., U.S. Pat. No. 4,650,764; Temin et al., U.S. Pat. No. 4,980,289; Markowitz et al., J. Virol. 62:1120 (1988); Temin et al., U.S. Pat. No. 5,124,263; International Patent Publication No. WO 95/07358, published Mar. 16, 1995, by Dougherty et al.; and Kuo et al., Blood 82:845 (1993), each of which is incorporated herein by reference in its entirety.

One method of genetic modification includes ex vivo modification. Various methods are available for transfecting cells and tissues removed from a subject via ex vivo modification. For example, retroviral gene transfer in vitro can be used to genetically modified cells removed from the subject and the cell transferred back into the subject. See e.g., Wilson et al., Science, 244:1344-1346, 1989 and Nabel et al., Science, 244 (4910): 1342-1344, 1989, both of which are incorporated herein by reference in their entity. In certain embodiments, the host cells may be removed from the subject and transfected ex vivo using the polynucleotides (e.g., expression vectors) of the invention. In certain embodiments, the host cells obtained from the subject can be transfected or transduced with the polynucleotides (e.g., expression vectors) of the invention and then administered back to the subject.

Another method of gene transfer includes injection. In certain embodiments, a cell or a polynucleotide or viral vector may be delivered to a cell, tissue, or organism via one or more injections (e.g., a needle injection). Non-limiting methods of injection include injection of a composition (e.g., a saline based composition). Polynucleotides can also be introduced by direct microinjection. Non-limiting sites of injection include, subcutaneous, intradermal, intramuscular, intranodal (allows for direct delivery of antigen to lymphoid tissues). intravenous, intraprotatic, intratumor, intralymphatic (allows direct administration of DCs) and intraperitoneal. It is understood that proper site of injection preparation is necessary (e.g., shaving of the site of injection to observe proper needle placement).

Electroporation is another method of polynucleotide delivery. See e.g., Potter et al., (1984) *Proc. Nat'l Acad. Sci. USA*, 81, 7161-7165 and Tur-Kaspa et al., (1986) *Mol. Cell Biol.*, 6, 716-718, both of which are incorporated herein in their entirety for all purposes. Electroporation involves the exposure of a suspension of cells and DNA to a high-voltage electric discharge. In certain embodiments, cell wall-degrading enzymes, such as pectin-degrading enzymes, can be employed to render the host cells more susceptible to genetic modification by electroporation than untreated cells. See e.g., U.S. Pat. No. 5,384,253, incorporated herein by reference in its entirety for all purposes.

In vivo electroporation involves a basic injection technique in which a vector is injected intradermally in a subject. Electrodes then apply electrical pulses to the intradermal site causing the cells localized there (e.g., resident dermal dendritic cells), to take up the vector. These tumor antigen-expressing dendritic cells activated by local inflammation can then migrate to lymph-nodes.

Methods of electroporation for use with this invention include, for example, Sardesai, N. Y., and Weiner, D. B., *Current Opinion in Immunotherapy* 23:421-9 (2011) and Ferraro, B. et al., *Human Vaccines* 7:120-127 (2011), both of which are hereby incorporated by reference herein in their entirety for all purposes.

Additional methods of polynucleotide transfer include liposome-mediated transfection (e.g., polynucleotide entrapped in a lipid complex suspended in an excess of aqueous solution. See e.g., Ghosh and Bachhawat, (1991) *In: Liver Diseases, Targeted Diagnosis and Therapy Using Specific Receptors and Ligands*. pp. 87-10$^4$). Also contemplated is a polynucleotide complexed with Lipofectamine, or Superfect); DEAE-dextran (e.g., a polynucleotide is delivered into a cell using DEAE-dextran followed by polyethylene glycol. See e.g., Gopal, T. V., *Mol Cell Biol.* 1985 May; 5 (5): 1188-90); calcium phosphate (e.g., polynucleotide is introduced to the cells using calcium phosphate precipitation. See e.g., Graham and van der Eb, (1973) *Virology*, 52, 456-467; Chen and Okayama, *Mol. Cell Biol.*, 7 (8): 2745-2752, 1987), and Rippe et al., *Mol. Cell Biol.*, 10:689-695, 1990); sonication loading (introduction of a polynucleotide by direct sonic loading. See e.g., Fechheimer et al., (1987) *Proc. Nat'l Acad. Sci. USA*, 84, 8463-8467); microprojectile bombardment (e.g., one or more particles may be coated with at least one polynucleotide and delivered into cells by a propelling force. See e.g., U.S. Pat. Nos. 5,550,318; 5,538,880; 5,610,042; and PCT Application WO 94/09699; Klein et al., (1987) *Nature*, 327, 70-73, Yang et al., (1990) *Proc. Nat'l Acad. Sci. USA*, 87, 9568-9572); and receptor-mediated transfection (e.g., selective uptake of macromolecules by receptor-mediated endocytosis that will be occurring in a target cell using cell type-specific distribution of various receptors. See e.g., Wu and Wu, (1987) *J. Biol. Chem.*, 262, 4429-4432; Wagner et al., *Proc. Natl. Acad. Sci. USA*, 87 (9): 3410-3414, 1990; Perales et al., *Proc. Natl. Acad. Sci. USA*, 91:4086-4090, 1994; Myers, EPO 0273085; Wu and Wu, *Adv. Drug Delivery Rev.*, 12:159-167, 1993; Nicolau et al., (1987) *Methods Enzymol.*, 149, 157-176), each reference cited here is incorporated by reference in their entirety for all purposes.

Expansion/Proliferation

After the host cells are activated and transduced, the cells are cultured to proliferate. T cells may be cultured for at least 1, 2, 3, 4, 5, 6, or 7 days, at least 2 weeks, at least 1, 2, 3, 4, 5, or 6 months or more with 1, 2, 3, 4, 5, 6, 7, 8, 9, or 10 or more rounds of expansion.

Agents that can be used for the expansion of T cells can include interleukins, such as IL-2, IL-7, IL-15, or IL-21 (see for example Cornish et al. 2006, Blood. 108 (2): 600-8, Bazdar and Sieg, 2007, Journal of Virology, 2007, 81 (22): 12670-12674, Battalia et al, 2013, Immunology, 139 (1): 109-120). Other illustrative examples for agents that may be used for the expansion of T cells are agents that bind to CD8, CD45 or CD90, such as αCD8, αCD45 or αCD90 antibodies. Illustrative examples of T cell population including antigen-specific T cells, T helper cells, cytotoxic T cells, memory T cell (an illustrative example of memory T-cells are CD62L|CD8| specific central memory T cells) or regulatory T cells (an illustrative example of Treg are CD4+ CD25+CD45RA+ Treg cells).

Additional agents that can be used to expand T lymphocytes includes methods as described, for example, in U.S. Pat. Nos. 6,352,694; 6,534,055; 6,905,680; 6,692,964; 5,858,358; 6,887,466; 6,905,681; 7,144,575; 7,067,318; 7,172,869; 7,232,566; 7,175,843; 5,883,223; 6,905,874; 6,797,514; and 6,867,041, each of which is incorporated herein by reference in its entirety.

In certain embodiments, the agent(s) used for expansion (e.g., IL-2) are administered at about 20 units/ml to about 200 units/ml. In certain embodiments, the agent(s) used for expansion (e.g., IL-2) are administered at about 25 units/ml to about 190 units/ml, about 30 units/ml to about 180 units/ml, about 35 units/ml to about 170 units/ml, about 40 units/ml to about 160 units/ml, about 45 units/ml to about 150 units/ml, about 50 units/ml to about 140 units/ml, about 55 units/ml to about 130 units/ml, about 60 units/ml to about 120 units/ml, about 65 units/ml to about 110 units/ml, about 70 units/ml to about 100 units/ml, about 75 units/ml to about 95 units/ml, or about 80 units/ml to about 90 units/ml. In certain embodiments, the agent(s) used for expansion (e.g., IL-2) are administered at about 20 units/ml, about 25 units/ml, about 30 units/ml, 35 units/ml, 40 units/ml, 45 units/ml, about 50 units/ml, about 55 units/ml, about 60 units/ml, about 65 units/ml, about 70 units/ml, about 75 units/ml, about 80 units/ml, about 85 units/ml, about 90 units/ml, about 95 units/ml, about 100 units/ml, about $10^5$ units/ml, about 110 units/ml, about 115 units/ml, about 120 units/ml, about 125 units/ml, about 130 units/ml, about 135 units/ml, about 140 units/ml, about 145 units/ml, about 150 units/ml, about 155 units/ml, about 160 units/ml, about 165 units/ml, about 170 units/ml, about 175 units/ml, about 180 units/ml, about 185 units/ml, about 190 units/ml, about 195 units/ml, or about 200 units/ml. In certain embodiments, the agent(s) used for expansion (e.g., IL-2) are administered at about 5 mg/ml to about 10 ng/ml. In certain embodiments, the agent(s) used for expansion (e.g., IL-2) are administered at about 5.5 ng/ml to about 9.5 ng/ml, about 6 ng/ml to about 9 ng/ml, about 6.5 ng/ml to about 8.5 ng/ml, or about 7 ng/ml to about 8 ng/ml. In certain embodiments, the agent(s) used for expansion (e.g., IL-2) are administered at about 5 ng/ml, 6 ng/ml, 7 ng/ml, 8 ng/ml, 9 ng/ml, or 10 ng/ml.

After the host cells are activated and transduced, the cells are cultured to proliferate. NK cells may be cultured for at least 1, 2, 3, 4, 5, 6, or 7 days, at least 2 weeks, at least 1, 2, 3, 4, 5, or 6 months or more with 1, 2, 3, 4, 5, 6, 7, 8, 9, or 10 or more rounds of expansion.

Agents that can be used for the expansion of natural killer cells can include agents that bind to CD16 or CD56, such as for example αCD16 or αCD56 antibodies. In certain embodiments, the binding agent includes antibodies (see for example Hoshino et al, Blood. 1991 Dec. 15; 78 (12): 3232-40.). Other agents that may be used for expansion of NK cells may be IL-15 (see for example Vitale et al. 2002. The Anatomical Record. 266:87-92).

Conditions appropriate for T cell culture include an appropriate media (e.g., Minimal Essential Media (MEM), RPMI Media 1640, Lonza RPMI 1640, Advanced RPMI, Clicks, AIM-V, DMEM, a-MEM, F-12, TexMACS, X-Vivo 15, and X-Vivo 20, Optimizer, with added amino acids, sodium pyruvate, and vitamins, either serum-free or supplemented with an appropriate amount of serum (or plasma) or a defined set of hormones, and/or an amount of cytokine(s) sufficient for the growth and expansion).

Examples of other additives for host cell expansion include, but are not limited to, surfactant, piasmanate, pH buffers such as HEPES, and reducing agents such as N-acetyl-cysteine and 2-mercaptoethanol, Antibiotics (e.g., penicillin and streptomycin), are included only in experimental cultures, not in cultures of cells that are to be infused into a subject. The target cells are maintained under conditions necessary to support growth, for example, an appropriate temperature (e.g., 37° C.) and atmosphere (e.g., air plus 5% $CO_2$).

In certain embodiments, host cells of the present invention may be modified such that the expression of an endogenous TCR, MHC molecule, or other immunogenic molecule is decreased or eliminated. When allogeneic cells are used, rejection of the therapeutic cells may be a concern as it may cause serious complications such as the graft-versus-host disease (GvHD). Although not wishing to be bound by theory, immunogenic molecules (e.g., endogenous TCRs and/or MHC molecules) are typically expressed on the cell surface and are involved in self vs non-self discrimination. Decreasing or eliminating the expression of such molecules may reduce or eliminate the ability of the therapeutic cells to cause GvHD.

In certain embodiments, expression of an endogenous TCR in the host cells is decreased or eliminated. In a particular embodiment, expression of an endogenous TCR (e.g., αβ TCR) in the host cells is decreased or eliminated. Expression of the endogenous TCR may be decreased or eliminated by disrupting the TRAC locus, TCR beta constant locus, and/or CD3 locus. In certain embodiments, expression of an endogenous TCR may be decreased or eliminated by disrupting one or more of the TRAC, TRBC1, TRBC2, CD3E, CD3G, and/or CD3D locus.

In certain embodiments, expression of one or more endogenous MHC molecules in the host cells is decreased or eliminated. Modified MHC molecule may be an MHC class I or class II molecule. In certain embodiments, expression of an endogenous MHC molecule may be decreased or eliminated by disrupting one or more of the MHC, β2M, TAP1, TAP2, CIITA, RFX5, RFXAP and/or RFXANK locus.

Expression of the endogenous TCR, an MHC molecule, and/or any other immunogenic molecule in the host cell can be disrupted using genome editing techniques such as Clustered regularly interspaced short palindromic repeats (CRISPR)/Cas, zinc finger nucleases (ZFNs), transcription activator-like effector nucleases (TALENs), and Meganucleases. These genome editing methods may disrupt a target gene by entirely knocking out all of its output or partially knocking down its expression. In a particular embodiment, expression of the endogenous TCR, an MHC molecule and/or any other immunogenic molecule in the host cell is disrupted using the CRISPR/Cas technique.

Therapeutic Methods of the Invention

In certain embodiments, the compositions comprise one or more polypeptides, polynucleotides, vectors comprising same, and host cell compositions, as disclosed herein. Compositions include, but are not limited to pharmaceutical compositions. In certain embodiments, the compositions of the present invention comprise an amount of modified host cells manufactured by the methods disclosed herein.

In one aspect, the invention provides a method for treating a disease or disorder associated in a subject in need thereof, comprising administering to the subject a therapeutically effective amount of the host cells disclosed herein comprising a CAR as disclosed herein. In certain embodiments, the host cells expressing the CAR are prepared by the methods as disclosed above.

In certain embodiments, the disease or disorder is cancer. In certain embodiments, the cancer can be, but is not limited to, a solid tumor. In certain embodiments, the disease or disorder is cancer expressing an Eph receptor. Table 2 provides non-limiting examples of cancers associated with increased Eph receptors. In certain embodiments, the disease or disorder is cancer expressing EphA2.

TABLE 2

Non-limiting Examples of Eph Receptor Involvement in Cancers

| Cancer type | Eph Receptor |
| --- | --- |
| Breast cancer | EphA2, EphB4 |
| Colorectal cancer | EphA1, EphA2, EphA3, EphA8, EphB4 |
| Prostate cancer | EphA2, EphA3, EphA5, EphA6, EphA7, EphA8, EphA10, EphB3, |
| Brain tumor, GBM | EphA2, EphA3, EphA4, EphA7, EphB2, EphB4 |
| Melanoma | EphA2, EphA3, EphB3 |
| Lung cancer | EphA2, EphB3 |
| Hepatocellular cancer | EphA3 |
| Gastric cancer | EphA1, EphA2, EphA3, EphB2 |

The terms "cancer" and "cancerous" refer to or describe the physiological condition in mammals that is typically characterized by unregulated cell growth. The term "cancer" includes, for example, the soft tissue tumors (e.g., lymphomas), and tumors of the blood and blood-forming organs (e.g., leukemias), and solid tumors, which is one that grows in an anatomical site outside the bloodstream (e.g., carcinomas). Examples of cancer include, but are not limited to, carcinoma, lymphoma, blastoma, sarcoma (e.g., osteosarcoma or rhabdomyosarcoma), and leukemia or lymphoid malignancies. More particular examples of such cancers include squamous cell cancer (e.g., epithelial squamous cell cancer), adenosquamous cell carcinoma, lung cancer (e.g., including small-cell lung cancer, non-small cell lung cancer, adenocarcinoma of the lung, squamous carcinoma of the lung), cancer of the peritoneum, hepatocellular cancer, gastric or stomach cancer (e.g., including gastrointestinal cancer, pancreatic cancer), cervical cancer, ovarian cancer, liver cancer, bladder cancer, cancer of the urinary tract, hepatoma, breast cancer, colon cancer, rectal cancer, colorectal cancer, endometrial or uterine carcinoma, salivary gland carcinoma, kidney or renal cancer, prostate cancer, vulval cancer, thyroid cancer, hepatic carcinoma, anal carcinoma, penile carcinoma, primary or metastatic melanoma, multiple myeloma and B-cell lymphoma, non-Hodgkin's lymphoma, Hodgkin's lymphoma, brain (e.g., high grade glioma, diffuse pontine glioma, ependymoma, neuroblastoma, or glioblastoma), as well as head and neck cancer, and associated metastases. Additional examples of cancer can be found in The Merck Manual of Diagnosis and Therapy, 19th Edition, § on Hematology and Oncology, published by Merck Sharp & Dohme Corp., 2011 (ISBN 978-0-911910-19-3); The Merck Manual of Diagnosis and Therapy, 20th Edition, § on Hematology and Oncology, published by Merck Sharp & Dohme Corp., 2018 (ISBN 978-0-911-91042-1) (2018 digital online edition at internet website of Merck Manuals); and SEER Program Coding and Staging Manual 2016, each of which are incorporated by reference in their entirety for all purposes.

Other hyperproliferative diseases, including solid tumors, that may be treated using the host cells discloser herein include, but are not limited to rheumatoid arthritis, inflammatory bowel disease, osteoarthritis, leiomyomas, adenomas, lipomas, hemangiomas, fibromas, vascular occlusion, restenosis, atherosclerosis, pre-neoplastic lesions (such as adenomatous hyperplasia and prostatic intraepithelial neoplasia), carcinoma in situ, oral hairy leukoplakia, or psoriasis.

In certain embodiments, composition comprising the host cells manufactured by the methods described herein may be administered at a dosage of $10^2$ to $10^{10}$ cells/kg body weight, $10^5$ to $10^9$ cells/kg body weight, $10^5$ to $10^8$ cells/kg body weight, $10^5$ to $10^7$ cells/kg body weight, $10^7$ to $10^9$ cells/kg body weight, or $10^7$ to $10^8$ cells/kg body weight, including all integer values within those ranges. The number of host cells will depend on the therapeutic use for which the composition is intended for.

Host cells modified to express an engineered TCR or CAR may be administered multiple times at dosages listed above. The host cells may be allogeneic, syngeneic, xenogeneic, or autologous to the patient undergoing therapy. When allogeneic cells are used, the cell surface expression of the endogenous TCR, MHC molecule, and/or any other immunogenic molecule may be decreased or eliminated in the administered cells.

The compositions and methods described in the present invention may be utilized in conjunction with other types of therapy for cancer, such as chemotherapy, surgery, radiation, gene therapy, and so forth.

In certain embodiments of any of the above methods of the invention, the composition is administered in a therapeutically effective amount. The dosages of the composition administered in the methods of the invention will vary widely, depending upon the subject's physical parameters, the frequency of administration, the manner of administration, the clearance rate, and the like. The initial dose may be larger, and might be followed by smaller maintenance doses. The dose may be administered as infrequently as weekly or biweekly, or fractionated into smaller doses and administered daily, semi-weekly, etc., to maintain an effective dosage level. It is contemplated that a variety of doses will be effective to achieve in vivo persistence of CAR containing host cells. It is also contemplated that a variety of doses will be effective to improve in vivo effector function of CAR containing host cells.

Compositions comprising modified host cells disclosed herein may comprise buffers such as neutral buffered saline, phosphate buffered saline and the like; carbohydrates such as glucose, mannose, sucrose or dextrans, mannitol; proteins; polypeptides or amino acids such as glycine; antioxidants; chelating agents such as EDTA or glutathione; adjuvants (e.g., aluminum hydroxide); and preservatives.

Compositions comprising modified host cells disclosed herein may comprise one or more of the following: sterile diluents such as water for injection, saline solution, preferably physiological saline, Ringer's solution, isotonic sodium chloride, fixed oils such as synthetic mono or diglycerides which may serve as the solvent or suspending medium, polyethylene glycols, glycerin, propylene glycol or other solvents; antibacterial agents such as benzyl alcohol or methyl paraben; antioxidants such as ascorbic acid or sodium bisulfite; chelating agents such as ethylenediaminetetraacetic acid; buffers such as acetates, citrates or phosphates and agents for the adjustment of tonicity such as sodium chloride or dextrose. The parenteral preparation can be enclosed in ampoules, disposable syringes or multiple dose vials made of glass or plastic. An injectable pharmaceutical composition is preferably sterile.

In certain embodiments, the compositions are formulated for parenteral administration, e.g., intravascular (intravenous or intraarterial), intraperitoneal, intratumoral, intraventricular, intrapleural or intramuscular administration. In certain embodiments, the composition is reconstituted from a lyophilized preparation prior to administration.

In certain embodiments, the CAR containing host cells may be mixed with substances that adhere or penetrate then prior to their administration, e.g., but not limited to, nanoparticles.

It is also contemplated that when used to treat various diseases/disorders, the compositions and methods of the present invention can be utilized with other therapeutic methods/agents suitable for the same or similar diseases/disorders. Such other therapeutic methods/agents can be co-administered (simultaneously or sequentially) to generate additive or synergistic effects. Suitable therapeutically effective dosages for each agent may be lowered due to the additive action or synergy.

In one embodiment of any of the above methods of the invention, the method further comprises administering to the subject one or more additional compounds selected from the group consisting of immuno-suppressives, biologicals, probiotics, prebiotics, and cytokines (e.g., IFN or IL-2).

As a non-limiting example, the invention can be combined with other therapies that block inflammation (e.g., via blockage of IL1, INFα/β, IL6, TNF, IL23, etc.).

The methods and compositions of the invention can be combined with other immunomodulatory treatments such as, e.g., therapeutic vaccines (including but not limited to GVAX, DC-based vaccines, etc.), checkpoint inhibitors (including but not limited to agents that block CTLA4, PD1, LAG3, TIM3, etc.) or activators (including but not limited to agents that enhance 4-1BB, OX40, etc.). The methods of the invention can be also combined with other treatments that possess the ability to modulate NKT function or stability, including but not limited to CD1d, CD1d-fusion proteins, CD1d dimers or larger polymers of CD1d either unloaded or loaded with antigens, CD1d-chimeric antigen receptors (CD1d-CAR), or any other of the five known CD1 isomers existing in humans (CD1a, CD1b, CD1c, CD1e). The methods of the invention can also be combined with other treatments such as midostaurin, enasidenib, or a combination thereof.

Therapeutic methods of the invention can be combined with additional immunotherapies and therapies. For example, when used for treating cancer, the compositions of the invention can be used in combination with conventional cancer therapies, such as, e.g., surgery, radiotherapy, chemotherapy or combinations thereof, depending on type of the tumor, patient condition, other health issues, and a variety of factors. In certain aspects, other therapeutic agents useful for combination cancer therapy with the inhibitors of the invention include anti-angiogenic agents. Many anti-angiogenic agents have been identified and are known in the art, including, e.g., TNP-470, platelet factor 4, thrombospondin-1, tissue inhibitors of metalloproteases (TIMP1 and TIMP2), prolactin (16-Kd fragment), angiostatin (38-Kd fragment of plasminogen), endostatin, bFGF soluble receptor, transforming growth factor beta, interferon alpha, soluble KDR and FLT-1 receptors, placental proliferin-related protein, as well as those listed by Carmeliet and Jain (2000). In one embodiment, the host cells of the invention can be used in combination with a VEGF antagonist or a VEGF receptor antagonist such as anti-VEGF antibodies, VEGF variants, soluble VEGF receptor fragments, aptamers capable of blocking VEGF or VEGFR, neutralizing anti-VEGFR antibodies, inhibitors of VEGFR tyrosine kinases and any combinations thereof (e.g., anti-hVEGF antibody A4.6.1, bevacizumab or ranibizumab).

Non-limiting examples of chemotherapeutic compounds which can be used in combination treatments of the present invention include, for example, aminoglutethimide, amsacrine, anastrozole, asparaginase, azacitidine, bcg, bicalutamide, bleomycin, buserelin, busulfan, campothecin, capecitabine, carboplatin, carmustine, chlorambucil, cisplatin, cladribine, clodronate, colchicine, cyclophosphamide, cyproterone, cytarabine, dacarbazine, dactinomycin, daunorubicin, decitabine, dienestrol, diethylstilbestrol, docetaxel, doxorubicin, epirubicin, estradiol, estramnustine, etoposide, exemestane, filgrastim, fludarabine, fludrocortisone, fluorouracil, fluoxymesterone, flutamide, gemcitabine, genistein, goserelin, hydroxyurea, idarubicin, ifosfamide, imatinib, interferon, irinotecan, ironotecan, letrozole, leucovorin, leuprolide, levamisole, lomustine, mechlorethamine, medroxyprogesterone, megestrol, melphalan, mercaptopurine, mesna, methotrexate, mitomycin, mitotane, mitoxantrone, nilutamide, nocodazole, octreotide, oxaliplatin, paclitaxel, pamidronate, pentostatin, plicamycin, porfimer, procarbazine, raltitrexed, rituximab, streptozocin, suramin, tamoxifen, temozolomide, teniposide, testosterone, thioguanine, thiotepa, titanocene dichloride, topotecan, trastuzumab, tretinoin, vinblastine, vincristine, vindesine, and vinorelbine.

These chemotherapeutic compounds may be categorized by their mechanism of action into, for example, following groups: anti-metabolites/anti-cancer agents, such as pyrimidine analogs (5-fluorouracil, floxuridine, capecitabine, gemcitabine and cytarabine) and purine analogs, folate antagonists and related inhibitors (mercaptopurine, thioguanine, pentostatin and 2-chlorodeoxyadenosine (cladribine)); antiproliferative/antimitotic agents including natural products such as vinca alkaloids (vinblastine, vincristine, and vinorelbine), microtubule disruptors such as taxane (paclitaxel, docetaxel), vincristin, vinblastin, nocodazole, epothilones and navelbine, epipidophyllotoxins (etoposide, teniposide), DNA damaging agents (actinomycin, amsacrine, anthracyclines, bleomycin, busulfan, camptothecin, carboplatin, chlorambucil, cisplatin, cyclophosphamide, cytoxan, dactinomycin, daunorubicin, doxorubicin, epirubicin, hexamethyhnelamineoxaliplatin, iphosphamide, melphalan, merchlorehtamine, mitomycin, mitoxantrone, nitrosourea, plicamycin, procarbazine, taxol, taxotere, teniposide, triethylenethiophosphoramide and etoposide (VP16)); antibiotics such as dactinomycin (actinomycin D), daunorubicin, doxorubicin (adriamycin), idarubicin, anthracyclines, mitoxantrone, bleomycins, plicamycin (mithramycin) and mitomycin; enzymes (L-asparaginase which systemically metabolizes L-asparagine and deprives cells which do not have the capacity to synthesize their own asparagine); antiplatelet agents; antiproliferative/antimitotic alkylating agents such as nitrogen mustards (mechlorethamine, cyclophosphamide and analogs, melphalan, chlorambucil), ethylenimines and methylmelamines (hexamethylmelamine and thiotepa), alkyl sulfonates-busulfan, nitrosoureas (carmustine (BCNU) and analogs, streptozocin), trazenes-dacarbazinine (DTIC); antiproliferative/antimitotic antimetabolites such as folic acid analogs (methotrexate); platinum coordination complexes (cisplatin, carboplatin), procarbazine, hydroxyurea, mitotane, aminoglutethimide; hormones, hormone analogs (estrogen, tamoxifen, goserelin, bicalutamide, nilutamide) and aromatase inhibitors (letrozole, anastrozole); anticoagulants (heparin, synthetic heparin salts and other inhibitors of thrombin); fibrinolytic agents (such as tissue plasminogen activator, streptokinase and urokinase), aspirin, dipyridamole, ticlopidine, clopidogrel, abciximab; antimigratory agents; antisecretory agents (breveldin); immunosuppressives (cyclosporine, tacrolimus (FK-506), sirolimus (rapamycin), azathioprine, mycophenolate mofetil); anti-angiogenic compounds (e.g., TNP-470, genistein, bevacizumab) and growth factor inhibitors (e.g., fibroblast growth factor (FGF) inhibitors); angiotensin receptor blocker; nitric oxide donors; anti-sense oligonucleotides; antibodies (trastuzumab); cell cycle inhibitors and differentiation inducers (tretinoin); mTOR inhibitors, topoisomerase inhibitors (doxorubicin (adriamycin), amsacrine, camptothecin, daunorubicin, dactinomycin, eniposide, epirubicin, etoposide, idarubicin and mitoxantrone, topotecan, irinotecan), corticosteroids (cortisone, dexamethasone, hydrocortisone, methylpednisolone, prednisone, and prenisolone); growth factor signal transduction kinase inhibitors; mitochondrial dysfunction inducers and caspase activators; and chromatin disruptors.

In accordance with the present invention there may be numerous tools and techniques within the skill of the art, such as those commonly used in molecular biology, pharmacology, and microbiology. Such tools and techniques are described in detail in e.g., Sambrook et al. (2001) Molecular Cloning: A Laboratory Manual. 3rd ed. Cold Spring Harbor Laboratory Press: Cold Spring Harbor, New York; Ausubel et al. eds. (2005) Current Protocols in Molecular Biology. John Wiley and Sons, Inc.: Hoboken, NJ; Bonifacino et al. eds. (2005) Current Protocols in Cell Biology. John Wiley and Sons, Inc.: Hoboken, NJ; Coligan et al. eds. (2005) Current Protocols in Immunology, John Wiley and Sons, Inc.: Hoboken, NJ; Coico et al. eds. (2005) Current Protocols in Microbiology, John Wiley and Sons, Inc.: Hoboken, NJ; Coligan et al. eds. (2005) Current Protocols in Protein Science, John Wiley and Sons, Inc.: Hoboken, NJ; and Enna et al. eds. (2005) Current Protocols in Pharmacology, John Wiley and Sons, Inc.: Hoboken, NJ.

EXAMPLES

The present invention is also described and demonstrated by way of the following examples. However, the use of these and other examples anywhere in the specification is illustrative only and in no way limits the scope and meaning of the invention or of any exemplified term. Likewise, the invention is not limited to any particular preferred embodiments described here. Indeed, many modifications and variations of the invention may be apparent to those skilled in the art upon reading this specification, and such variations can be made without departing from the invention in spirit or in scope. The invention is therefore to be limited only by the terms of the appended claims along with the full scope of equivalents to which those claims are entitled.

Example 1. Generation of CARs

Figure 1B:
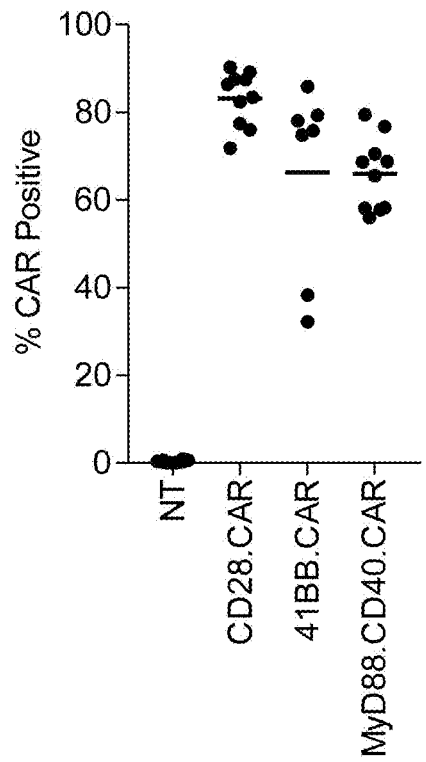
Figure 1C:
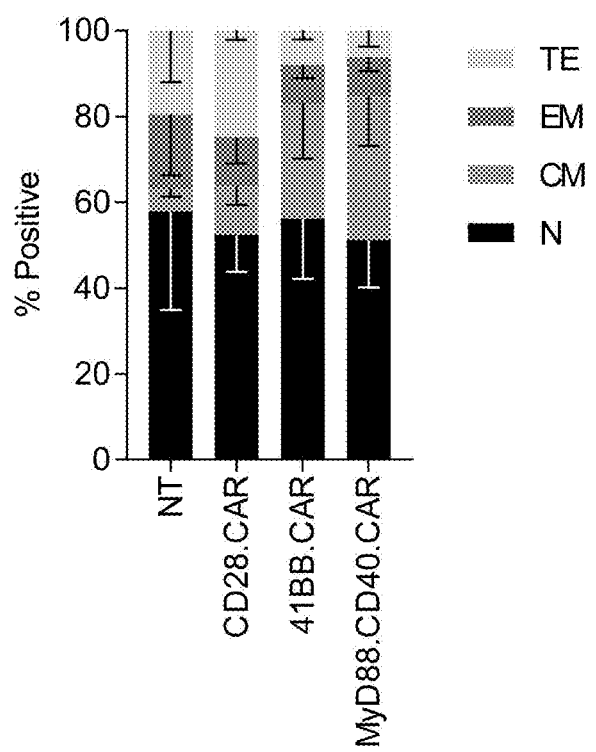

Retroviral vectors were generated encoding CARs comprising CD28.ζ (SEQ ID NOs: 3-4), 4-1BB.ζ (SEQ ID NOs: 5-6), or MyD88.CD40.ζ (SEQ ID NOs: 1-2) endodomains that recognize the solid tumor antigen EphA2 (FIG. 1A and FIGS. 6A-6F). CAR T cells were generated by retroviral transduction, and all three CARs were expressed at similar levels as judged by FACS analysis (FIGS. 1B-1C).

EphA2-specific CD28.CAR and 41BB.CAR: A codon-optimized gene encoding the humanized version of EphA2 mAb EA2 was synthesized by GeneArt (Invitrogen, Carlsbad, CA) containing the immunoglobulin heavy-chain leader peptide and the 4H5 heavy and light chains connected by a short glycine-serine linker. The minigene was flanked by 5' NcoI and 3' BamHI sites and subcloned into an SFG retroviral vector containing a human IgG1 core hinge and CD28.ζ or 41BB.ζ endodomains. The retroviral vector with CD28.ζ contained a CD28 transmembrane domain and the vector with 41BB.ζ contained a CD8a transmembrane domain. In addition, all vectors encoded for a 2A sequence and truncated CD19.

EphA2-specific MyD88.CD40.CAR: In-Fusion cloning (Takara Bio USA, Mountain View, CA) was used to generate this CAR. First, an IL13Rα2-specific MyD88.CD40.CAR was generated by replacing CD28 of an IL13Rα2-specific CD28.CAR (Krenciute et al, Mol Ther 2016) with MyD88.CD40 amplified from plasmid FRP5.z.2A.iMyD88.CD40 (Mata et al; Cancer Discovery 2017). In-Fusion cloning was then used i) to replace the IL13Ra2-specific scFv with the EphA2-specific scFv 4H5 and ii) to add a 2A sequence and truncated CD19.

All cloning of CARs was verified by Sanger sequencing (Seqwright, Houston, TX and The Hartwell Center, SJCRH, Memphis, TN).

Generation of CAR T cells: Retroviral particles were generated by transient transfection of 293T cells with an EphA2 CAR encoding SFG retroviral vector, Peg-Pam-e plasmid containing the sequence for MoMLV gag-pol, and a plasmid containing the sequence for RD114 envelope proteins. Supernatants containing the retrovirus were collected after 48 hours, filtered, and snap frozen for later transduction of T cells. Human peripheral blood mononuclear cells (PBMCs) were obtained from whole blood of healthy donors under IRB-approved protocols at Baylor College of Medicine or St. Jude Children's Research Hospital. To generate EphA2-CAR T cells, PBMCs were isolated by Lymphoprep (Abbott Laboratories, Chicago, IL) gradient centrifugation and then stimulated on treated non-tissue culture 24-well plates, which were precoated with CD3 and CD28 (BD Biosciences, San Jose, CA) antibodies. Recombinant human IL-7 and IL-15 (IL-7, 10 ng/ml; IL-15, 5 ng/ml; PeproTech, Rocky Hill, NJ) were added to cultures the next day. On day 2, CD3/CD28-stimulated T cells ($2.5\times10^5$ cells/well) were transduced with RD114-pseudotyped retroviral particles on RetroNectin (Clontech, Mountain View, CA)-coated plates in the presence of IL-7 and IL-15. On day 5, transduced T cells were transferred into new tissue culture 24-well plates and subsequently expanded with IL-7 and IL-15. Non-transduced (NT) T cells were prepared in the same way minus the addition of retrovirus. CAR T cell expression was determined using flow cytometry at multiple time points post-transduction to ensure continued CAR expression. All in vitro experiments were performed 7-21 days post-transduction. Biological replicates were performed using PBMCs from different healthy donors.

Phenotypic analysis of CAR T cells: A FACSCanto II (BD Biosciences, San Jose, CA) instrument was used to acquire flow cytometry data, which was analyzed using FlowJo v10 (FlowJo, Ashland, OR). Samples were washed with and stained in PBS (Lonza, Basel, Switzerland) with 1% FBS (GE Healthcare Life Sciences HyClone). T cells were phenotyped with CD3-APC (clone UTCH1, Beckman Coulter, Brea, CA) CD4-Pacific Blue (clone SK3, BioLegend, San Diego, CA) CD8-PerCP-Cy5.5 (clone SK1, BioLegend), CD19-PE (clone J3-119, Beckman Coulter), CCR7-AF488 (clone G043H7, BioLegend), and CD45RA–APC-H7 (clone HI100, BD) at day 7 after transduction as well as 7 days after incubation with tumor cells. Samples were washed, stained with antibodies in the dark for 30 minutes at room temperature or 1 hour at 4C, and washed again before analysis.

Example 2. In Vitro Characterization of CARs

Figure 2A:
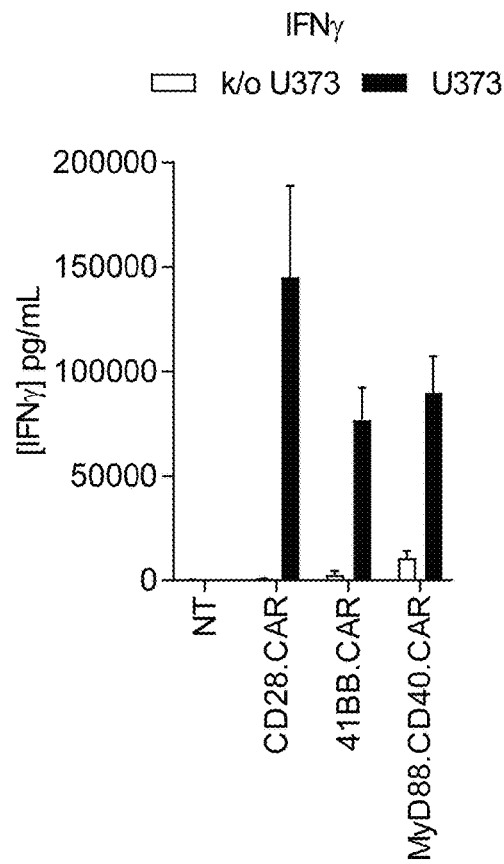
FIGS. 2A-2C demonstrate that all three EphA2-targeting CARs effectively recognize and kill EphA2+ U373 glioma cells.
Figure 2B:
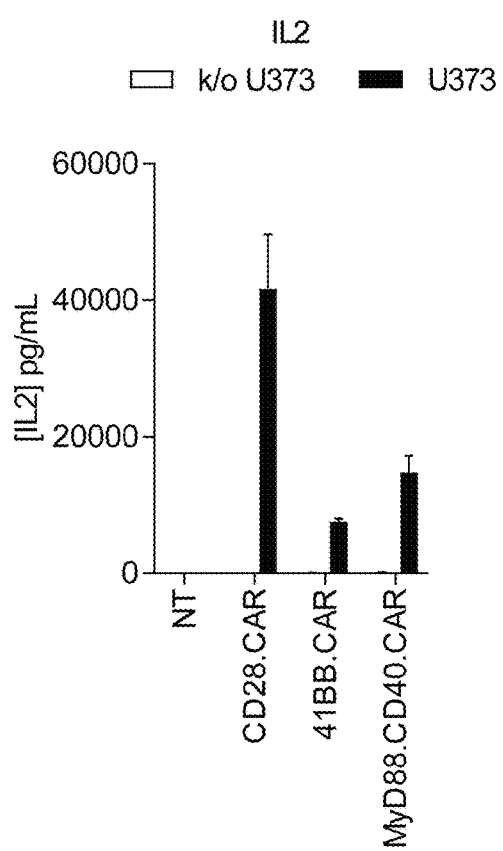
Figure 2C:
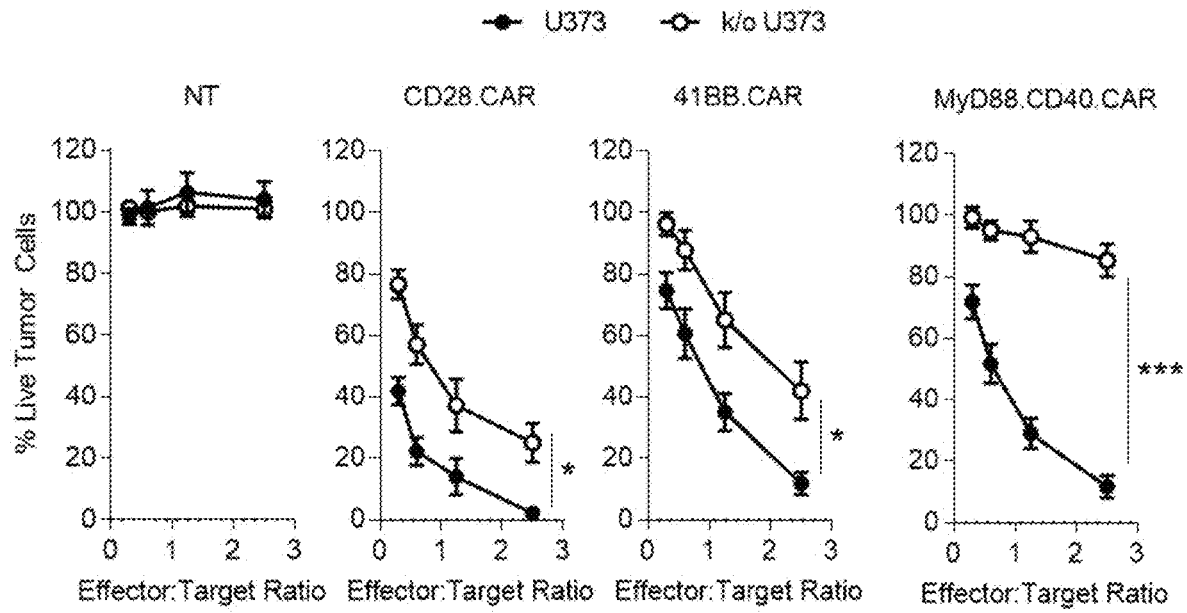
Figure 3A:
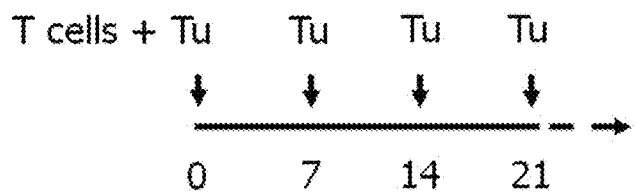
FIGS. 3A-3C demonstrate that MyD88.CD40.CAR T cells are able to proliferate after repeat stimulation with tumor cells in vitro.
Figure 3B:
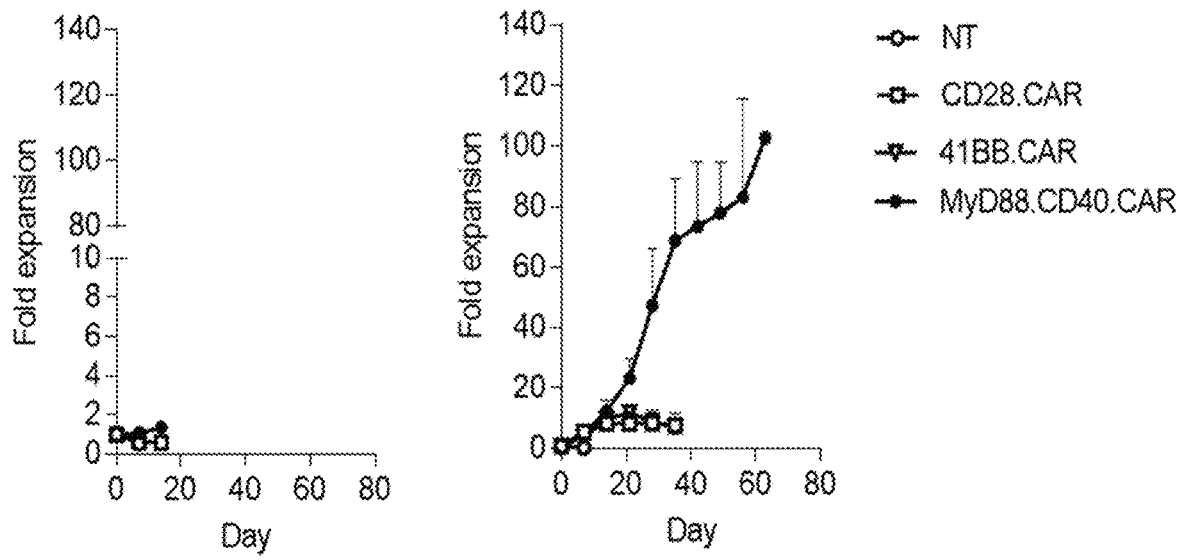
Figure 3C:
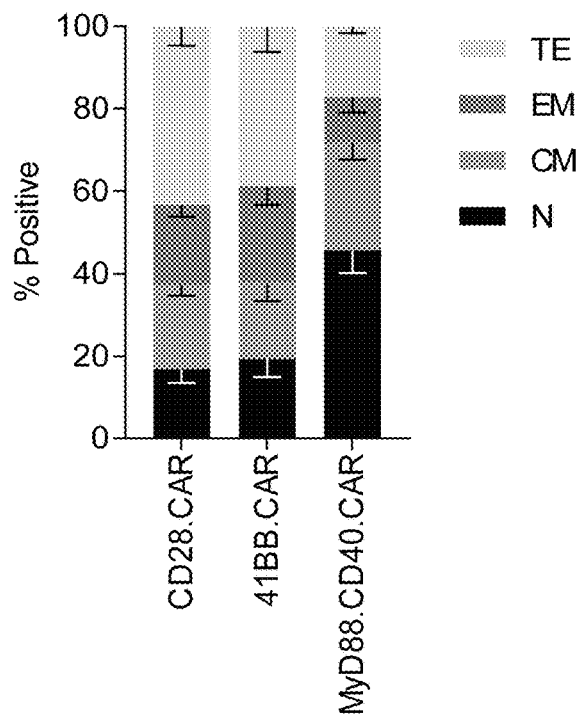

Next, the CARs were evaluated in vitro. In coculture assays, CD28.ζ.CAR T cells secreted more cytokines (IFNγ and IL2, FIGS. 2A-2B, respectively) and killed EphA2+ target cells faster in comparison to MyD88.CD40.ζ.CAR T cells (FIG. 2C). MyD88.CD40.ζ.CAR T cells, however, produced significant amounts of IFNγ (*$p<0.05$) and IL2 (*$p<0.01$) in the presence of EphA2+ U373 cells, and did not exhibit background killing of k/o U373 cells (FIGS. 2A-2C). Consistent with greater T-cell activation, CD28.ζ.CAR T-cell cultures had a higher percentage of terminally differentiated CAR T cells (CD45RA+/CCR7−) in comparison to MyD88.CD40.ζ.CAR T cells (FIGS. 3B-3C). Notably, in repeat stimulation assays (diagrammed in FIG. 3A), in which fresh tumor cells were added to CAR T cells weekly, only MyD88.CD40. ζ.CAR T cells maintained their ability to expand and kill tumor cells in contrast to CD28. ζ.CAR or 4-1BB.ζ.CAR T cells (FIGS. 3B-3C).

The following cell lines were used for the in vitro characterization of CAR T cells: U373 (GBM), LM7 (osteosarcoma), and 293T (human embryonic kidney) were purchased from the American Type Culture Collection (ATCC, Manassas, VA). LM7 cells expressing eGFP and firefly luciferase (LM7.eGFP.ffLuc) were generated by lentiviral transduction. U373 EphA2 KO cells were generated using CRISPR/Cas9. A guide RNA targeting the sequence GGGGGGCCGCTCACCCGCAA (SEQ ID NO:62) was selected using the online CRISPRscan scoring algorithm (Giraldez Lab, Yale University) to maximize cutting efficiency and minimize off-target effects. sgRNA was generated using the HiScribe T7 in vitro transcription kit (New England Biola bs, Ipswich, MA). U373 cells were electroporated with 1 µg Cas9 with NLS (PNA Bio, Newbury Park, CA) and 1 µg sgRNA using the Neon Transfection System (ThermoFisher Scientific, Waltham, MA). Flow cytometry was used to confirm EphA2 knockout. T cells and cell lines were grown in RPMI or DMEM (GE Healthcare Life Sciences HyClone Laboratories, Logan, UT) with 10% fetal bovine serum (FBS; GE Healthcare Life Sciences HyClone)

and 2 mM GlutaMAX-I (Invitrogen, Carlsbad, CA). The "Characterized Cell Line Core Facility" at MD Anderson Cancer Center (Houston, TX) performed cell line validation.

Cytokine Production: In order to assess cytokine production, $1 \times 10^6$ T cells were co-cultured with $5 \times 10^5$ U373 cells without the provision of exogenous cytokines. 24 hours later, supernatant was collected and frozen for later analysis. Cytokines were measured using a MILLIPLEX® MAP Human Cytokine/Chemokine Magnetic Bead Panel (EMD Millipore, Burlington, MA) kit on a FLEXMAP 3D® System (Luminex, Austin, TX).

Cytotoxicity Assay: A CellTiter96® AQ$_{ueous}$ One Solution Cell Proliferation Assay (Promega, Madison, WI) was utilized to assess CAR T cell cytotoxicity. In a tissue culture-treated 96-well plate, 12,500 U373 cells were co-cultured with serial dilutions of T cells to give effector: target ratios of 2.5:1, 1.25:1, 0.6:1, and 0.3:1. Media or tumor cells alone served as controls for background and no T cell-mediated cytotoxicity, respectively. Each condition was plated in triplicate. After 24 hours, the media and T cells were removed by gently pipetting up and down to avoid disrupting adherent U373 cells. CellTiter96® AQ$_{ueous}$ One Solution Reagent (MTS+phenazine ethosulfate, an electron coupling reagent) in RPMI-10% FBS was added to each well and incubated at 37C, 5% $CO_2$ for 2 hours. The absorbance at 492 nm was measured using an Infinite® 200 Pro MPlex plate reader (Tecan, Männedorf, Switzerland) to assess the number of viable cells in each well. % Live tumor cells was determined by the following formula: (sample-media alone)/(tumor alone-media alone)*100%.

Repeat Stimulation Assay: $1 \times 10^6$ T cells were co-cultured with $5 \times 10^5$ U373 cells in a 24-well plate without the provision of exogenous cytokines. Seven days later, the number of T cells was determined with a hemocytometer. If the T cells killed and expanded, $1 \times 10^6$ T cells were re-plated against $5 \times 10^5$ fresh U373 tumor cells. This process was repeated weekly until the T cells no longer killed the tumor cells or expanded.

Statistical analysis: All in vitro experiments were performed at least in triplicate, GraphPad Prism 7 software (GraphPad software, Inc., La Jolla, CA) was used for statistical analysis. Measurement data were presented as mean±standard deviation (SD). The differences between means were tested by appropriate tests. The significance level used was P<0.05.

Example 3. In Vivo Characterization of CARs

Figure 4A:
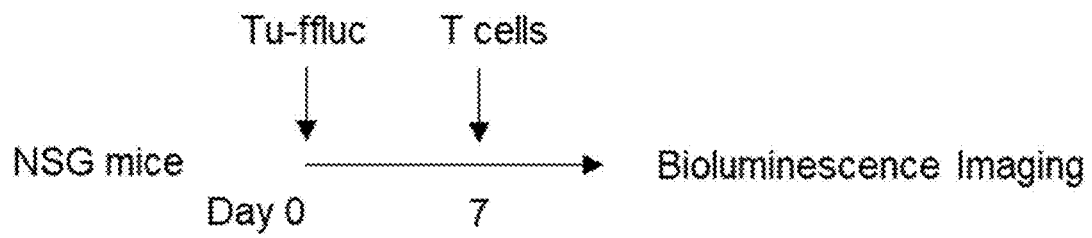
FIGS. 4A-4D demonstrate that MyD88.CD40 CAR T cells exhibit superior anti-tumor activity compared with 4-1BB.CAR T cells in an intraperitoneal LM7 xenograft model.
Figure 4B:
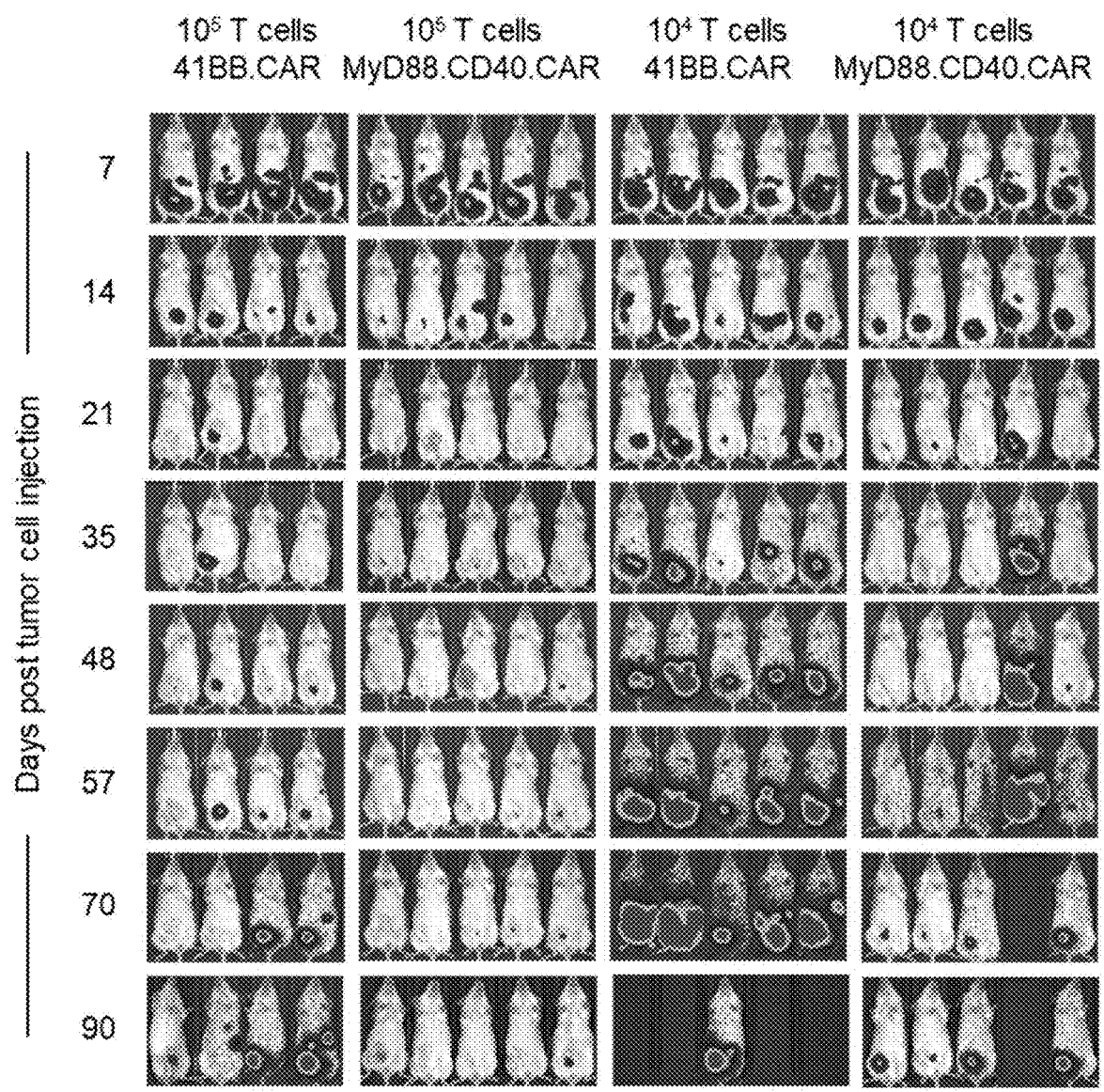
Figure 4C:
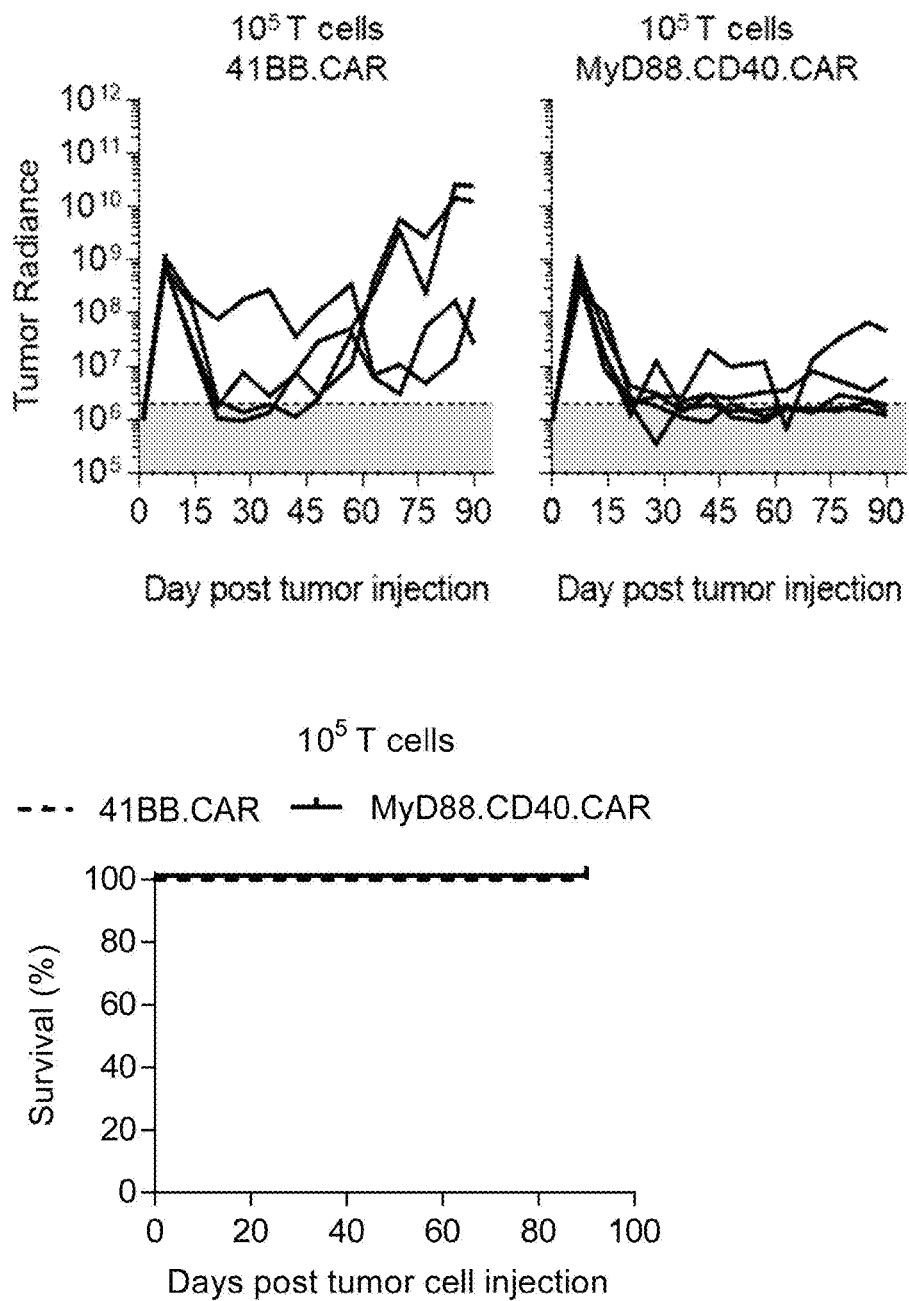
Figure 4D:
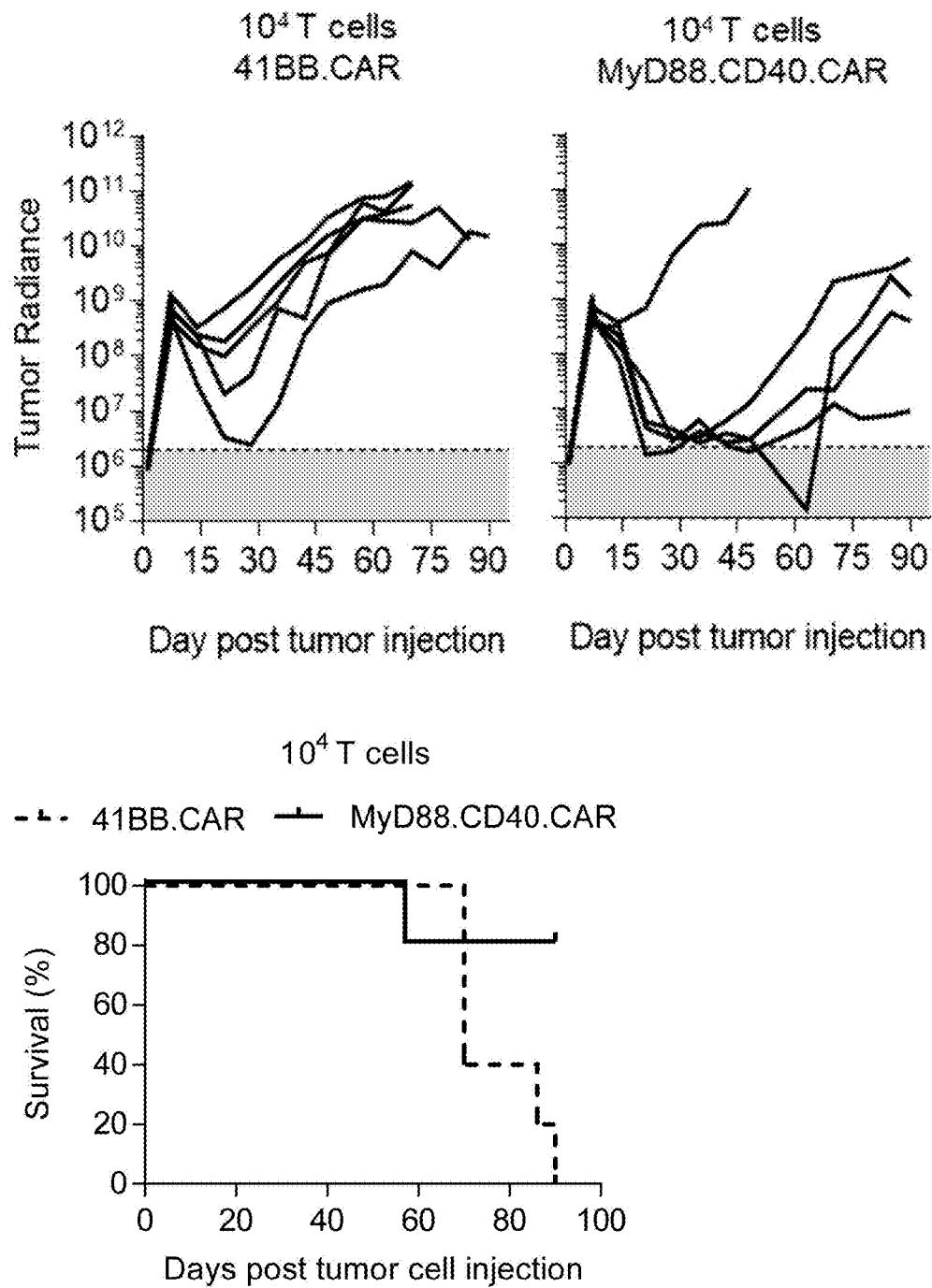
Figure 5A:
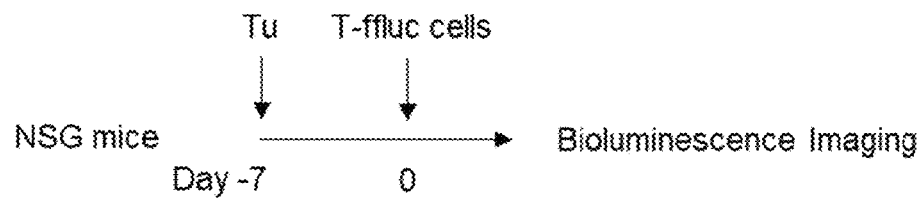
FIGS. 5A-5D demonstrate that MyD88.CD40.ζ.CAR T cells expand better compared with CD28.ζ.CAR or 4-1BB.ζ.CAR T cells in an intraperitoneal LM7 xenograft model.
Figure 5B:
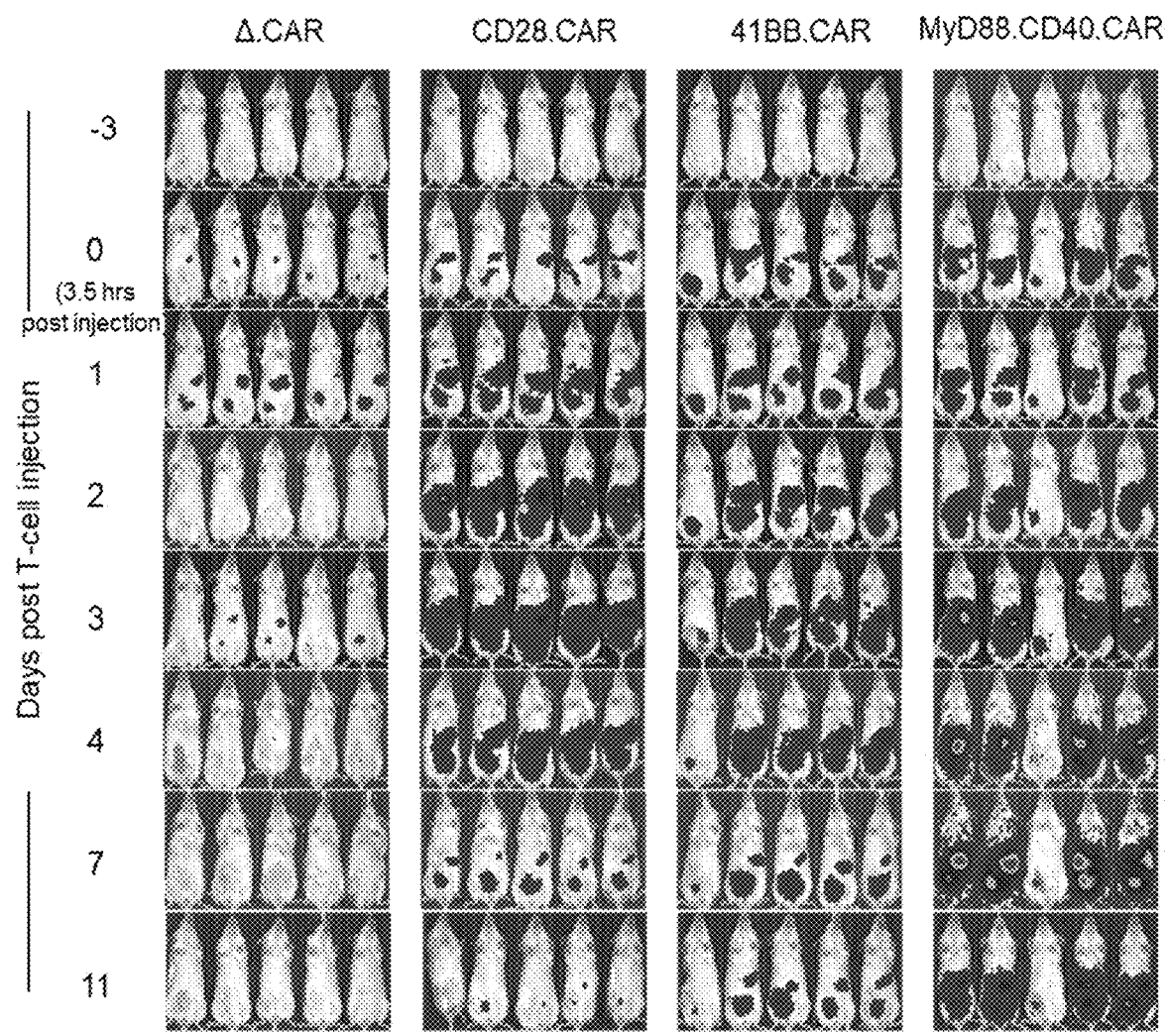
Figure 5C:
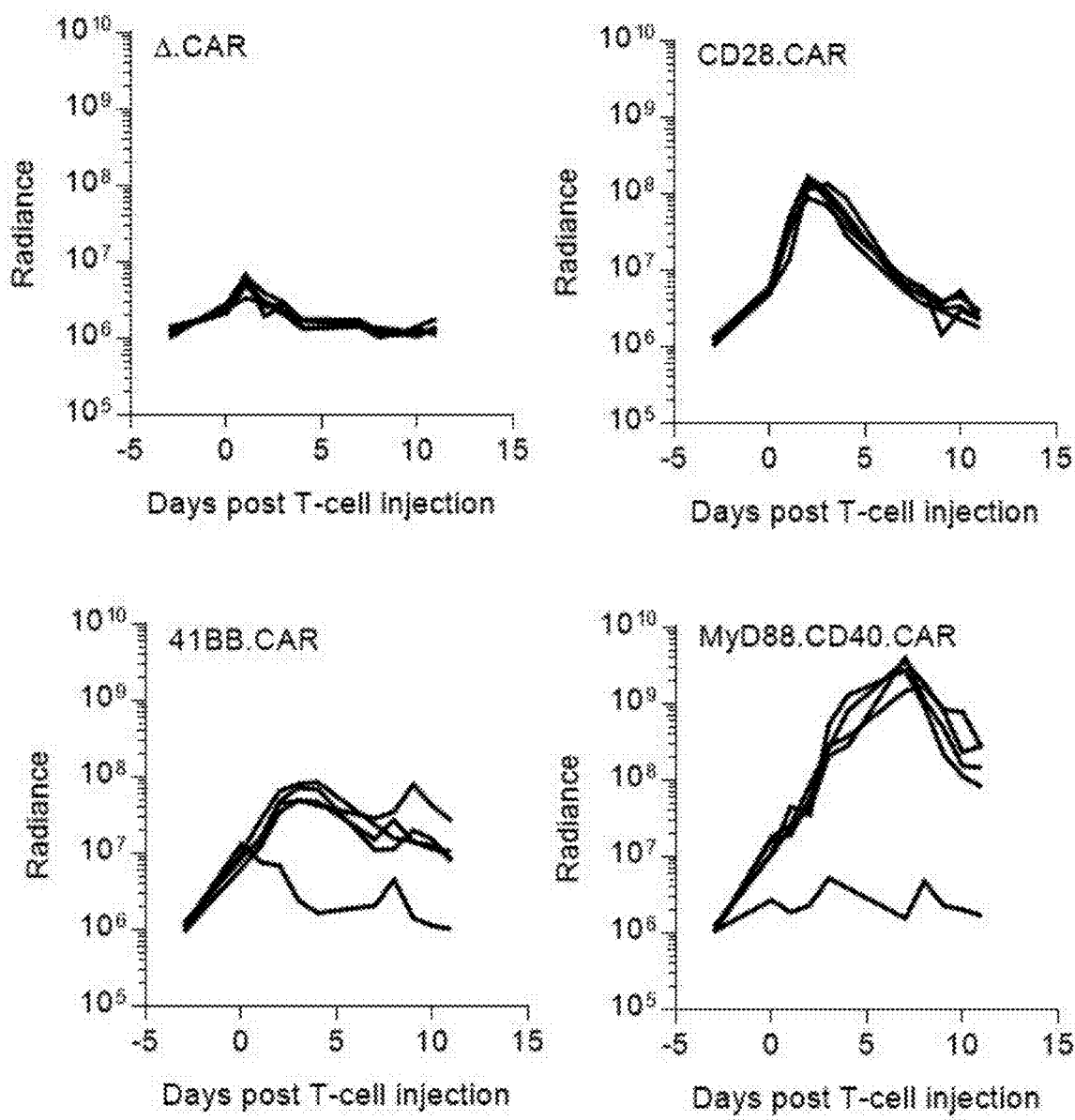
Figure 5D:
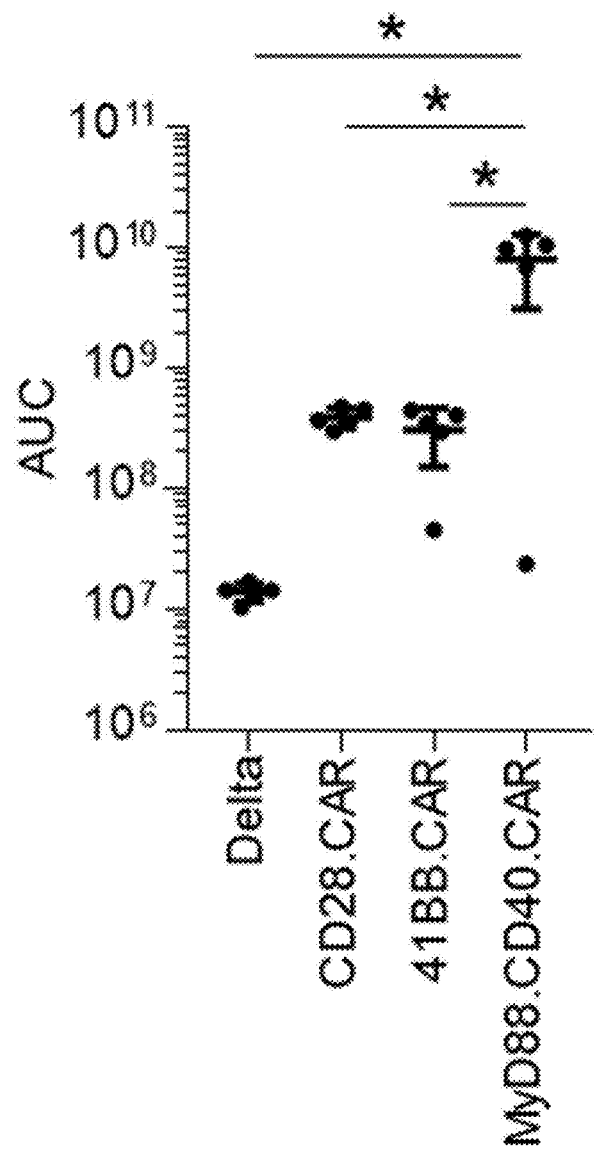

Next, the CARs were evaluated in vivo. In in vivo experiments, a low dose of MyD88.CD40.ζ.CAR T cells ($1 \times 10^4$) had superior antitumor activity in the EphA2+LM7 osteosarcoma xenograft model in comparison to 4-1BB.ζ.CAR T cells and CD28.ζ.CAR T cells. MyD88.CD40.ζ.CAR T cells exhibited superior anti-tumor activity compared with 4-1BB.ζ.CAR T cells (FIGS. 4A-4D). After injection of 4-1BB.ζ.CAR or MyD88.CD40.ζ.CAR T cells there was a rapid reduction in tumor size as judged by bioluminescence imaging. While tumors after 4-1BB.ζ.CAR T-cell therapy recurred earlier, there was no significant difference in overall survival between both mice during the first 83 days post T-cell infection (FIG. 4C). After injection of 4-1BB.ζ.CAR or MyD88.CD40.ζ.CAR T cells, only MyD88.CD40.ζ.CAR T-cell treated mice exhibited prolonged antitumor responses, which translated in a significant (p<0.05) survival advantage (FIG. 4D). Further, MyD88.CD40.ζ.CAR T cells expanded better compared with CD28.ζ.CAR or 4-1BB.ζ.CAR T cells in the intraperitoneal LM7 xenograft model (FIGS. 5A-5D).

Animal experiments followed a protocol approved by the St. Jude Children's Research Hospital Institutional Animal Care and Use Committee. All experiments utilized 8-10 week male NOD-scid IL2Rgamma$^{null}$ (NSG) mice purchased from The Jackson Laboratory (Bar Harbor, ME). To assess anti-tumor activity, mice were injected intraperitoneally (i.p.) with $1 \times 10^6$ LM7 cells genetically modified to express firefly-luciferase. Seven days later, $1 \times 10^5$, $1 \times 10^4$, or $1 \times 10^3$ 41BB.CAR or MyD88.CD40.CAR T cells were injected i.p. Tumor burden was monitored weekly using bioluminescence imaging. Mice were injected i.p. with 150 mg/kg of D-luciferin 5-10 minutes before imaging, anesthetized with isoflurane (1.5-2% delivered in 100% $O_2$ at 1 l/min), and imaged with a Xenogen IVIS-200 (IVIS; Xenogen, Alameda, CA) imaging system. The photons emitted from the luciferase-expressing tumor cells were quantified using Living Image software (Caliper Life Sciences, Hopkinton, MA). To monitor T cell persistence, T cells were doubly transduced with eGFP-ffLuc and an EphA2.CAR. Mice were injected i.p. with $1 \times 10^6$ unmodified LM7 cells. Seven days later, $1 \times 10^5$ CD28.2-ffLuc, 41BB.ζ-ffLuc, or MyD88.CD40ζ-ffLuc T cells were injected i.p. The presence of T cells was monitored daily using bioluminescence imaging as described above. Survival determined from the time of tumor cell injection was analyzed by the Kaplan-Meier method, and area under the curve (AUC) analyses was performed using GraphPad Prism 7 software.

Example 4. Difficulties in Generating MyD88.CD40 CARS

In an attempt to generate additional CARs with the MyD88.CD40 structure, additional CARs were generated and tested. This example demonstrates the difficulty of generating other MyD88.CD40 CARs, and potential solutions to overcome the issues encountered here.

Figure 7A:
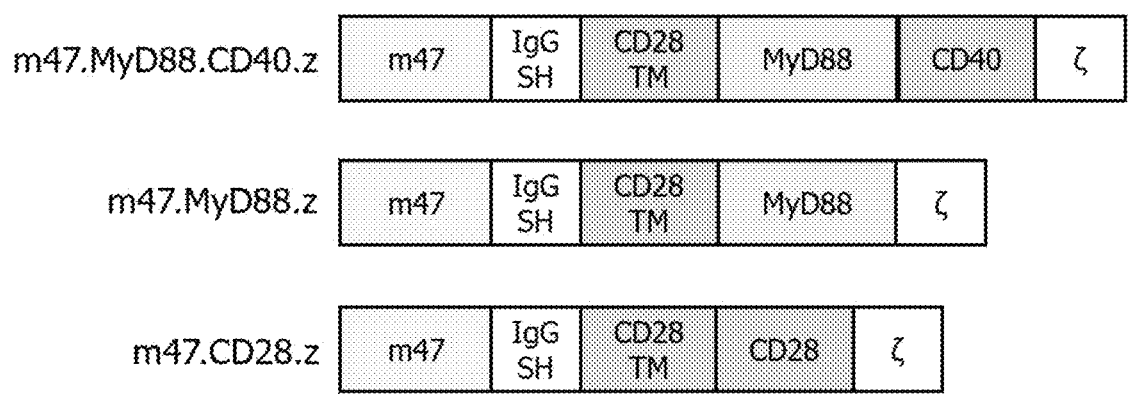

Frist, the IL13Rα2-specific CAR constructs (FIG. 7A-7D) were generated and evaluated. Each construct consists of the same IL13Rα2-specific scFv m47, an IgG core hinge, a transmembrane domain, a co-stimulatory domain, and CD3ζ. Flow cytometry was used to determine the expression of CARs 7 to 10 days after transduction (FIG. 7E). m47.MyD88.CARs were not expressed on the cell surface, and m47.MyD88.CD40.CARs were expressed at lower levels than CD28.CARs. Western blot analysis of CAR T cells revealed equal expression of all three CARs (FIG. 7F), indicating that MyD88.CAR and MyD88.CD40.CARs are inefficiently transported to the cell surface and/or are rapidly internalized once they reach the cell surface. CAR T cells were incubated with IL13Rα2+ U373 cells and their ability to kill tumor cells was scored by microscopic examination after 48 to 72 hours (FIG. 7G). While CD28.CAR T cells readily killed U373 cells, no killing was induced by MyD88.CD40.CAR or MyD88.CAR T cells. These results demonstrate that MyD88 detrimentally affects the function of CARs containing the IL13Rα2-specific m47 scFv.

Figure 8A:
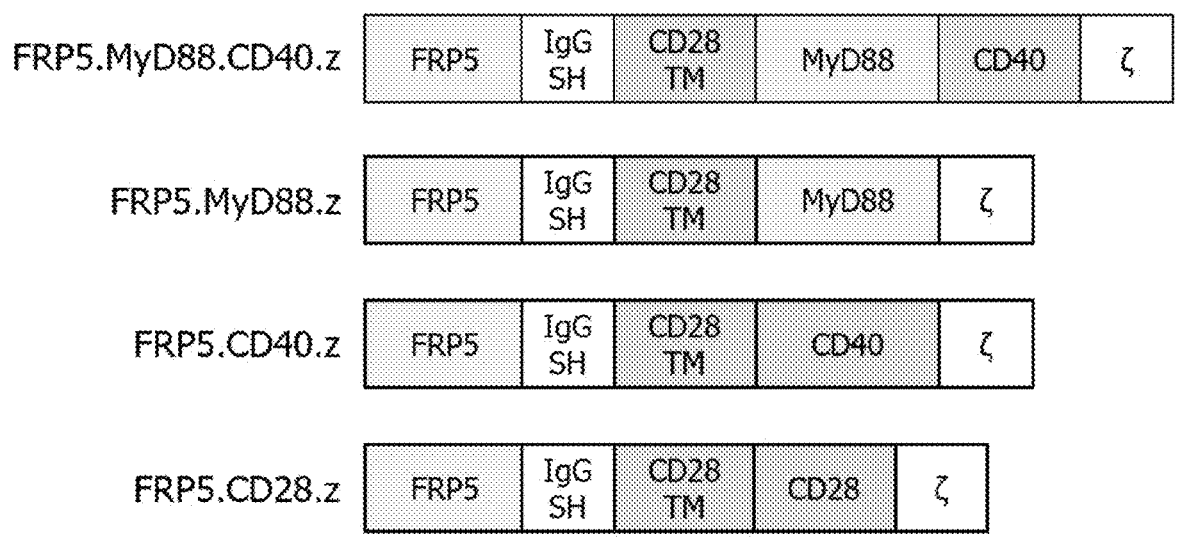
Figure 8G:
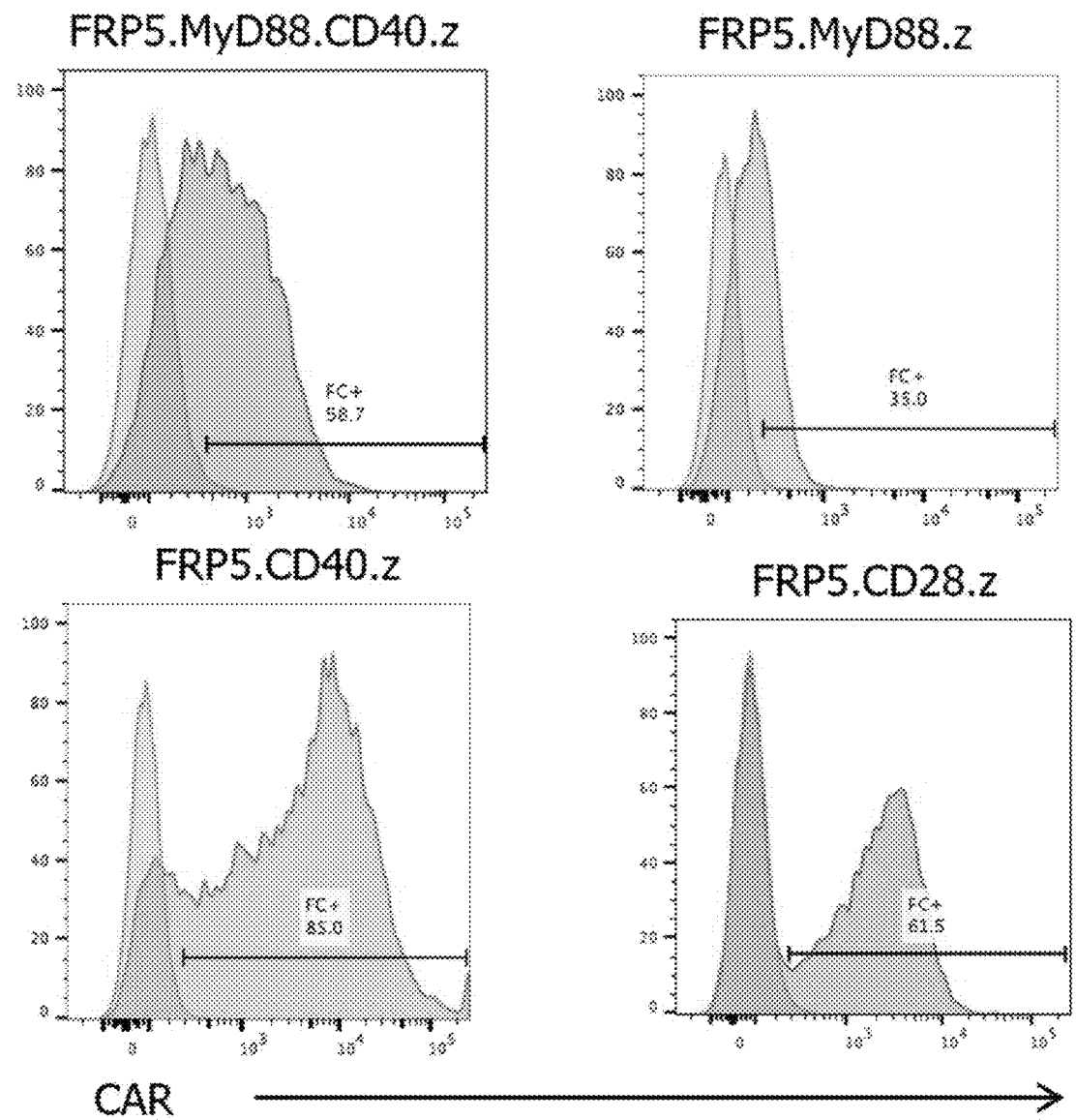

To confirm the finding that MyD88 can detrimentally affect CAR function, CAR using the HER2-specific scFv FRP5 (FIGS. 8A-8F) were generated and evaluated. Each consists of the same HER2-specific scFv FRP5, an IgG core hinge, a transmembrane domain, a costimulatory domain, and CD3ζ. For transduction efficiency of HER2-CAR T cells, flow cytometry was used to determine the expression of CARs 7 to 10 days after transduction (FIG. 8G (Individual FACS plot) and FIG. 8H (Summary data)). The results demonstrate that MyD88.CARs and MyD88.CD40 CARs are expressed at lower levels than CD28.CARs. CD40.CAR expression was similar to CD28.CARs. CAR T cells were incubated with HER2+U373 cells and their ability to kill tumor cells was scored by microscopic examination after 48 to 72 hours (FIG. 8I). While CD28.CAR and CD40.CAR T cells readily killed U373 cells, killing of MyD88.CD40.CAR or MyD88.CAR T cells was minimal. These results demonstrate that MyD88 also detrimentally affects the function of CARs containing the HER2-specific FRP5 scFv.

Figure 9F:
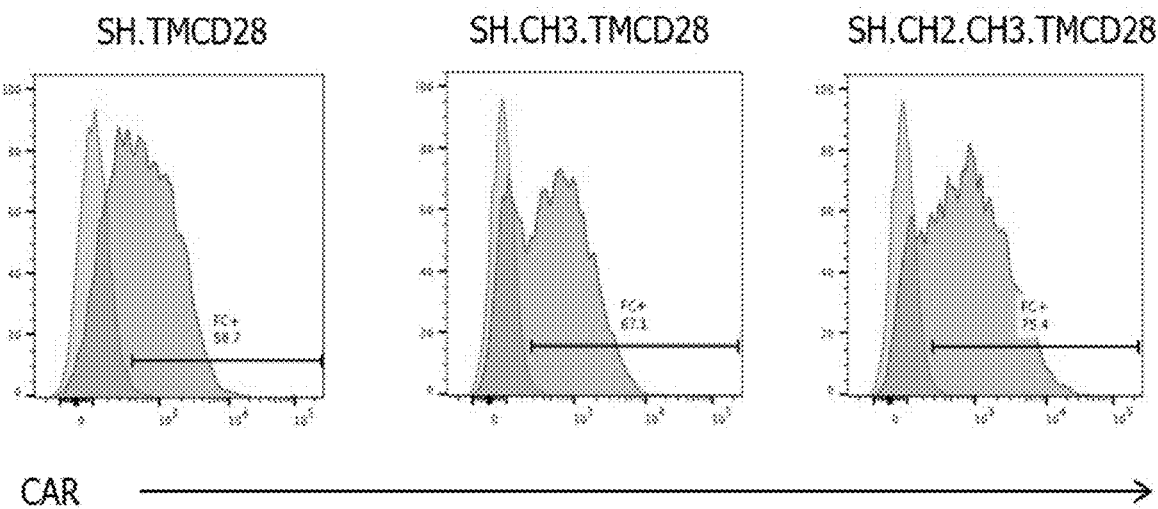
Figure 9G:
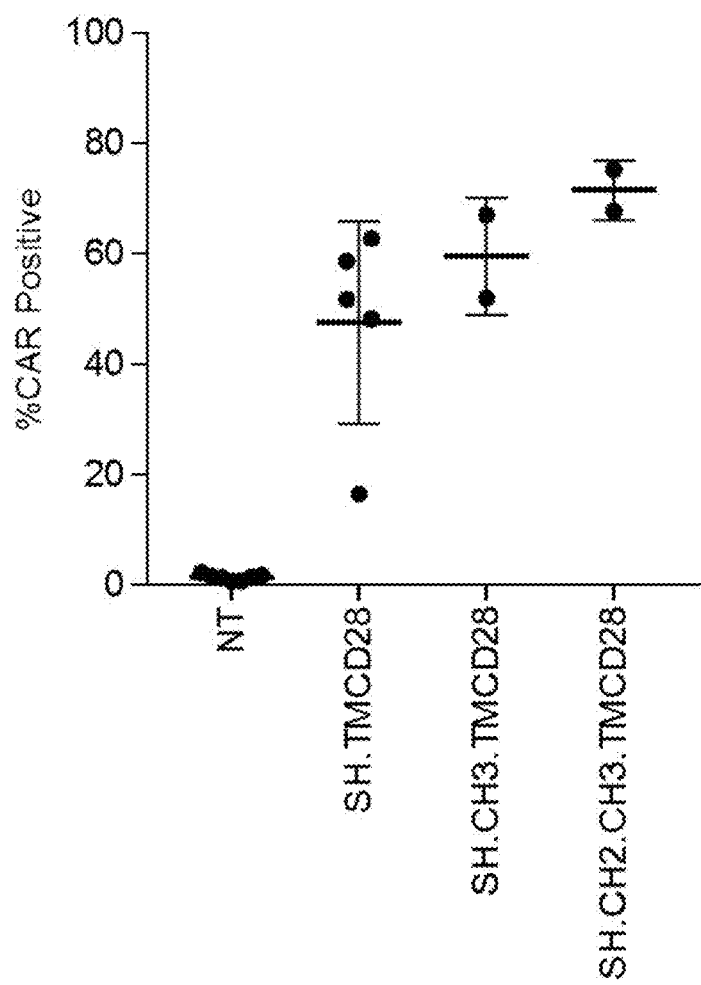
Figures 9H, 10A:
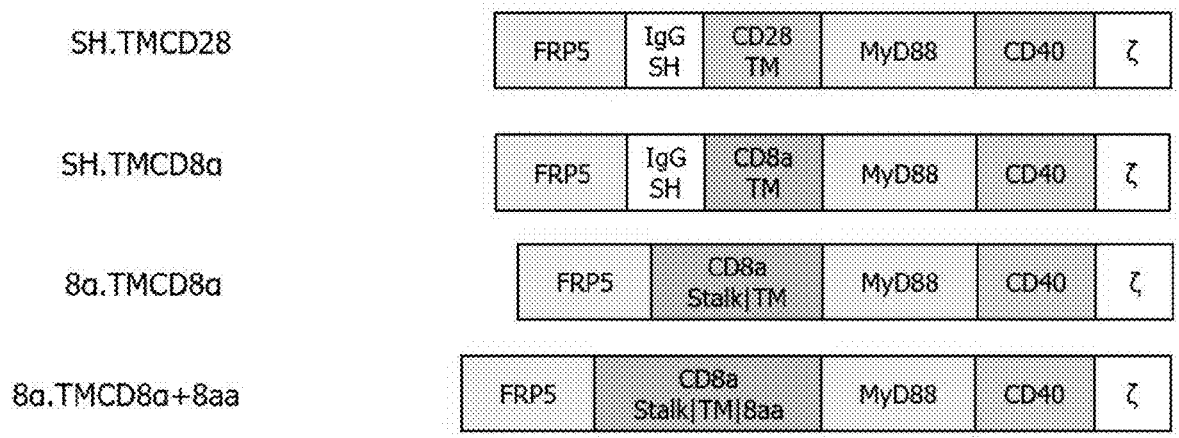

In FIG. 9 and FIG. 10 additional HER2-specific MyD88.CD40.CAR constructs are described and evaluated. In the experiments shown in FIG. 9, it was first evaluated if increasing the hinge region could rescue CAR function. FIGS. 8B-8C and 9A-9E show the HER2-specific CAR constructs evaluated. Each consists of the same HER2-specific scFv FRP5, different hinges (IgG core hinge (SH), IgG.SH+IgG.CH3, or IgG.SH+IgG.CH2+IgG.CH3), transmembrane domain, MyD88.CD40, and CD3ζ. Transduction efficiency of HER2-CAR T cells are shown in FIG. 9F and FIG. 9G. Flow cytometry was used to determine the expression of CARs 7 to 10 days after transduction (FIG. 9F (Individual FACS plot) and FIG. 9G (Summary data)). The results demonstrate no significant differences between CAR constructs. CAR T cells were incubated with HER2+U373 cells and their ability to kill tumor cells was scored by microscopic examination after 48 to 72 hours. Only minimal killing was observed for all three constructs (FIG. 9H). These results demonstrate that increasing the hinge region does not improve HER2-specific MyD88.CD40.CAR function.

Figure 10E:
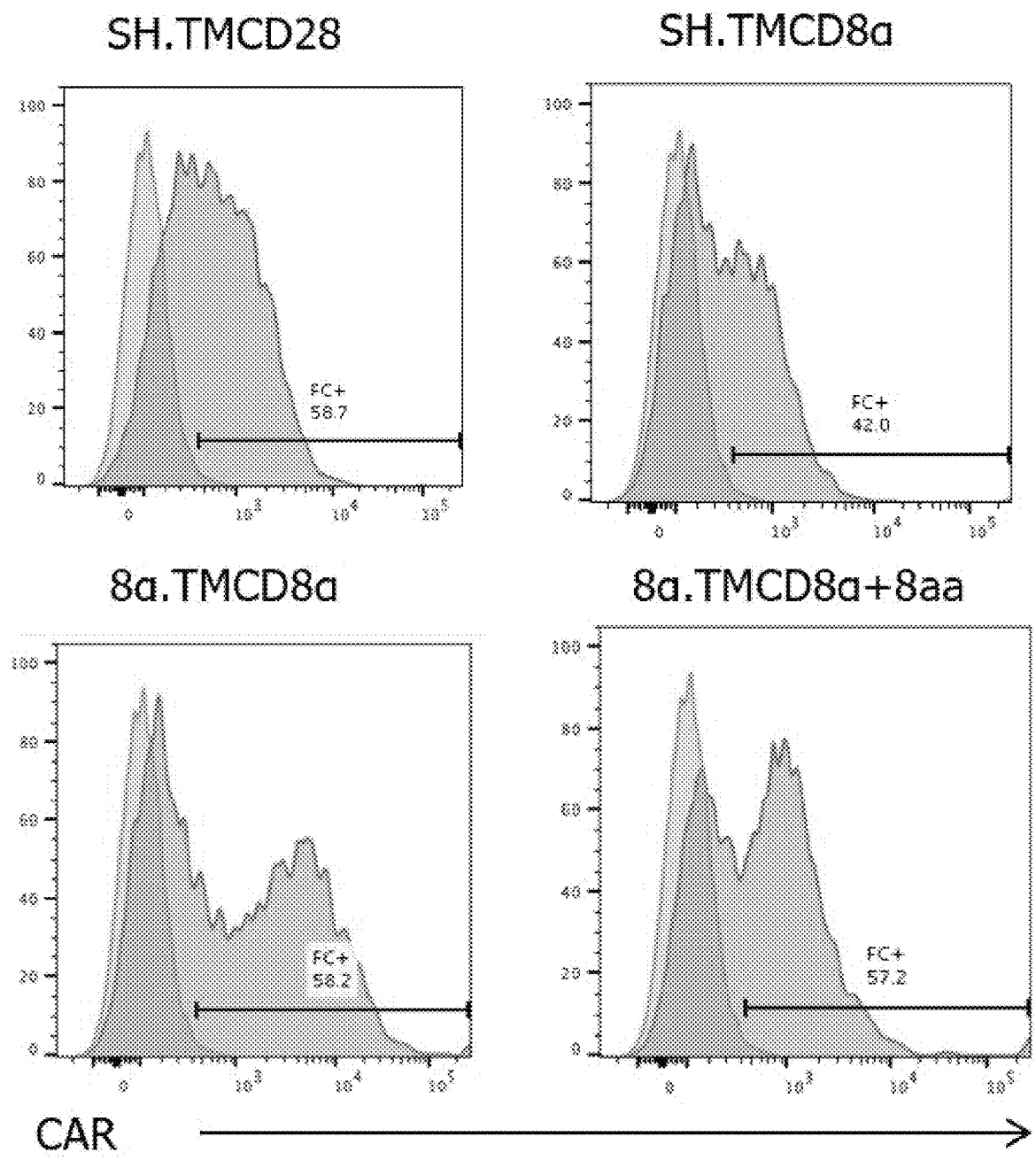
Figures 10F, 10G:
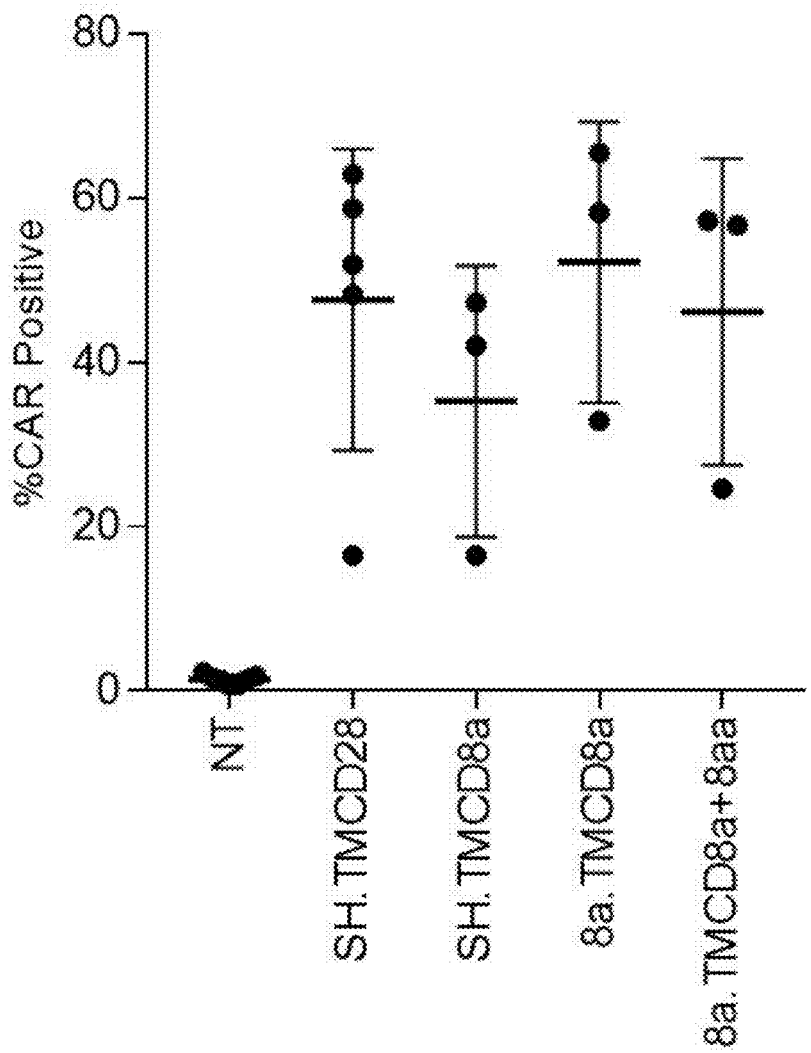

In the experiments shown in FIG. 10, it was evaluated if substituting the IgG.SH hinge and/or CD28 transmembrane domain could rescue CAR function (FIG. 10A-10D). Each consists of the same HER2-specific scFv FRP5, different hinges (IgG.SH (core hinge) or CD8a stalk), different transmembrane domains (CD28, CD8α, or CD8a with 8 amino acids of its cytoplasmic tail), MyD88.CD40, and CD3ζ. Transduction efficiency of HER2-CAR T cells are shown in FIG. 10E and FIG. 10F. Flow cytometry was used to determine the expression of CARs 7 to 10 days after transduction (FIG. 10E (Individual FACS plot) and FIG. 10F (Summary data)). The results demonstrate no significant differences between CAR constructs; however CARs with a CD8α stalk and a CD8α+8aa transmembrane domain (8a.TMCD8α+8aa) were expressed at slightly higher levels. CAR T cells were incubated with HER2+U373 cells and their ability to kill tumor cells was scored by microscopic examination after 48 to 72 hours. Only minimal killing was observed for all four constructs (FIG. 10G). These results demonstrate that changing the transmembrane domain and hinge region to CD8α does not significantly improve HER2-specific MyD88.CD40.CAR function.

In summary, the experiments shown in FIGS. 7 to 10 demonstrate that MyD88 interferes with CD3ζ activation. Thus, for MyD88.CD40.CARs, which are not functional, CD3ζ and MyD88.CD40 signaling might need to be separated. For example, T cells could be genetically modified with two molecules: the first encodes a CAR, and the second a chimeric molecule consisting of an extracellular domain, a transmembrane domain, and a MyD88.CD40 signaling domain. The extracellular domain may consist of a scFv, but if no antigen-specificity is desired, other amino acid sequences could be substituted (e.g., the extracellular domain of CD19, CD34 or a fragment there of). If needed, additional structures such as a hinge might also be included in the extracellular domain. The transmembrane domain is derived from CD8, CD8α, CD4, CD3ζ, CD28, CD40, CD134 (OX-40), or CD7. Examples of four such molecules are illustrated in FIG. 11.

Example 5. Additional In Vivo Experiments

Figure 12A:
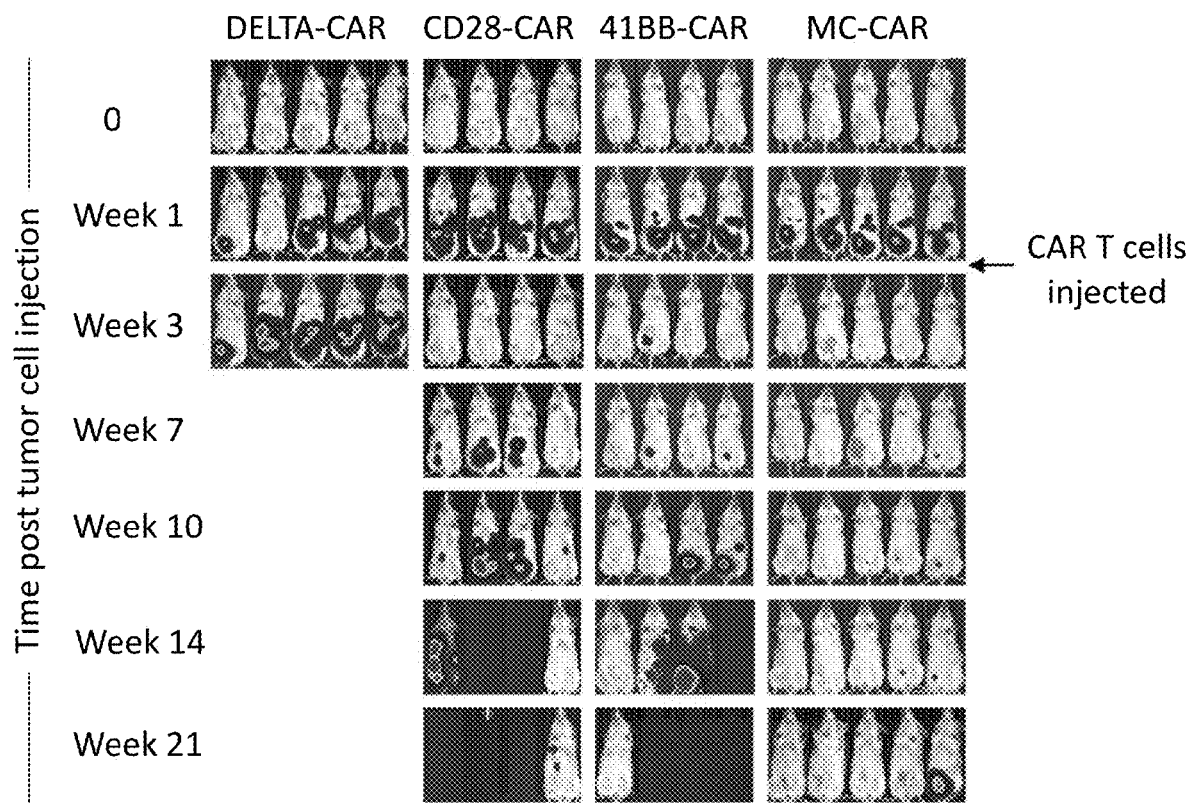
FIGS. 12A-E show an updated experiment from FIG. 4 with additional animals per group and longer follow up. In addition, it included one additional group (CD28.CAR T cells).
Figure 12B:
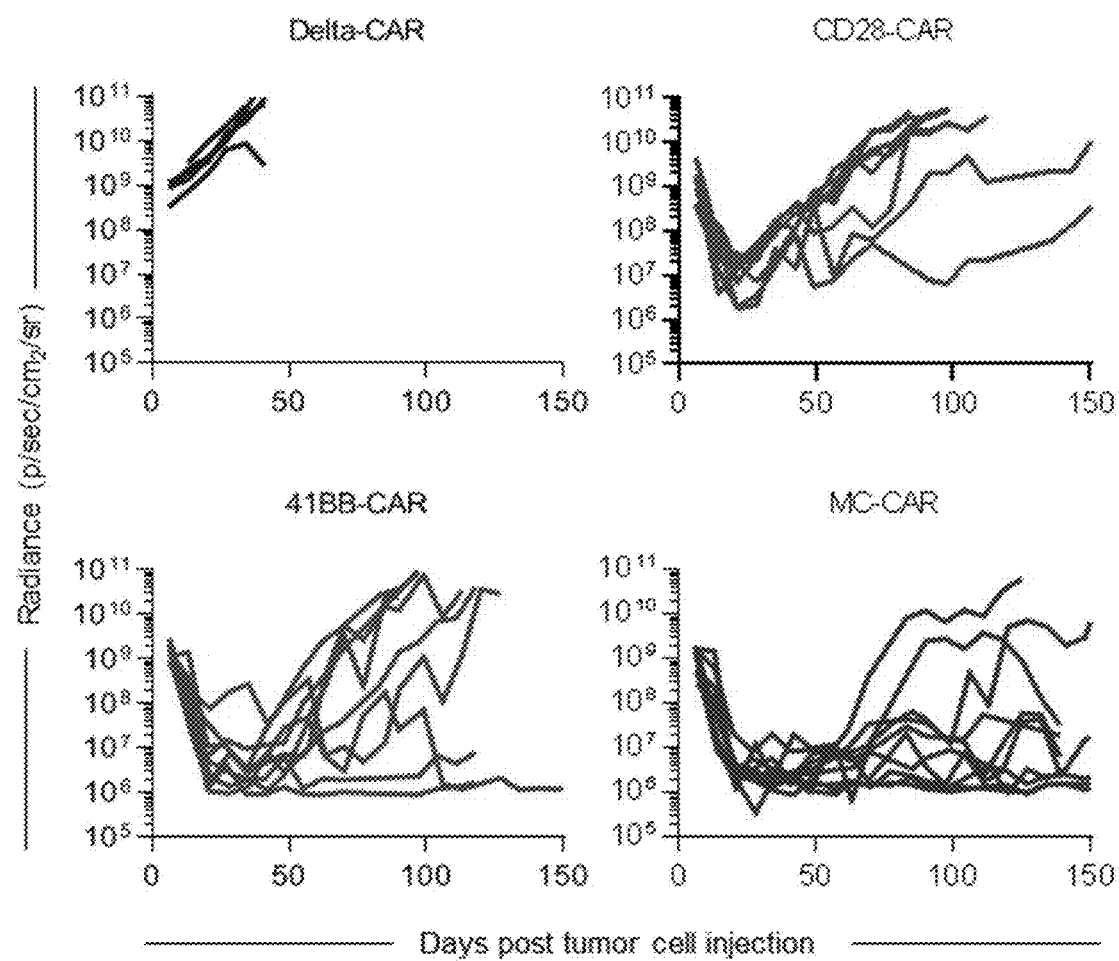
Figure 12C:
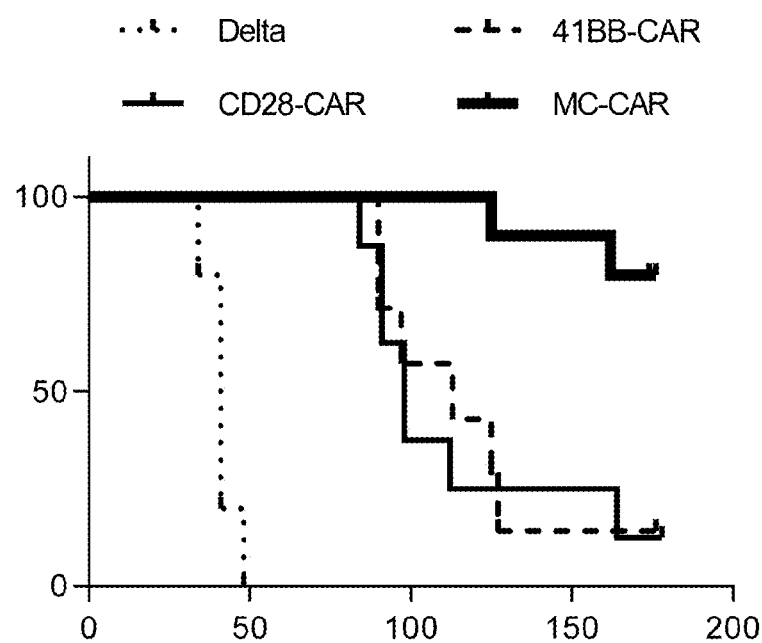
Figure 12D:
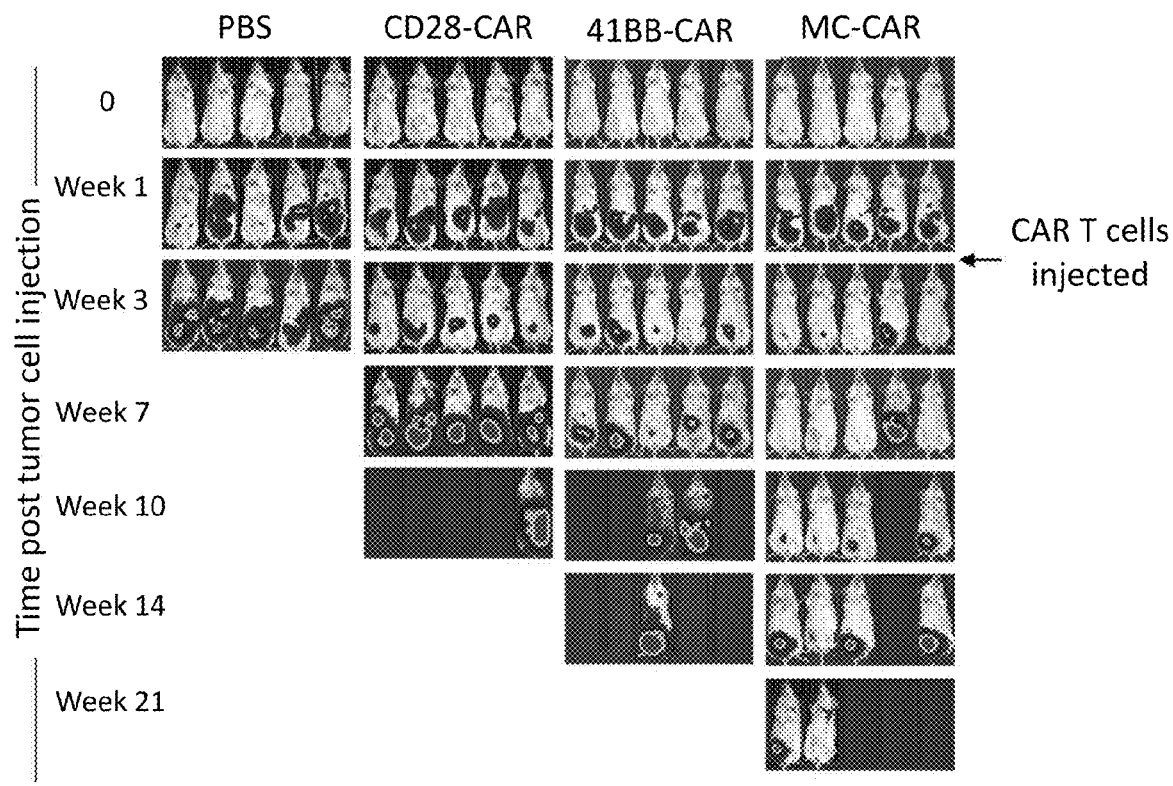
Figure 12E:
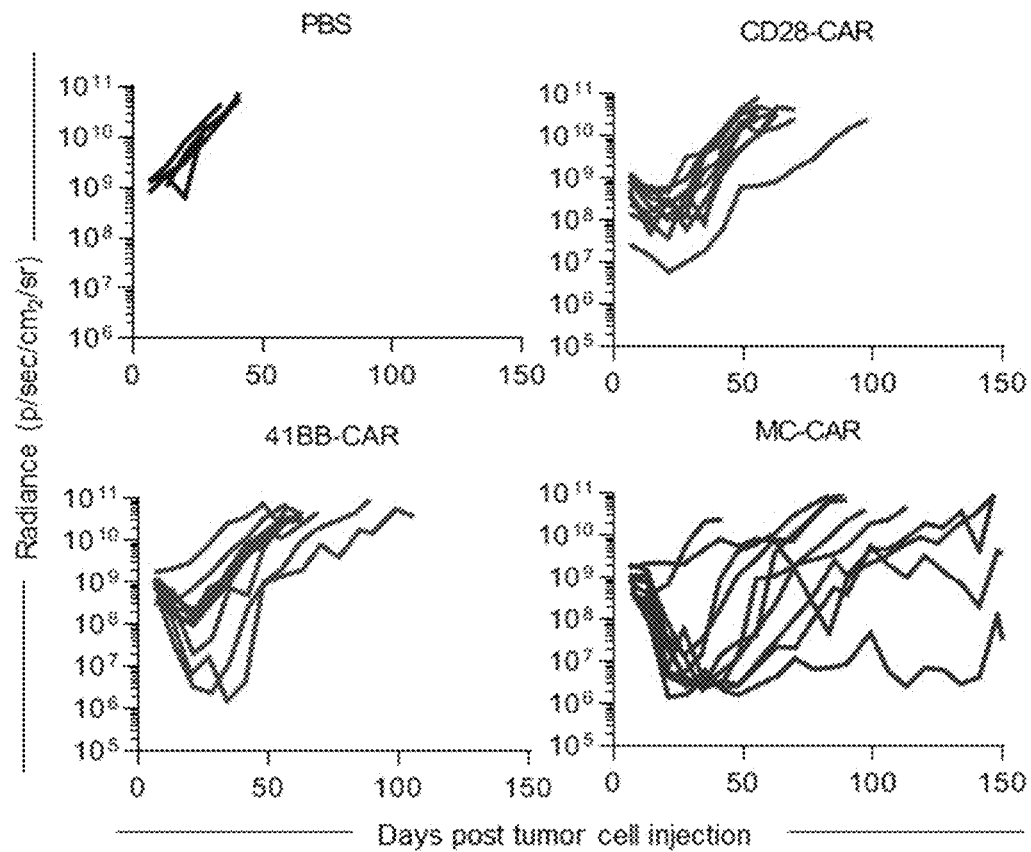
Figure 12F:
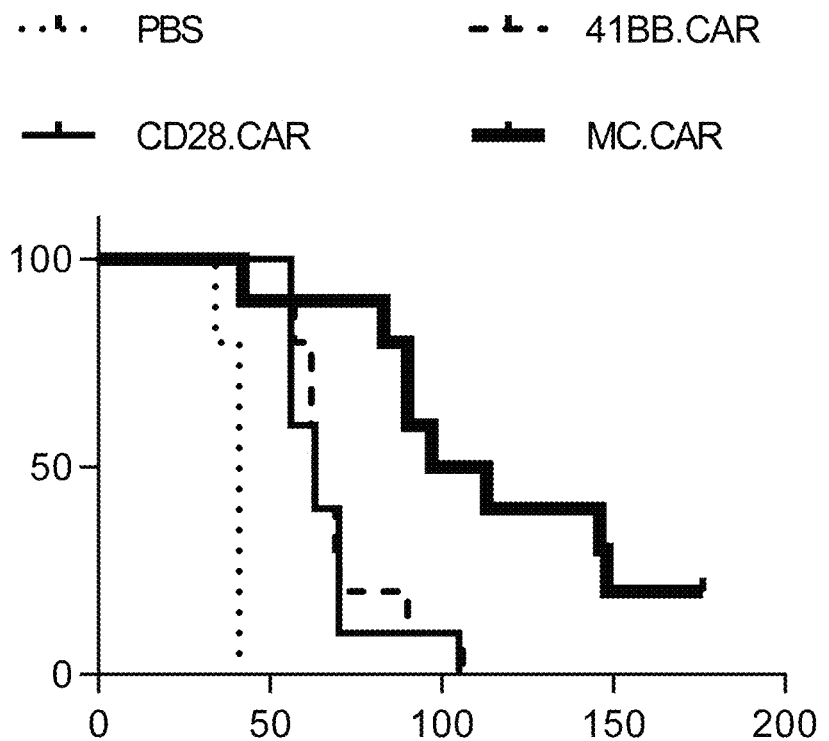

An updated in vivo experiment from FIG. 4 was carried out with additional animals per group and longer follow up. In addition, it included one additional group (CD28.CAR T cells). 8-week old female NSG mice were injected intraperitoneally (i.p.) with $10^6$ LM7 tumor cells, which were genetically modified to express firefly luciferase (ffluc) to enable non-invasive bioluminescence imaging to track tumor cells. On day +7, mice received a single i.p. injection of $10^5$ (FIGS. 12A-12C) or $10^4$ (FIGS. 12D-12F) CAR T cells. Tumor burden was monitored by bioluminescence imaging. IVIS images of individual mice are shown in FIG. 12A and FIG. 12D. Quantitative bioluminescence imaging and survival curve for $10^5$ CAR T cells are shown in FIG. 12B and FIG. 12C, respectively. After injection of CD28.CAR, 41BB.CAR or MyD88.CD40.CAR (MC-CAR) T cells there was a rapid reduction in tumor size as judged by bioluminescence imaging. While tumors after CD28.CAR and 41BB.CAR T-cell therapy recurred earlier, there was no significant difference in overall survival between both mice during the first 83 days post T-cell infection. However, long term follow-up revealed a significant survival advantage ($p<0.05$). Quantitative bioluminescence imaging and survival curve for $10^4$ CAR T cells are presented in FIG. 12E and FIG. 12F, respectively. After injection of CD28.CAR, 41BB.CAR or MyD88.CD40.CAR T cells only MyD88.CD40.CAR T-cell treated mice exhibited prolonged antitumor responses, which translated in a significant ($p<0.05$) survival advantage.

Example 6. Knocking out Endogenous TCRs

Figure 13A:
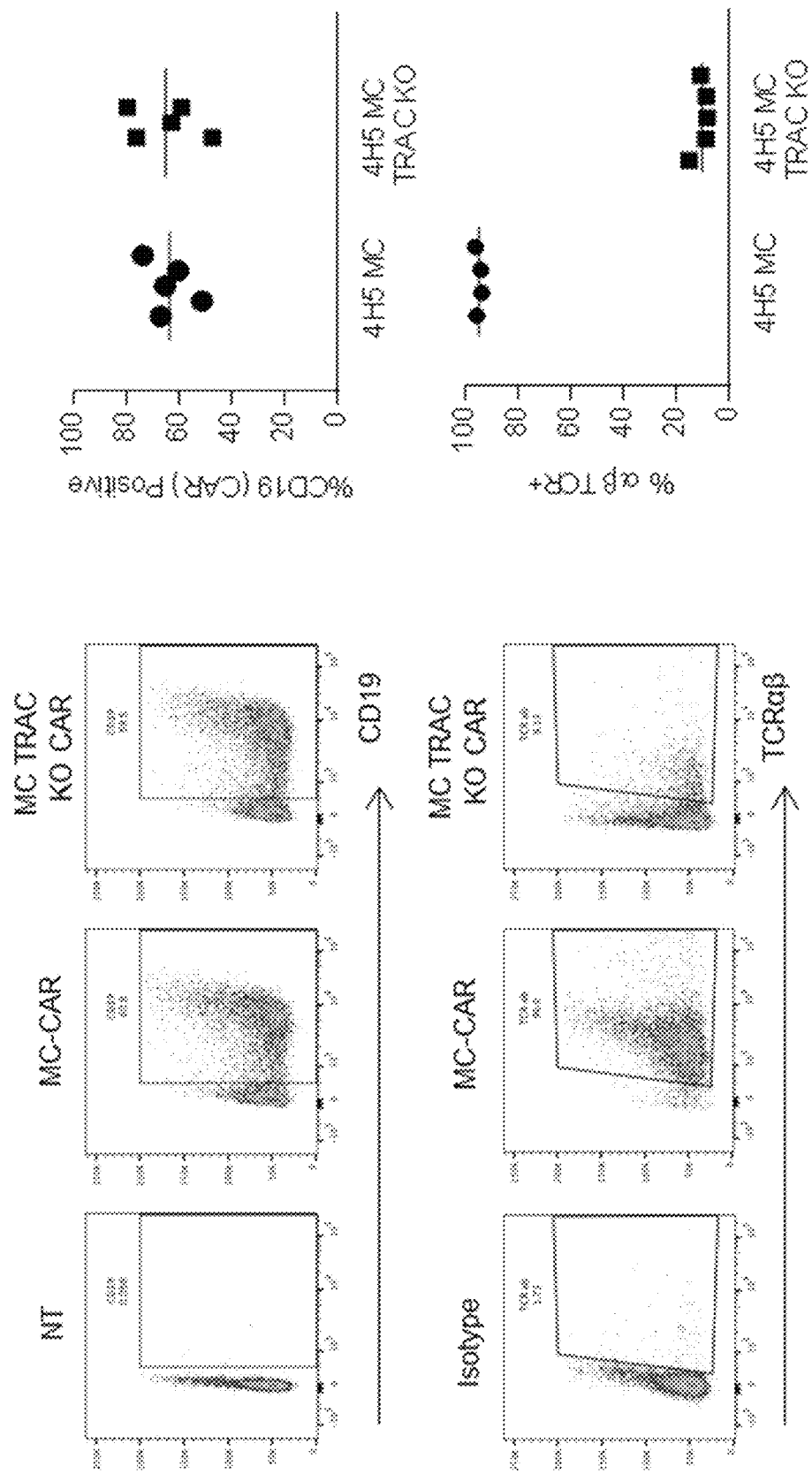
FIGS. 13A-13C demonstrate that the function of MyD88.CD40-CAR T cells depends on the presence of a functional zeta signaling domain within the CAR and not on the presence of endogenous αβ TCRs.
Figure 13B:
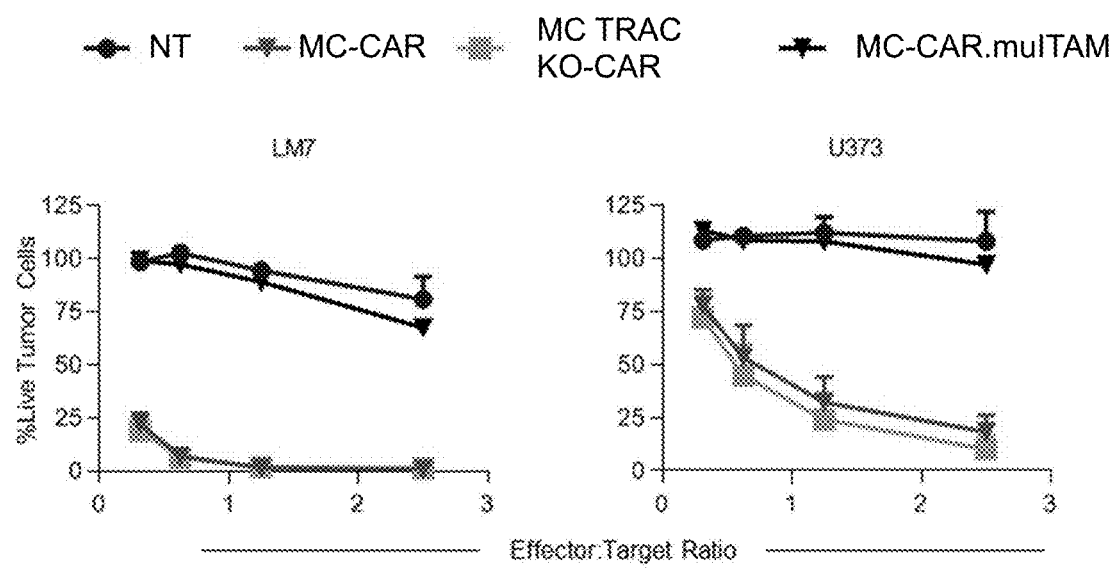
Figure 13C:
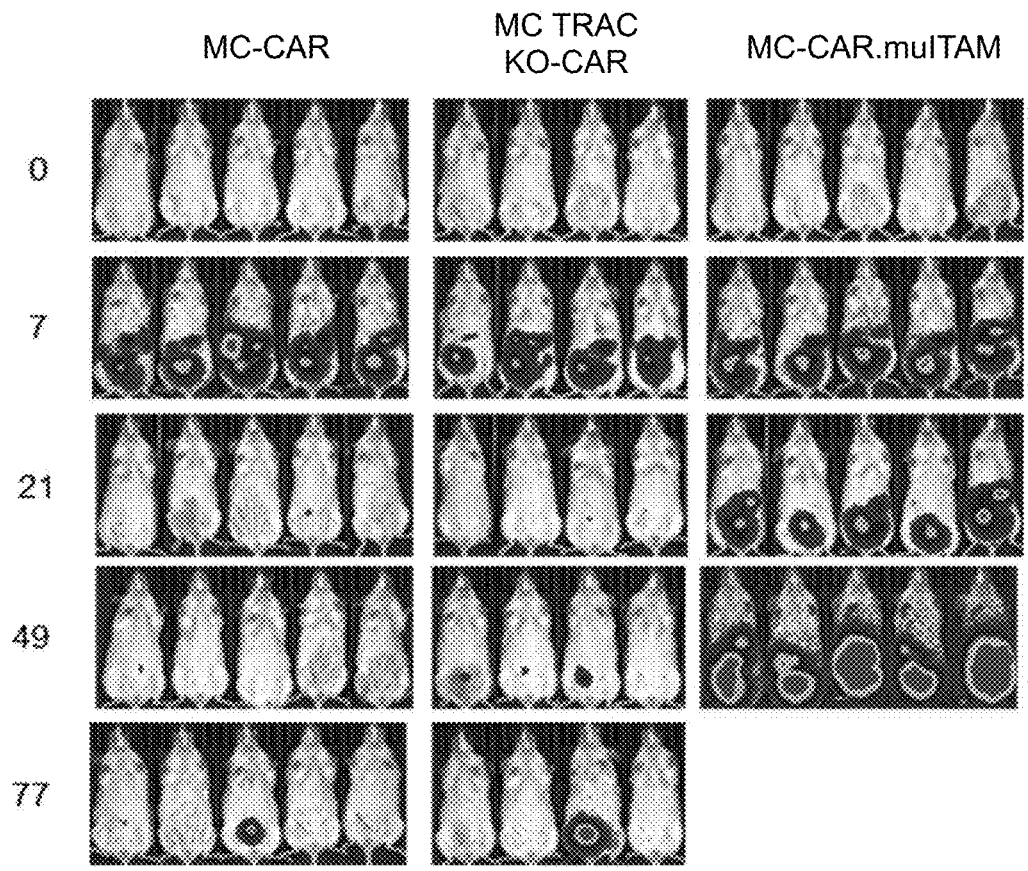

In the experiments shown in FIG. 13, it was demonstrated that the function of MyD88.CD40-CAR T cells depends on the presence of a functional zeta signaling domain within the CAR and not on the presence of endogenous αβ TCRs. MyD88.CD40-CAR (MC-CAR) T cells were generated in which the TRAC locus was knocked out (MC TRAC KO-CAR). The TRAC-KO CAR T cells were created by first transducing activated T cells with retroviral vectors encoding CARs, and then electroporating them with CAS9/TRAC-specific sgRNA ribonucleoprotein (RNP) complexes. The RNP complexes contained recombinant Cas9 (MacoLabs, Berkeley) and TRAC-specific sgRNA comprising the guide sequence CAGGGTTCTGGATATCTGT (SEQ ID NO: 98). Knocking out the TRAC locus resulted in the absence of cell surface expression of αβ TCRs (FIG. 13A). In a cytotoxicity assay, MC-CAR T cells and MC TRAC KO-CAR T cells killed EphA2+ tumor cells (U373, LM7) (FIG. 13B). In contrast non-transduced T cells (NT) did not kill target cells. In addition, T cells were generated by expressing a non-functional MyD88.CD40 CAR in which the immunoreceptor tyrosine-based activation motif (ITAM) was mutated (MC-CAR.mulTAM). All six tyrosines within the cytoplasmic domain of CD3z (SEQ ID NO: 19) were mutated to phenylalanine. MC-CAR.mulTAM T cells also did not kill tumor cells indicating that killing depends on an active CAR. The antitumor activity of CAR T cells was evaluated in the intraperitoneal LM7 xenograft model described in FIG. 4 with a T cell dose of $10^5$. MC-CAR T cells and MC TRAC KO-CAR T cells had similar antitumor activity whereas T cells expressing the non-functional CAR had no antitumor activity (FIG. 13C).

Figure 14A:
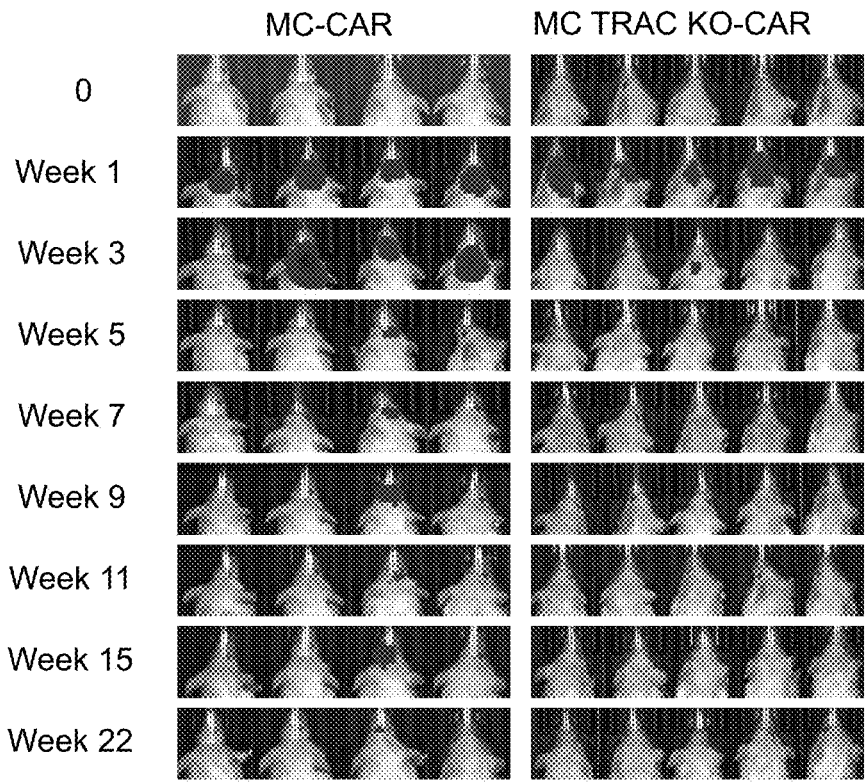
FIGS. 14A-14B demonstrate the antitumor activity of MC-CAR T cells and MC TRAC KO-CAR T cells in a glioma model. Luciferase-expressing EphA2+U373 cells were injected into the brain of NSG mice and on day 7, MC-CAR T cells or MC TRAC KO-CAR T cells were injected intravenously. Within 4 weeks of intravenous injection there was a dramatic reduction in tumor size as judged by bioluminescence imaging.
Figure 14B:
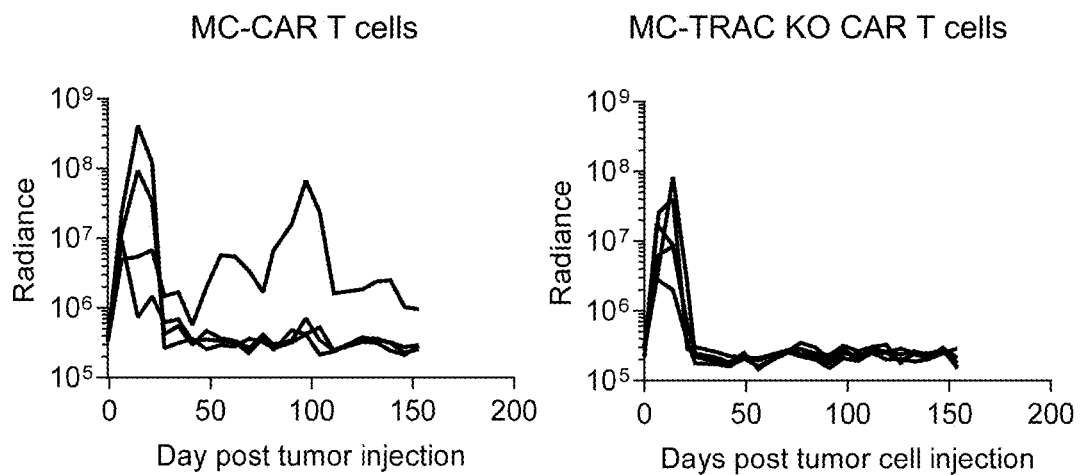

The antitumor activity of MC-CAR T cells and MC TRAC KO-CAR T cells was evaluated in a glioma model. Luciferase-expressing EphA2+ U373 cells were injected into the brain of NSG mice and on day 7, MC-CAR T cells or MC TRAC KO-CAR T cells were injected intravenously. Within 4 weeks of intravenous injection there was a dramatic reduction in tumor size as judged by bioluminescence imaging. The IVIS images of individual mice and quantitative bioluminescence imaging are presented in FIG. 14A and FIG. 14B, respectively.

REFERENCES

Park et. al., *Blood,* 2016; 127:3312-20
Beatty et al., *Pharmacol. Ther.* 2016; 166:30-39

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All patents, applications, publications, test methods, literature, and other materials cited herein are hereby incorporated by reference in their entirety as if physically present in this specification.

---

What is claimed is:

1. A polynucleotide encoding a chimeric antigen receptor (CAR) comprising the amino acid sequence of SEQ ID NO: 1, 26, 50, 52, 54, 56, or 58 or an amino acid sequence that has at least 95% sequence identity to SEQ ID NO: 1, 26, 50, 52, 54, 56, or 58.

2. The polynucleotide of claim 1, wherein the CAR is encoded by the nucleotide sequence of SEQ ID NO: 2, 27, 51, 53, 55, 57, or 59 or a nucleotide sequence that has at least 95% sequence identity to SEQ ID NO: 2, 27, 51, 53, 55, 57, or 59.

3. The polynucleotide of claim 1, wherein the CAR comprises the amino acid sequence of SEQ ID NO: 1, 26, 50, 52, 54, 56, or 58.

4. The polynucleotide of claim 1, wherein the polynucleotide comprises at least one polynucleotide sequence encoding a transduced host cell selection marker, an in vivo tracking marker, a cytokine, or a suicide gene.

5. A recombinant vector comprising the polynucleotide of claim 1, wherein the polynucleotide is operatively linked to at least one regulatory element for expression of the CAR.

6. A chimeric antigen receptor (CAR) encoded by the polynucleotide of claim 1.

7. An isolated host cell comprising the polynucleotide of claim 1.

8. A pharmaceutical composition comprising the host cell of claim 7 and a pharmaceutically acceptable carrier and/or excipient, wherein the host cell is a T-lymphocyte or a natural killer (NK) cell.

9. A method of enhancing activity of a T lymphocyte or a natural killer (NK) cell towards cells expressing EphA2 in a subject in need thereof comprising administering to the subject an effective amount of the pharmaceutical composition of claim 8, wherein the T-lymphocyte or the NK cell in the pharmaceutical composition is autologous or allogeneic to the subject.

10. A method for reducing one or more symptoms of a cancer expressing EphA2 in a subject in need thereof, said method comprising administering to the subject a therapeutically effective amount of cytotoxic T cells or natural killer (NK) cells comprising the CAR of claim 6, and wherein the cytotoxic T cells or NK cells are autologous or allogeneic to the subject.

\* \* \* \* \*